US011941457B2

(12) United States Patent
Lal et al.

(10) Patent No.: US 11,941,457 B2
(45) Date of Patent: Mar. 26, 2024

(54) DISAGGREGATED COMPUTING FOR DISTRIBUTED CONFIDENTIAL COMPUTING ENVIRONMENT

(71) Applicant: Intel Corporation, Santa Clara, CA (US)

(72) Inventors: Reshma Lal, Portland, OR (US); Pradeep Pappachan, Tualatin, OR (US); Luis Kida, Beaverton, OR (US); Soham Jayesh Desai, Hillsboro, OR (US); Sujoy Sen, Beaverton, OR (US); Selvakumar Panneer, Portland, OR (US); Robert Sharp, Austin, TX (US)

(73) Assignee: INTEL CORPORATION, Santa Clara, CA (US)

(*) Notice: Subject to any disclaimer, the term of this patent is extended or adjusted under 35 U.S.C. 154(b) by 216 days.

(21) Appl. No.: 17/525,143

(22) Filed: Nov. 12, 2021

(65) Prior Publication Data

US 2022/0100579 A1   Mar. 31, 2022

Related U.S. Application Data

(63) Continuation of application No. 17/133,066, filed on Dec. 23, 2020.
(Continued)

(51) Int. Cl.
*G06F 9/50* (2006.01)
*G06F 9/38* (2018.01)
(Continued)

(52) U.S. Cl.
CPC .......... *G06F 9/5083* (2013.01); *G06F 9/3814* (2013.01); *G06F 9/5027* (2013.01); *G06T 1/20* (2013.01); *G06T 1/60* (2013.01)

(58) Field of Classification Search
CPC .... G06F 9/5083; G06F 9/3814; G06F 9/5027; G06F 9/5066; G06F 9/5077; G06F 21/53;
(Continued)

(56) References Cited

U.S. PATENT DOCUMENTS 7,971,236 B1   6/2011   Lentini
8,930,717 B2   1/2015   Smith
(Continued)

FOREIGN PATENT DOCUMENTS

DE    102021207514 A1    3/2022
EP        2383648 A1    2/2011
(Continued)

OTHER PUBLICATIONS

Taranov, K. et al. "sRDMA—Efficient NIC-based Authentication and Encryption for Remote Direct Memory Access", 2020 USENIX Annual Technical Conference, Jul. 15-17, 2020, pp. 691-704.
(Continued)

*Primary Examiner* — Sisley N Kim
(74) *Attorney, Agent, or Firm* — JAFFERY WATSON MENDONSA & HAMILTON LLP

(57) ABSTRACT

An apparatus to facilitate disaggregated computing for a distributed confidential computing environment is disclosed. The apparatus includes a source remote direct memory access (RDMA) network interface controller (RNIC); a queue to store a data entry corresponding to an RDMA request between the source RNIC and a sink RNIC; a data buffer to store data for an RDMA transfer corresponding to the RDMA request, the RDMA transfer between the source RNIC and the sink RNIC; and a trusted execution environment (TEE) comprising an authentication tag controller to: initialize a first authentication tag calculated using a first key known between a source consumer generating the RDMA request and the source RNIC; associate the first authentica-
(Continued)

tion tag with the data entry as integrity verification; initialize a second authentication tag calculated using a second key; and associate the second authentication tag with the data buffer as integrity verification for the data buffer.

20 Claims, 59 Drawing Sheets

Related U.S. Application Data

(60) Provisional application No. 63/083,565, filed on Sep. 25, 2020.

(51) Int. Cl.
    *G06T 1/20*     (2006.01)
    *G06T 1/60*     (2006.01)

(58) Field of Classification Search
    CPC ........... G06T 1/20; G06T 1/60; H04L 9/3234; H04L 9/3242
    See application file for complete search history.

(56) References Cited

U.S. PATENT DOCUMENTS

| | | |
|---|---|---|
| 10,482,291 B2 | 11/2019 | Woodall |
| 10,649,790 B1 | 5/2020 | Ingegneri |
| 10,652,108 B2 | 5/2020 | Guim Bernat |
| 10,528,765 B2 | 7/2020 | Smith et al. |
| 10,776,145 B2 | 9/2020 | Iyer et al. |
| 11,449,963 B1 | 9/2022 | Beeler et al. |
| 2006/0168091 A1 | 7/2006 | Makhervaks et al. |
| 2006/0259570 A1 | 11/2006 | Feng et al. |
| 2012/0254587 A1 | 10/2012 | Biran et al. |
| 2013/0162661 A1 | 6/2013 | Bolz et al. |
| 2014/0240327 A1 | 8/2014 | Lustig et al. |
| 2014/0281169 A1 | 9/2014 | Mehrotra et al. |
| 2015/0326684 A1 | 11/2015 | Takefman et al. |
| 2016/0093012 A1 | 3/2016 | Rao et al. |
| 2016/0147710 A1 | 5/2016 | Franke et al. |
| 2016/0358306 A1 | 12/2016 | Begeman et al. |
| 2017/0213053 A1 | 7/2017 | Areno et al. |
| 2017/0300361 A1 | 10/2017 | Lanka et al. |
| 2017/0351639 A1 | 12/2017 | Borikar |
| 2018/0082083 A1 | 3/2018 | Smith et al. |
| 2018/0205553 A1 | 7/2018 | Hoppert et al. |
| 2019/0044519 A1 | 2/2019 | Atsatt et al. |
| 2019/0044875 A1 | 2/2019 | Murty et al. |
| 2019/0102568 A1* | 4/2019 | Hausauer .............. H04L 9/3242 |
| 2019/0179755 A1 | 6/2019 | Mudumbai et al. |
| 2019/0286479 A1 | 9/2019 | Tian et al. |
| 2019/0355163 A1 | 11/2019 | Imbrogno et al. |
| 2020/0004701 A1 | 1/2020 | Subbarao et al. |
| 2020/0127836 A1 | 4/2020 | Pappachan et al. |
| 2020/0127850 A1 | 4/2020 | Scarlata et al. |
| 2020/0132761 A1 | 4/2020 | Rahardjo et al. |
| 2020/0167488 A1 | 5/2020 | Mtbarek et al. |
| 2020/0218684 A1 | 7/2020 | Sen et al. |
| 2020/0226009 A1* | 7/2020 | Bachmutsky ......... G06F 9/5038 |
| 2020/0228388 A1 | 7/2020 | Schulz et al. |
| 2020/0242258 A1* | 7/2020 | Smith ................... H04L 9/0894 |
| 2020/0342112 A1 | 10/2020 | Plusquellic |
| 2020/0364516 A1 | 11/2020 | Krasner et al. |
| 2021/0117246 A1 | 4/2021 | Lal et al. |
| 2021/0406178 A1 | 12/2021 | Enrici et al. |
| 2022/0019356 A1* | 1/2022 | Hong .................... G06F 3/0659 |
| 2022/0100580 A1 | 3/2022 | Lal et al. |
| 2022/0100581 A1 | 3/2022 | Lal et al. |
| 2022/0100582 A1 | 3/2022 | Lal et al. |
| 2022/0100583 A1 | 3/2022 | Lal et al. |
| 2022/0100584 A1 | 3/2022 | Lal et al. |
| 2022/0214912 A1 | 7/2022 | Julien et al. |

FOREIGN PATENT DOCUMENTS

| | | |
|---|---|---|
| EP | 3719657 A1 | 10/2020 |
| NL | 2029026 B1 | 7/2022 |
| WO | 2016101288 A1 | 6/2016 |
| WO | 2022066304 A1 | 3/2022 |

OTHER PUBLICATIONS

International Patent Application No. PCT/US2021/045185 "Notification Concerning the Availability of the Publication of the International Application", mailed on Mar. 31, 2022, 1 page.

Anonymous: CUDA Runtime API version v11.1.74, Chapter 5, section 5.29, Sep. 15, 2020, XP055865248, retrieved from the Internet <https://docs.nvidia.com/cuda/archive/11.1.0/pdf/CUDA_Runtime_API.pdf> [retrieved on Jan. 31, 2022].

International Patent Application No. PCT/US2021/045185 "International Search Report and Written Opinion", dated Dec. 3, 2021, 13 pages.

International Patent Application No. PCT/US2021/045185 "International Preliminary Report on Patentability", dated Apr. 6, 2023, 9 pages.

Notice of Grant for Dutch Application No. 2029026 dated Jul. 27, 2022, 6 pages.

Search Report and Written Opinion for Dutch Application No. 2029026 dated May 25, 2022, 12 pages.

U.S. Appl. No. 17/531,005 "Notice of Allowance" dated Sep. 27, 2023, 11 pages.

U.S. Appl. No. 17/532,562 "Non-Final Office Action" dated Sep. 26, 2023, 15 pages.

U.S. Appl. No. 17/532,569 "Non-Final Office Action" dated Sep. 26, 2023, 13 pages.

U.S. Appl. No. 17/133,066 "Notice of Allowance" dated Aug. 17, 2023, 9 pages.

U.S. Appl. No. 17/526,097 "Non-Final Office Action" dated Sep. 13, 2023, 19 pages.

U.S. Appl. No. 17/528,374 "Non-Final Office Action" dated Sep. 13, 2023, 18 pages.

\* cited by examiner

2100

Initialize a first authentication tag calculated using a first key known between a source consumer the source consumer generating an RDMA request and a source RNIC
2110

Associate the first authentication tag with the data entry in a queue as integrity verification for the data entry
2120

Initialize a second authentication tag calculated using a second key known between the source consumer and a sink consumer of the remote device, the sink consumer to receive the RDMA request
2130

Associate the second authentication tag with the data buffer as integrity verification for the data buffer
2140

*FIG. 21*

| Data Structure 2455 | Identifier 2460 | Source Address 2465 | Size 2470 | Destination 2475 | Dependencies 2480 |
|---|---|---|---|---|---|
| CB1 2405 | ID1 | A1 | SZ1 | HOST | ID2, ID3 |
| CB2 2410 | ID2 | A2 | SZ2 | HOST | ID4, ID5 |
| CB3 2415 | ID3 | A3 | SZ3 | HOST | ID6, ID7 |
| Heap 1 2420 | ID4 | A4 | SZ4 | HOST | NIL |
| Kern1 2425 | ID5 | A5 | SZ5 | GPU, A5' | NIL |
| Heap 2 2430 | ID6 | A6 | SZ6 | HOST | NIL |
| Kern2 2435 | ID7 | A7 | SZ7 | GPU, A7' | NIL |

Manifest 2450

Receive a manifest corresponding to graph nodes representing regions of memory of a remote client machine, the graph nodes corresponding to at least one command buffer and to associated data structures and kernels of the at least one command buffer, and the manifest indicating a destination memory location of each of the graph nodes and dependencies of each of the graph nodes
2610

Identify, based on the manifest, the at least one command buffer and the associated data structures to copy to the host memory
2620

Identify, based on the manifest, the kernels to copy to local memory of the hardware accelerator
2630

Patch addresses in the at least one command buffer copied to the host memory with updated addresses of corresponding locations in the host memory
2640

Provide a remote GPU middleware layer to act as a proxy for an application stack on a client platform separate from a remote device hosting the remote GPU middleware layer
2910

Receive, from the client platform, command buffers and data structures generated by the application stack for consumption by a command streamer of a remote GPU
2920

Communicate with a kernel mode driver to cause host memory of the remote device to be allocated for the command buffers and the data structures
2930

Invoke, by the remote GPU middleware layer, the kernel mode driver to submit a workload generated by the application stack for processing by the remote GPU using the command buffers and the data structures allocated in the host memory of the remote device
2940

```
Provide a virtual GPU monitor (VGM) to interface over a network with a middleware layer
of a client platform, the VGM to interface with the middleware layer using a message
passing interface
                                                                                    3310
```

↓

```
Configure and expose, by the VGM, virtual functions (VFs) of a GPU to the middleware
layer of the client platform
                                                                                    3320
```

↓

```
Intercept, by the VGM, request messages directed to the GPU from the middleware layer,
the request messages corresponding to VFs of the GPU to be utilized by the client
platform
                                                                                    3330
```

↓

```
Generate, by the VGM, a response to the request messages for the middleware client
                                                                                    3340
```

| Device ID | | Vendor ID | |
|---|---|---|---|
| Status | | Command | |
| Class Code | | | Revision ID |
| BIST | Header Type | Lst. Timer | Cache Line S. |
| Base Address Registers | | | |
| Cardbus CIS Pointer | | | |
| Subsystem ID | | Subsystem Vendor ID | |
| Expansion ROM Base Address | | | |
| Reserved | | | Cap. Pointer |
| Reserved | | | |
| Max Lst. | Min Gnt. | Interrupt Pin | Interrupt Line |

Receive, from a tenant, a tenant bitstream and a tenant use policy for utilization of a programmable IC via the tenant bitstream, where the tenant use policy is cryptographically bound to the tenant bitstream by a cloud service provider (CSP) authorizing entity and signed with a signature of the CSP authorizing entity
4410

Extract, in response to successful verification of the signature of the CSP authorizing entity, the tenant use policy to provide to a policy manager of the programmable IC for verification
4420

Configure, in response to the policy manager verifying the tenant bitstream based on the tenant use policy, a partial reconfiguration (PR) region of the programmable IC using the tenant bitstream
4430

Associate a slot identifier (ID) of the PR region with the tenant use policy for enforcement of the tenant use policy on the PR region of the tenant
4440

Interface, by a system manager of a programmable IC over a network, with a remote application of a client platform, the system manager to interface with the remote application using a message-based interface
5110

Perform, by the system manager, resource management of resources of the programmable IC
5120

Validate, by the system manager, incoming messages to the programmable IC
5130

Verify, by the system manager, whether a requester is allowed to perform requested actions of the incoming messages that are successfully validated
5140

Manage, by the system manager, transfer of data between the programmable IC and the remote application based on successfully verifying the requester
5150

*FIG. 51*

DISAGGREGATED COMPUTING FOR DISTRIBUTED CONFIDENTIAL COMPUTING ENVIRONMENT

RELATED APPLICATIONS

This application claims the benefit of priority from and is a continuation of U.S. patent application Ser. No. 17/133,066 filed on Dec. 23, 2020, now U.S. Patent Publication No. 2021/0117246 A1, published on Apr. 22, 2021, which claims the benefit of priority from U.S. Provisional Patent Application Ser. No. 63/083,565 filed on Sep. 25, 2020, now expired, the full disclosure of which is incorporated herein by reference.

FIELD

This disclosure relates generally to data processing and more particularly to disaggregated computing for distributed confidential computing environment.

BACKGROUND OF THE DISCLOSURE

Disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe).

Disaggregated computing enables improved resource utilization and lowers ownership costs by enabling more efficient use of available resources. Disaggregated computing also enables pooling a large number of hardware accelerators for large computation making the computation more efficient and better performing.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

FIG. 21 is a flow diagram depicting a process for protected RDMA for distributed confidential computing in accordance with implementations of the disclosure.

FIG. 24B illustrates a manifest for data relocation and command buffer patching in accordance with implementations of the disclosure.

FIG. 26 is a flow diagram illustrating a method for providing data relocation and command buffer patching for graphics processing unit (GPU) remoting, in accordance with implementations of the disclosure.

FIG. 29 is a flow diagram depicting a process for GPU remoting to driver-managed GPUs, in accordance with implementations of the disclosure.

FIG. 33 is a flow diagram depicting a process for remoting to autonomous GPUs in accordance with implementations of the disclosure.

FIG. 38 depicts one example of a data structure with PCIe configuration information for protected management of network-connected FPGAs, in accordance with implementations of the disclosure.

FIG. 44 depicts a flow diagram illustrating a method enforcement of CSP policy for FPGA usage by tenant bitstream, in accordance with implementations of the disclosure.

FIG. 51 is a flow diagram illustrating a method for autonomous FPGAs, in accordance with implementations of the disclosure.

DETAILED DESCRIPTION

Figure 1:
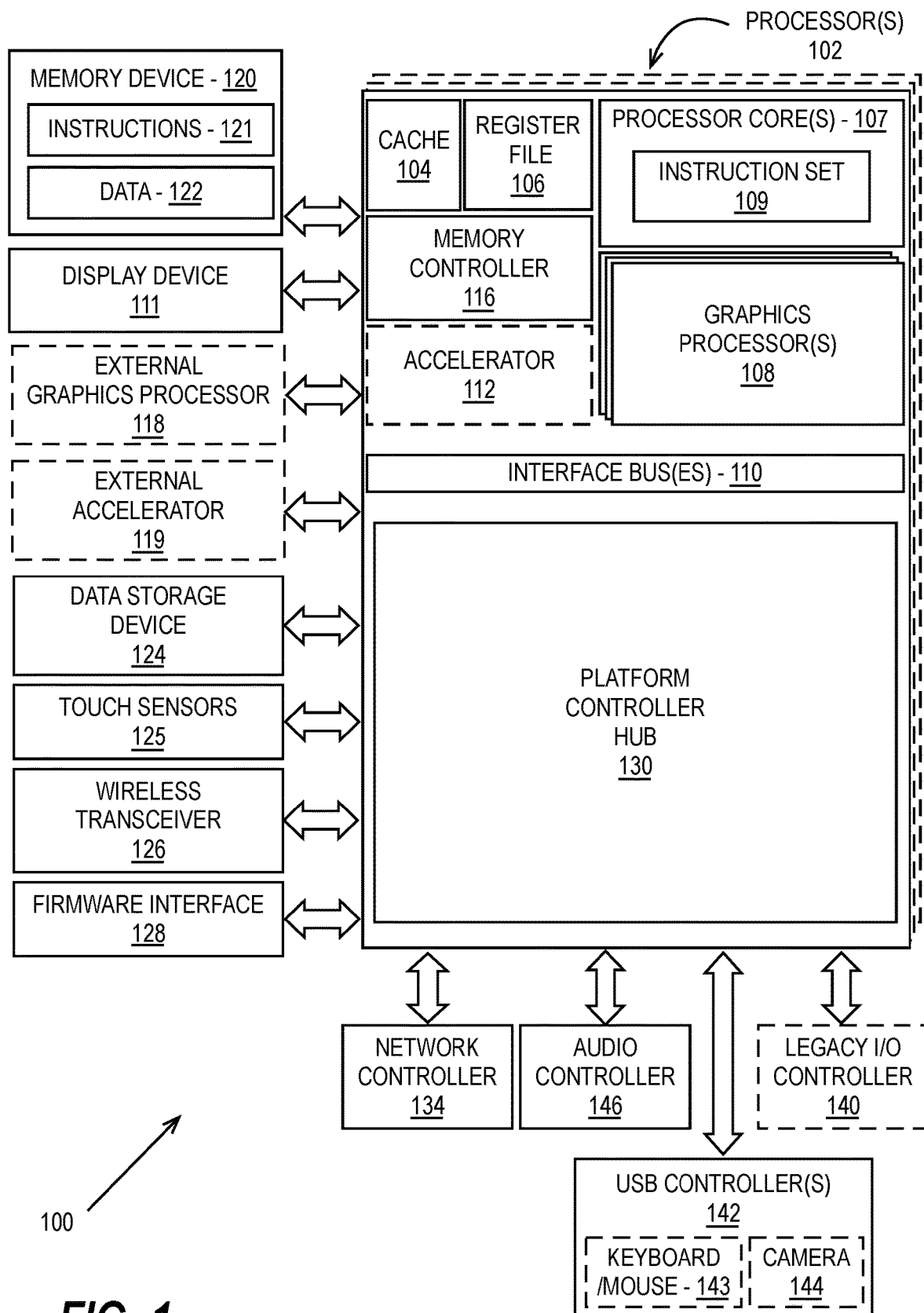
FIG. 1 is a block diagram of a processing system, according to an embodiment.

Disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe).

Disaggregated computing enables improved resource utilization and lowers ownership costs by enabling more efficient use of available resources. Disaggregated computing also enables pooling a large number of hardware accelerators for large computation making the computation more efficient and better performing.

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

Various embodiments are directed to techniques for disaggregated computing for a distributed confidential computing environment, for instance.

System Overview

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be utilized. Rather, in some embodiments, such features may be arranged in a different manner and/or order than shown in the illustrative figures. Additionally, the inclusion of a structural or method feature in a particular figure is not meant to imply that such feature is utilized in all embodiments and, in some embodiments, may not be included or may be combined with other features.

Referring now to FIG. 1, a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus.

However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In one embodiment, the accelerator 112 is a field programmable gate array (FPGA). An FPGA refers to an integrated circuit (IC) including an array of programmable logic blocks that can be configured to perform simple logic gates and/or complex combinatorial functions, and may also include memory elements. FPGAs are designed to be configured by a customer or a designer after manufacturing. FPGAs can be used to accelerate parts of an algorithm, sharing part of the computation between the FPGA and a general-purpose processor. In some embodiments, accelerator 112 is a GPU or an application-specific integrated circuit (ASIC). In some implementations, accelerator 112 is also referred to as a compute accelerator or a hardware accelerator.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It may be appreciated that the system 100 shown is one example and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., graphics processing unit (GPUs), graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 2:
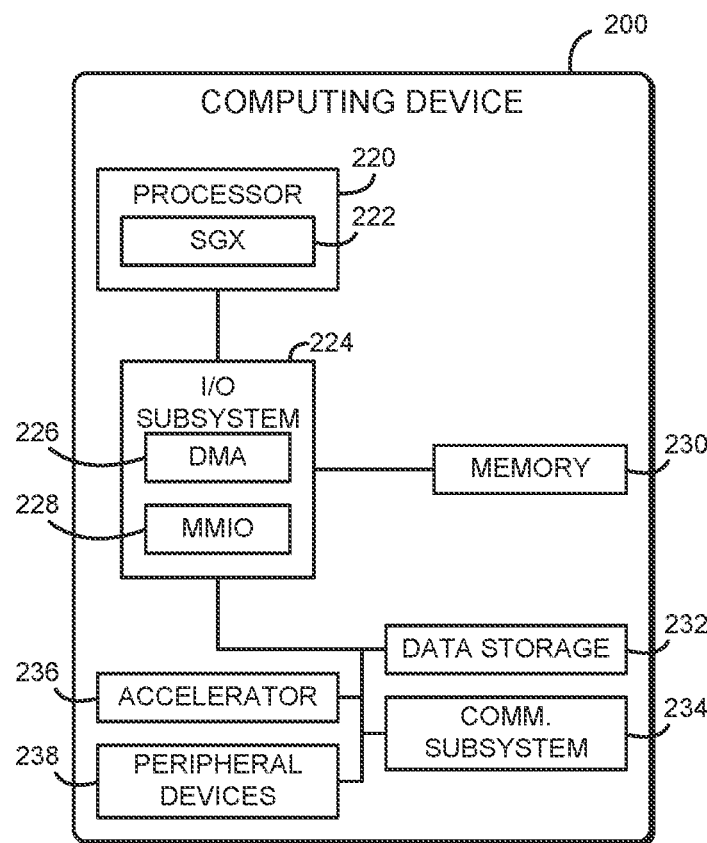
FIG. 2 is a simplified block diagram of at least one embodiment of a computing device for secure I/O with an accelerator device.

FIG. 2 illustrates a block diagrams of an additional processing system architecture provided by embodiments described herein. A computing device 200 for secure I/O with an accelerator device includes a processor 220 and an accelerator device 236, such as a field-programmable gate array (FPGA). In use, as described further below, a trusted execution environment (TEE) established by the processor 220 securely communicates data with the accelerator 236. Data may be transferred using memory-mapped I/O (MMIO) transactions or direct memory access (DMA) transactions. For example, the TEE may perform an MMIO write transaction that includes encrypted data, and the accelerator 236 decrypts the data and performs the write. As another example, the TEE may perform an MMIO read request transaction, and the accelerator 236 may read the requested data, encrypt the data, and perform an MMIO read response transaction that includes the encrypted data. As yet another example, the TEE may configure the accelerator 236 to perform a DMA operation, and the accelerator 236 performs a memory transfer, performs a cryptographic operation (i.e., encryption or decryption), and forwards the result. As described further below, the TEE and the accelerator 236 generate authentication tags (ATs) for the transferred data and may use those ATs to validate the transactions. The computing device 200 may thus keep untrusted software of the computing device 200, such as the operating system or virtual machine monitor, outside of the trusted code base (TCB) of the TEE and the accelerator 236. Thus, the computing device 200 may secure data exchanged or otherwise processed by a TEE and an accelerator 236 from an owner of the computing device 200 (e.g., a cloud service provider) or other tenants of the computing device 200. Accordingly, the computing device 200 may improve security and performance for multi-tenant environments by allowing secure use of accelerator devices.

The computing device 200 may be embodied as any type of device capable of performing the functions described herein. For example, the computing device 200 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 2, the illustrative computing device 200 includes a processor 220, an I/O subsystem 224, a memory 230, and a data storage device 232. Additionally, in some embodiments, one or more of the illustrative components may be incorporated in, or otherwise form a portion of, another component. For example, the memory 230, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. As shown, the processor 220 illustratively includes secure enclave support 222, which allows the processor 220 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 220 while being executed or while being stored in certain protected cache memory of the processor 220. The code and data included in the secure enclave may be encrypted when stored in a shared cache or the main memory 230. The secure enclave support 222 may be embodied as a set of processor instruction extensions that allows the processor 220 to establish one or more secure enclaves in the memory 230. For example, the secure enclave support 222 may be embodied as Intel® Software Guard Extensions (SGX) technology.

The memory 230 may be embodied as any type of volatile or non-volatile memory or data storage capable of performing the functions described herein. In operation, the memory 230 may store various data and software used during operation of the computing device 200 such as operating systems, applications, programs, libraries, and drivers. As shown, the memory 230 may be communicatively coupled to the processor 220 via the I/O subsystem 224, which may be embodied as circuitry and/or components to facilitate input/output operations with the processor 220, the memory 230, and other components of the computing device 200. For example, the I/O subsystem 224 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 230 may be directly coupled to the processor 220, for example via an integrated memory controller hub. Additionally, in some embodiments, the I/O subsystem 224 may form a portion of a system-on-a-chip (SoC) and be incorporated, along with the processor 220, the memory 230, the accelerator device 236, and/or other components of the computing device 200, on a single integrated circuit chip. Additionally, or alternatively, in some embodiments the processor 220 may include an integrated memory controller and a system agent, which may be embodied as a logic block in which data traffic from processor cores and I/O devices converges before being sent to the memory 230.

As shown, the I/O subsystem 224 includes a direct memory access (DMA) engine 226 and a memory-mapped I/O (MMIO) engine 228. The processor 220, including secure enclaves established with the secure enclave support 222, may communicate with the accelerator device 236 with one or more DMA transactions using the DMA engine 226 and/or with one or more MMIO transactions using the MMIO engine 228. The computing device 200 may include multiple DMA engines 226 and/or MMIO engines 228 for handling DMA and MMIO read/write transactions based on bandwidth between the processor 220 and the accelerator 236. Although illustrated as being included in the I/O subsystem 224, it should be understood that in some embodiments the DMA engine 226 and/or the MMIO engine 228 may be included in other components of the computing device 200 (e.g., the processor 220, memory controller, or system agent), or in some embodiments may be embodied as separate components.

The data storage device 232 may be embodied as any type of device or devices configured for short-term or long-term storage of data such as, for example, memory devices and circuits, memory cards, hard disk drives, solid-state drives, non-volatile flash memory, or other data storage devices. The computing device 200 may also include a communications subsystem 234, which may be embodied as any communication circuit, device, or collection thereof, capable of enabling communications between the computing device 200 and other remote devices over a computer network (not shown). The communications subsystem 234 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 236 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 236 is an FPGA, which may be embodied as an integrated circuit including programmable digital logic resources that may be configured after manufacture. The FPGA may include, for example, a configurable array of logic blocks in communication over a configurable data interchange. The accelerator device 236 may be coupled to the processor 220 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 236 may receive data and/or commands for processing from the processor 220 and return results data to the processor 220 via DMA, MMIO, or other data transfer transactions.

As shown, the computing device 200 may further include one or more peripheral devices 238. The peripheral devices 238 may include any number of additional input/output devices, interface devices, hardware accelerators, and/or other peripheral devices. For example, in some embodiments, the peripheral devices 238 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Field Programmable Gate Arrays (FPGAs)

Figure 3:
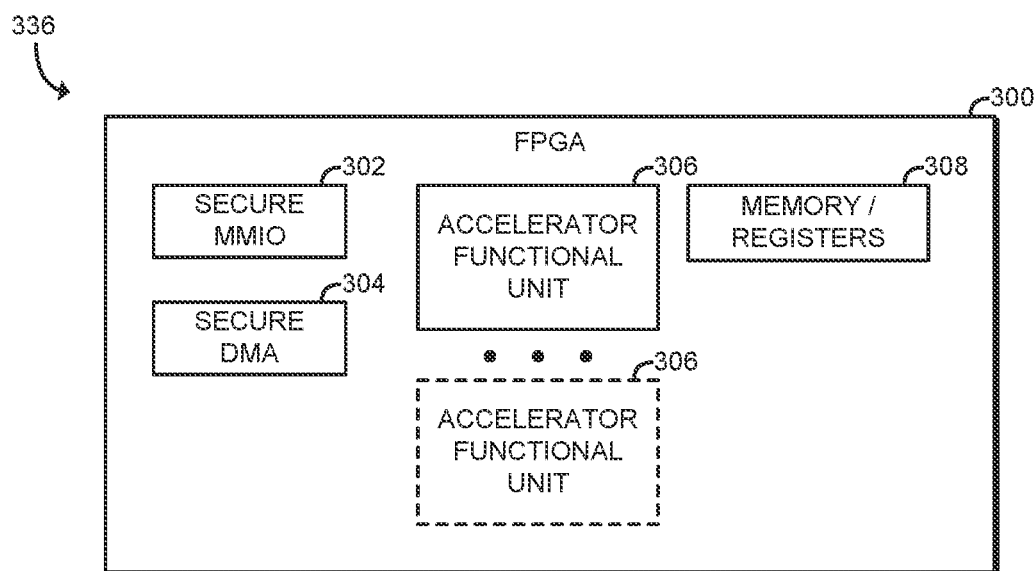
FIG. 3 is a simplified block diagram of at least one embodiment of an accelerator device of the computing device of FIG. 2.

Referring now to FIG. 3, an illustrative embodiment of a field-programmable gate array (FPGA) 300 is shown. As shown, the FPGA 300 is one potential embodiment of an accelerator device 236 described with respect to FIG. 2. The illustratively FPGA 300 includes a secure MMIO engine 302, a secure DMA engine 304, one or more accelerator functional units (AFUs) 306, and memory/registers 308. As described further below, the secure MMIO engine 302 and the secure DMA engine 304 perform in-line authenticated cryptographic operations on data transferred between the processor 220 (e.g., a secure enclave established by the processor) and the FPGA 300 (e.g., one or more AFUs 306). In some embodiments, the secure MMIO engine 302 and/or the secure DMA engine 304 may intercept, filter, or otherwise process data traffic on one or more cache-coherent interconnects, internal buses, or other interconnects of the FPGA 300.

Each AFU 306 may be embodied as logic resources of the FPGA 300 that are configured to perform an acceleration task. Each AFU 306 may be associated with an application executed by the computing device 100 in a secure enclave or other trusted execution environment. Each AFU 306 may be configured or otherwise supplied by a tenant or other user of the computing device 100. For example, each AFU 306 may correspond to a bitstream image programmed to the FPGA 300. As described further below, data processed by each AFU 306, including data exchanged with the trusted execution environment, may be cryptographically protected from untrusted components of the computing device 100 (e.g., protected from software outside of the trusted code base of the tenant enclave). Each AFU 306 may access or otherwise process stored in the memory/registers 308, which may be embodied as internal registers, cache, SRAM, storage, or other memory of the FPGA 300. In some embodiments, the memory 308 may also include external DRAM or other dedicated memory coupled to the FPGA 300.

Commuting Systems and Graphics Processors

FIGS. 4A-4D illustrate computing systems and graphics processors provided by embodiments described herein. The elements of FIGS. 4A-4D having the same reference numbers (or names) as the elements of any other figure herein can operate or function in any manner similar to that described elsewhere herein, but are not limited to such.

In some implementations, a GPU is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Figure 4A:
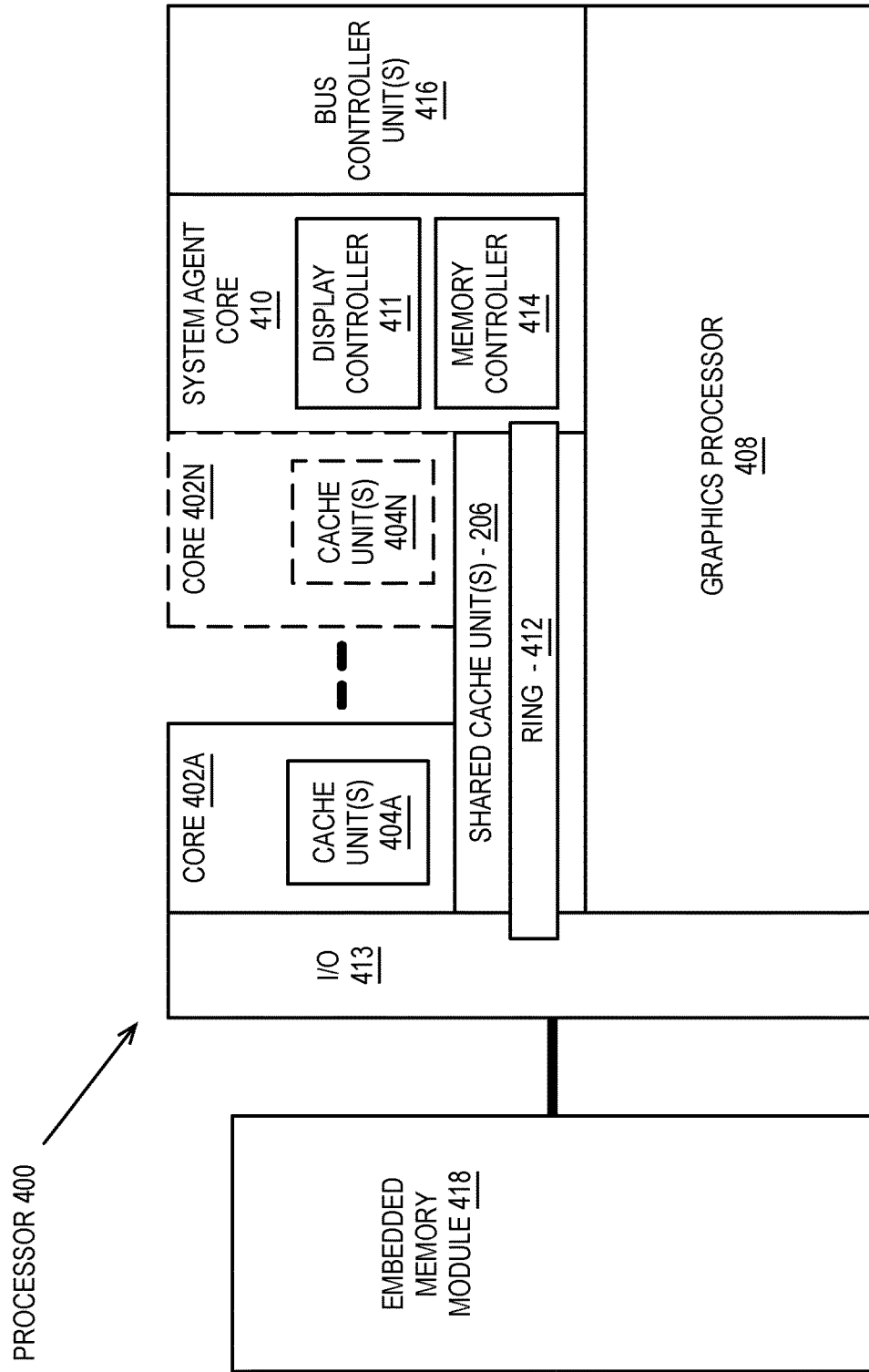
FIGS. 4A-4D illustrate computing systems and graphics processors provided by embodiments described herein.

FIG. 4A is a block diagram of an embodiment of a processor 400 having one or more processor cores 402A-402N, an integrated memory controller 414, and an integrated graphics processor 408. Processor 400 can include additional cores up to and including additional core 402N represented by the dashed lined boxes. Each of processor cores 402A-402N includes one or more internal cache units 404A-404N. In some embodiments each processor core also has access to one or more shared cached units 406. The internal cache units 404A-404N and shared cache units 406 represent a cache memory hierarchy within the processor 400. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 406 and 404A-404N.

In some embodiments, processor 400 may also include a set of one or more bus controller units 416 and a system agent core 410. The one or more bus controller units 416 manage a set of peripheral buses, such as one or more PCI or PCI express busses. System agent core 410 provides management functionality for the various processor components. In some embodiments, system agent core 410 includes one or more integrated memory controllers 414 to manage access to various external memory devices (not shown).

In some embodiments, one or more of the processor cores 402A-402N include support for simultaneous multi-threading. In such embodiment, the system agent core 410 includes components for coordinating and operating cores 402A-402N during multi-threaded processing.

System agent core 410 may additionally include a power control unit (PCU), which includes logic and components to regulate the power state of processor cores 402A-402N and graphics processor 408.

In some embodiments, processor 400 additionally includes graphics processor 408 to execute graphics processing operations. In some embodiments, the graphics processor 408 couples with the set of shared cache units 406, and the system agent core 410, including the one or more integrated memory controllers 414. In some embodiments, the system agent core 410 also includes a display controller 411 to drive graphics processor output to one or more coupled displays. In some embodiments, display controller 411 may also be a separate module coupled with the graphics processor via at least one interconnect, or may be integrated within the graphics processor 408.

In some embodiments, a ring-based interconnect unit 412 is used to couple the internal components of the processor 400. However, an alternative interconnect unit may be used, such as a point-to-point interconnect, a switched interconnect, or other techniques, including techniques well known in the art. In some embodiments, graphics processor 408 couples with the ring interconnect 412 via an I/O link 413.

The example I/O link 413 represents at least one of multiple varieties of I/O interconnects, including an on package I/O interconnect which facilitates communication between various processor components and a high-performance embedded memory module 418, such as an eDRAM module. In some embodiments, each of the processor cores 402A-402N and graphics processor 408 can use embedded memory modules 418 as a shared Last Level Cache.

In some embodiments, processor cores 402A-402N are homogenous cores executing the same instruction set architecture. In another embodiment, processor cores 402A-402N are heterogeneous in terms of instruction set architecture (ISA), where one or more of processor cores 402A-402N execute a first instruction set, while at least one of the other cores executes a subset of the first instruction set or a different instruction set. In one embodiment, processor cores 402A-402N are heterogeneous in terms of microarchitecture, where one or more cores having a relatively higher power consumption couple with one or more power cores having a lower power consumption. In one embodiment, processor cores 402A-402N are heterogeneous in terms of computational capability. Additionally, processor 400 can be implemented on one or more chips or as an SoC integrated circuit having the illustrated components, in addition to other components.

Figure 4B:
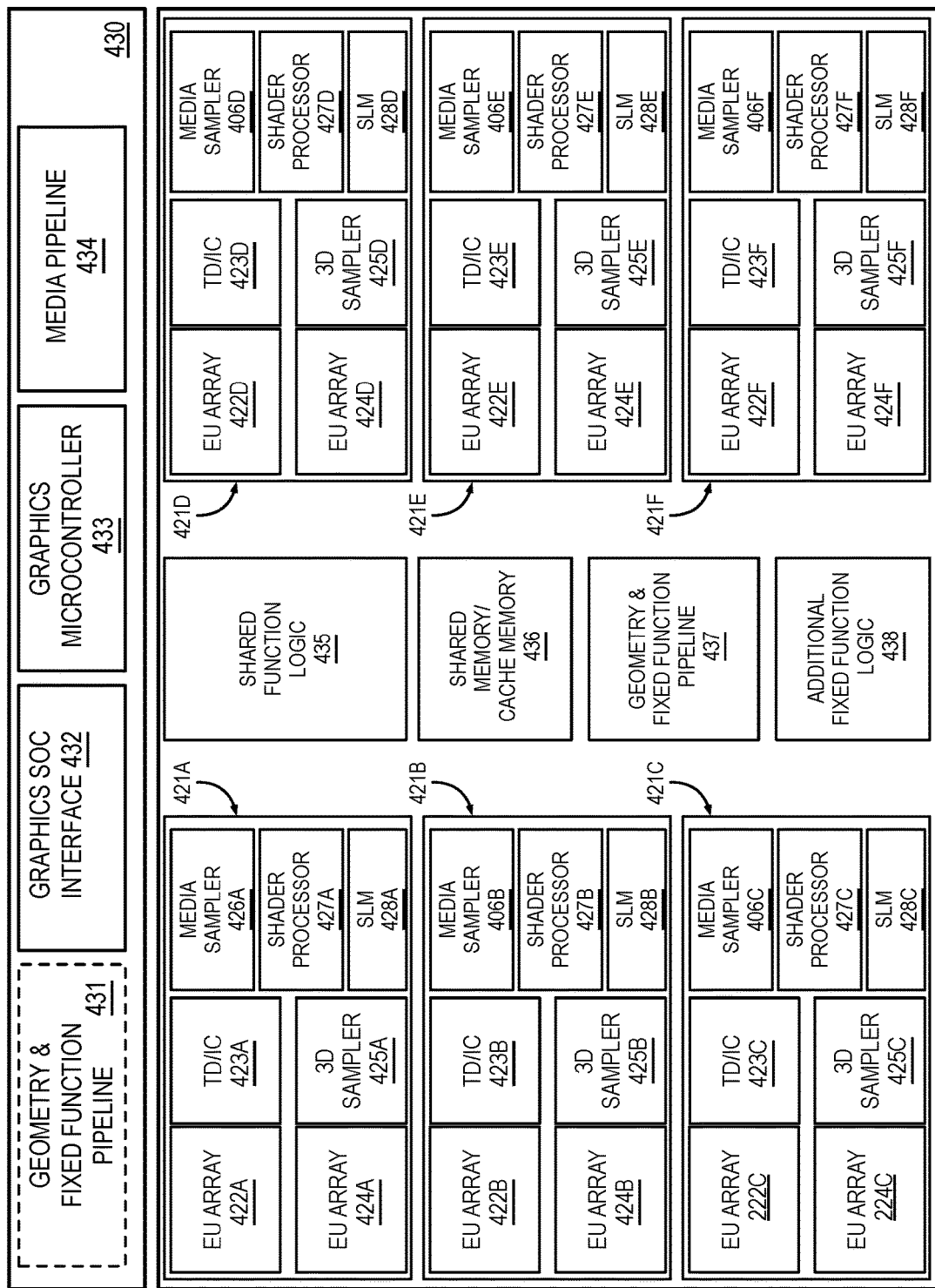

FIG. 4B is a block diagram of hardware logic of a graphics processor core 419, according to some embodiments described herein. Elements of FIG. 4B having the same reference numbers (or names) as the elements of any other figure herein can operate or function in any manner similar to that described elsewhere herein, but are not limited to such. The graphics processor core 419, sometimes referred to as a core slice, can be one or multiple graphics cores within a modular graphics processor. The graphics processor core 419 is an example of one graphics core slice, and a graphics processor as described herein may include multiple graphics core slices based on target power and performance envelopes. Each graphics processor core 419 can include a fixed function block 430 coupled with multiple sub-cores 421A-421F, also referred to as sub-slices, that include modular blocks of general-purpose and fixed function logic.

In some embodiments, the fixed function block 430 includes a geometry/fixed function pipeline 431 that can be shared by all sub-cores in the graphics processor core 419, for example, in lower performance and/or lower power graphics processor implementations. In various embodiments, the geometry/fixed function pipeline 431 includes a 3D fixed function, a video front-end unit, a thread spawner and thread dispatcher, and a unified return buffer manager, which manages unified return buffers.

In one embodiment the fixed function block 430 also includes a graphics SoC interface 432, a graphics microcontroller 433, and a media pipeline 434. The graphics SoC interface 432 provides an interface between the graphics processor core 419 and other processor cores within a system on a chip integrated circuit. The graphics microcontroller 433 is a programmable sub-processor that is configurable to manage various functions of the graphics processor core 419, including thread dispatch, scheduling, and pre-emption. The media pipeline 434 includes logic to facilitate the decoding, encoding, pre-processing, and/or post-processing of multimedia data, including image and video data. The media pipeline 434 implement media operations via requests to compute or sampling logic within the sub-cores 421-421F.

In one embodiment the SoC interface 432 enables the graphics processor core 419 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 432 can also enable communication with fixed function devices within the SoC, such as camera imaging pipelines, and enables the use of and/or implements global memory atomics that may be shared between the graphics processor core 419 and CPUs within the SoC. The SoC interface 432 can also implement power management controls for the graphics processor core 419 and enable an interface between a clock domain of the graphic core 419 and other clock domains within the SoC. In one embodiment the SoC interface 432 enables receipt of command buffers from a command streamer and global thread dispatcher that are configured to provide commands and instructions to each of one or more graphics cores within a graphics processor. The commands and instructions can be dispatched to the media pipeline 434, when media operations are to be performed, or a geometry and fixed function pipeline (e.g., geometry and fixed function pipeline 431, geometry and fixed function pipeline 437) when graphics processing operations are to be performed.

The graphics microcontroller 433 can be configured to perform various scheduling and management tasks for the graphics processor core 419. In one embodiment the graphics microcontroller 433 can perform graphics and/or compute workload scheduling on the various graphics parallel engines within execution unit (EU) arrays 422A-422F, 424A-424F within the sub-cores 421A-421F. In this scheduling model, host software executing on a CPU core of an SoC including the graphics processor core 419 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 433 can also facilitate low-power or idle states for the graphics processor core 419, providing the graphics processor core 419 with the ability to save and restore registers within the graphics processor core 419 across low-power state transitions independently from the operating system and/or graphics driver software on the system.

The graphics processor core 419 may have greater than or fewer than the illustrated sub-cores 421A-421F, up to N modular sub-cores. For each set of N sub-cores, the graphics processor core 419 can also include shared function logic 435, shared and/or cache memory 436, a geometry/fixed function pipeline 437, as well as additional fixed function logic 438 to accelerate various graphics and compute processing operations. The shared function logic 435 can include logic units associated with the shared function logic (e.g., sampler, math, and/or inter-thread communication logic) that can be shared by each N sub-cores within the graphics processor core 419. The shared and/or cache memory 436 can be a last-level cache for the set of N sub-cores 421A-421F within the graphics processor core 419, and can also serve as shared memory that is accessible by multiple sub-cores. The geometry/fixed function pipeline 437 can be included instead of the geometry/fixed function pipeline 431 within the fixed function block 430 and can include the same or similar logic units.

In one embodiment the graphics processor core 419 includes additional fixed function logic 438 that can include various fixed function acceleration logic for use by the graphics processor core 419. In one embodiment the additional fixed function logic 438 includes an additional geometry pipeline for use in position only shading. In position-only shading, two geometry pipelines exist, the full geometry pipeline within the geometry/fixed function pipeline 438, 431, and a cull pipeline, which is an additional geometry pipeline which may be included within the additional fixed function logic 438. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example, and in one embodiment, the cull pipeline logic within the additional fixed function logic 438 can execute position shaders in parallel with the main application and generally generates results faster than the full pipeline, as the cull pipeline fetches and shades the position attribute of the vertices, without performing rasterization and rendering of the pixels to the frame buffer. The cull pipeline can use the generated results to compute visibility information for all the triangles without regard to whether those triangles are culled. The full pipeline (which in this instance may be referred to as a replay pipeline) can consume the visibility information to skip the culled triangles to shade the visible triangles that are finally passed to the rasterization phase.

In one embodiment the additional fixed function logic 438 can also include machine-learning acceleration logic, such as fixed function matrix multiplication logic, for implementations including optimizations for machine learning training or inferencing.

Within each graphics sub-core 421A-421F includes a set of execution resources that may be used to perform graphics, media, and compute operations in response to requests by graphics pipeline, media pipeline, or shader programs. The graphics sub-cores 421A-421F include multiple EU arrays 422A-422F, 424A-424F, thread dispatch and inter-thread communication (TD/IC) logic 423A-423F, a 3D (e.g., texture) sampler 425A-425F, a media sampler 406A-406F, a shader processor 427A-427F, and shared local memory (SLM) 428A-428F. The EU arrays 422A-422F, 424A-424F each include multiple execution units, which are general-purpose graphics processing units capable of performing floating-point and integer/fixed-point logic operations in service of a graphics, media, or compute operation, including graphics, media, or compute shader programs. The TD/IC logic 423A-423F performs local thread dispatch and thread control operations for the execution units within a sub-core and facilitate communication between threads executing on the execution units of the sub-core. The 3D sampler 425A-425F can read texture or other 3D graphics related data into memory. The 3D sampler can read texture data differently based on a configured sample state and the texture format associated with a given texture. The media sampler 406A-406F can perform similar read operations based on the type and format associated with media data. In one embodiment, each graphics sub-core 421A-421F can alternately include a unified 3D and media sampler. Threads executing on the execution units within each of the sub-cores 421A-421F can make use of shared local memory 428A-428F within each sub-core, to enable threads executing within a thread group to execute using a common pool of on-chip memory.

Figure 4C:
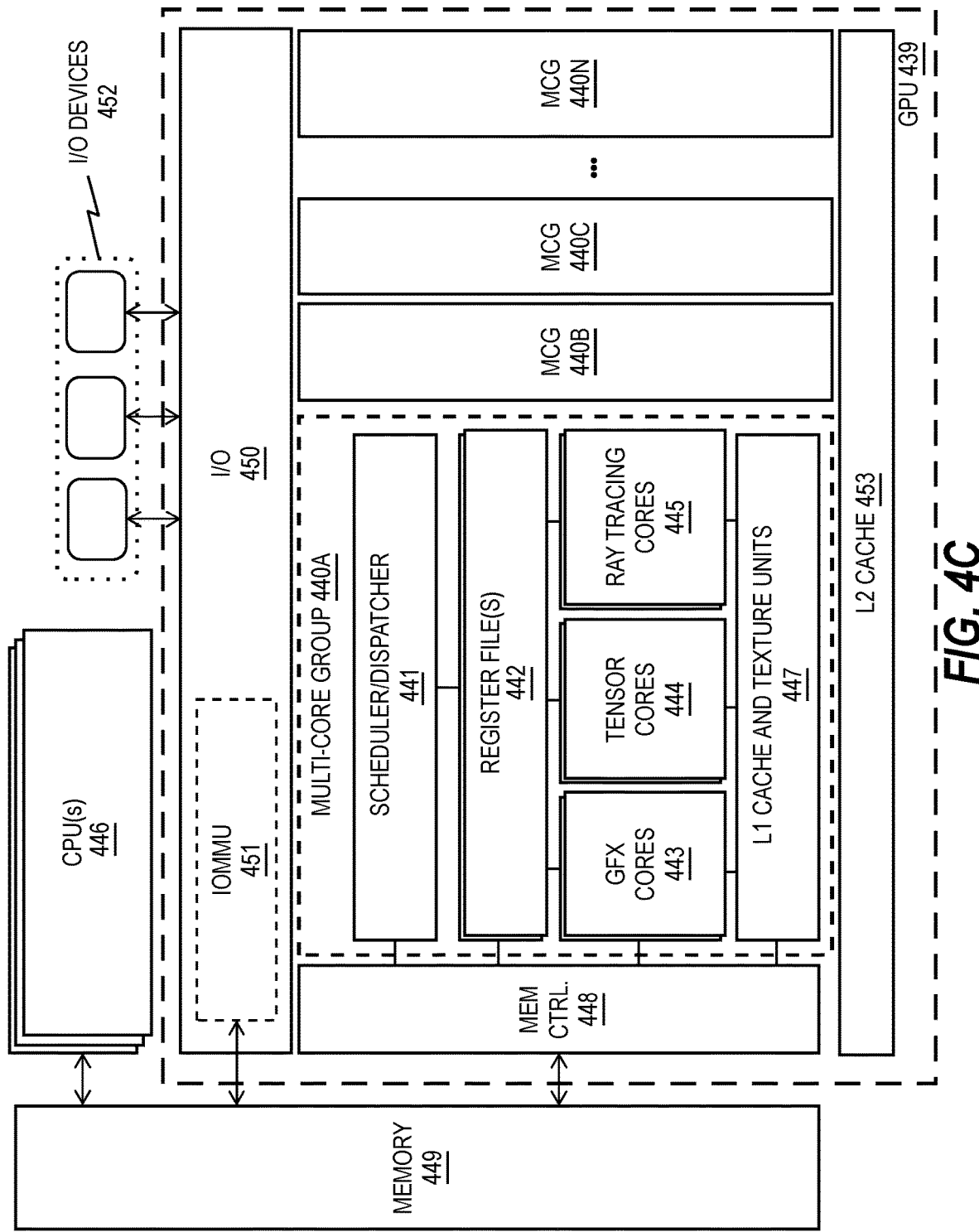

FIG. 4C illustrates a graphics processing unit (GPU) 439 that includes dedicated sets of graphics processing resources arranged into multi-core groups 440A-440N. While the details of a single multi-core group 440A are provided, it may be appreciated that the other multi-core groups 440B-440N may be equipped with the same or similar sets of graphics processing resources.

As illustrated, a multi-core group 440A may include a set of graphics cores 443, a set of tensor cores 444, and a set of ray tracing cores 445. A scheduler/dispatcher 441 schedules and dispatches the graphics threads for execution on the various cores 443, 444, 445. A set of register files 442 store operand values used by the cores 443, 444, 445 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 447 store graphics data such as texture data, vertex data, pixel data, ray data, bounding volume data, etc., locally within each multi-core group 440A. One or more texture units 447 can also be used to perform texturing operations, such as texture mapping and sampling. A Level 2 (L2) cache 453 shared by all or a subset of the multi-core groups 440A-440N stores graphics data and/or instructions for multiple concurrent graphics threads. As illustrated, the L2 cache 453 may be shared across a plurality of multi-core groups 440A-440N. One or more memory controllers 448 couple the GPU 439 to a memory 449 which may be a system memory (e.g., DRAM) and/or a dedicated graphics memory (e.g., GDDR6 memory).

Input/output (I/O) circuitry 450 couples the GPU 439 to one or more I/O devices 452 such as digital signal processors (DSPs), network controllers, or user input devices. An on-chip interconnect may be used to couple the I/O devices 454 to the GPU 439 and memory 449. One or more I/O memory management units (IOMMUs) 451 of the I/O circuitry 450 couple the I/O devices 452 directly to the system memory 449. In one embodiment, the IOMMU 451 manages multiple sets of page tables to map virtual addresses to physical addresses in system memory 449. In this embodiment, the I/O devices 452, CPU(s) 446, and GPU(s) 439 may share the same virtual address space.

In one implementation, the IOMMU 451 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 449). The base addresses of each of the first and second sets of page tables may be stored in control registers and swapped out on a context switch (e.g., so that the new context is provided with access to the relevant set of page tables). While not illustrated in FIG. 4C, each of the cores 443, 444, 445 and/or multi-core groups 440A-440N may include translation lookaside buffers (TLBs) to cache guest virtual to guest physical translations, guest physical to host physical translations, and guest virtual to host physical translations.

In one embodiment, the CPUs 446, GPUs 439, and I/O devices 452 are integrated on a single semiconductor chip and/or chip package. The illustrated memory 449 may be integrated on the same chip or may be coupled to the memory controllers 448 via an off-chip interface. In one implementation, the memory 449 comprises GDDR6 memory which shares the same virtual address space as other physical system-level memories, although the underlying principles of implementations of the disclosure are not limited to this specific implementation.

In one embodiment, the tensor cores 444 include a plurality of execution units specifically designed to perform matrix operations, which are the compute operations used to perform deep learning operations. For example, simultaneous matrix multiplication operations may be used for neural network training and inferencing. The tensor cores 444 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 444. The training of neural networks, in particular, utilizes a significant number matrix dot product operations. In order to process an inner-product formulation of an N×N×N matrix multiply, the tensor cores 444 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 444 to ensure that the most efficient precision is used for different workloads (e.g., such as inferencing workloads which can tolerate quantization to bytes and half-bytes).

In one embodiment, the ray tracing cores 445 accelerate ray tracing operations for both real-time ray tracing and non-real-time ray tracing implementations. In particular, the ray tracing cores 445 include ray traversal/intersection circuitry for performing ray traversal using bounding volume hierarchies (BVHs) and identifying intersections between rays and primitives enclosed within the BVH volumes. The ray tracing cores 445 may also include circuitry for performing depth testing and culling (e.g., using a Z buffer or similar arrangement). In one implementation, the ray tracing cores 445 perform traversal and intersection operations in concert with the image denoising techniques described herein, at least a portion of which may be executed on the tensor cores 444. For example, in one embodiment, the tensor cores 444 implement a deep learning neural network to perform denoising of frames generated by the ray tracing cores 445. However, the CPU(s) 446, graphics cores 443, and/or ray tracing cores 445 may also implement all or a portion of the denoising and/or deep learning algorithms.

In addition, as described above, a distributed approach to denoising may be employed in which the GPU 439 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 445 process all BVH traversal and ray-primitive intersections, saving the graphics cores 443 from being overloaded with thousands of instructions per ray. In one embodiment, each ray tracing core 445 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 440A can simply launch a ray probe, and the ray tracing cores 445 independently perform ray traversal and intersection and return hit data (e.g., a hit, no hit, multiple hits, etc.) to the thread context. The other cores 443, 444 are freed to perform other graphics or compute work while the ray tracing cores 445 perform the traversal and intersection operations.

In one embodiment, each ray tracing core 445 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 443 and tensor cores 444) are freed to perform other forms of graphics work.

In one particular embodiment described below, a hybrid rasterization/ray tracing approach is used in which work is distributed between the graphics cores 443 and ray tracing cores 445.

In one embodiment, the ray tracing cores 445 (and/or other cores 443, 444) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 445, graphics cores 443 and tensor cores 444 is Vulkan 1.1.85. Note, however, that the underlying principles of implementations of the disclosure are not limited to any particular ray tracing ISA.

In general, the various cores 445, 444, 443 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray can traverse.

Exceptions—Includes various types of exception handlers (e.g., invoked for various error conditions).

Figure 4D:
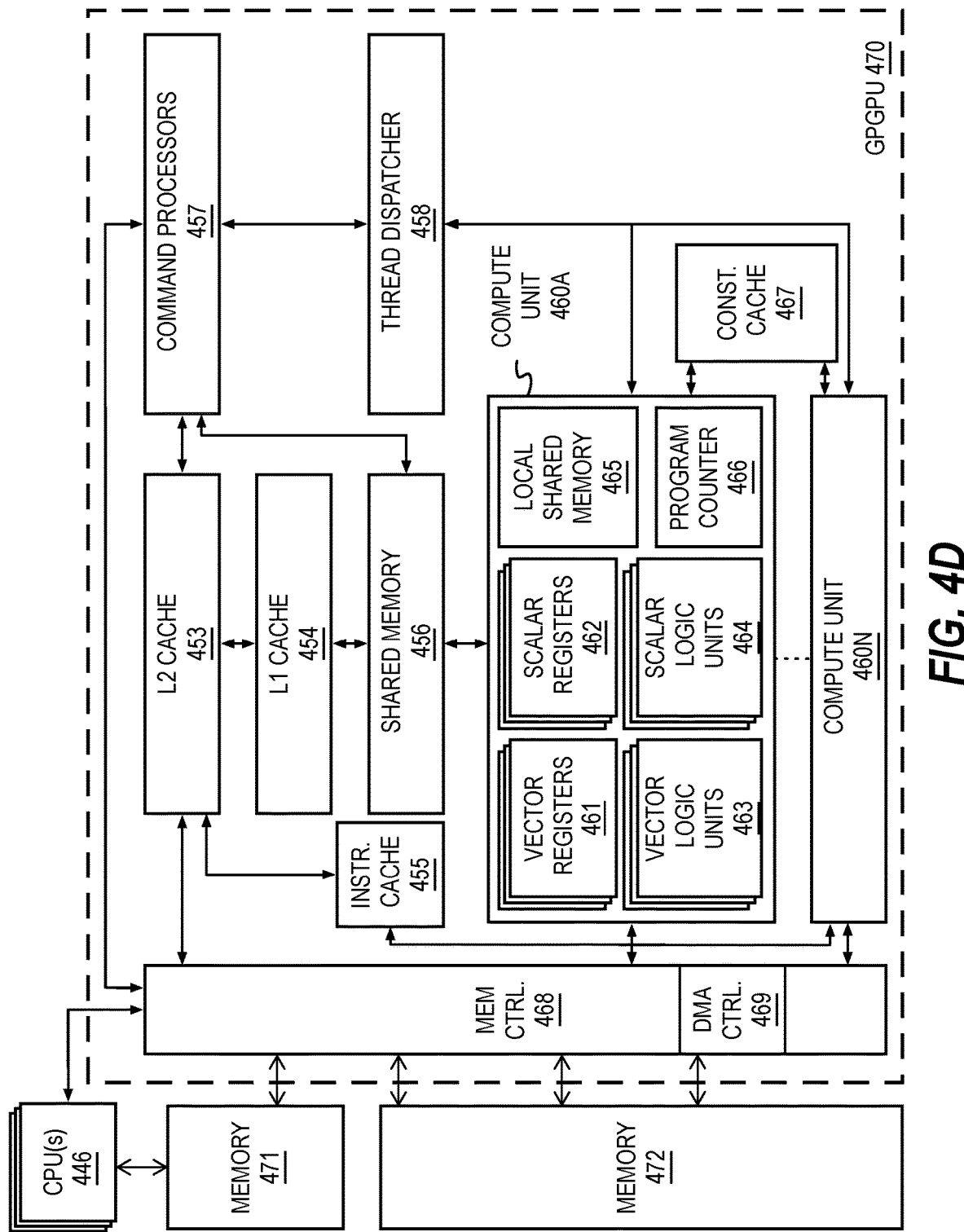

FIG. 4D is a block diagram of general purpose graphics processing unit (GPGPU) 470 that can be configured as a graphics processor and/or compute accelerator, according to embodiments described herein. The GPGPU 470 can interconnect with host processors (e.g., one or more CPU(s) 446) and memory 471, 472 via one or more system and/or memory busses.

In one embodiment the memory 471 is system memory that may be shared with the one or more CPU(s) 446, while memory 472 is device memory that is dedicated to the GPGPU 470. In one embodiment, components within the GPGPU 470 and device memory 472 may be mapped into memory addresses that are accessible to the one or more CPU(s) 446. Access to memory 471 and 472 may be facilitated via a memory controller 468. In one embodiment the memory controller 468 includes an internal direct memory access (DMA) controller 469 or can include logic to perform operations that would otherwise be performed by a DMA controller.

The GPGPU 470 includes multiple cache memories, including an L2 cache 453, L1 cache 454, an instruction cache 455, and shared memory 456, at least a portion of which may also be partitioned as a cache memory. The GPGPU 470 also includes multiple compute units 460A-460N. Each compute unit 460A-460N includes a set of vector registers 461, scalar registers 462, vector logic units 463, and scalar logic units 464. The compute units 460A-460N can also include local shared memory 465 and a program counter 466. The compute units 460A-460N can couple with a constant cache 467, which can be used to store constant data, which is data that may not change during the run of kernel or shader program that executes on the GPGPU 470. In one embodiment the constant cache 467 is a scalar data cache and cached data can be fetched directly into the scalar registers 462.

During operation, the one or more CPU(s) 446 can write commands into registers or memory in the GPGPU 470 that has been mapped into an accessible address space. The command processors 457 can read the commands from registers or memory and determine how those commands can be processed within the GPGPU 470. A thread dispatcher 458 can then be used to dispatch threads to the compute units 460A-460N to perform those commands. Each compute unit 460A-460N can execute threads independently of the other compute units.

Additionally, each compute unit 460A-460N can be independently configured for conditional computation and can conditionally output the results of computation to memory. The command processors 457 can interrupt the one or more CPU(s) 446 when the submitted commands are complete.

Graphics Software Architecture

Figure 5:
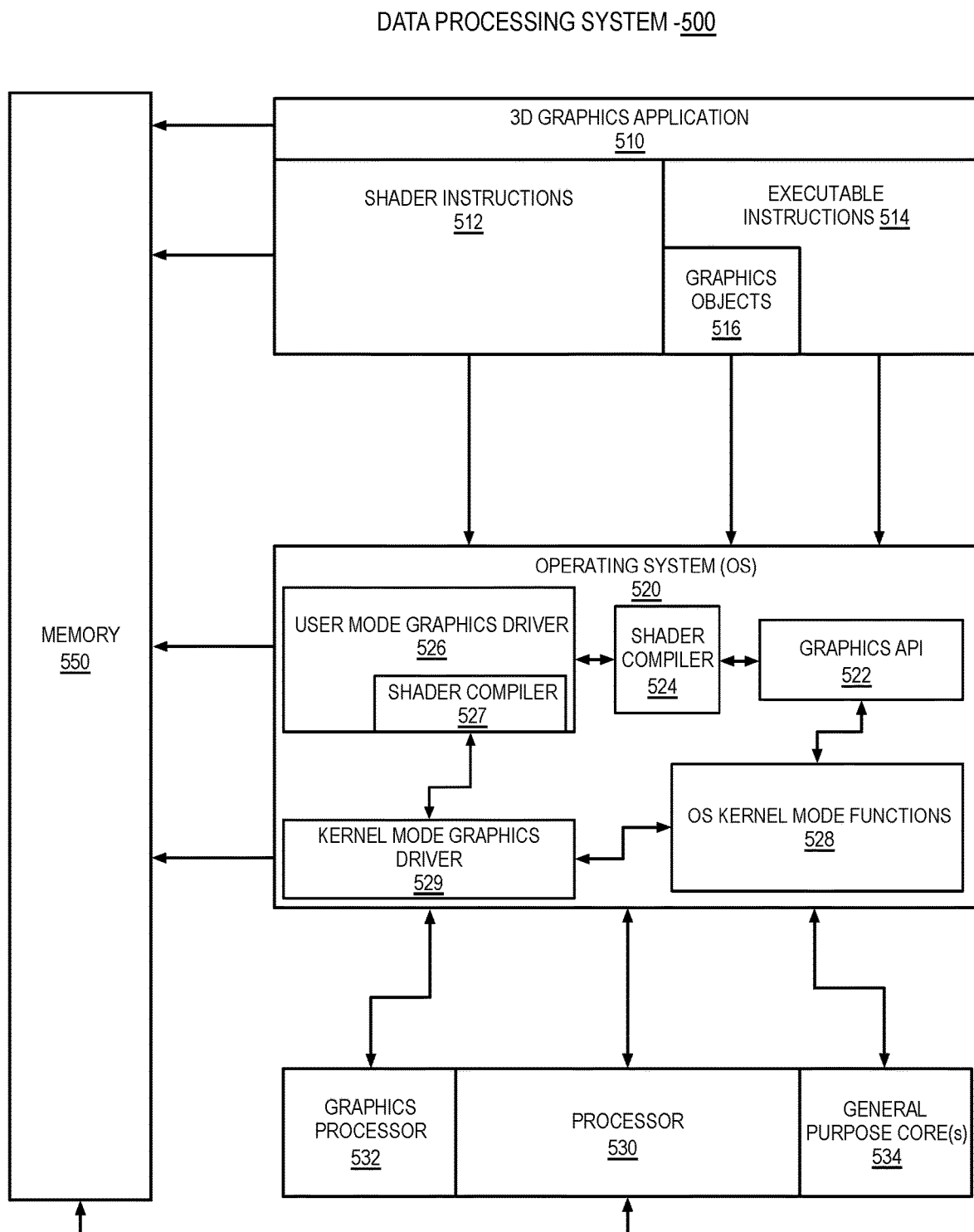
FIG. 5 illustrates example graphics software architecture for a data processing system in accordance with some embodiments.

FIG. 5 illustrates an example graphics software architecture for a data processing system 500 according to some embodiments. In some embodiments, software architecture includes a 3D graphics application 510, an operating system 520, and at least one processor 530. In some embodiments, processor 530 includes a graphics processor 532 and one or more general-purpose processor core(s) 534. The graphics application 510 and operating system 520 each execute in the system memory 550 of the data processing system.

In some embodiments, 3D graphics application 510 contains one or more shader programs including shader instructions 512. The shader language instructions may be in a high-level shader language, such as the High-Level Shader Language (HLSL) of Direct3D, the OpenGL Shader Language (GLSL), and so forth. The application also includes executable instructions 514 in a machine language suitable for execution by the general-purpose processor core 534. The application also includes graphics objects 516 defined by vertex data.

In some embodiments, operating system 520 is a Microsoft® Windows® operating system from the Microsoft Corporation, a proprietary UNIX-like operating system, or an open source UNIX-like operating system using a variant of the Linux kernel. The operating system 520 can support a graphics API 522 such as the Direct3D API, the OpenGL API, or the Vulkan API. When the Direct3D API is in use, the operating system 520 uses a front-end shader compiler 524 to compile any shader instructions 512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 510. In some embodiments, the shader instructions 512 are provided in an intermediate form, such as a version of the Standard Portable Intermediate Representation (SPIR) used by the Vulkan API.

In some embodiments, user mode graphics driver 526 contains a back-end shader compiler 527 to convert the shader instructions 512 into a hardware specific representation.

When the OpenGL API is in use, shader instructions 512 in the GLSL high-level language are passed to a user mode graphics driver 526 for compilation. In some embodiments, user mode graphics driver 526 uses operating system kernel mode functions 528 to communicate with a kernel mode graphics driver 529. In some embodiments, kernel mode graphics driver 529 communicates with graphics processor 532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 6A:
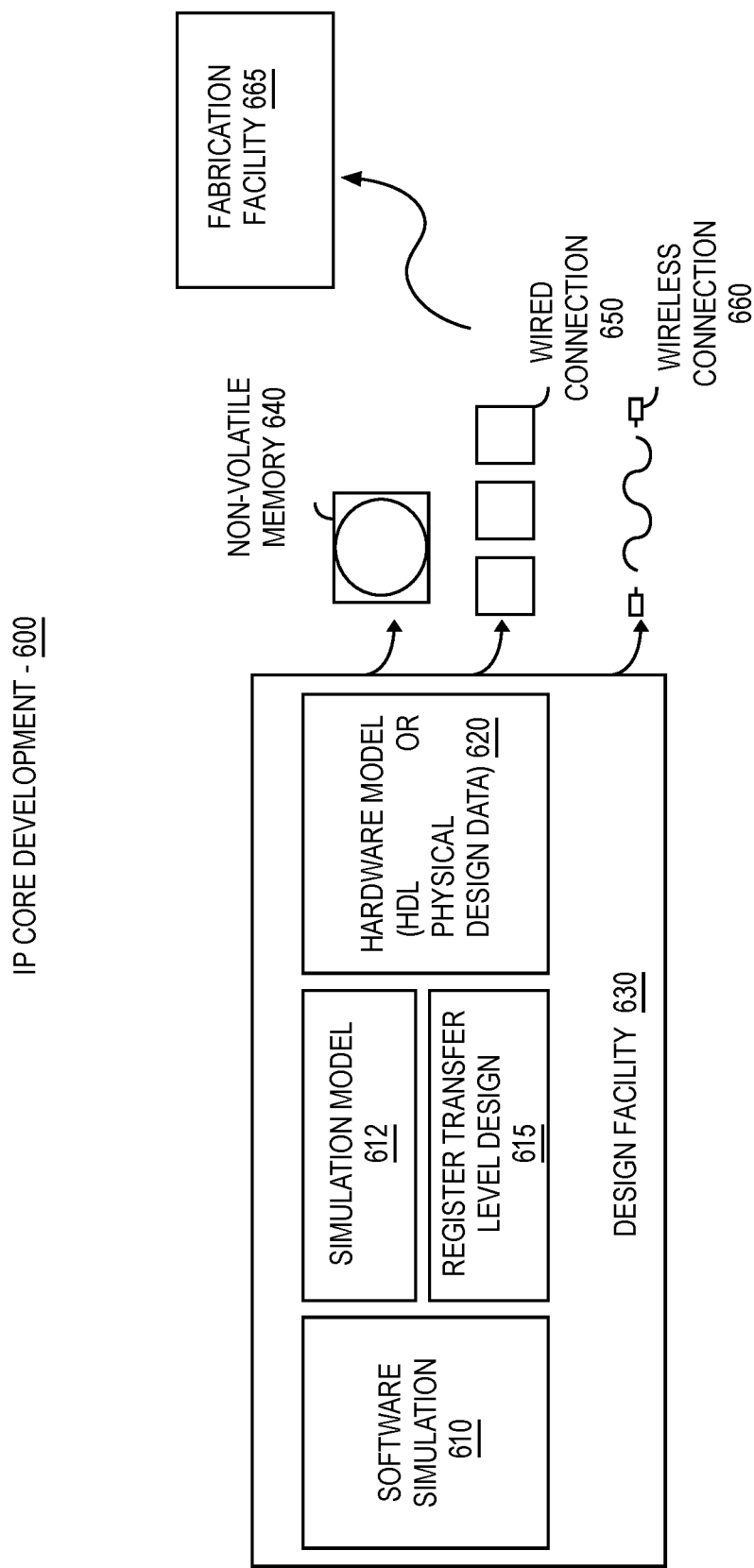
FIG. 6A is a block diagram illustrating an IP core development system in accordance with some embodiments.

FIG. 6A is a block diagram illustrating an IP core development system 600 that may be used to manufacture an integrated circuit to perform operations according to an embodiment. The IP core development system 600 may be used to generate modular, re-usable designs that can be incorporated into a larger design or used to construct an entire integrated circuit (e.g., an SOC integrated circuit). A design facility 630 can generate a software simulation 610 of an IP core design in a high-level programming language (e.g., C/C++). The software simulation 610 can be used to design, test, and verify the behavior of the IP core using a simulation model 612.

The simulation model 612 may include functional, behavioral, and/or timing simulations. A register transfer level (RTL) design 615 can then be created or synthesized from the simulation model 612. The RTL design 615 is an abstraction of the behavior of the integrated circuit that models the flow of digital signals between hardware registers, including the associated logic performed using the modeled digital signals. In addition to an RTL design 615, lower-level designs at the logic level or transistor level may also be created, designed, or synthesized. Thus, the particular details of the initial design and simulation may vary.

The RTL design 615 or equivalent may be further synthesized by the design facility into a hardware model 620, which may be in a hardware description language (HDL), or some other representation of physical design data. The HDL may be further simulated or tested to verify the IP core design. The IP core design can be stored for delivery to a $3^{rd}$ party fabrication facility 665 using non-volatile memory 640 (e.g., hard disk, flash memory, or any non-volatile storage medium). Alternatively, the IP core design may be transmitted (e.g., via the Internet) over a wired connection 650 or wireless connection 660. The fabrication facility 665 may then fabricate an integrated circuit that is based at least in part on the IP core design. The fabricated integrated circuit can be configured to perform operations in accordance with at least one embodiment described herein.

Figure 6B:
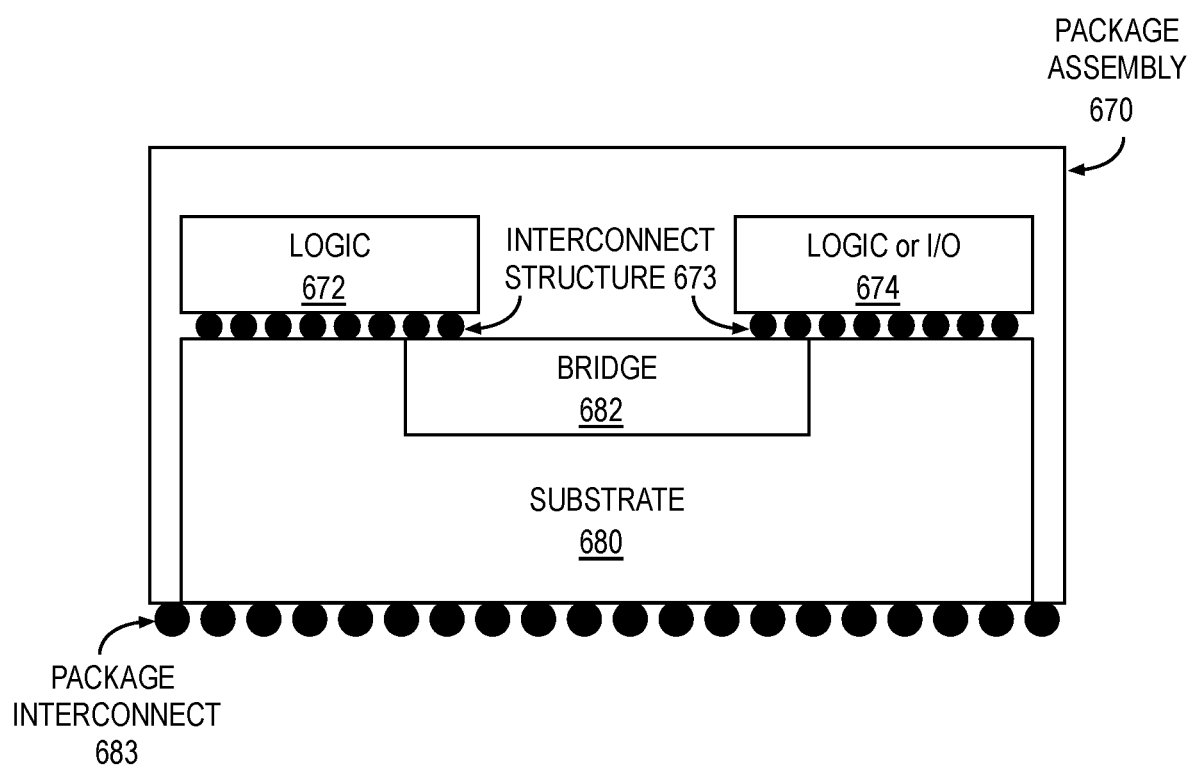
FIG. 6B illustrates a cross-section side view of an integrated circuit package assembly in accordance with some embodiments.

FIG. 6B illustrates a cross-section side view of an integrated circuit package assembly 670, according to some embodiments described herein. The integrated circuit package assembly 670 illustrates an implementation of one or more processor or accelerator devices as described herein. The package assembly 670 includes multiple units of hardware logic 672, 674 connected to a substrate 680. The logic 672, 674 may be implemented at least partly in configurable logic or fixed-functionality logic hardware, and can include one or more portions of any of the processor core(s), graphics processor(s), or other accelerator devices described herein. Each unit of logic 672, 674 can be implemented within a semiconductor die and coupled with the substrate 680 via an interconnect structure 673. The interconnect structure 673 may be configured to route electrical signals between the logic 672, 674 and the substrate 680, and can include interconnects such as, but not limited to bumps or pillars. In some embodiments, the interconnect structure 673 may be configured to route electrical signals such as, for example, input/output (I/O) signals and/or power or ground signals associated with the operation of the logic 672, 674. In some embodiments, the substrate 680 is an epoxy-based laminate substrate. The substrate 680 may include other suitable types of substrates in other embodiments. The package assembly 670 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, the units of logic 672, 674 are electrically coupled with a bridge 682 that is configured to route electrical signals between the logic 672, 674. The bridge 682 may be a dense interconnect structure that provides a route for electrical signals. The bridge 682 may include a bridge substrate composed of glass or a suitable semiconductor material. Electrical routing features can be formed on the bridge substrate to provide a chip-to-chip connection between the logic 672, 674.

Although two units of logic 672, 674 and a bridge 682 are illustrated, embodiments described herein may include more or fewer logic units on one or more dies. The one or more dies may be connected by zero or more bridges, as the bridge 682 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 6C:
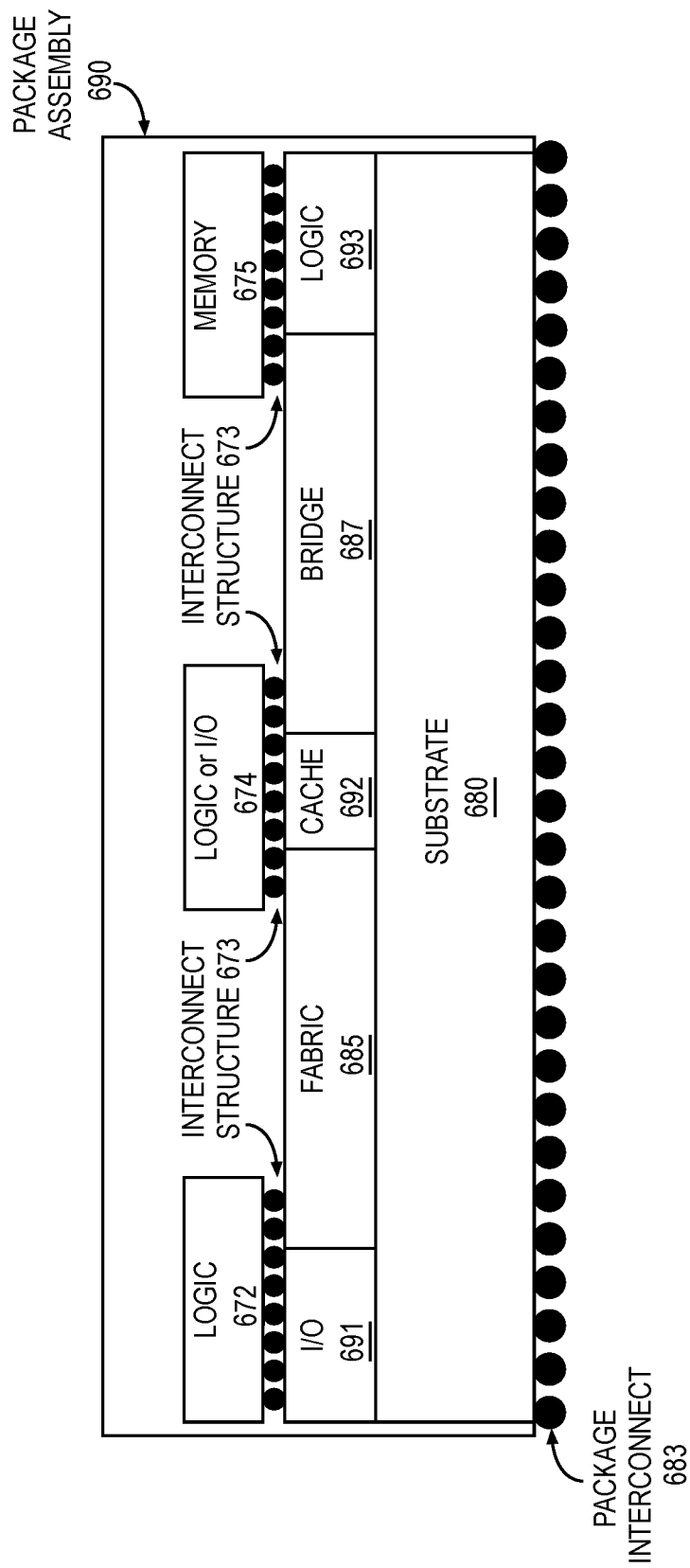
FIG. 6C illustrates a package assembly that includes multiple units of hardware logic chiplets connected to a substrate (e.g., base die) in accordance with some embodiments.

FIG. 6C illustrates a package assembly 690 that includes multiple units of hardware logic chiplets connected to a substrate 680 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 672, logic or I/O chiplets 674, and/or memory chiplets 675. The hardware logic chiplets 672 and logic or I/O chiplets 674 may be implemented at least partly in configurable logic or fixed-functionality logic hardware and can include one or more portions of any of the processor core(s), graphics processor(s), parallel processors, or other accelerator devices described herein.

The memory chiplets 675 can be DRAM (e.g., GDDR, HBM) memory or cache (SRAM) memory.

Each chiplet can be fabricated as separate semiconductor die and coupled with the substrate 680 via an interconnect structure 673. The interconnect structure 673 may be configured to route electrical signals between the various chiplets and logic within the substrate 680. The interconnect structure 673 can include interconnects such as, but not limited to bumps or pillars. In some embodiments, the interconnect structure 673 may be configured to route electrical signals such as, for example, input/output (I/O) signals and/or power or ground signals associated with the operation of the logic, I/O and memory chiplets.

In some embodiments, the substrate 680 is an epoxy-based laminate substrate. The substrate 680 may include other suitable types of substrates in other embodiments. The package assembly 690 can be connected to other electrical devices via a package interconnect 683. The package interconnect 683 may be coupled to a surface of the substrate 680 to route electrical signals to other electrical devices, such as a motherboard, other chipset, or multi-chip module.

In some embodiments, a logic or I/O chiplet 674 and a memory chiplet 675 can be electrically coupled via a bridge 687 that is configured to route electrical signals between the logic or I/O chiplet 674 and a memory chiplet 675. The bridge 687 may be a dense interconnect structure that provides a route for electrical signals. The bridge 687 may include a bridge substrate composed of glass or a suitable semiconductor material. Electrical routing features can be formed on the bridge substrate to provide a chip-to-chip connection between the logic or I/O chiplet 674 and a memory chiplet 675. The bridge 687 may also be referred to as a silicon bridge or an interconnect bridge. For example, the bridge 687, in some embodiments, is an Embedded Multi-die Interconnect Bridge (EMIB). In some embodiments, the bridge 687 may simply be a direct connection from one chiplet to another chiplet.

The substrate 680 can include hardware components for I/O 691, cache memory 692, and other hardware logic 693. A fabric 685 can be embedded in the substrate 680 to enable communication between the various logic chiplets and the logic 691, 693 within the substrate 680. In one embodiment, the U/O 691, fabric 685, cache, bridge, and other hardware logic 693 can be integrated into a base die that is layered on top of the substrate 680. The fabric 685 may be a network on a chip interconnect or another form of packet switched fabric that switches data packets between components of the package assembly.

In various embodiments a package assembly 690 can include fewer or greater number of components and chiplets that are interconnected by a fabric 685 or one or more bridges 687. The chiplets within the package assembly 690 may be arranged in a 3D or 2.5D arrangement. In general, bridge structures 687 may be used to facilitate a point to point interconnect between, for example, logic or I/O chiplets and memory chiplets. The fabric 685 can be used to interconnect the various logic and/or I/O chiplets (e.g., chiplets 672, 674, 691, 693). with other logic and/or I/O chiplets. In one embodiment, the cache memory 692 within the substrate can act as a global cache for the package assembly 690, part of a distributed global cache, or as a dedicated cache for the fabric 685.

Figure 6D:
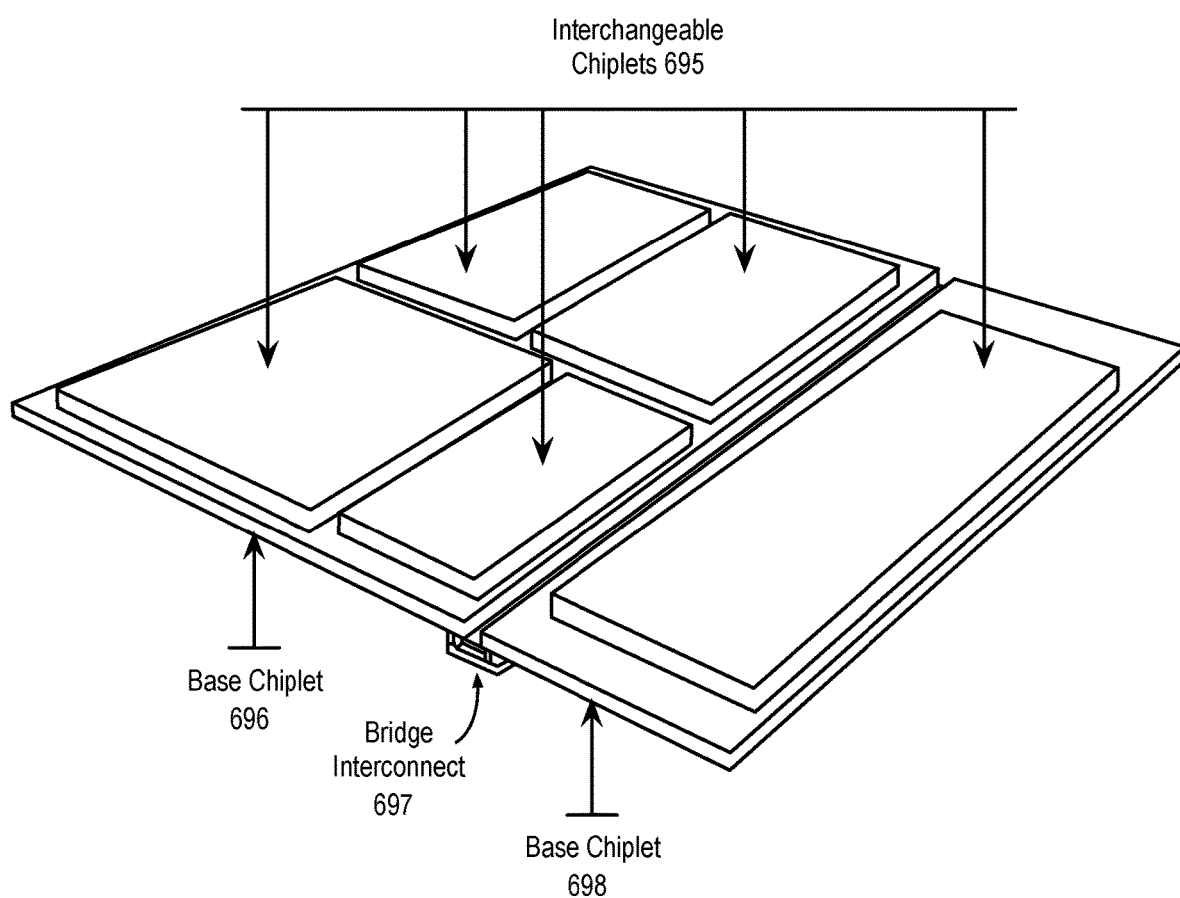
FIG. 6D illustrates a package assembly including interchangeable chiplets in accordance with some embodiments.

FIG. 6D illustrates a package assembly 694 including interchangeable chiplets 695, according to an embodiment. The interchangeable chiplets 695 can be assembled into standardized slots on one or more base chiplets 696, 698. The base chiplets 696, 698 can be coupled via a bridge interconnect 697, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 696, 698, which can be fabricated using a different process technology relative to the interchangeable chiplets 695 that are stacked on top of the base chiplets. For example, the base chiplets 696, 698 can be fabricated using a larger process technology, while the interchangeable chiplets can be manufactured using a smaller process technology. One or more of the interchangeable chiplets 695 may be memory (e.g., DRAM) chiplets. Different memory densities can be selected for the package assembly 694 based on the power, and/or performance targeted for the product that uses the package assembly 694. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Example System on a Chin Integrated Circuit

Figure 7:
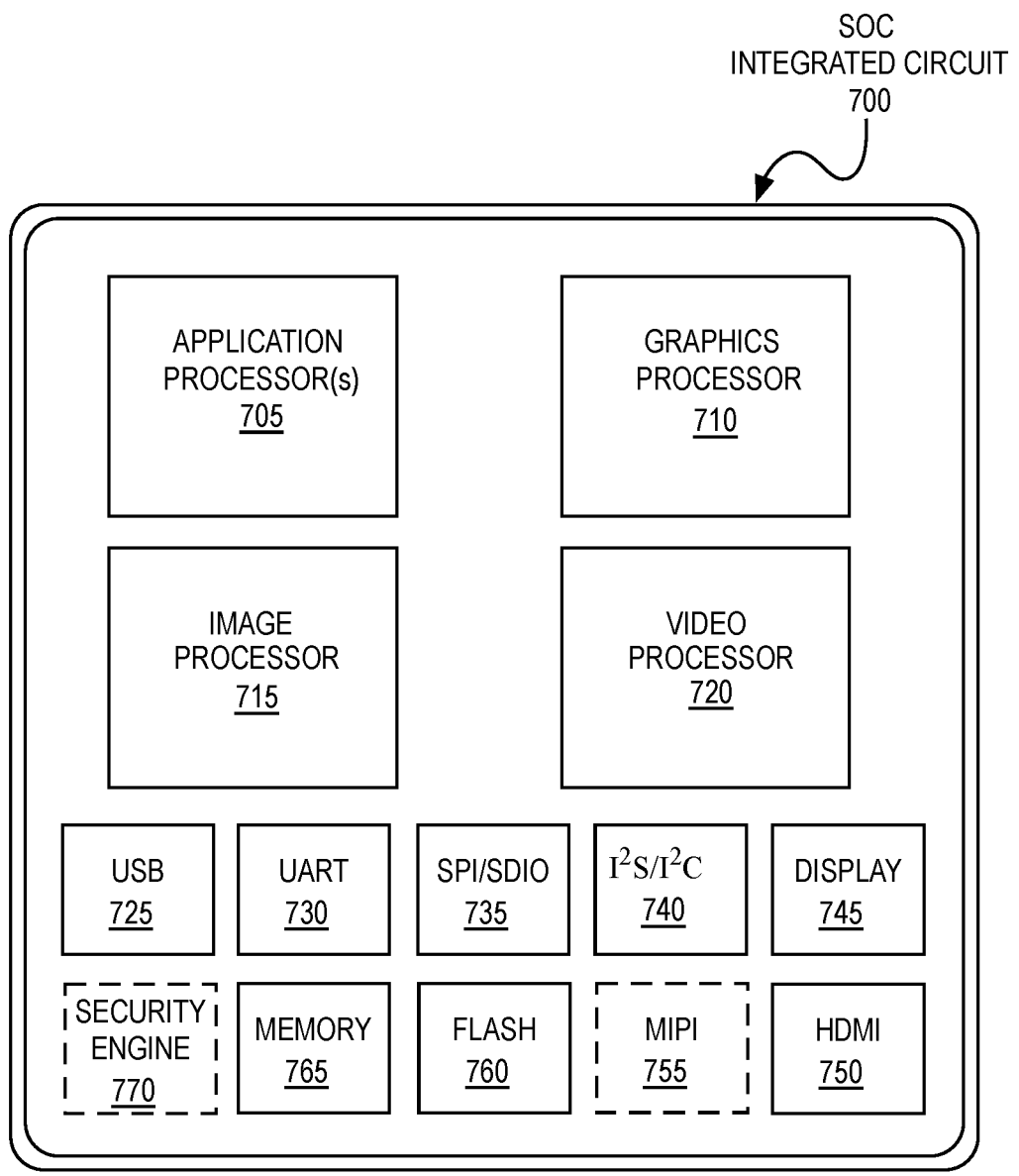
FIG. 7 is a block diagram illustrating an example system on a chip integrated circuit in accordance with some embodiments.

FIG. 7 illustrates an example integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 7 is a block diagram illustrating an example system on a chip integrated circuit 700 that may be fabricated using one or more IP cores, according to an embodiment. Example integrated circuit 700 includes one or more application processor(s) 705 (e.g., CPUs), at least one graphics processor 710, and may additionally include an image processor 715 and/or a video processor 720, any of which may be a modular IP core from the same or multiple different design facilities. Integrated circuit 700 includes peripheral or bus logic including a USB controller 725, UART controller 730, an SPI/SDIO controller 735, and an $I^2S/I^2C$ controller 740. Additionally, the integrated circuit can include a display device 745 coupled to one or more of a high-definition multimedia interface (HDMI) controller 750 and a mobile industry processor interface (MIPI) display interface 755. Storage may be provided by a flash memory subsystem 760 including flash memory and a flash memory controller. Memory interface may be provided via a memory controller 765 for access to SDRAM or SRAM memory devices. Some integrated circuits additionally include an embedded security engine 770.

Disaggregate Computing for Distributed Confidential Computing Environment

As previously described, disaggregated computing is on the rise in data centers. Cloud service providers (CSP) are deploying solutions where processing of a workload is distributed on disaggregated compute resources, such as CPUs, GPUs, and hardware accelerators (including field programmable gate arrays (FPGAs)), that are connected via a network instead of being on the same platform and connected via physical links such as peripheral component interconnect express (PCIe). Disaggregated computing enables improved resource utilization and lowers ownership costs by enabling more efficient use of available resources. Disaggregated computing also enables pooling a large number of hardware accelerators for large computation making the computation more efficient and better performing.

Embodiments provide for novel techniques for disaggregate computing for distributed confidential computing environments. These novel techniques are used to provide for the above-noted improved computation efficiency and performance in computing architectures seeking to implement disaggregate computing. Implementations of the disclosure provide protected remote direct memory access (RDMA) for distributed confidential computing, provide data relocation and command buffer patching for GPU remoting, provide remoting to driver-managed GPUs, provide remoting to autonomous GPUs, provide protected management of network-connected FPGAs, provide enforcement of CSP policy for FPGA usage by a tenant bitstream, and/or provide autonomous FPGAs, as discussed further below with respect to FIGS. 8-51.

Figure 8:
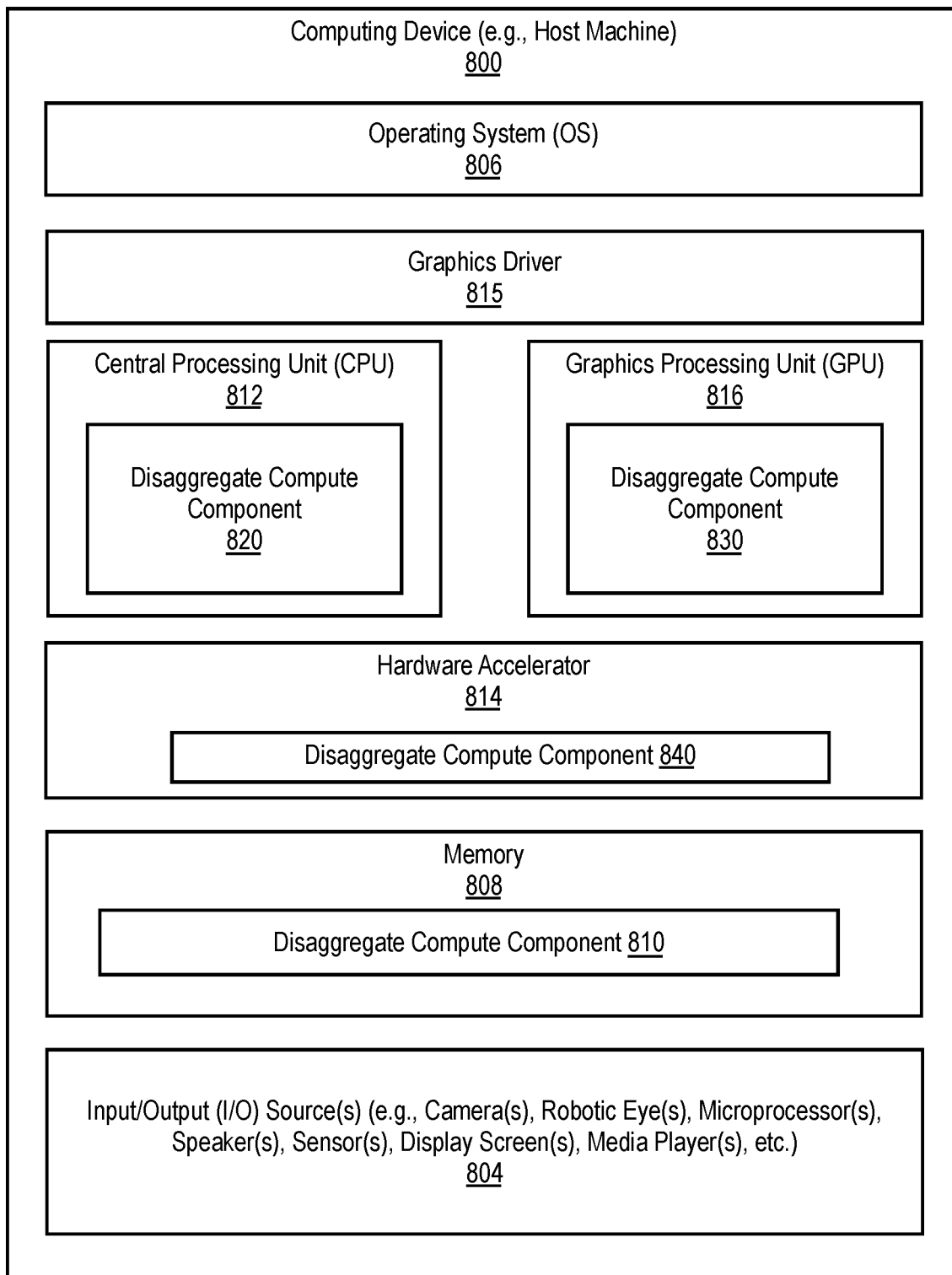
FIG. 8 illustrates a computing device employing a disaggregate compute component, according to implementations of the disclosure.

FIG. 8 illustrates a computing device 800 employing a disaggregate compute component 810 according to one implementation of the disclosure. Computing device 800 represents a communication and data processing device including or representing (without limitations) smart voice command devices, intelligent personal assistants, home/ office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set—top boxes (e.g., Internet based cable television set—top boxes, etc.), global positioning system (GPS)—based devices, automotive infotainment devices, etc.

In some embodiments, computing device 800 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 800 may include a computer platform hosting an integrated circuit ("IC"), such as a system on a chip ("SOC" or "SOC"), integrating various hardware and/or software components of computing device 800 on a single chip.

As illustrated, in one embodiment, computing device 800 may include any number and type of hardware and/or software components, such as (without limitation) graphics processing unit ("GPU" or simply "graphics processor") 816 (such as the graphics processors described above with respect to any one of FIGS. 1-7), graphics driver (also referred to as "GPU driver", "graphics driver logic", "driver logic", user-mode driver (UMD), user-mode driver framework (UMDF), or simply "driver") 815, central processing unit ("CPU" or simply "application processor") 812 (such as the processors or CPUs described above with respect to FIGS. 1-7), hardware accelerator 814 (such as an FPGA, ASIC, a re-purposed CPU, or a re-purposed GPU, for example), memory 808, network devices, drivers, or the like, as well as input/output (I/O) sources 804, such as touchscreens, touch panels, touch pads, virtual or regular keyboards, virtual or regular mice, ports, connectors, etc. Computing device 800 may include operating system (OS) 806 serving as an interface between hardware and/or physical resources of the computing device 800 and a user.

It is to be appreciated that a lesser or more equipped system than the example described above may be utilized for certain implementations. Therefore, the configuration of computing device 800 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, disaggregate compute component 810 may be hosted by memory 808 in communication with I/O source(s) 804, such as microphones, speakers, etc., of computing device 800. In another embodiment, disaggregate compute component 810 may be part of or hosted by operating system 806. In yet another embodiment, disaggregate compute component 810 may be hosted or facilitated by graphics driver 815. In yet another embodiment, disaggregate compute component 810 may be hosted by or part of a hardware accelerator 814; for example, disaggregate compute component 810 may be embedded in or implemented as part of the processing hardware of hardware accelerator 814, such as in the form of disaggregate compute component 840. In yet another embodiment, disaggregate compute component 810 may be hosted by or part of graphics processing unit ("GPU" or simply graphics processor") 816 or firmware of graphics processor 816; for example, disaggregate compute component may be embedded in or implemented as part of the processing hardware of graphics processor 816, such as in the form of disaggregate compute component 830. Similarly, in yet another embodiment, disaggregate compute evaluation component 810 may be hosted by or part of central processing unit ("CPU" or simply "application processor") 812; for example, disaggregate compute evaluation component 820 may be embedded in or implemented as part of the processing hardware of application processor 812, such as in the form of disaggregate compute component 820. In some embodiments, disaggregate compute component 810 may be provided by one or more processors including one or more of a graphics processor, an application processor, and another processor, wherein the one or more processors are co-located on a common semiconductor package.

It is contemplated that embodiments are not limited to certain implementation or hosting of disaggregate compute component 810 and that one or more portions or components of disaggregate compute component 810 may be employed or implemented as hardware, software, or any combination thereof, such as firmware. In one embodiment, for example, the disaggregate compute component may be hosted by a machine learning processing unit which is different from the GPU. In another embodiment, the disaggregate compute component may be distributed between a machine learning processing unit and a CPU. In another embodiment, the disaggregate compute component may be distributed between a machine learning processing unit, a CPU and a GPU. In another embodiment, the disaggregate compute component may be distributed between a machine learning processing unit, a CPU, a GPU, and a hardware accelerator.

Computing device 800 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 9:
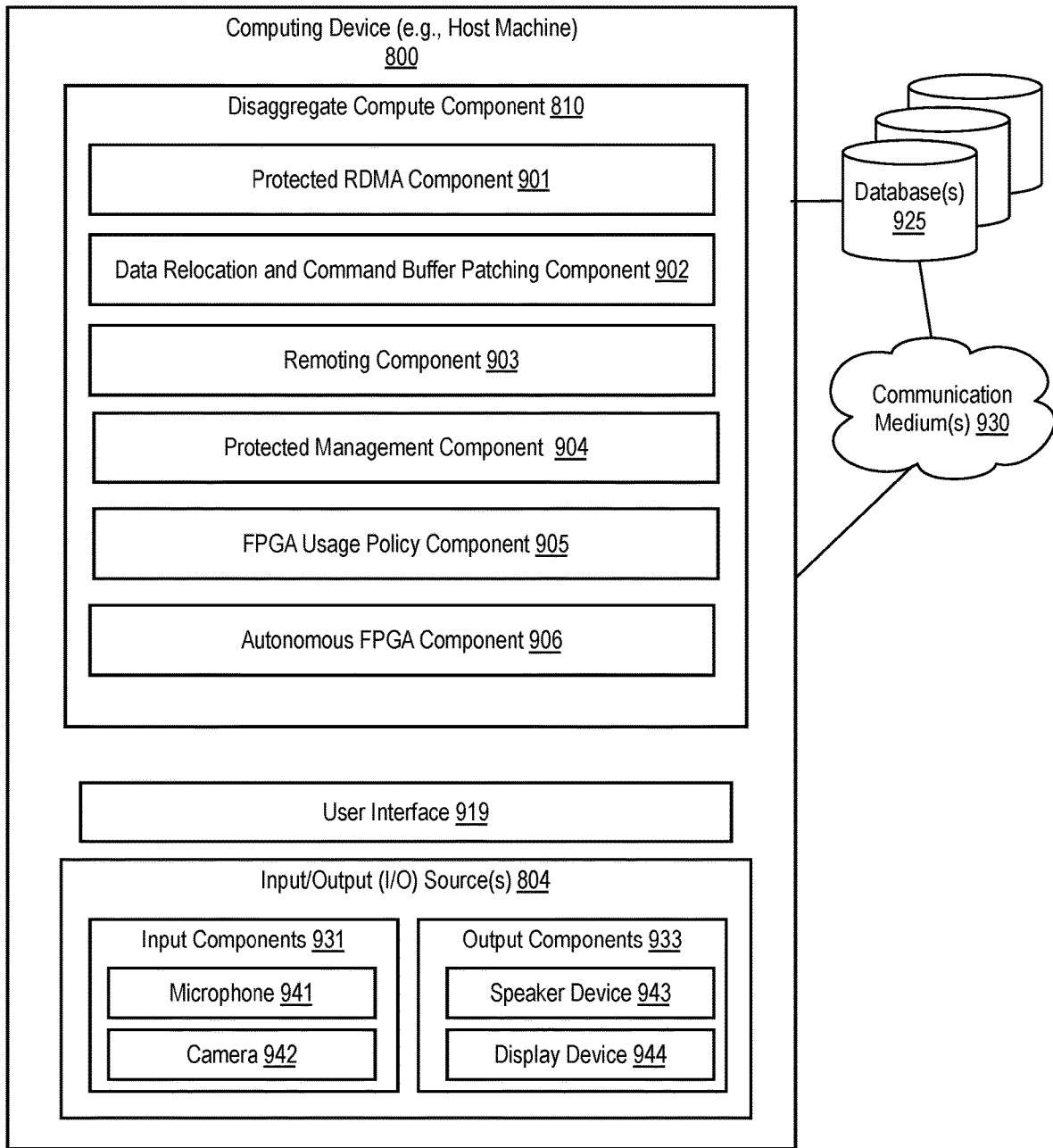
FIG. 9 illustrates disaggregate compute component, according to one implementation of the disclosure.

FIG. 9 illustrates disaggregate compute component 810 of FIG. 8, according to one implementation of the disclosure. For brevity, many of the details already discussed with reference to FIG. 8 are not repeated or discussed hereafter. In one embodiment, disaggregate compute component 810 may be the same as any of disaggregate compute components 810, 820, 830, 840 described with respect to FIG. 8 and may include any number and type of components, such as (without limitations): protected RDMA component 901; data relocation and command buffer patching component 902; remoting component 903; protected management component 904; FPGA usage policy component 905; and autonomous FPGA component 906.

Computing device 800 is further shown to include user interface 919 (e.g., graphical user interface (GUI) based user interface, Web browser, cloud-based platform user interface, software application-based user interface, other user or application programming interfaces (APIs), etc.).

Computing device 800 may further include I/O source(s) 804 having input component (s) 931, such as camera(s) 942 (e.g., Intel® RealSense™ camera), sensors, microphone(s) 941, etc., and output component(s) 933, such as display device(s) or simply display(s) 944 (e.g., integral displays, tensor displays, projection screens, display screens, etc.), speaker devices(s) or simply speaker(s), etc.

Computing device 800 is further illustrated as having access to and/or being in communication with one or more database(s) 925 and/or one or more of other computing devices over one or more communication medium(s) 930 (e.g., networks such as a proximity network, a cloud network, the Internet, etc.).

In some embodiments, database(s) 925 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or other details, and/or the like.

As aforementioned, computing device 800 may host I/O sources 804 including input component(s) 931 and output component(s) 933. In one embodiment, input component(s) 931 may include a sensor array including, but not limited to, microphone(s) 941 (e.g., ultrasound microphones), camera(s) 942 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 933 may include any number and type of display device(s) 944, projectors, light-emitting diodes (LEDs), speaker(s) 943, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as disaggregate compute component 820, disaggregate compute component 830, and/or disaggregate compute component 840 hosted by application processor 812, graphics processor 816, and/or hardware accelerator 814, respectively, of FIG. 8 having to facilitate or execute the corresponding logic to perform certain tasks.

For example, as illustrated, input component (s) 931 may include any number and type of microphone(s) 941, such as multiple microphones or a microphone array, such as ultrasound microphones, dynamic microphones, fiber optic microphones, laser microphones, etc. It is contemplated that one or more of microphone(s) 941 serve as one or more input devices for accepting or receiving audio inputs (such as human voice) into computing device 800 and converting this audio or sound into electrical signals. Similarly, it is contemplated that one or more of camera(s) 942 serve as one or more input devices for detecting and capturing of image and/or videos of scenes, objects, etc., and provide the captured data as video inputs into computing device 800.

Embodiments provide for novel techniques for disaggregate computing for distributed confidential computing environments. These novel techniques can be used to provide for the above-noted improved computation efficiency and performance in computing architectures seeking to implement disaggregated computing. Implementations of the disclosure utilize a disaggregate compute component 810 to provide protected remote direct memory access (RDMA) for distributed confidential computing, provide data relocation and command buffer patching for GPU remoting, provide remoting to driver-managed GPUs, provide remoting to autonomous GPUs, provide protected management of network connected FPGAs, provide enforcement of CSP policy for FPGA usage by a tenant bitstream, and/or provide autonomous FPGAs.

With respect to FIG. 9, the disaggregate compute component 810 includes protected RDMA component 901 to provide for protected remote direct memory access (RDMA) for distributed confidential computing; data relocation and command buffer patching component 902 to provide for data relocation and command buffer patching for GPU remoting; remoting component 903 to provide for remoting to driver-managed GPUs and remoting to autonomous GPUs; protected management component 904 to provide for protected management of network connected FPGAs; FPGA usage policy component 905 to provide for enforcement of CSP policy for FPGA usage by a tenant bitstream; and autonomous FPGA component 906 to provide for autonomous FPGAs. Further details of the protected RDMA component 901; data relocation and command buffer patching component 902; remoting component 903; protected management component 904; FPGA usage policy component 905; and autonomous FPGA component 906 are described below with respect to FIGS. 10-51.

Protected RDMA for Distributed Confidential Computing

In some embodiments, an apparatus, system, or process is to provide protected RDMA for distributed confidential computing. In one implementation, protected RDMA component 901 described with respect to FIG. 9 provides the protected RDMA for distributed confidential computing.

RDMA refers to a direct memory access (DMA) from memory of one computing device into memory of another computing device without involving either computer devices' OSes.

RDMA directly copies data between local and remote memory of the computing devices without calling the kernel drivers. Received buffers do not have to be copied twice and the kernel does not use CPU clock cycles for RDMA buffer copy. As such, RDMA enables faster data transfer through networks and reduces the overhead to the CPU because an application and an RDMA Network Interface Controller (RDMA NIC or RNIC) interface directly. In traditional networking, such as sockets, TCP/IP, and Ethernet, the kernel intermediates the interface between the application and the RNIC, resulting in an additional copy of data buffers.

RDMA offers technical advantages including, but not limited to, reducing context switching between user space and kernel space in the OS, eliminating the extra buffer copy, and reducing CPU cycles consumed by the kernel (in host). RDMA also reduces interrupts because it coalesces processing of packets to an interrupt for completion of a RDMA transfer. The RNIC also offloads network transport processing (e.g., TCP/IP) from the host.

RDMA finds use in distributed computation, including disaggregated computing, where the processing elements with the same architecture or different architectures are networked to form a virtual processing platform. For example, where multiple identical CPUs, or combinations of different CPU architectures, and accelerators such as GPUs, FPGAs, ASICs, are connected in a network to cooperate on a computation. Distributed systems/platforms allow dynamic configuration and allocation of resources to match the type of computation (instructions/algorithm) and performance requirements of the application/workload. The dynamic allocation improves efficiency of use of networked components. This higher utilization of resources translates to cost savings and increased profits for the operator of the distributed datacenter.

The data, and sometimes commands, of an application running on a distributed system, are transferred between processing elements to cooperate in the computation. Computation resources (time and logic) used to transfer workloads are counted as overhead of distributed computation relative to processing the workload on processing elements on the same platform (directly connected components). RDMA's efficient data transfer reduces the overhead and latency, enabling better performance of distributed computational systems. In turn, this allows a wider range and more applications to run in distributed systems with higher performance.

Protection of computation in distributed platforms is more complex than in a single platform. Distributed computation exposes data and possibly algorithms (IP in the form of commands) when workloads are shared between processing elements.

Current threat models have the kernel and system driver in the Trusted Compute Base (TCB). In some conventional RDMA standards, the data buffer and RDMA structures to control execution in queue pairs (QP) are isolated from other applications by running on a Virtual Machine (VM). The Virtual Machine Manager (VMM) enforces the separation. The VMM can access the data buffer and QP, but is trusted and not considered a threat.

Some conventional systems protect DMA of directly-attached devices. However, such conventional systems do not protect DMA of networked devices (i.e., RDMA). Such conventional systems expose the application's data and the RDMA's data structures in user space to vulnerabilities in the VMM and kernel drivers. Datacenter operators and datacenter users want to minimize the threat surface. Conventional systems do not protect networked devices (i.e., do not protect RDMA).

Implementations of the disclosure provide for protected RDMA for a distributed confidential computing environment (DCCE). Implementations of the disclosure provide for the execution of computation in the processing elements in trusted execution environments (TEE), cryptographically protect confidentiality, and enable detection of integrity violations of RDMA between network-connected TEEs.

In implementations of the disclosure, the data buffer and RDMA structures in user space are protected from the VMM and other attackers. Integrity verification and encryption in the TEE protects the data buffer in the processing elements and transport. Integrity verification of the RDMA QP elements between application and RNIC protects RDMA execution order.

Regular mutual attestation protocols setup the communication medium (e.g., link, transport, channel, etc.) between processing elements and RNICs. Standard key exchange setup the encrypted tunnel for data transport.

RDMA is a key ingredient used in distributed computation. Implementations of the disclosure protect RDMA so that it can be part of a full solution that expand confidential computation to distributed platforms. This enables running confidential workloads on distributed systems to take advantage of higher utilization (lower cost of operation) of distributed systems. Implementations of the disclosure enable datacenter owners and operators to run workloads on distributed platforms while assuring the owners of the workloads that their data and intellectual property is not viewable by other applications running on the datacenter nor by the datacenter operators.

Implementations of the disclosure enable workload owners to submit workloads assured they can be able to detect when the computation has been corrupted. Furthermore, the privacy of data can be preserved even when a software attacker bypasses the protections in the datacenter.

Some conventional computing systems offer confidential computing and distributed FPGAs, but do not offer confidential computing with distributed accelerators. Computing system RNICs that implement implementations of the disclosure may be used in private and public datacenters to enable confidential computation using distributed computation resources.

Figure 10:
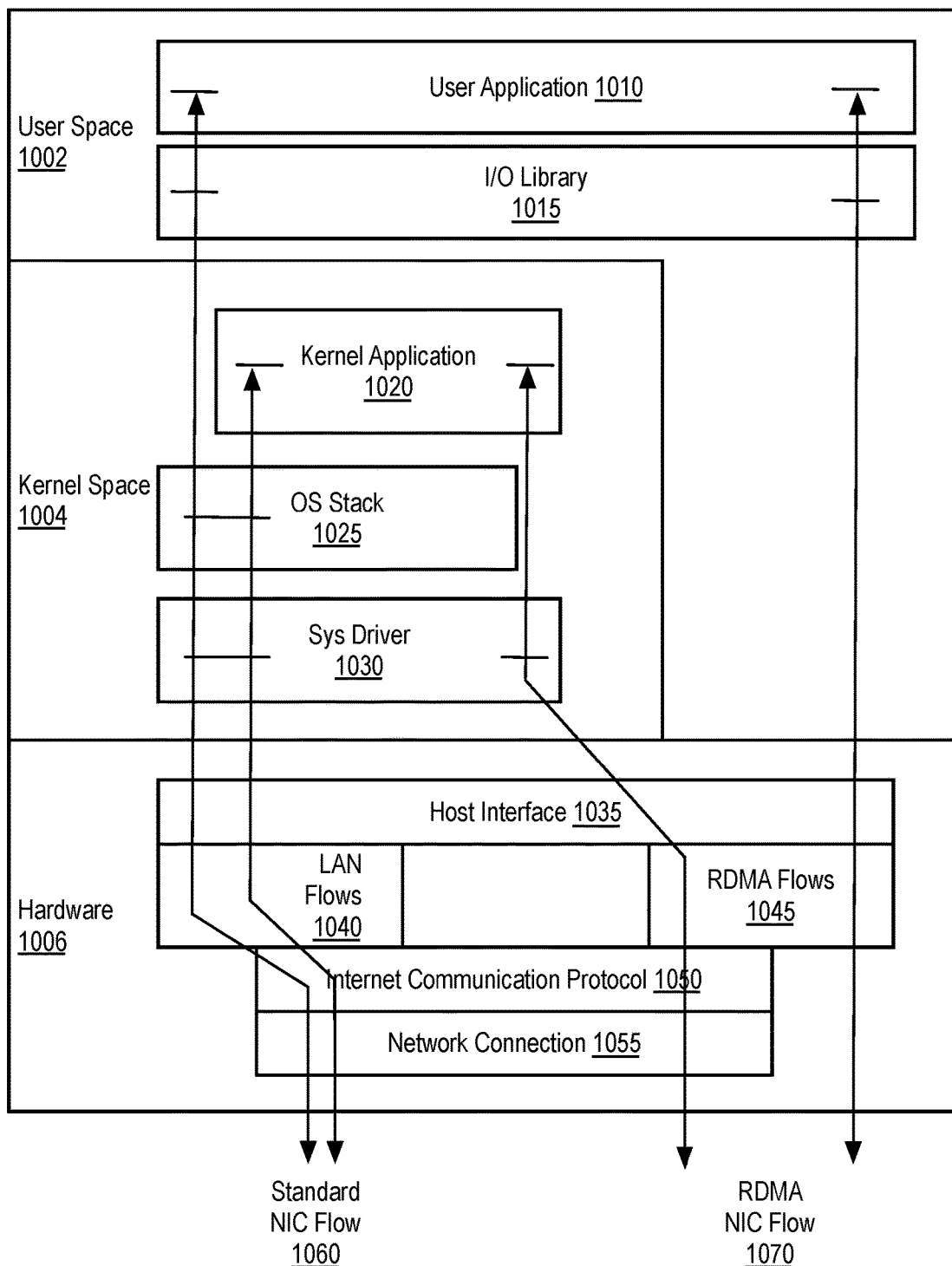
FIG. 10 is a schematic of a computing architecture depicting the difference between a remote direct memory access (RDMA) flow and a standard network interface controller (NIC) flow, according to implementations of the disclosure.

FIG. 10 is a schematic of a computing architecture 1000 depicting the difference between a remote direct memory access (RDMA) flow and a standard network interface controller (NIC) flow, according to implementations of the disclosure. Computing architecture 1000 includes a hardware layer 1006 including, but not limited to, a network connection 1055, such as Ethernet, transmitting information via an internet communication protocol 1050, such as IPv4 or IPv6, to an OS of the computing architecture 1000 via a host interface 1035. The OS of the computing architecture 1000 is divided into kernel space 1004 and user space 1002. The kernel space 1004 include a system driver 1030, OS stack 1025, and kernel application 1020. The user space includes an I/O library 1015 and a user application 1010. The example computing architecture 1000 of FIG. 10 may include one or more elements, processes and/or devices in addition to, or instead of, those illustrated in FIG. 10, and/or may include more than one of any or all of the illustrated elements, processes, and devices.

Computing architecture 1000 emphasizes the difference between a standard NIC flow 1060 and an RDMA NIC flow 1070 through the components of computing architecture 1000.

As shown, the standard NIC flow 1060 involves both user space 1002 and kernel space 1004 components of the OS for both of its configuration and data transfer flows. The standard NIC flow 1060 also follows a LAN flow 1040 through hardware 1006. The RDMA NIC flow 1070 removes the context switching between kernel space 1004 and user space 1002 during the data transfer flow and the kernel does not handle user data in the RDMA NIC flow 1070. Furthermore, the RDMA flow 1070 follows an RDMA flow 1045 through hardware 1006.

Figure 11:
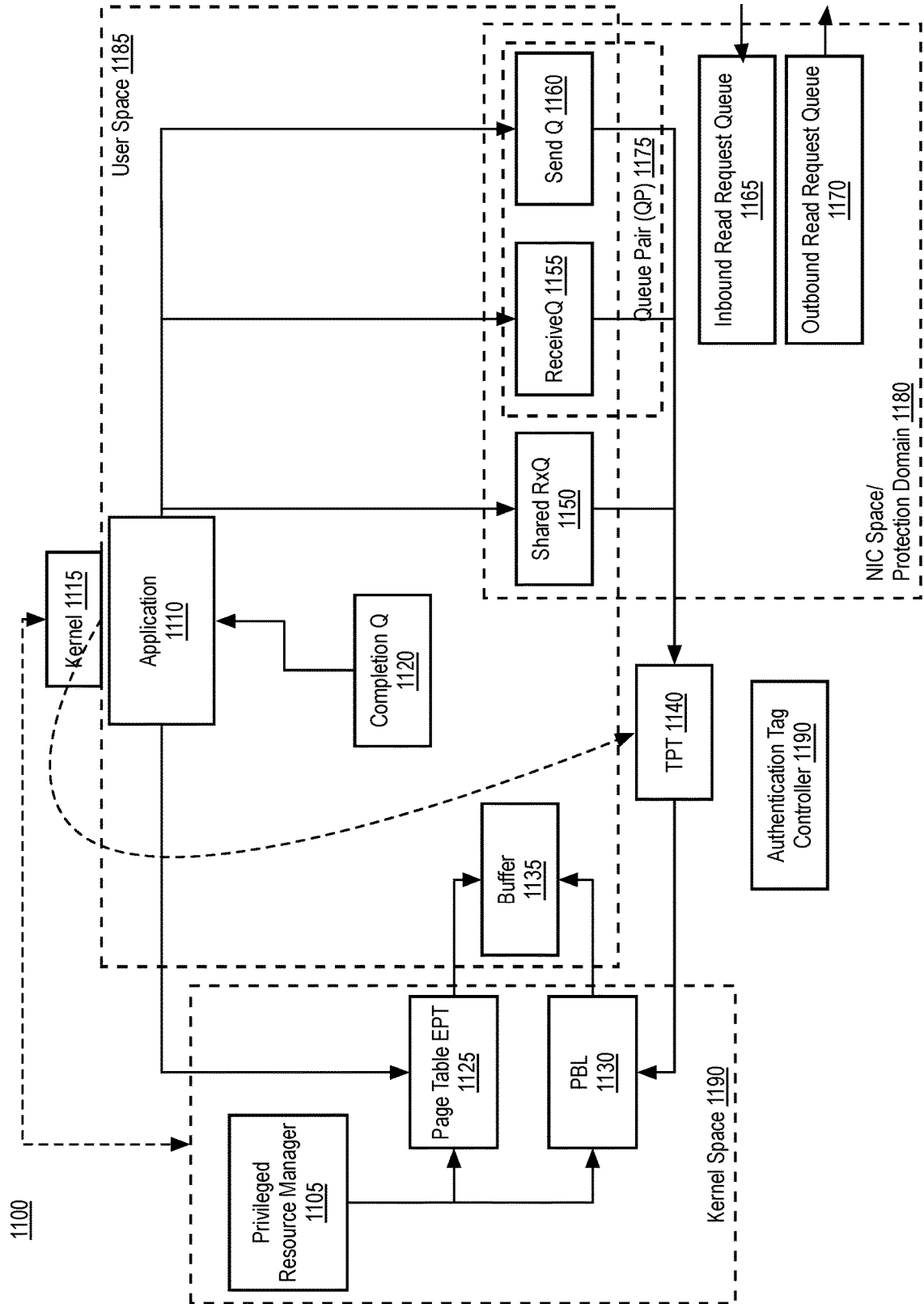
FIG. 11 illustrates data structures including an RDMA NIC (RNIC) and application use to request RDMAs, according to implementations of the disclosure.

FIG. 11 illustrates a computing architecture 1100 to request RDMAs, according to implementations of the disclosure. Computing architecture 1100 includes data structures that an RNIC and an application use in order to request RDMAs. Computing architecture 1100 depicts an example of mapping the data structures in kernel space, user space, and NIC memory. The data structures for RDMA may include, but are not limited to, a physical buffer list (PBL) 1130, a translation and protection table (TPT) 1140, and a plurality of queues including queue pairs (QP) 1175, a shared receive queue (RxQ) 1150, and completion queue 1120. The QP 1175 may include, but is not limited to, a receive queue (Q) 1155 and send Q 1160. The QP 1175 may be communicably connected to an inbound read request queue 1165 and an outbound read request queue 1170 of an RNIC in NIC space 1180. NIC space 1180 may further be implemented as a protection domain 1180 that is established by a privileged consumer to associate one process to its resources.

The buffer 1135 for data and the queue pairs (QP) 1175 used to submit and order execution of RDMA work requests (WR) are implemented in user space 1185 memory to allow the application 1110 to interface directly with the RNIC through them. The RNIC has direct access to memory in user space 1185 to efficiently copy data in the buffer 1135. The QP 1175 implemented in memory of the user space 1185 allows the application 1110 and RNIC to synchronize work directly through the QPs 1175.

The application 1110 calls the kernel 1115 to setup and resize the QP 1175, and registration and deregistration of memory regions (MR, the buffers). The kernel space 1190 may include the kernel 1115 as well as a privileged resource manager 1105, page table (extended page table (EPT) 1125, and the PBL 1130. After registration, the application 1110 does not call the kernel 1115 to copy buffers 1135 using RDMA.

Data separation between the application 1110 that owns the data and other software can be enforced via privileged software, such as a VMM in virtualized environments or the OS in bare metal platforms, as part of memory separation between users. Privileged software can access memory in user space 1185 and assign physical memory pages that map (translate) to the user's (guest) pages.

Figure 12:
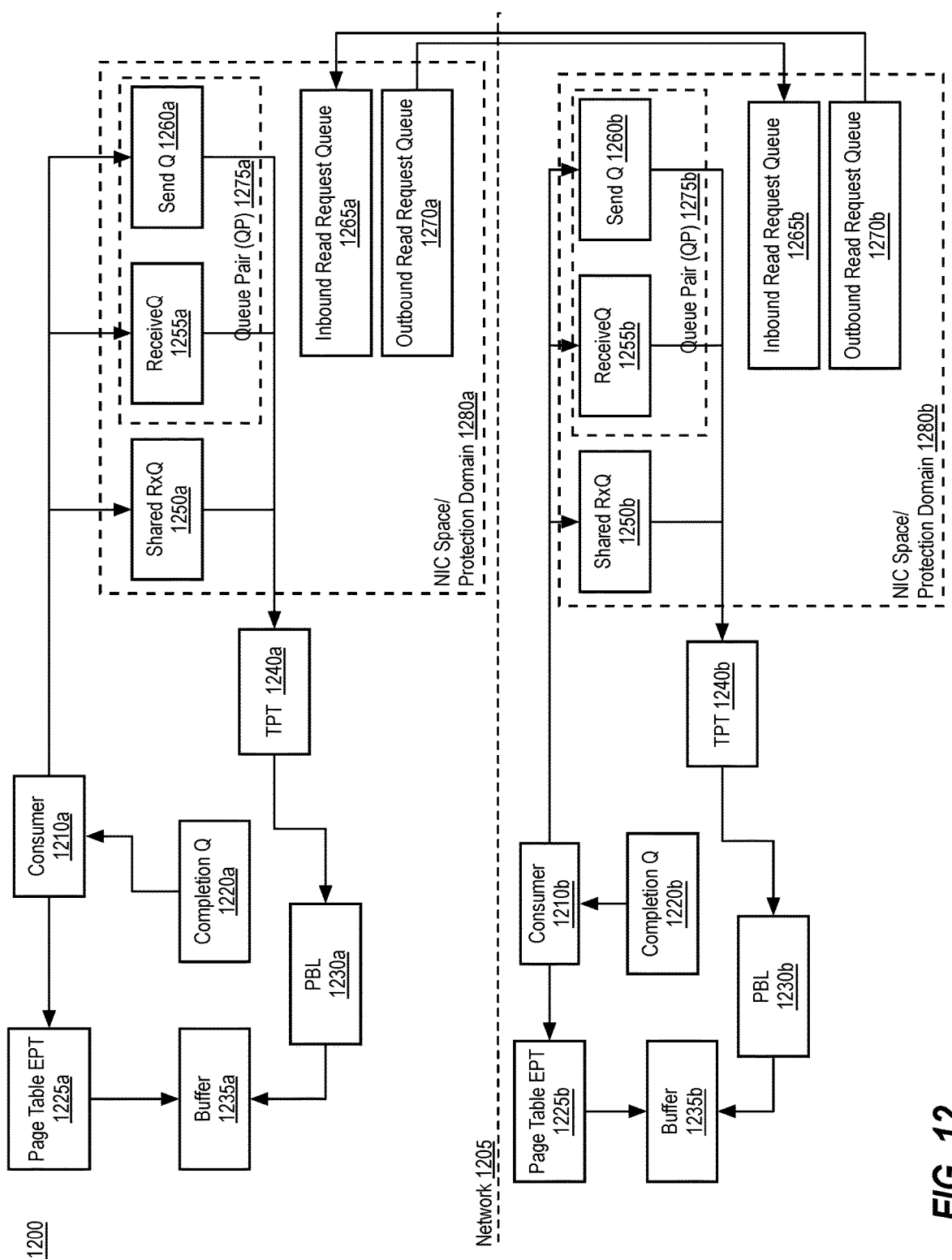
FIG. 12 illustrates a diagram depicting attack points for RDMA of two applications connected over a network, according to implementations of the disclosure.

FIG. 12 depicts a network architecture 1200 with potential attack points for RDMA in accordance with implementations of the disclosure. Network architecture 1200 includes two consumers 1210a, 1210b (e.g., application, accelerator, orchestrator, OS/VMM) connected over a network 1205 through QPs 1275a, 1275b interfacing via inbound read request queues 1265a, 1265b and outbound read request queues 1170a, 1170b of NIC space/PD 1180a, 1180b. Other components of the computing architectures underlying consumers 1210a, 1210b illustrated in FIG. 12 are the same to their identically-named components of FIG. 11 and the description of such similarly-named elements applies here with respect to FIG. 12.

In example network architecture 1200, privileged software or a simple hardware could attack RDMA at:

(1) The interface to the CQ 1220, shared RxQ 1250, and all QPs 1275a, 1275b. A consumer may submit a work request (WR) and consume completions. The RNIC consumes the WR and submits completions. Other software may try to interact with the RNIC, for example, by submitting work requests and consuming work request completions from another application. Other software may also interact with the QPs 1275a, 1275b to submit WRs and with CQ 1220 to consume completions.

(2) Access structures that the RNIC uses to execute RDMA. Such structures may include buffer 1235a, 1235b, PBL 1230a, 1230b, TPT 1240a, 1240b, share RxQ 1250 1250a, 1250b, QPs 1275a, 1275b, and completion queue 1220a, 1220b.

(3) Access memory of user space used for RDMA, such as data buffer 1235a, 1235b, CQ 1220, shared RxQ 1250, and QPs 12751, 1275b, in order to:

(a) Read confidential data in the buffer 1235a, 1235b, corrupt data in the buffer 1235a, 1235b.

(b) Change (corrupt) work requests and completions by changing the elements in the queues of the QPs 1275a, 1275b, removing elements, adding elements, reordering elements in the queues, or moving elements between queues of the QPs 1275a 1275b.

(4) Modify the translation of addresses to the buffer 1235a, 1235b to make the RDMA (or consumer 1210a, 1210b) access different physical memory pages.

(5) A physical attacker may view or modify data in transit in the network 1205.

The consumer 1210a, 1210b (e.g., application) can interface directly with the RNIC's structures in user space/ memory, which improves performance because it allows reading or writing (pushing or popping) elements in the queues without coordinating with the RNIC. The consumer

1210*a*, 1210*b* (e.g., application) could also access the QP structures and elements stored in user space the same way it can access the data buffer 1235*a*, 1235*b*. For this reason, the vulnerabilities of the QP 1275*a*, 1275*b* structure and RNIC interface to QP 1275*a*, 1275*b* may be grouped as a common vulnerability. An attacker with access to user space memory can affect execution of RDMA through manipulation of structures through the interface or directly modifying the elements of the structure.

Implementations of the disclosure address each of these above-noted vulnerabilities, as discussed in further detail below. First, protection of execution order, queues structures and RNIC interface, and RNIC structures in NIC space by implementations of the disclosure are discussed. Then, protection of the data buffer by implementations of the disclosure is discussed. The protection schemes of implementations of the disclosure may be described with respect to a trusted execution environments established during operation of the computing device.

Figure 13A:
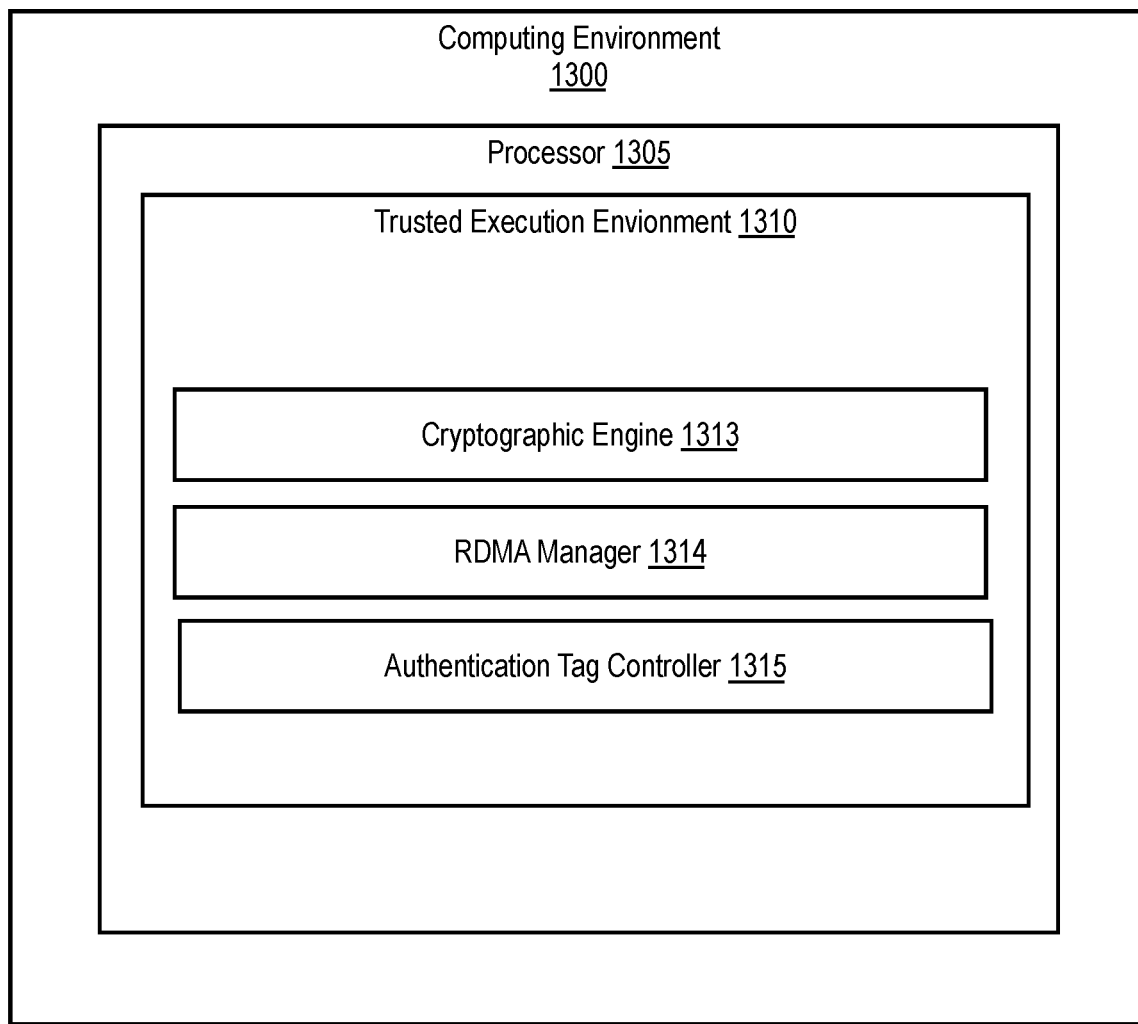
FIG. 13A illustrates a computing environment to establish a trusted execution environment (TEE) during operation, according to implementations of the disclosure.

Referring now to FIG. 13A, in an illustrative embodiment, a computing environment 1300 establishes a trusted execution environment (TEE) 1310 during operation. In one implementation, the illustrative computing environment 1300 may include a processor 1305 to establish the TEE 1310. The computing environment 1300 may be the same as processing system 100 described with respect to FIG. 1 and/or computing device 200 described with respect to FIG. 2, for example. Processor 1305 may be the same as any of the processors or processing elements discussed above with respect to FIGS. 1-7, for example. The establishment of the TEE 1310 may be in line with the discussion above with respect to FIG. 2 of establishing a TEE (also referred to as a secure enclave) and such discussion applies similarly here with respect to FIG. 13A.

As illustrated, the TEE 302 further includes a cryptographic engine 1313, an RDMA manager 1314, and an authentication tag controller 1315. The various components of the computing environment 1300 may be embodied as hardware, firmware, software, or a combination thereof. As such, in some embodiments, one or more of the components of the computing environment 1300 may be embodied as circuitry or collection of electrical devices (e.g., cryptographic engine circuitry 1313, RDMA manager circuitry 1314, and/or authentication tag controller circuitry 1315). It should be appreciated that, in such embodiments, one or more of the cryptographic engine circuitry 1313, RDMA manager circuitry 1314, and/or authentication tag controller circuitry 1315 may form a portion of the processor 1305, and/or other components of the computing device 100. Additionally, in some embodiments, one or more of the illustrative components may form a portion of another component and/or one or more of the illustrative components may be independent of one another.

The TEE 1310 may be embodied as a trusted execution environment of the computing environment 1300 that is authenticated and protected from unauthorized access using hardware support of the computing environment 1300. Illustratively, the TEE 1310 may be embodied as one or more secure enclaves established using Intel SGX technology. The TEE 1310 may also include or otherwise interface with one or more drivers, libraries, or other components of the computing environment 1300 to interface with an accelerator.

The cryptographic engine 1313 is configured to perform a cryptographic operation associated with an RDMA transaction. For an RDMA transaction, the cryptographic operation includes encrypting a data item to generate an encrypted data item, or decrypting a data item to generate a decrypted data item.

The RDMA manager 1314 is configured to securely write an initialization command to initialize a secure RDMA transfer. The RDMA manager 1314 is further configured to securely configure a descriptor indicative of a memory buffer and a transfer direction. The transfer direction may be source to sink or sink to source. The RDMA manager 1314 is generally configured to manage an RDMA transfer in accordance with implementations of the disclosure.

The authentication tag controller 1315 is configured to generate an authentication tag (AT) in accordance with implementations of the disclosure. The AT may be embodied as any hash, message authentication code (MAC), or other value that may be used to authenticate the encrypted data and additional authentication data. The description below of protection schemes of implementations of the disclosure provide further details of utilization of the cryptographic engine 1313 and authentication tag controller 1315 to provide protected RDMA for distributed confidential computing environments, such as computing environment 1300 of FIG. 13A.

Protection of Execution Order, Q Structures and RNIC Interface, RNIC Structures in NIC In implementations of the disclosure, protected RDMA may provide for protection of execution order, queues structures and RNIC interface, and RNIC structures in NIC space. In one implementation, queue structures in user memory used as part of an RDMA transaction may be protected by an authentication tag generated by, for example, authentication tag controller 1315 of FIG. 13A. For purposes of the discussion below, the authentication tag is discussed as implemented as a MAC. However, the authentication tag may be implemented in other forms and is not limited to implementation as a MAC herein.

In one implementation, the authentication tag, such as a MAC, is calculated using a key known between application and RNIC (authorized parties) to detect modifications by unauthorized parties. The RNIC or application protects the elements with the generated MAC when adding (pushing) to the Q and verifies integrity when removing (popping) from the Q. In one implementation, the Q may refer to any of the queue structures utilized by the RNIC and/or consumer as part of an RDMA transaction, such as the QP, shared RxQ, completion Q, for example.

Figure 13B:
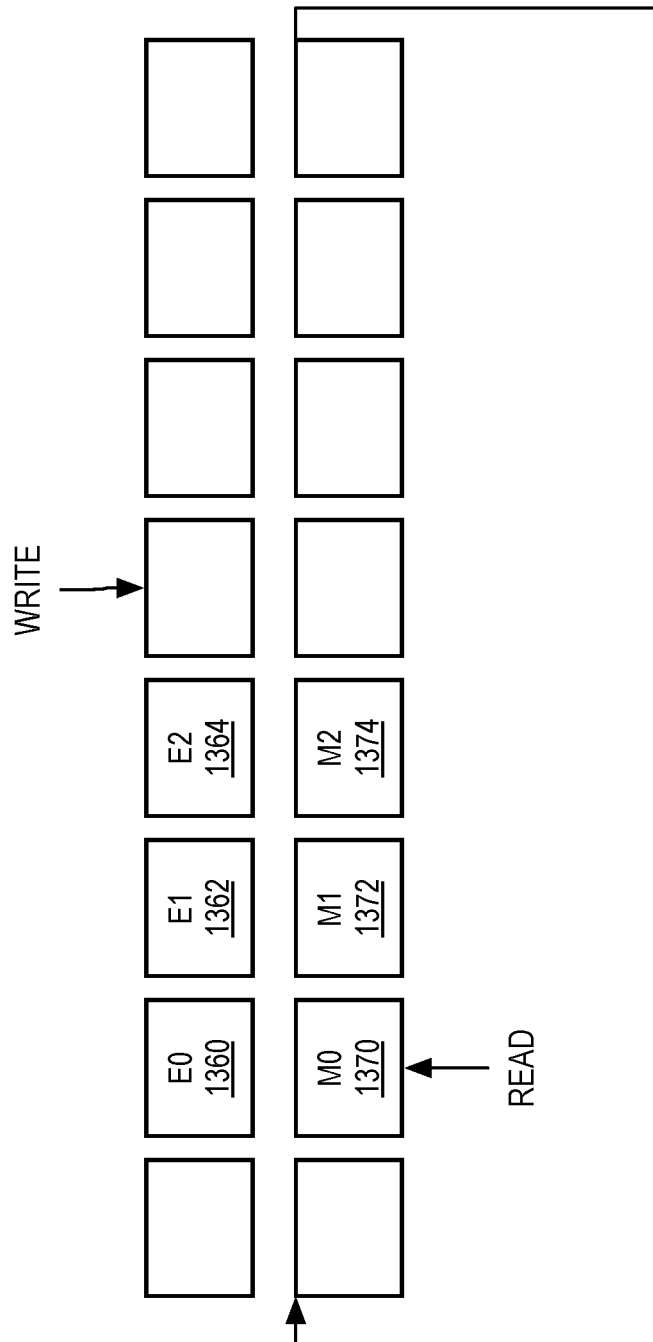
FIG. 13B illustrates a queue implemented with a circular buffer in which the elements are protected by authentication tags, in accordance with implementations of the disclosure.

FIG. 13B illustrates a queue (Q) 1350 implemented with a circular buffer in which the elements are protected by authentication tags, in accordance with implementations of the disclosure. The structure of the Q 1350 and order of elements (Ei) 1360, 1362, 1364 can be protected in order to prevent changes in order of execution (e.g., preserve the order of the elements in the Q 1350). The MAC (Mi) 1370, 1372, 1374 may be used to protect the order and prevent moving elements between different Qs 1350.

In one implementation, in addition to the Q entry data 1360, 1362, 1364 and the key, a unique identifier (ID) of the Q 1350 can be added to the calculation of the MAC 1370, 1372, 1374 of an element (or entry) 1360, 1362, 1364 to assist with preventing moving elements across different Qs 1350. In some implementations, a sequence number may be added to the MAC calculation in order to prevent changing the order of Q elements 1360, 1362, 1364 within the Q 1350. In some implementations, the MAC 1370, 1372, 1374 of a prior element 1360, 1362, 1364 may be used (instead of a sequence number) in order to include information on the order of elements in the MAC calculation. In both cases, the information used to generate the MAC 1370, 1372, 1374 should be agreed upon (known to) by both the RNIC and the consumer (e.g., application).

The MAC may also protect against deletion of the last element(s) on the Q 1350 by including a "valid element flag" in the Q element 1360, 1362, 1364. If the implementation uses an alternative method to manage the elements in the Q 1350, for example, by tracking the number of valid elements in the Q 1350 or a pointer to the first or last elements 1360, 1362, 1364, implementations of the disclosure can request sharing this information between the consumer and the RNIC with integrity protection. This shared length or pointer piece of shared information may again be protected with a MAC. Similar to the MAC for Q entries, such an integrity calculation can include information on the associated Q, the pointer, or length, for example.

The structures in RNIC space (e.g., queue structures, etc.) may be protected in a similar manner with the difference that the RNIC is supposed to access the structures. The RNIC can both calculate and insert the MAC to push an entry in the Q and validate integrity before using the entry popped from the Q.

Some implementations may elect to not protect the integrity of RNIC structures in RNIC space memory. For example, in some implementations, RNIC space structures are implemented in memory not accessible to other (untrusted) software (e.g., in memory attached to RNIC instead of borrowed from host memory). In another examples, the memory is not accessible to simple hardware attackers (e.g., RNIC space memory integrated within the same package as the RNIC).

Protection of Data Buffer

The data buffer, such as buffer 1135 described with respect to FIG. 11 or buffer 1235a, 1235b described with respect to FIG. 12, may also be protected for integrity with an authentication tag (e.g., MAC) calculated over the full transfer (buffer) or the data is partitioned into blocks, each protected by an authentication tag (e.g., MAC). In one implementation, the authentication tag can be generated by, for example, authentication tag controller 1315 of FIG. 13A. For purposes of the discussion below, the authentication tag is discussed as implemented as a MAC. However, the authentication tag may be implemented in other forms and is not limited to implementation as a MAC herein.

The MAC calculation may include additional data to protect the RDMA transfer. For example, the MAC may include some form of identification of the QP (e.g., QP 1175 or 1275a, 1275b of FIGS. 11 and/or 12) and/or QP element that describes the RDMA transaction that references the data in the buffer. In some implementations, the form of identification may be the identification of the local and/or remote application(s) that are the intended end points of the RDMA transfer. In some implementations, the form of identification may be a sequence number or unique value to indicate the "freshness" of the data that is used to indicate the order of use of the buffer and/or prevent unintended re-use of the data in the buffer in another RDMA transfer. This unique value changes the calculated value of the MAC so that the same data in the buffer cannot be used a second time.

In addition to integrity, the data buffer may further be encrypted to protect confidentiality with the same or different key used to calculate the MAC. In one implementation, a cryptographic engine, such as cryptographic engine 1313 in a TEE 1310 of FIG. 13A, performs the encryption of the data buffer. The key used to encrypt the data should be shared between the local and remote applications.

The following examples illustrate an Upper Level Protocol (ULP) that uses encryption of the data buffer and MAC added to the buffer to protect RDMA transactions including SEND, READ, WRITE.

Figure 14:
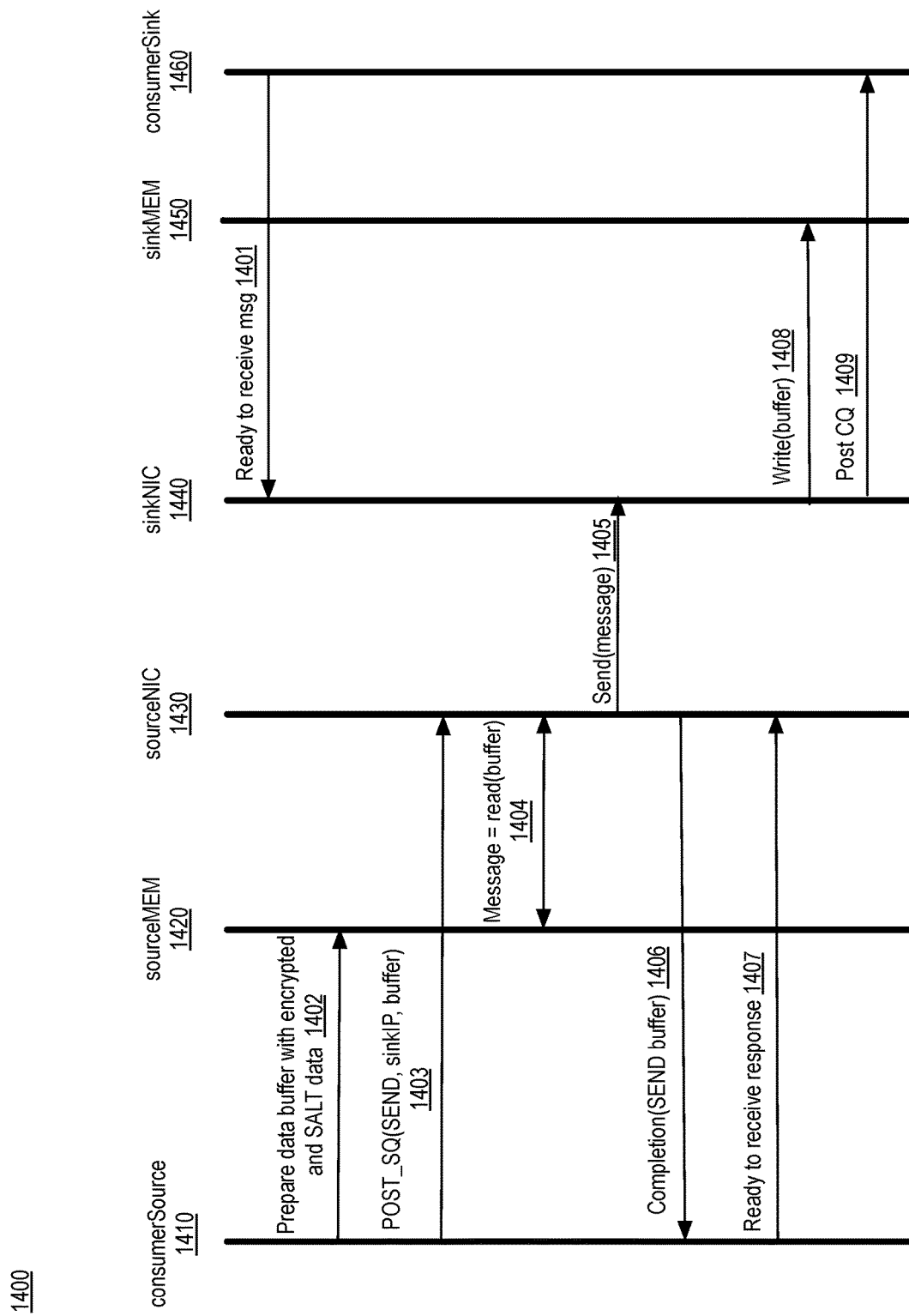
FIG. 14 illustrates a diagram depicting an implementation of integrity protection of RDMA send, according to implementations of the disclosure.

FIG. 14 illustrates an operation flow 1400 of integrity protection of RDMA SEND in accordance with implementations of the disclosure. Operation flow 1400 depicts operations of an RDMA transaction among a plurality of different components at a source and a sink. In one implementation, the source refers to the component generating outgoing events and the sink refers to the component receiving incoming events. The source components include a source consumer (consumerSource) 1450 (e.g., consumer such as an application, accelerator, orchestrator, OS.VMM, etc.), source memory (sourceMEM) 1420, and a source NIC (sourceNIC) 1430. The sink components include a sink NIC (sinkNIC) 1440, a sink memory (sinkMEM) 1450, and a sink consumer (consumerSink) 1460 (e.g., consumer such as an application, accelerator, orchestrator, OS.VMM, etc.).

In one implementation, the RDMA send of operation flow 1400 changes the format and length of the data buffer and preserves the data transport mechanism. In implementations of the disclosure, the consumerSink 1460 indicates to sinkNIC 1440 that the consumerSink 1460 is ready to receive messages 1401 from the sinkNIC 1440. Thereafter, the consumerSource 1410 prepares the data buffer with encrypted and SALTed data and the MAC of the data 1402. In implementations of the disclosure, a SALT may be the unique number that is used in calculating the MAC. A SALT refers to random data that is used as an additional input to a one-way function that hashes data, a password or passphrase, for example. In implementations of the disclosure, an optional sequence number and MAC is added to the buffer as part of writing to the buffer 1402 for the RDMA SEND message posted to the send queue 1403. In this example, the applications (e.g., consumer such as consumerSource 1410) add information to the message to protect integrity. The mechanisms to transport the message buffer in the RNIC are unchanged relative to current implementations of RDMA SEND, as shown in operations 1403, 1404, 1405, 1406, 1407, 1408, and 1409.

Figure 15:
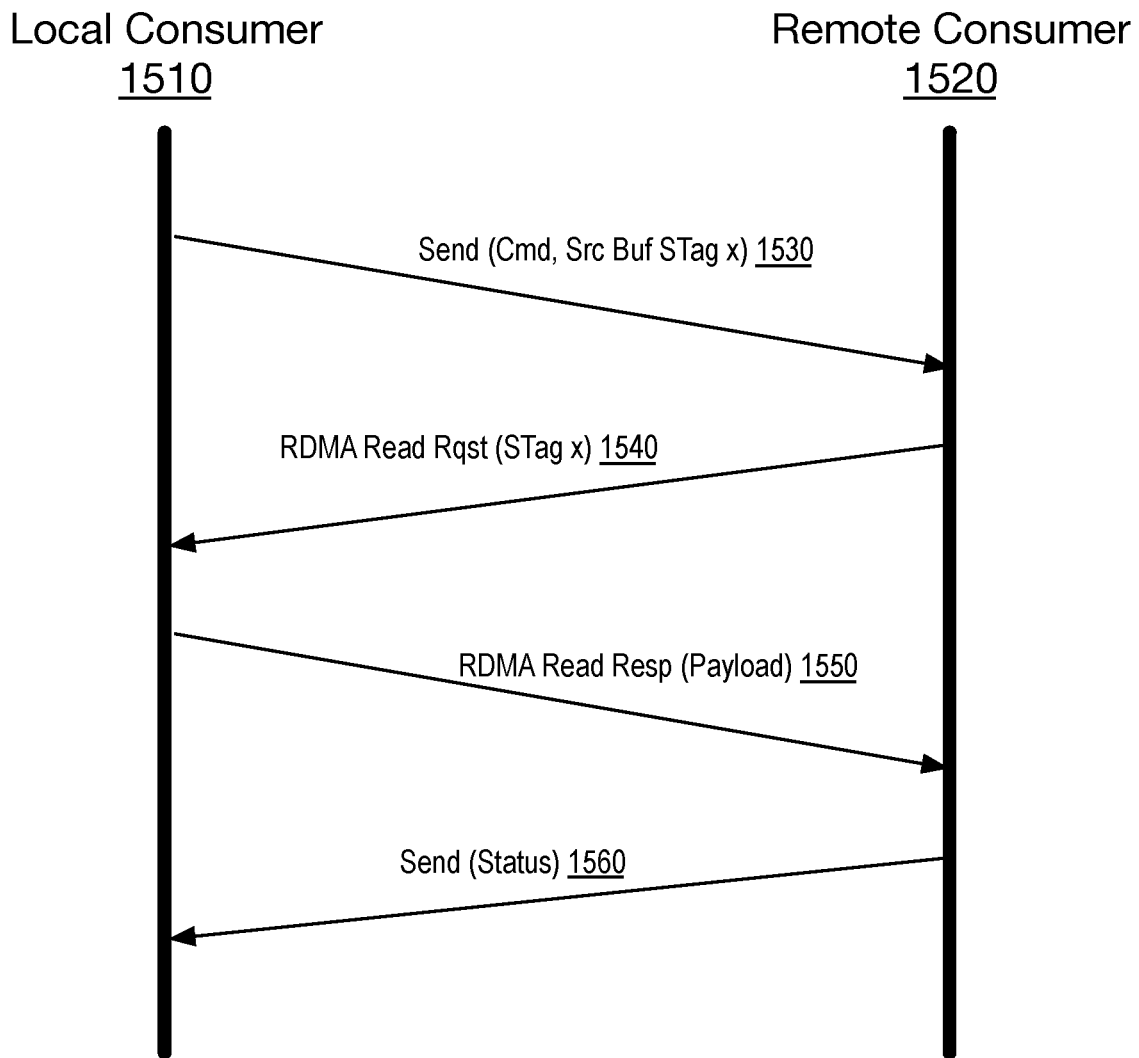
FIG. 15 illustrates an operation flow implementing copy of a buffer using RDMA READ, in accordance with implementations of the disclosure.

FIG. 15 illustrates an operation flow 1500 implementing ULP copy of a buffer using RDMA READ in accordance with implementations of the disclosure. The local consumer 1510 with data advertises the data buffer and requests the remote consumer 1520 to read the buffer with RDMA READ through an RDMA SEND 1530. The remote consumer 1520 schedules an RDMA READ on its RNIC 1540. When the buffer has been copied 1550, the remote consumer 1520 releases the buffer with an RDMA SEND message 1560 with the status of the buffer copy.

Figure 16:
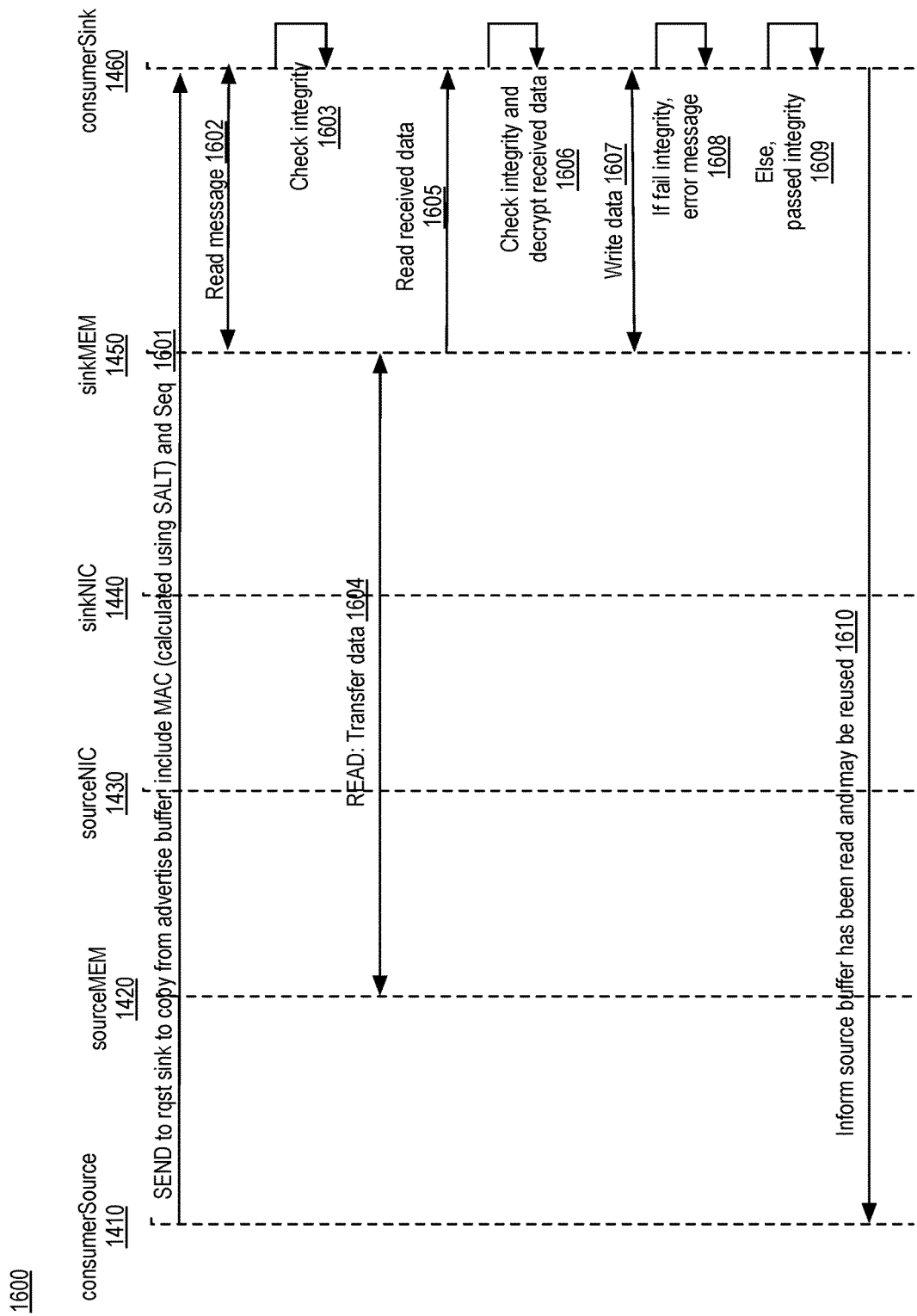
FIG. 16 illustrates an operation flow of integrity protection of RDMA SEND used for messaging and protection of RDMA READ used for data copy, in accordance with implementations of the disclosure.

FIG. 16 illustrates an operation flow 1600 of integrity protection of RDMA SEND used for messaging and protection of RDMA READ used for data copy, in accordance with implementations of the disclosure. Operation flow 1600 depicts operations of an RDMA transaction among a plurality of different components at a source and a sink. In one implementation, the components of source and sink illustrated in FIG. 16 are the same as those discussed with respect to FIG. 14 and as such their description similarly applies here.

The consumerSource 1410 (e.g., local application) protects the integrity and confidentiality of its data by encrypting the data in the buffer and adding a MAC, as previously discussed. In this example, the MAC can be calculated over a unique number that is advertised to the consumerSink 1460 (e.g., a remote application) with the buffer (STag, TO and length).

The buffer also stores the MAC that can travel with the data. In implementations of the disclosure, a SALT may be the unique number that is used to calculate the MAC.

The consumerSource 1410 sends a message 1601 through RDMA SEND to advertise the buffer and request the copy of the buffer with RDMA READ. The message is protected with RDMA SEND, as described above.

The consumerSink 1460 checks the integrity of the message received with the RDMA SEND 1602, 1603. In this example, the message sequence number should be the expected next number in the sequence of messages exchanged between the consumers 1410, 1460 and the MAC calculation should also match. If the consumerSink 1460 deems the message valid, it proceeds to request the remote RNIC to perform the RDMA READ of the advertised buffer 1604.

The remote and local RNIC copy the buffer. Once the transport of data is completed and the RNIC notified 1605 the application the data is in memory, the consumerSink 1460 checks the integrity 1606 of the data payload by calculating the MAC on the received data and a unique number (e.g., an expected SALT that the remote application advertised to the remote application). If the integrity test passes, the remote application decrypts and consumes the payload 1607, 1609. If the integrity test fails, an error message can be passed to an error handler 1608.

The consumerSink 1460 sends 1610 a protected response message with the status of the requested RDMA READ using RDMA SEND. The sequence number is updated. The response may include an identifier of the request message to match the response status to the request. In some implementations, the message sequence number may reuse the message number of the request to associate the response to the request. There are multiple possible schemes to synchronize the expected messages between the applications.

In some implementations, the local application can test the integrity of the received RDMA SEND message that contains the response before taking the appropriate reaction for the response status.

The examples shown carry the MAC of the data payload with the data payload. The data buffer increases in length by the length of the MAC. In one implementation, the protocol may carry the MAC of the data payload on the payload of the (SEND) message. The RDMA SEND payload increases in length by the MAC of the data payload that protects the integrity of the payload and the MAC of the message itself to protect the integrity of the message. In this case, the length of the data payload doesn't change if the encryption algorithm used keeps the length of cyphertext the same as plaintext.

The protection mechanisms of implementations of the disclosure illustrated on the RDMA READ may also be applied to RDMA WRITE, as discussed further below.

Figure 17:
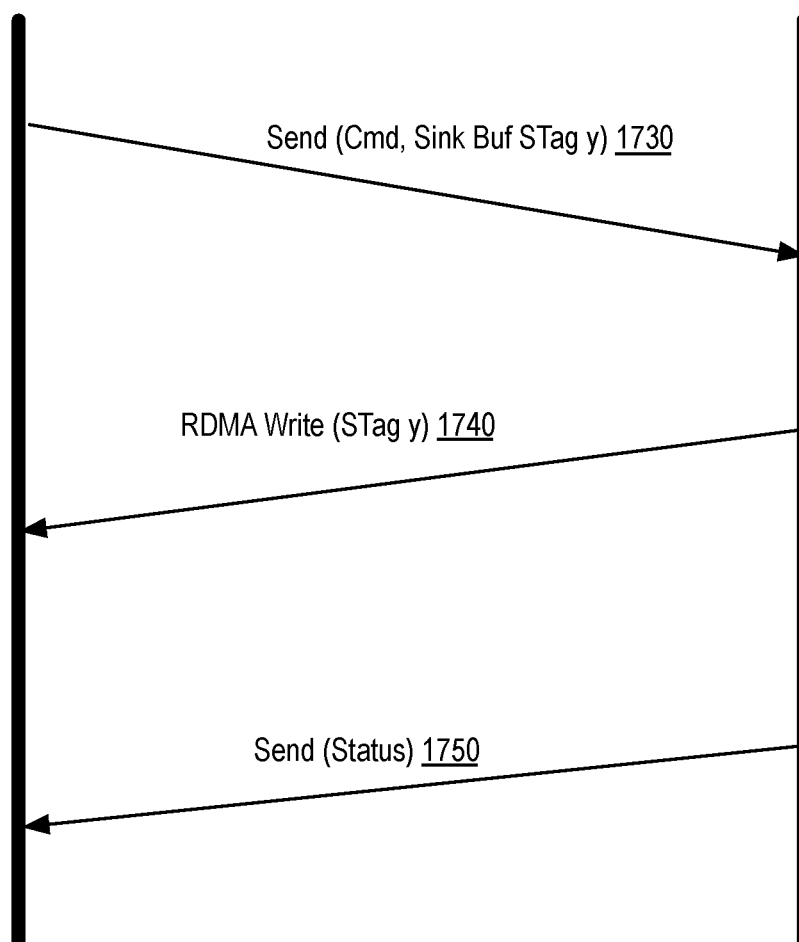
FIG. 17 illustrates an operation flow using RDMA SEND messages to copy a buffer with RDMA WRITE, in accordance with implementations of the disclosure.

FIG. 17 illustrates an operation flow 1700 implementing ULP using RDMA SEND messages to copy a buffer with RDMA WRITE, in accordance with implementations of the disclosure. Operation flow 1700 begins with the local consumer 1710 requesting the remote consumer 1720 to write to the buffer with an RDMA SEND 1730. As illustrated, operation flow 1700 omits the follow-up RDMA SEND messages exchanged prior to RDMA WRITE 1740 to request the allocation and to advertise the buffer allocated to receive data from RDMA WRITE 1740. When the buffer has been copied, the remote consumer 1720 releases the buffer with an RDMA SEND message 1750 with the status of the buffer copy.

Figure 18:
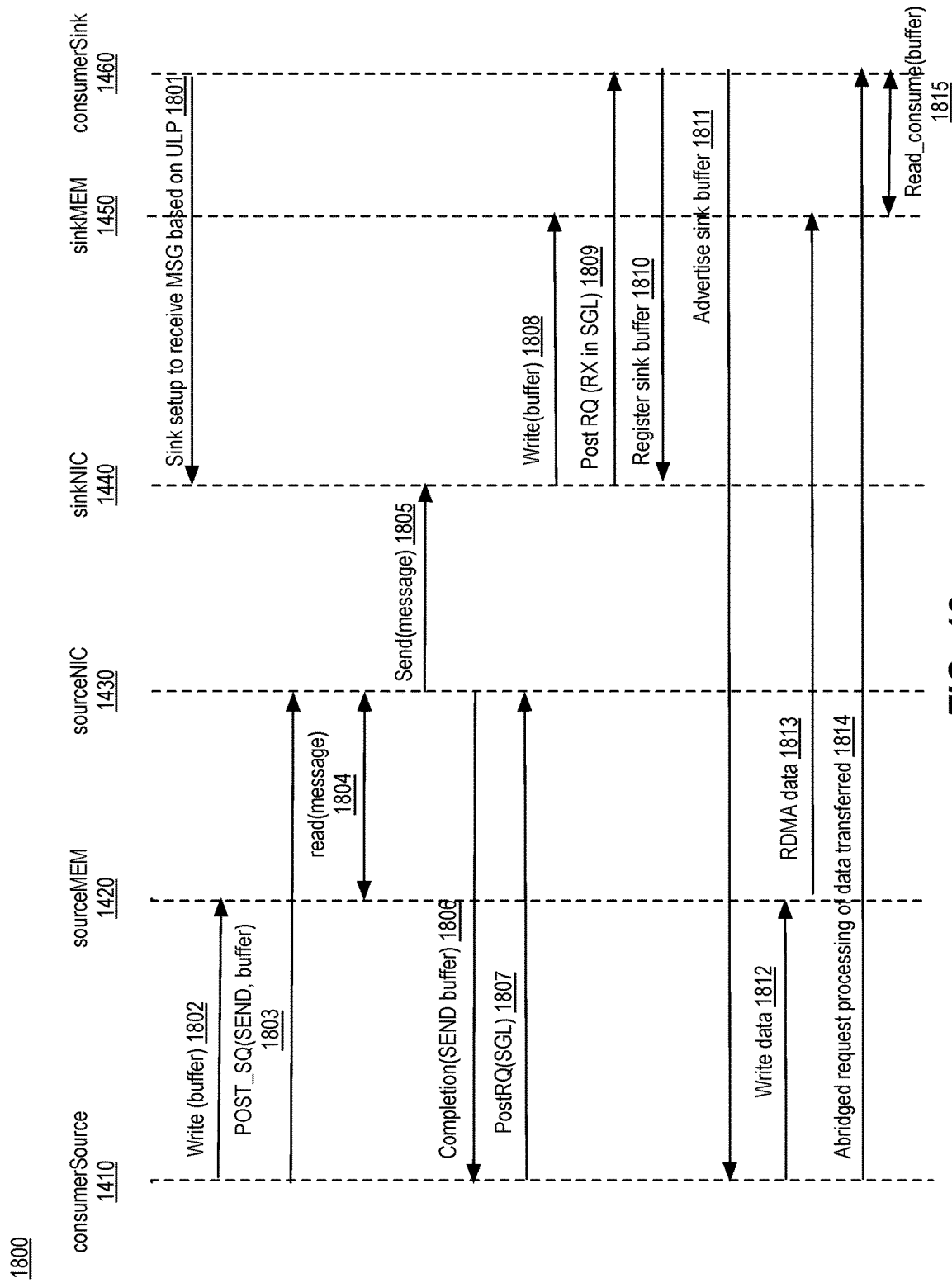
FIG. 18 illustrates an operation flow of RDMA WRITE used for protected data copy, in accordance with implementations of the disclosure.

FIG. 18 illustrates an operation flow 1800 of RDMA WRITE used for protected data copy, in accordance with implementations of the disclosure. Operation flow 1800 depicts operations of an RDMA transaction among a plurality of different components at a source and a sink. In one implementation, the components of source and sink illustrated in FIG. 18 are the same as those discussed with respect to FIG. 14 and as such their description similarly applies here.

In operation flow 1800, the consumerSink 1460 indicates to sinkNIC 1440 that the consumerSink 1460 is ready to receive messages 1801 from the sinkNIC 1440. Thereafter, the consumerSource 1410 writes data to the buffer 1802. In implementations of the disclosure, the consumerSource 1410 sends an RDMA SEND message 1803, 1804, 1805 protected by the message sequence number and MAC to request the registration and advertisement of a writeable memory buffer by the consumerSink 1460 (e.g., remote application) 1806, 1807, 1808, 1809. The consumerSink 1460 verifies the integrity of the request (not shown), registers the buffer 1810 and sends a response 1811 with the handle for the buffer and a unique number (e.g., SALT), or tweak, to calculate the MAC of the payload.

The consumerSource 1410 encrypts the data and calculates the MAC 1812. In some implementations, a SALT may be used to calculate the MAC and/or encryption. In this example, the consumerSource 1410 uses the SALT to tie the data in the buffer to the advertised buffer and to the request to the buffer. The calculation of the MAC may include different additional data depending on which information integrity the application wants to protect with the MAC.

After the buffer is transported 1813, the consumerSource 1410 sends a message 1814 to indicate data is available using similar mechanisms to protect the RDMA SEND. The consumerSink 1460 verifies the integrity of the message (not shown) before decrypting and consuming the message 1815.

The protection scheme of implementations of the disclosure has the option to append the MAC of the data payload to the RDMA WRITE buffer or the RDMA SEND message payload that informs data was transported. The length of the data buffer stays the same or increases by the length of the MAC. As described for RDMA READ.

In implementations of the disclosure, the RNIC (e.g., sourceNIC 1403, sinkNIC 1440) may have storage that is protected from untrusted parties to save the keys used for MAC calculation and for encryption.

Wire Transport, Network

In implementations of the disclosure, the protection schemes discussed above. can be layered on top of encryption for current solutions. The protection scheme described in implementations of the disclosure has the advantage that with adequate choice of encryption and MAC algorithms and what additional data to include in the MAC calculation, the encryption and integrity protection added to protect the data in the data buffer may also protect data in the network. Some implementations of the disclosure may elect to not encrypt data twice, and bypass encryption in current wire protection schemes (e.g. IPSEC) to save processing and implementation complexity.

Address Translation

Protection of address translation is implementation specific to the platform, TEE support and virtualization scheme, etc. Any scheme that protects address translation may be used in conjunction with implementations of the disclosure.

In the absence of a trusted address translation, the methods described here still provide a level of protection that may be adequate for some use cases. Because the encryption of the data buffer prevents data leakage and the addition of integrity protection enables detection of corruption.

Remapping of the data buffer may still allow RDMA to be used to corrupt the memory the RNIC was redirected to write.

Extension to Reduce Utilization of the CPU

Implementations of the disclosure can be extended to offload the RDMA protection (encryption and MAC calculation) to the RNIC. In the example of RDMA transactions described above, implementations of the disclosure reduce to changes to the RNIC to protection of work execution of the Qs.

The implementations described above call for logic to calculate and verify MAC, and storage of MAC keys. As such, the application endpoints implement the protection protocol, encryption, and MAC and additional data to protect integrity (e.g., via a TEE, such as TEE 1310 described with respect to FIG. 13A), while the RNIC transport functionality remains mostly the same.

Implementations of the disclosure may also offload the protection overhead described above to the RNIC to reduce processing and changes to the application endpoints. In this alternative, the application remains unmodified. This alternative implementation may be appropriate when the data buffer and the connection between the RNIC and the data buffer are already protected in the platform by other means.

The trusted compute base (TCB) does not grow because the RNIC already had to be trusted to verify the integrity of the Q elements (validate/calculate the MAC for Qs).

In the example below, the RNIC that is already trusted to manage the keys for integrity (MAC calculation) and to verify integrity can also store the ephemeral session keys to encrypt the data buffer and implement most of the logic to encrypt, decrypt, and add information to enable detection of data corruption, and test data integrity of data and message payloads.

Figure 19A:
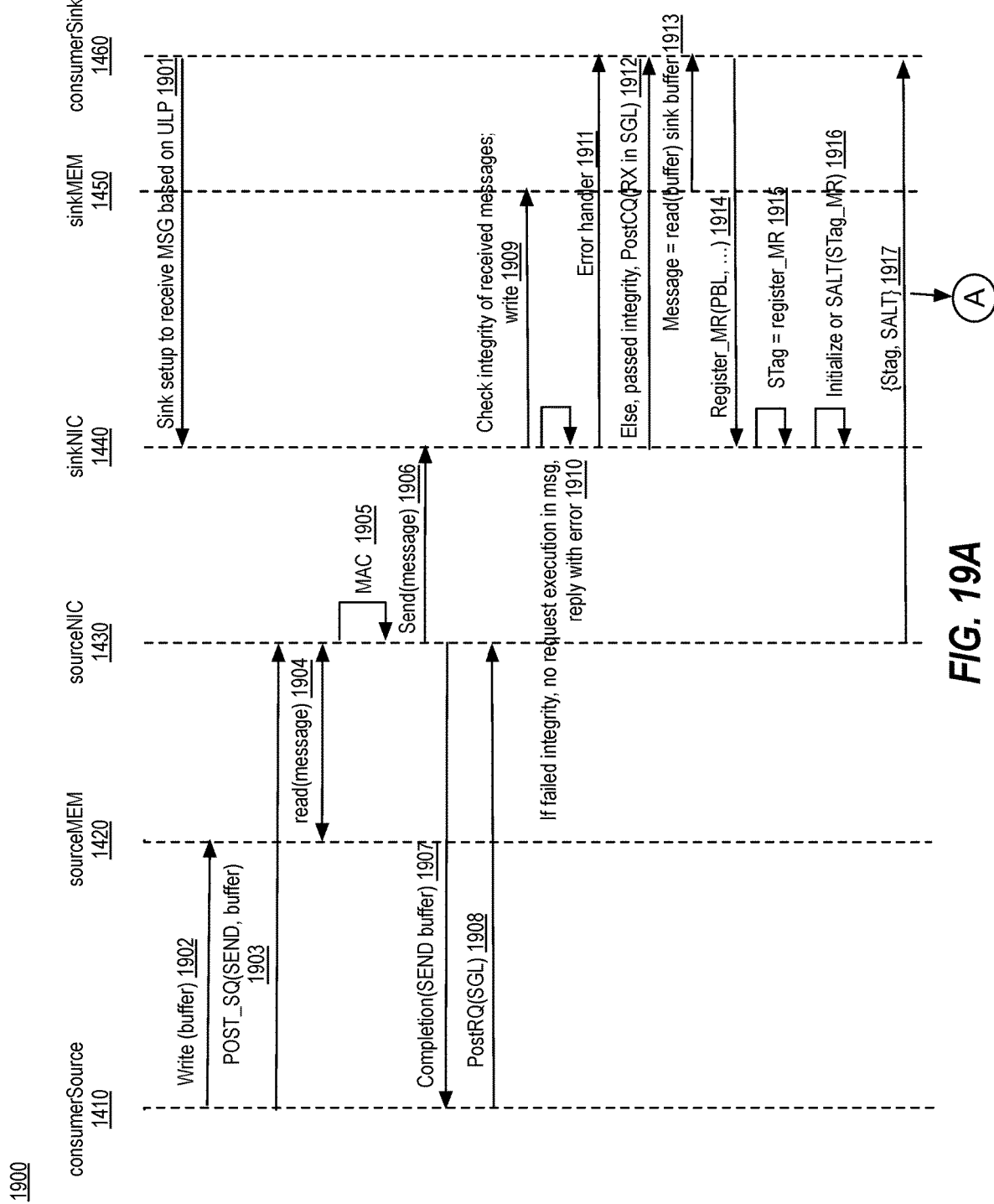
FIGS. 19A and 19B illustrate an example implementation of the protection of an RDMA SEND implemented by RNICs, according to implementations of the disclosure.
Figure 19B:
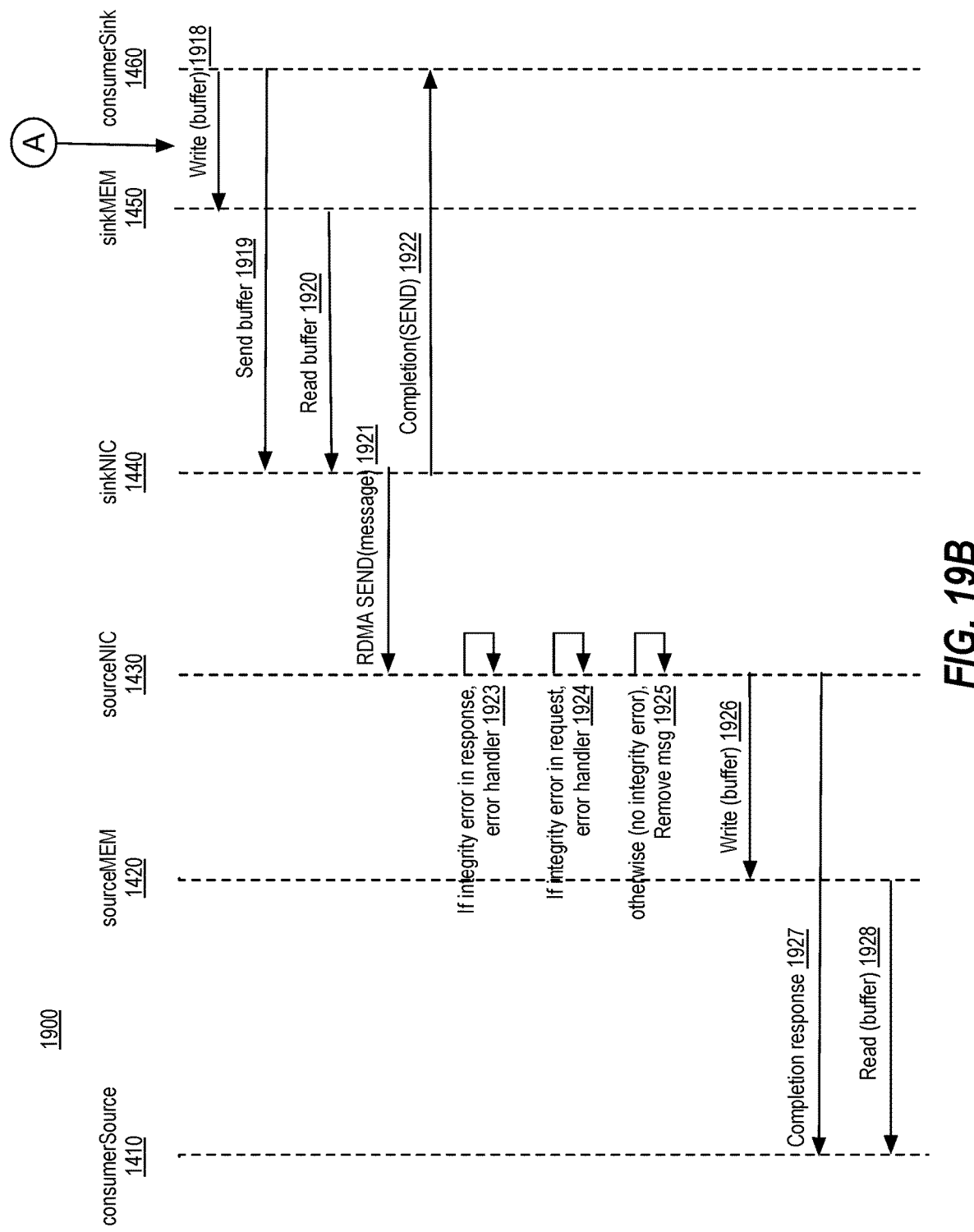

FIGS. 19A and 19B illustrate an example operation flow 1900 where the protection of an RDMA SEND is implemented by the RNICs in accordance with implementations of the disclosure. Operation flow 1900 depicts operations of an RDMA transaction among a plurality of different components at a source and a sink. In one implementation, the components of source and sink illustrated in FIG. 19 are the same as those discussed with respect to FIG. 14 and as such their description similarly applies here.

In operation flow 1900, the consumerSink 1460 indicates to sinkNIC 1440 that the consumerSink 1460 is ready to receive messages 1901 from the sinkNIC 1440. Thereafter, the consumerSource 1410 writes data to the buffer 1902. The RNIC sending the message (e.g., sourceNIC 1430) adds the message sequence number, calculates the MAC and appends or prepends or a combination of both to the message from the application 1903, 1904, 1905, 1906.

In this example, the sinkNIC 1440 (e.g., receiving RNIC) writes the message 1909 in an unnamed buffer and checks the integrity 1910, 1911 of the message before posting the completion to the receiving application 1912.

The message requests a buffer to write 1913. If the message was corrupted, the RNIC may send a status response messages to both sending RNIC and receiving application or, send the integrity error status message to the receiving application for the receiving application to send a status response message to the sending application.

The receiving application process the message to perform the appropriate response. In this example, it registers a memory region 1914, 1915, 1916 and response to the request with the information on the buffer 1917 through an RDMA SEND message 1918, 1919, 1920, 1921, 1922. In this example, the application advertising the buffer manages the unique number (e.g., a SALT) to help detect freshness of the data on the buffer. This task might also be offloaded to the RNIC. In some implementations, the RNIC would store and select (e.g., increment) the unique SALT.

The application that requested the memory buffer receives the buffer information to start using the buffer 1923, 1924, 1925, 1926, 1927, 1928.

The paired RNICs 1430, 1440 protect the response message similarly to the protection to the request message. For example, the paired RNICs can increment the message sequence number and add and verify the MAC.

Figure 20:
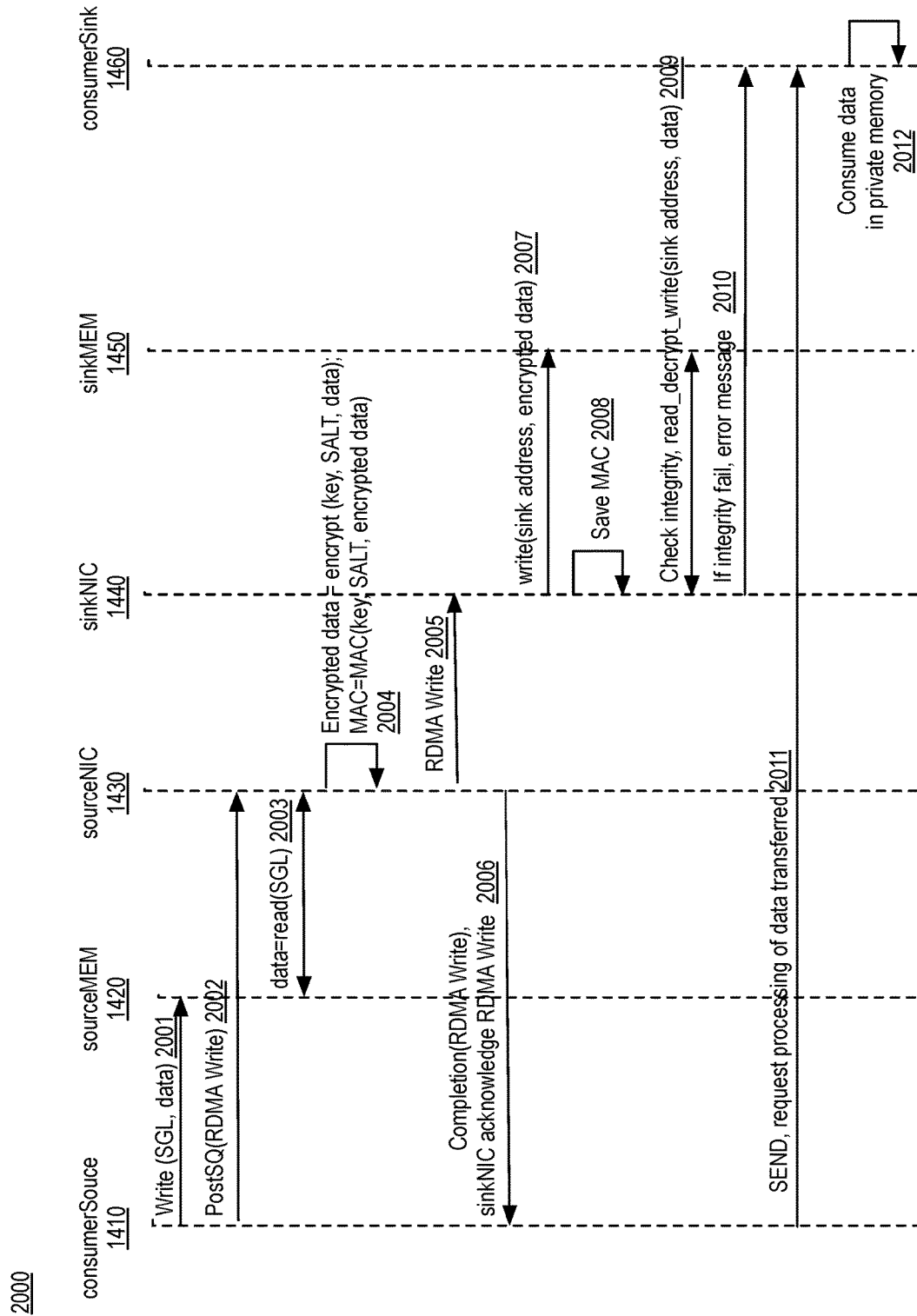
FIG. 20 illustrates an application copying a buffer to an advertised buffer using RDMA WRITE, according to implementations of the disclosure.

FIG. 20 illustrates an operation flow 2000 of a consumer copying a buffer to an advertised buffer using RDMA WRITE, in accordance with implementations of the disclosure. Operation flow 2000 depicts operations of an RDMA transaction among a plurality of different components at a source and a sink. In one implementation, the components of source and sink illustrated in FIG. 20 are the same as those discussed with respect to FIG. 14 and as such their description similarly applies here.

In operation flow 2000, the consumerSource 1410 write data for an RDMA transaction to the buffer 2001. The buffer is posted to the send queue 2002 and read 2003. The sourceNIC 1430 does not store the SALT. The SALT is passed to the consumer instead. The consumerSource 1410 includes the SALT in the Work Request when it posts the Work Request in the Q 2002. The RNIC uses the stored transport key and SALT received from the application to encrypt the payload and calculate the MAC 2004. The sourceNIC 1430 then passes the encrypted and integrity-protected data to the sinkNIC 1440 through an RDMA WRITE 2005, 2006. The RNIC may store the SALT and not pass it to the application in an alternative implementation.

In operation flow 2000, the receiving sinkNIC 1440 tests the integrity of the payload and decrypts the payload after receiving the payload 2007, 2008, 2009, 2010, 2011, 2012. The protocol may be implemented so that the RNIC or Application checks the integrity and decrypt after receiving the message informing of the copy of the data, when the receiving application is ready to consume the payload or copy the payload to private memory. The protection of RDMA READ transactions may also be offloaded to the RNICs in a similar fashion.

The first set of examples implemented protection on the receiving and sending applications as discussed with respect to FIGS. 14-18 and the second set of examples implemented protection on the receiving and sending RNICs as discussed with respect to FIGS. 19-20. The protocol and data transported in the network does not change whether the additional logic for protection is implemented on the RNIC or on the application. Implementations of the disclosure may also be provided with any combination of location to implement protection on the Application or RNIC. For example, on the sending application and receiving RNIC, or on sending RNIC and receiving application.

FIG. 21 is a flow diagram illustrating a method 2100 for protected RDMA for distributed confidential computing, in accordance with implementations of the disclosure. Method 2100 may be performed by processing logic that may comprise hardware (e.g., circuitry, dedicated logic, programmable logic, etc.), software (such as instructions run on a processing device), or a combination thereof. More particularly, the method 2100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 2100 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 10-20 may not be repeated or discussed hereafter. In one implementation, a processor, such as processor 1305 described with respect to FIG. 13A may perform method 2100. In some implementations, an authentication tag controller, such as authentication tag controller 1315 described with respect to FIG. 13A may perform method 2100.

Method 2100 begins at block 2110 where a processor may initialize a first authentication tag calculated using a first key known between a source consumer generating an RDMA request and a source RNIC. In one implementation, the first key is to authenticate an interface between the source consumer and the source RNIC. At block 2120, the processor may associate the first authentication tag with the data entry in a queue as integrity verification for the data entry.

Subsequently, at block 2130, the processor may initialize a second authentication tag calculated using a second key known between the source consumer and a sink consumer of the remote device. In one implementation, the sink consumer is to receive the RDMA request. In one implementation, the second key is to, depending on the implementation of encryption and authentication tag calculation, authenticate the data (and messages) exchanged between the networked consumers or RNICs. Lastly, at block 2140, the processor may associate the second authentication tag with the data buffer as integrity verification for the data buffer.

The following examples pertain to further embodiments of protected RDMA for distributed confidential computing. Example 1 is an apparatus to facilitate protected RDMA for distributed confidential computing. The apparatus of Example 1 comprises a source remote direct memory access (RDMA) network interface controller (RNIC); a queue to store a data entry corresponding to an RDMA request between the source RNIC and a sink RNIC of a remote device; a data buffer to store data for an RDMA transfer corresponding to the RDMA request, the RDMA transfer between the source RNIC and the sink RNIC; and a trusted execution environment (TEE) comprising an authentication tag controller to: initialize a first authentication tag calculated using a first key known between a source consumer generating the RDMA request and the source RNIC; associate the first authentication tag with the data entry in the queue as integrity verification for the data entry; initialize a second authentication tag calculated using a second key known between the source consumer and a sink consumer of the remote device, the sink consumer receiving the RDMA request; and associate the second authentication tag with the data buffer as integrity verification for the data buffer.

In Example 2, the subject matter of Example 1 can optionally include wherein the trusted execution environment further comprises a cryptographic engine to encrypt contents of the data buffer and the second authentication tag that is added to the data buffer. In Example 3, the subject matter of any one of Examples 1-2 can optionally include further comprising one or more processors comprising one or more of a GPU, a central processing unit (CPU), or a hardware accelerator. In Example 4, the subject matter of any one of Examples 1-3 can optionally include wherein the queue comprises at least one of a receive queue, a send queue, a shared receive queue, or a completion queue, and wherein the receive queue and the send queue are part of a queue pair (QP) of the RNIC.

In Example 5, the subject matter of any one of Examples 1-4 can optionally include wherein the TEE comprises an application initiating the RDMA transfer. In Example 6, the subject matter of any one of Examples 1-5 can optionally include wherein the TEE comprises the RNIC, and wherein the RNIC comprises the authentication tag controller. In Example 7, the subject matter of any one of Examples 1-6 can optionally include wherein the first authentication tag and the second authentication tags are message authentication codes (MACs) to provide integrity protection to the queue and the data buffer for the RDMA request.

In Example 8, the subject matter of any one of Examples 1-7 can optionally include wherein the queue is implemented as a circular buffer, with each data entry in the queue protected by the corresponding first authentication tag for the data entry. In Example 9, the subject matter of any one of Examples 1-8 can optionally include wherein at least one of an identifier of the queue or a sequence number of the data entry is added to a calculation of the first authentication tag. In Example 10, the subject matter of any one of Examples 1-9 can optionally include wherein at least one of an identifier of a queue pair comprising the queue, an identifier of an end point application of the RDMA request, or a sequence number of the data entry is added to a calculation of the first authentication tag. In Example 11, the subject matter of any one of Examples 1-10 can optionally include wherein an upper level protocol (ULP) is to utilize the encrypted buffer and the second authentication tag added to the buffer as part of the RDMA request, and wherein the RDMA request comprises at least one of an RDMA send command, an RDMA read command, or an RDMA write command.

Example 12 is a method for facilitating protected RDMA for distributed confidential computing. The method of Example 12 can include initializing, by an authentication tag controller of a trusted execution environment (TEE), a first authentication tag calculated using a first key known between a source consumer generating a remote direct memory access (RDMA) request and a source RDMA network interface controller (RNIC); associating, by the authentication tag controller, the first authentication tag with a data entry in a queue as integrity verification for the data entry; initializing, by the authentication tag controller, a second authentication tag calculated using a second key known between the source consumer and a sink consumer of a remote device, the sink consumer receiving the RDMA request; and associating, by the authentication tag controller, the second authentication tag with a data buffer as integrity verification for the data buffer.

In Example 13, the subject matter of Example 12 can optionally include wherein the trusted execution environment further comprises a cryptographic engine to encrypt contents of the data buffer and the second authentication tag that is added to the data buffer. In Example 14, the subject matter of any one of Examples 12-13 can optionally include wherein the queue comprises at least one of a receive queue, a send queue, a shared receive queue, or a completion queue, and wherein the receive queue and the send queue are part of a queue pair (QP) of the RNIC. In Example 15, the subject matter of any one of Examples 12-14 can optionally include wherein the TEE comprises the RNIC, and wherein the RNIC comprises the authentication tag controller.

In Example 16, the subject matter of any one of Examples 12-15 can optionally include wherein the first authentication tag and the second authentication tags are message authentication codes (MACs) to provide integrity protection to the queue and the data buffer for the RDMA request. In Example 17, the subject matter of any one of Examples 12-16 can optionally include wherein at least one of an identifier of the queue or a sequence number of the data entry is added to a calculation of the first authentication tag. In Example 18, the subject matter of any one of Examples 12-17 can optionally include wherein at least one of an identifier of a queue pair comprising the queue, an identifier of an end point application of the RDMA request, or a sequence number of the data entry is added to a calculation of the first authentication tag, and wherein an upper level protocol (ULP) is to utilize the encrypted buffer and the second authentication tag added to the buffer as part of the RDMA request, and wherein the RDMA request comprises at least one of an RDMA send command, an RDMA read command, or an RDMA write command.

Example 19 is a non-transitory machine readable storage medium for facilitating protected RDMA for distributed confidential computing. The non-transitory computer-readable storage medium of Example 16 having stored thereon executable computer program instructions that, when executed by one or more processors, cause the one or more processors to perform operations comprising initializing, by an authentication tag controller of a trusted execution environment (TEE) comprising the at least one processor, a first authentication tag calculated using a first key known between a source consumer generating a remote direct memory access (RDMA) request and a source RDMA network interface controller (RNIC); associating, by the authentication tag controller, the first authentication tag with a data entry in a queue as integrity verification for the data entry; initializing, by the authentication tag controller, a second authentication tag calculated using a second key known between the source consumer and a sink consumer of a remote device, the sink consumer receiving the RDMA request; and associating, by the authentication tag controller, the second authentication tag with a data buffer as integrity verification for the data buffer.

In Example 20, the subject matter of Example 19 can optionally include wherein the trusted execution environment further comprises a cryptographic engine to encrypt contents of the data buffer and the second authentication tag that is added to the data buffer. In Example 21, the subject matter of Examples 19-20 can optionally include wherein the queue comprises at least one of a receive queue, a send queue, a shared receive queue, or a completion queue, and wherein the receive queue and the send queue are part of a queue pair (QP) of the RNIC. In Example 22, the subject matter of Examples 19-21 can optionally include wherein the TEE comprises the RNIC, and wherein the RNIC comprises the authentication tag controller.

In Example 23, the subject matter of Examples 19-22 can optionally include wherein the first authentication tag and the second authentication tags are message authentication codes (MACs) to provide integrity protection to the queue and the data buffer for the RDMA request. In Example 24, the subject matter of Examples 19-23 can optionally include wherein at least one of an identifier of the queue or a sequence number of the data entry is added to a calculation of the first authentication tag. In Example 25, the subject matter of Examples 19-24 can optionally include wherein at least one of an identifier of a queue pair comprising the queue, an identifier of an end point application of the RDMA request, or a sequence number of the data entry is added to a calculation of the first authentication tag, and wherein an upper level protocol (ULP) is to utilize the encrypted buffer and the second authentication tag added to the buffer as part of the RDMA request, and wherein the RDMA request comprises at least one of an RDMA send command, an RDMA read command, or an RDMA write command.

Example 26 is an apparatus for facilitating protected RDMA for distributed confidential computing according to implementations of the disclosure. The apparatus of Example 26 can comprise means for initializing, by an authentication tag controller of a trusted execution environment (TEE), a first authentication tag calculated using a first key known between a source consumer generating a remote direct memory access (RDMA) request and a source RDMA network interface controller (RNIC); means for associating, by the authentication tag controller, the first authentication tag with a data entry in a queue as integrity verification for the data entry; means for initializing, by the authentication tag controller, a second authentication tag calculated using a second key known between the source consumer and a sink consumer of a remote device, the sink consumer receiving the RDMA request; and means for associating, by the authentication tag controller, the second authentication tag with a data buffer as integrity verification for the data buffer. In Example 27, the subject matter of Example 26 can optionally include the apparatus further configured to perform the method of any one of the Examples 13 to 18.

Example 28 is a system for facilitating protected RDMA for distributed confidential computing, configured to perform the method of any one of Examples 12-18. Example 29 is an apparatus for facilitating protected RDMA for distributed confidential computing comprising means for performing the method of any one of claims 12 to 18. Specifics in the Examples may be used anywhere in one or more embodiments.

Data Relocation and Command Buffer Patching for GPU Remoting

In some implementations, an apparatus, system, or process is to provide data relocation and command buffer patching for GPU remoting. In one implementation, data relocation and command buffer patching component 902 described with respect to FIG. 9 provides the data relocation and command buffer patching for GPU remoting.

Hardware accelerators, such as GPUs, are structured for workloads to be submitted through command buffers. A command buffer is a sequence of commands that, when executed, initialize the environment inside the accelerator and execute kernels. Commands in a command buffer include references to buffers in memory that contain user data, state information, various descriptors, as well as the kernel itself. These references are pointers to addresses in host memory.

In a remote acceleration scenario such as disaggregated computing, where the client application and the remote accelerator are on different physical platforms with different address spaces, command buffers created on the client platform cannot be directly executed on the remote accelerator. In implementations of the disclosure, a technique to relocate and patch command buffers and associated data structures (originally created in client host memory) in remote host memory to enable remote acceleration is provided.

In one implementation, the data relocation and command buffer pathing for GPU remoting may operate by creating a manifest that contains the source address and other metadata for each command buffer and data structure that should be relocated from the client to remote server platform. The remote host uses the manifest to allocate memory and transfer the data structures from client to server host. The remote host then patches the command buffer entries to point to local host memory addresses allocated in the remote host's allocated memory and then submits it to the accelerator. From the accelerator's point of view, the command buffers and data structures are in local host memory of the accelerator and the accelerator is unaware that the command buffer was originally created and submitted from a different physical host machine.

Implementations of the disclosure enable performant remote acceleration by allowing the user space components of an accelerator stack (that creates command buffers and other data structures) to run on a remote machine, without incurring the overhead of frequent network communication in the model where the application runs on the client machine and the rest of the stack runs on the remote server machine.

Implementations of the disclosure make remote acceleration transparent to the hardware (e.g., GPU), allowing remote acceleration to be enabled with current hardware.

In the following description, for ease of illustration, GPU is used as an example of an accelerator to which implementations of the disclosure apply. However, other accelerator implementations may be utilized and not limited to a GPU implementation.

Background: GPU Remoting Architecture

Figure 22:
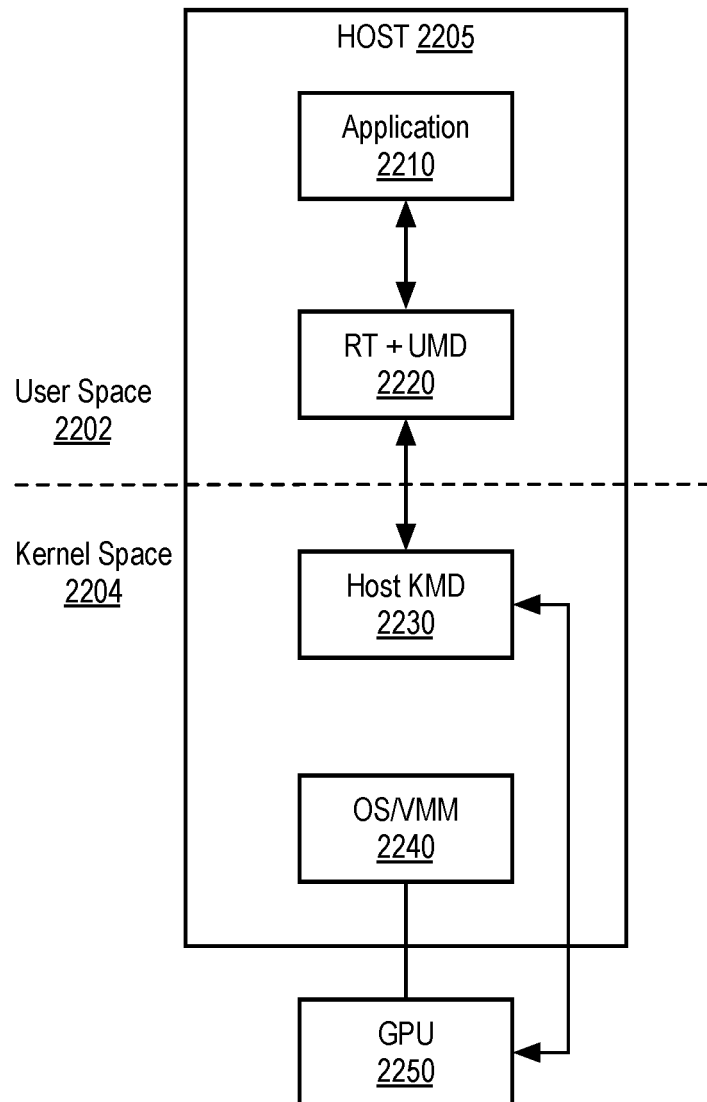
FIG. 22 is a block diagram depicting a conventional GPU stack in accordance with implementations of the disclosure.

FIG. 22 is a block diagram depicting a conventional GPU stack 2200 in accordance with implementations of the disclosure. The term 'stack' herein may refer to a collection of subsystems or components used to create a complete platform. The GPU stack 2200 includes a GPU 2250 locally connected to the host 2205. The user space 2202 components of the host 2205 include an application 2210, runtime (RT) and user mode driver (UMD) 2220. The RT and UMD 2220 construct the command buffers and various data structures referenced by the command buffer. A kernel space 2204 of the host machine includes an OS/VMM 2240 interfacing with a host kernel mode driver 2230.

The KMD 2230 maintains a ring buffer (not shown) that points to the command buffers created in user space 2202. When a workload is submitted to the GPU 2250, a Command Streamer (CS) in the GPU 2250 reads the ring buffer to determine if there are any new work items (command buffers) and if so, executes them. The KMD 2230 is responsible for discovering the GPU 2250, enumerating its features, managing its resources such as memory and scheduling workloads on the GPU.

In implementations of the disclosure, and in contrast to FIG. 22, another model of GPU remoting can be implemented where the GPU stack is partitioned so that one part of the GPU stack runs on a client platform and the rest of the GPU stack runs on a remote platform that is connected to the GPU. A brief description of such a GPU remoting architecture as shown in FIG. 23.

Figure 23:
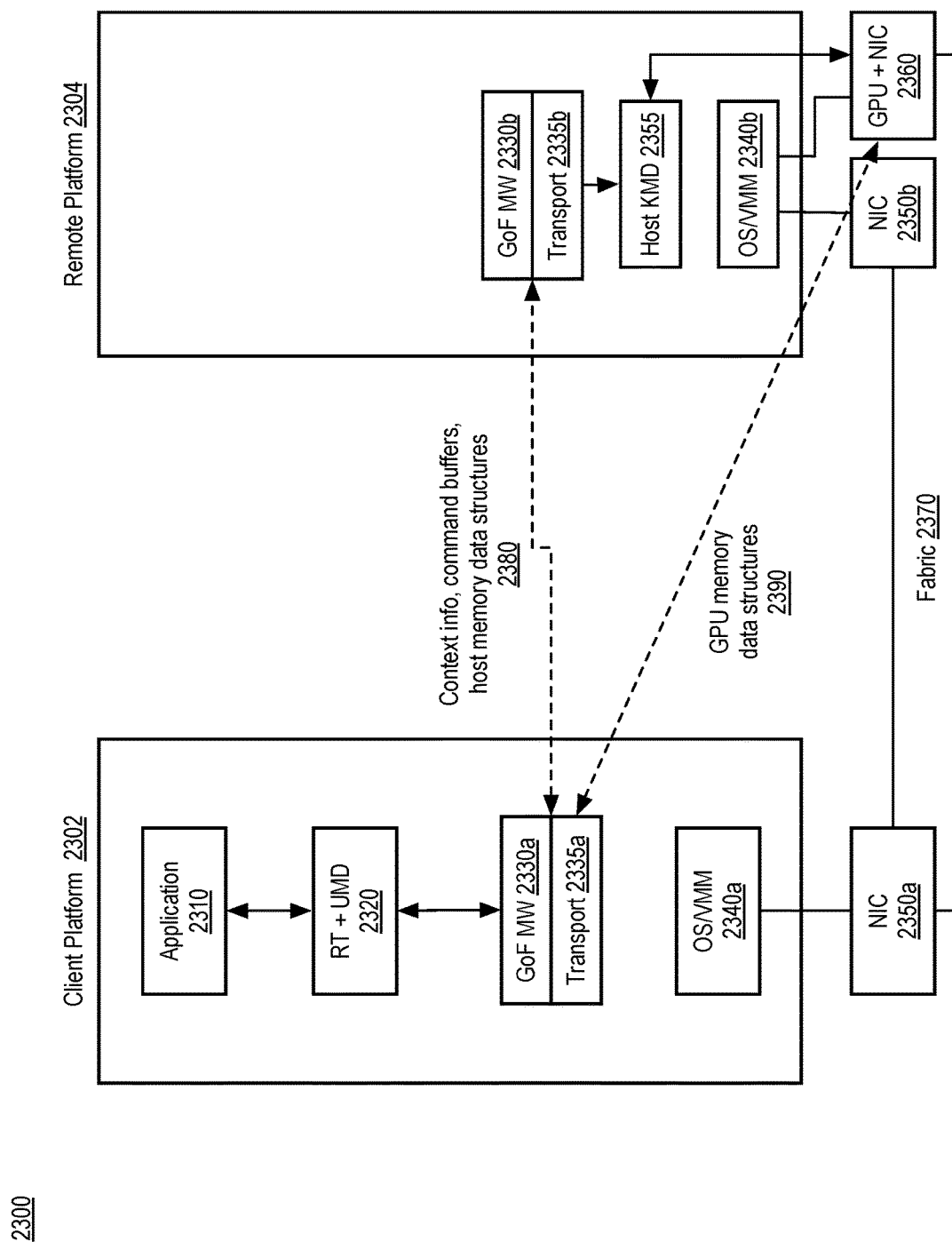
FIG. 23 is a block diagram depicting a GPU remoting architecture in accordance with implementations of the disclosure.

FIG. 23 is a block diagram depicting a GPU remoting architecture 2300 in accordance with implementations of the disclosure. The GPU remoting architecture 2300 includes a GPU stack that is partitioned such that its user space components, including an application 2310, and RT and UMD 2320 run on a client platform 2302, while the KMD 2355 controlling the remote GPU 2360 runs on a remote platform 2304. The client platform 2302 and server platform 2304 can be connected over a fabric 2370 (e.g., Ethernet) via NICs 2350a, 2350b. To bridge the two parts of the GPU stack, a new middleware layer, referred to herein as a GPU-over-Fabric (GoF) middleware 2330a, 2330b, is inserted at the bottom of the client stack (2330a) and at the top of the server stack (2330b). Both client platform 2302 and remote platform 2304 may include an OS/VMM 2340a, 2340b.

This GOF middleware layer 2330a, 2330b can serve the following functions: (1) it exposes an abstraction of the remote GPU 2360 to the userspace components on the client platform 2302; (2) it mediates the transfer of data between the client platform 2302 and server platform 2304, as well as data transfers directly between the client platform 2302 and GPU 2360 using different transport protocols, such as RDMA, Infiniband, and so on. As shown in FIG. 23, the dashed lines depict the flow of data between components of the distributed stack, including context information, command buffers, host memory data structures 2380 and GPU memory data structures 2390. The physical flow of data over the fabric 2370 takes place via the attached NICs 2350a, 2350b.

The middleware 2330a, 2330b uses a protocol that supports operations such as discovery of the remote GPU 2360, authentication, connection to GPU resources (e.g., memory), and transfer of data to/from the GPU 2360, as well as remote platform 2304. A transport sublayer 2335a, 2335b in the GoF middleware 2330a, 2330b communicates commands and data between the client platform 2302 and the remote platform 2304 using a specific transport (e.g., TCP/IP, RDMA, InfiniBand, etc.).

The GPU remoting solution works as follows. Assume that an orchestrator service binds a client application 2310 with a remote GPU resource (outside the scope of implementations of the disclosure) of the GPU 2360 and middleware 2330a, 2330b on both sides set up the network communication channel provided by fabric 2370. The application 2310 invokes a runtime API to specify data buffers and kernels that compute on user data. The runtime and UMD 2320 construct command buffers that initialize the GPU environment and reference various buffers, kernels and data structures utilized for execution. The UMD 2320 submits the workload to the remote GPU server platform 2304 via the GoF middleware 2330a, 2330b. This may mean that the command buffers and all the associated data structures are to be relocated to the remote host memory of the remote platform 2304. As the data structures were constructed in the client platform 2302, they contain addresses that are not valid on the remote host platform 2304 and hence they should be patched. Once the relocation and patching are completed in the remote GoF middleware 2330a, 2330b, the workload is submitted by the remote KMD 2355 to the GPU 2360.

Further discussion below details a data structure referred to as the manifest that is used to detail the various data structures that should be relocated and the interdependencies between them, the process of relocating the data structures using the manifest, and an explanation of how command buffers can be patched before the job is submitted to the local GPU on the remote machine.

Manifest

With reference to the manifest, the manifest may refer to a data structure that includes one entry for each data structure that should be relocated from client host memory to server host memory.

Figure 24A:
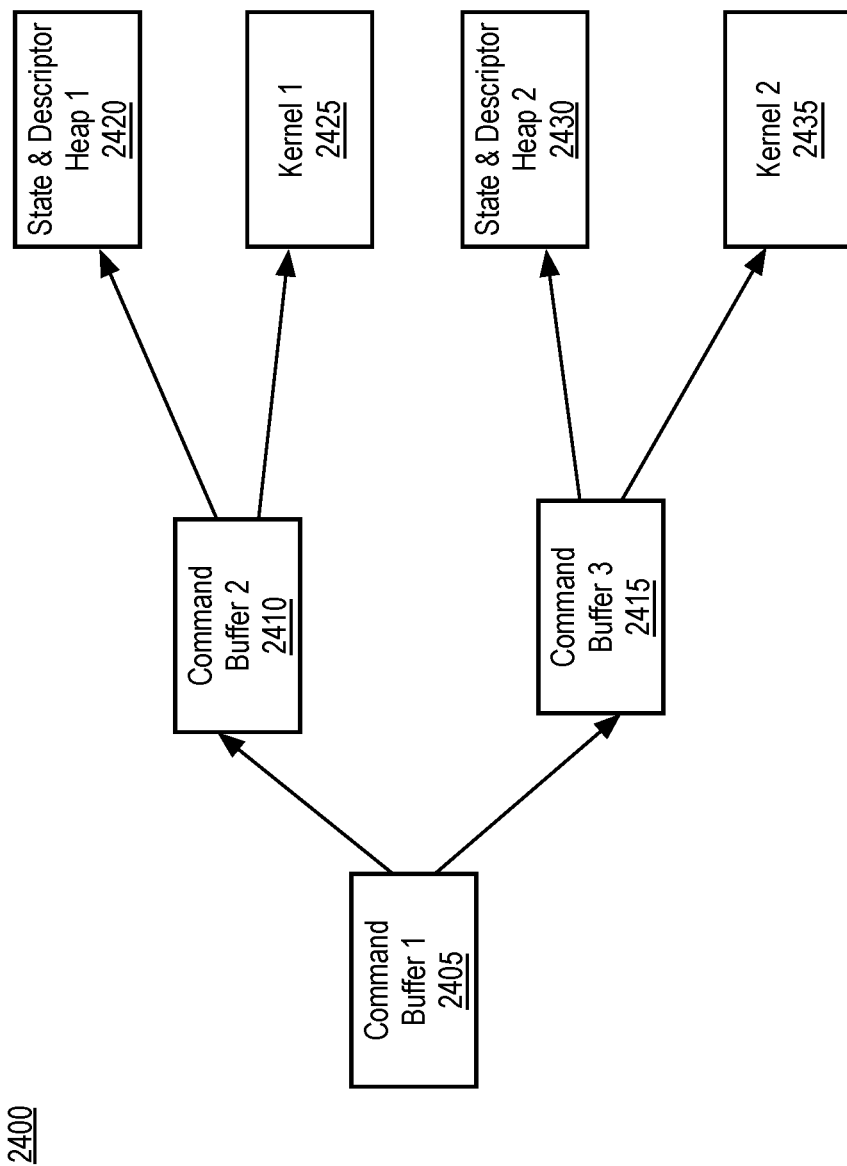
FIG. 24A depicts a graph representing a set of command buffers with associated data structures in accordance with implementations of the disclosure.

FIG. 24A depicts a graph 2400 representing a set of command buffers with associated data structures, in accordance with implementations of the disclosure. Each node in the graph 2400 represents a region of memory that contains either a command buffer (e.g., command buffer 1 (CB1) 2405, command buffer 2 (CB2) 2410, command buffer 3 (CB3) 2415) or associated data structure (e.g., state and descriptor heap 1 2420, state and descriptor heap 2 2430, kernel 1 2425, kernel 2 2435, etc.). The edges of the graph 2400 describe the dependencies between the nodes of the graph 2400. For example, there is an edge from node i to node j in the graph 2400, if the data structure associated with node i contains a memory reference (address) to node j.

As shown in FIG. 24A, CB1 2405, CB2 2410, and CB3 2415 are command buffers. CB1 2405 is the top-level command buffer, which in turn invokes CB2 2410 and CB3 2415. CB2 2410 references a state and descriptor heap (HEAP1) 2420 and a kernel (KERN1) 2425. Similarly, CB3 2415 references another state and descriptor heap (HEAP2) 2430 and a kernel (KERN2) 2435. These data structures can be created by the runtime/UMD on the client machine (such as RT+UMD 2320 described with respect to FIG. 23).

FIG. 24B illustrates a manifest 2450 for data relocation and command buffer patching, in accordance with implementations of the disclosure. Manifest 2450 may be a data structure representing the nodes and edges of a graph, such as graph 2400 of FIG. 24A. There is one entry 2455 for each node in the graph. Each node is identified by an ID 2460 and has fields for source address 2465 (client host memory address), size 2470, destination 2475 (remote host memory or GPU local memory/address) and a list of any dependencies 2480 (identifiers of nodes in the graph that it references).

In order to relocate these data structure corresponding to entries 2455 to their target memory locations, the manifest 2450 is transported to the remote GoF middleware (such as GoF middleware 2330b described with respect to FIG. 23). In the next section, it is described how the relocation is accomplished.

Data and Command Buffer Relocation

Figure 25:
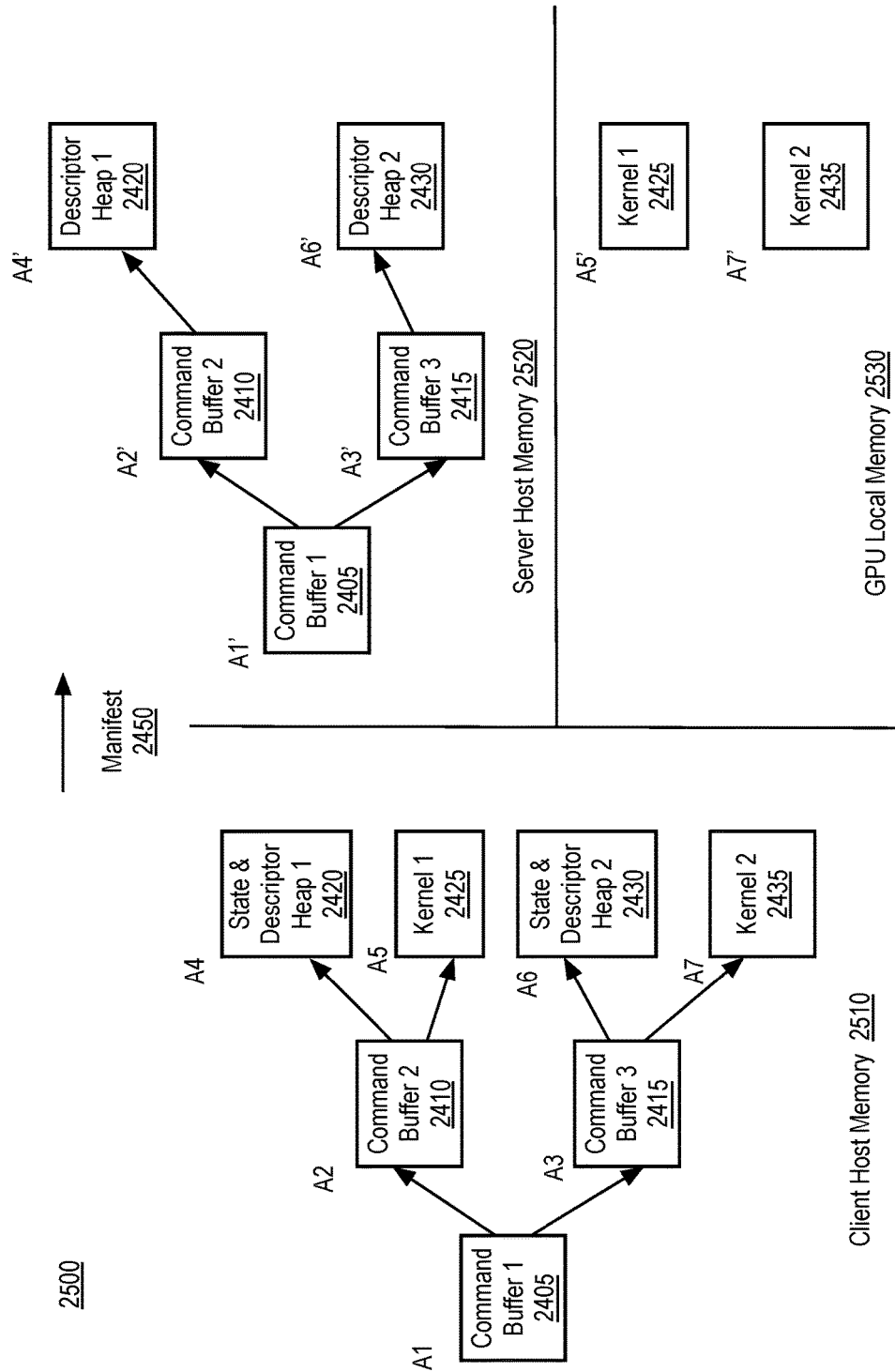
FIG. 25 illustrates relocation of data and command buffers using a manifest, according to implementations of the disclosure.

FIG. 25 illustrates a GPU remoting architecture 2500 depicting the relocation of the data and command buffers using a manifest, in accordance with implementations of the disclosure. In one implementation, GPU remoting architecture 2500 may be the same as GPU remoting architecture 2300 described with respect to FIG. 23. GPU remoting architecture 2500 include a client host memory 2510 of a client platform, and server host memory 2520 and GPU local memory 2530 of a remote GPU connected to the remote platform.

In one implementation, a manifest 2450, such as manifest 2450 described with respect to FIG. 24B, is depicted as being passed from the client platform to the remote platform (e.g., via a GoF middleware layer 2330a, 2330b as described with respect to FIG. 23). As indicated in the manifest 2450, the command buffers 2405, 2410, 2415 and state and descriptor heaps 2420, 2430 can be copied to the server host memory 2520, while the compute kernels 2425, 2435 can be copied to GPU local memory 2530 of the remote GPU.

With respect to the transfer of the command buffers and descriptor heaps to remote host memory 2520, the server platform can utilize the manifest 2450 to implement this transfer. For example, utilizing the manifest 2450, the server platform identifies the data structures that should be copied to its host memory (e.g., CB1 2405, CB2 2410, CB3 2415, state and descriptor heap 1 2420, state and descriptor heap 2 2430), along with their source addresses (on the client machine) and their size as indicated in manifest 2450.

The server platform allocates memory in server host memory 2520 for the data structures to be transferred and initiates the copies from client platform to server host memory 2520. In one implementation, the copies may be made using an efficient protocol such as RDMA. In the example, the server platform allocates server host memory 2520 for CB1 2405, CB2 2410, CB3 2415, HEAP1 2420, and HEAP2 2430. As shown in FIG. 25, the target addresses (after allocation) for these data structures are A1', A2', A3', A4', and A6', respectively.

Similarly, for data/code (kernels) that should be copied to the GPU's local memory 2530, the KMD on the server (e.g., KMD 2355 described with respect to FIG. 23) allocates the GPU local memory 2530 based on the sizes specified in the manifest 2450. As shown in FIG. 25, the addresses A5' and A7' for KERN1 2425 and KERN2 2435 in the manifest 2450 are the GPU virtual addresses assigned to them on the client machine. Those addresses are mapped to the GPU physical addresses based on the allocation by the KMD in the GPU page tables. The server platform initiates a copy of the GPU-bound data/code (kernels) from the client platform (client host memory 2510). Note that a direct copy to GPU memory can be used to minimize latency. In some implementations, it is possible to copy these data structures to server host memory 2530 and have the Command Streamer in the GPU perform the DMA into GPU local memory. However, in that case, the destination field of those data structures in the manifest 2450 would indicate "HOST," not "GPU".

The final step in this process is the patching of the command buffers to reflect the new addresses associated with the data structures that were copied to the server. This is described in the next section.

Command Buffer Patching

With reference to FIG. 25, the original command buffers constructed on the client platform referenced addresses that were valid on that platform. For example, CB2 2410 and CB3 2415 reference HEAP1 2420 and HEAP2 2430 at addresses A4 and A6 on the client platform, respectively. After the command buffers and heaps are relocated to the server host memory 2520, these references in CB2 and CB3 become invalid. Therefore, such references that become invalid should be patched. In the case of CB2 2410 and CB3 2415, the new addresses referencing the heaps become A4' and A6', respectively. Similarly addresses in CB1 2405 that point to CB2 2410 and CB3 2415 should be patched to A2' and A3', respectively.

In the example, since the kernels KERN1 2425 and KERN2 2435 are copied to GPU local memory directly by the server platform, the GPU should not execute the original copy commands in CB2 2410 and CB3 2415 for their transfer. Therefore, those commands can be deleted from the command buffers. This completes the patching of the command buffers.

After relocation and patching, the KMD can prepare the context and submit the workload to the GPU. The Command Streamer in the GPU can find the command buffers and associated data structures in either server or GPU local memory and all memory references in those data structures would be valid. It can then execute the command buffers as if they were prepared on the local server. In some implementations, for end-to-end security, protecting the integrity of command buffers and other associated data structures can be performed.

FIG. 26 is a flow diagram illustrating a method 2600 for providing data relocation and command buffer patching for GPU remoting, in accordance with implementations of the disclosure. Method 2600 may be performed by processing logic that may comprise hardware (e.g., circuitry, dedicated logic, programmable logic, etc.), software (such as instructions run on a processing device), or a combination thereof. More particularly, the method 2600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 2600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 22-25 may not be repeated or discussed hereafter. In one implementation, a processor providing a middleware layer, such as GoF middleware layer 2330a, 2330b described with respect to FIG. 23, may perform method 2600.

Method 2600 begins at block 2610 where a processor may receive a manifest corresponding to graph nodes representing regions of memory of a remote client machine, the graph nodes corresponding to at least one command buffer and to associated data structures and kernels of the at least one command buffer. In one implementation, the manifest indicates a destination memory location of each of the graph nodes and dependencies of each of the graph nodes. At block 2620, the processor may identify, based on the manifest, the at least one command buffer and the associated data structures to copy to the host memory.

Subsequently, at block 2630, the processor may identify, based on the manifest, the kernels to copy to local memory of the hardware accelerator. Lastly, at block 2640, the processor may patch addresses in the at least one command buffer copied to the host memory with updated addresses of corresponding locations in the host memory.

The following examples pertain to further embodiments of data relocation and command buffer patching for GPU remoting. Example 1 is an apparatus to facilitate data relocation and command buffer patching for GPU remoting. The apparatus of Example 1 comprises a host memory; a hardware accelerator; and one or more processors communicably coupled to the host memory and the hardware accelerator, the one or more processors to facilitate: receiving a manifest corresponding to graph nodes representing regions of memory of a remote client machine, the graph nodes corresponding to at least one command buffer and to associated data structures and kernels of the at least one command buffer used to initialize the hardware accelerator and execute the kernels, and the manifest indicating a destination memory location of each of the graph nodes and dependencies of each of the graph nodes; identifying, based on the manifest, the at least one command buffer and the associated data structures to copy to the host memory; identifying, based on the manifest, the kernels to copy to local memory of the hardware accelerator; and patching addresses in the at least one command buffer copied to the host memory with updated addresses of corresponding locations in the host memory. In Example 2, the subject matter of Example 1 can optionally include wherein the manifest comprises a data structure storing at least one of a description, an identifier, a source address, a size, a destination, or a dependency for each of the graph nodes. In Example 3, the subject matter of any one of Examples 1-2 can optionally include wherein the manifest is received from the remote client machine, and wherein the at least one command buffer referenced by the manifest comprises commands to initialize an environment inside the hardware accelerator and execute the kernels. In Example 4, the subject matter of any one of Examples 1-3 can optionally include wherein the hardware accelerator comprises a graphics processing unit (GPU).

In Example 5, the subject matter of any one of Examples 1-4 can optionally include wherein the remote client machine comprises userspace components of an accelerator stack of the hardware accelerator, and wherein a remainder of the accelerator stack executes on the apparatus. In Example 6, the subject matter of any one of Examples 1-5 can optionally include wherein a middleware component is to expose an abstraction of the apparatus to the userspace components of the accelerator stack on the remote client machine, and is to mediate transfer of data between the remote client machine and the hardware accelerator. In Example 7, the subject matter of any one of Examples 1-6 can optionally include wherein the associated data structures comprise one or more descriptor heaps. In Example 8, the subject matter of any one of Examples 1-7 can optionally include wherein patching the addresses comprises: identifying the addresses in the at least one command buffer; identifying the updated addresses of the corresponding locations in the host memory; and replacing the addresses with the updated addresses in the at least one command buffer copied to the host memory. In Example 9, the subject matter of any one of Examples 1-8 can optionally include wherein the one or more processors comprise one or more of a GPU, a central processing unit (CPU), or a hardware accelerator.

Example 10 is a method for facilitating data relocation and command buffer patching for GPU remoting. The method of Example 10 can include receiving, by one or more processors communicably coupled to a host memory and a hardware accelerator a manifest corresponding to graph nodes representing regions of memory of a remote client machine, the graph nodes corresponding to at least one command buffer and to associated data structures and kernels of the at least one command buffer used to initialize the hardware accelerator and execute the kernels, and the manifest indicating a destination memory location of each of the graph nodes and dependencies of each of the graph nodes; identifying, by the one or more processors based on the manifest, the at least one command buffer and the associated data structures to copy to the host memory; identifying, by the one or more processors based on the manifest, the kernels to copy to local memory of the hardware accelerator; and patching, by the one or more processors, addresses in the at least one command buffer copied to the host memory with updated addresses of corresponding locations in the host memory.

In Example 11, the subject matter of Example 10 can optionally include wherein the manifest comprises a data structure storing at least one of a description, an identifier, a source address, a size, a destination, or a dependency for each of the graph nodes. In Example 12, the subject matter of any one of Examples 10-11 can optionally include wherein the manifest is received from the remote client machine, and wherein the at least one command buffer referenced by the manifest comprises commands to initialize an environment inside the hardware accelerator and execute the kernels. In Example 13, the subject matter of any one of Examples 10-12 can optionally include wherein the remote client machine comprises userspace components of an accelerator stack of the hardware accelerator, and wherein a remainder of the accelerator stack executes on the apparatus.

In Example 14, the subject matter of any one of Examples 10-13 can optionally include wherein a middleware component is to expose an abstraction of the apparatus to the userspace components of the accelerator stack on the remote client machine, and is to mediate transfer of data between the remote client machine and the hardware accelerator. In Example 15, the subject matter of any one of Examples 10-14 can optionally include, wherein the associated data structures comprise one or more descriptor heaps.

In Example 16, the subject matter of any one of Examples 10-15 can optionally include wherein patching the addresses comprises: identifying the addresses in the at least one command buffer; identifying the updated addresses of the corresponding locations in the host memory; and replacing the addresses with the updated addresses in the at least one command buffer copied to the host memory.

Example 17 is a non-transitory machine readable storage medium for facilitating data relocation and command buffer patching for GPU remoting. The non-transitory computer-readable storage medium of Example 17 having stored thereon executable computer program instructions that, when executed by one or more processors, cause the one or more processors to perform operations comprising receive, by the at least one processor communicably coupled to a host memory and a hardware accelerator a manifest corresponding to graph nodes representing regions of memory of a remote client machine, the graph nodes corresponding to at least one command buffer and to associated data structures and kernels of the at least one command buffer used to initialize the hardware accelerator and execute the kernels, and the manifest indicating a destination memory location of each of the graph nodes and dependencies of each of the graph nodes; identify, by the at least one processor based on the manifest, the at least one command buffer and the associated data structures to copy to the host memory; identify, by the at least one processor based on the manifest, the kernels to copy to local memory of the hardware accelerator; and patch, by the at least one processor, addresses in the at least one command buffer copied to the host memory with updated addresses of corresponding locations in the host memory.

In Example 18, the subject matter of Example 17 can optionally include wherein the manifest comprises a data structure storing at least one of a description, an identifier, a source address, a size, a destination, or a dependency for each of the graph nodes. In Example 19, the subject matter of Examples 17-18 can optionally include wherein the manifest is received from the remote client machine, and wherein the at least one command buffer referenced by the manifest comprises commands to initialize an environment inside the hardware accelerator and execute the kernels. In Example 20, the subject matter of Examples 17-19 can optionally include wherein patching the addresses comprises: identifying the addresses in the at least one command buffer; identifying the updated addresses of the corresponding locations in the host memory; and replacing the addresses with the updated addresses in the at least one command buffer copied to the host memory.

Example 21 is an apparatus for facilitating data relocation and command buffer patching for GPU remoting according to implementations of the disclosure. The apparatus of Example 21 can comprise means for receiving, by one or more processors communicably coupled to a host memory and a hardware accelerator a manifest corresponding to graph nodes representing regions of memory of a remote client machine, the graph nodes corresponding to at least one command buffer and to associated data structures and kernels of the at least one command buffer used to initialize the hardware accelerator and execute the kernels, and the manifest indicating a destination memory location of each of the graph nodes and dependencies of each of the graph nodes; means for identifying, by the one or more processors based on the manifest, the at least one command buffer and the associated data structures to copy to the host memory; means for identifying, by the one or more processors based on the manifest, the kernels to copy to local memory of the hardware accelerator; and means for patching, by the one or more processors, addresses in the at least one command buffer copied to the host memory with updated addresses of corresponding locations in the host memory. In Example 22, the subject matter of Example 21 can optionally include the apparatus further configured to perform the method of any one of the Examples 11 to 16.

Example 23 is a system for facilitating data relocation and command buffer patching for GPU remoting, configured to perform the method of any one of Examples 10-16. Example 24 is an apparatus for facilitating data relocation and command buffer patching for GPU remoting comprising means for performing the method of any one of claims 10 to 16. Specifics in the Examples may be used anywhere in one or more embodiments.

GPU Remoting

In some embodiments, an apparatus, system, or process is to provide GPU remoting to driver-managed GPUs and/or to autonomous GPUs. In one implementation, remoting component 903 described with respect to FIG. 9 provides the remoting to driver-managed GPUs. In one implementation, remoting component 903 described with respect to FIG. 9 provides the remoting to autonomous GPUs.

There is a strong trend toward disaggregating compute resources, such as GPU and/or other hardware accelerators, in cloud datacenters. Disaggregation enables Cloud Service Providers (CSPs) to utilize their accelerator resources more efficiently and lowers their cost. By pooling GPUs and making them available to client applications on demand, CSPs do not have to overprovision individual server platforms to meet peak demand. GPU disaggregation also improves the performance of certain applications, like machine learning (ML) training, because a workload can use as many GPUs as possible to improve performance, rather than be constrained by the number of GPUs attached to a specific platform.

To make a remote GPU accessible to a client application running on a different platform, the GPU stack should be distributed over two platforms—one on which the client application is run and the other to which the GPU is physically attached. The solution for GPU remoting should ensure that the performance overhead due to network communication latency between the two platforms is minimized. In addition, the remoting architecture should be able to support secure offloading of workloads from the client platform to the remote GPU. Other considerations might include minimizing the changes to GPU hardware for remoting, as well as support for a variety of different GPU stacks (e.g., OpenCL, OpenGL, Vulkan, DX12, DPC++ etc.)

Conventional GPU Architecture

Referring back to FIG. 22, a conventional GPU stack 2200 is depicted. As previously noted, the term stack herein may refer to a collection of subsystems or components needed to create a complete platform. GPU stack 2200 may include a GPU 2250 locally connected to a host 2205 (e.g., host computing device, host machine, etc.). The host 2205 may be divided into a user space 2202 and a kernel space 2204. The user space 2202 components include an application 2210, runtime (RT) and user mode driver (UMD) 2220. The RT and UMD 2220 can construct command buffers and various data structures referenced by the command buffer in order to interact with the GPU 2250. The kernel space 220 can include a host KMD 2230 and an OS/VMM 2240. The KMD 2230 is responsible for discovering the GPU 2250, enumerating its features, managing its resources, such as memory, and scheduling workloads on the GPU 2250. The KMD 2230 maintains a ring buffer (not shown) that points to the command buffers created in user space 2202, along with other context information, such as page tables, that translate graphics virtual addresses to physical addresses.

When a workload is submitted to the GPU 2250, a Command Streamer (CS) (not shown) in the GPU 2250 reads the ring buffer to determine if there are any new work items. When the CS finds new jobs, it executes the commands in the corresponding command buffers. When the command buffer is executed, the GPU environment is initialized in preparation for the kernel to run, memory buffers that should be in GPU local memory are copied from host memory, and finally, the kernel is dispatched to SIMD execution cores. After the kernel has completed execution, an interrupt is posted to notify the application 2210 that the results are available for processing.

GPU Remoting to Driver-Managed GPUS

In one implementation, an apparatus, system, or process is to provide GPU remoting to driver-managed GPUs. For example, remoting component 903 described with respect to FIG. 9 provides the remoting to driver-managed GPUs. Implementations of the disclosure provide a solution for GPU remoting that involves partitioning the GPU stack to run all of the userspace components (e.g., application, runtime, UMDs) on one platform, and connecting the userspace components over a network to a driver-managed remote GPU on a different platform. Implementations of the GPU remoting to driver-managed GPUs as described herein offers better performance than conventional solutions, while also meeting other requirements for security and support of various userspace GPU stacks within a single framework.

Figure 27:
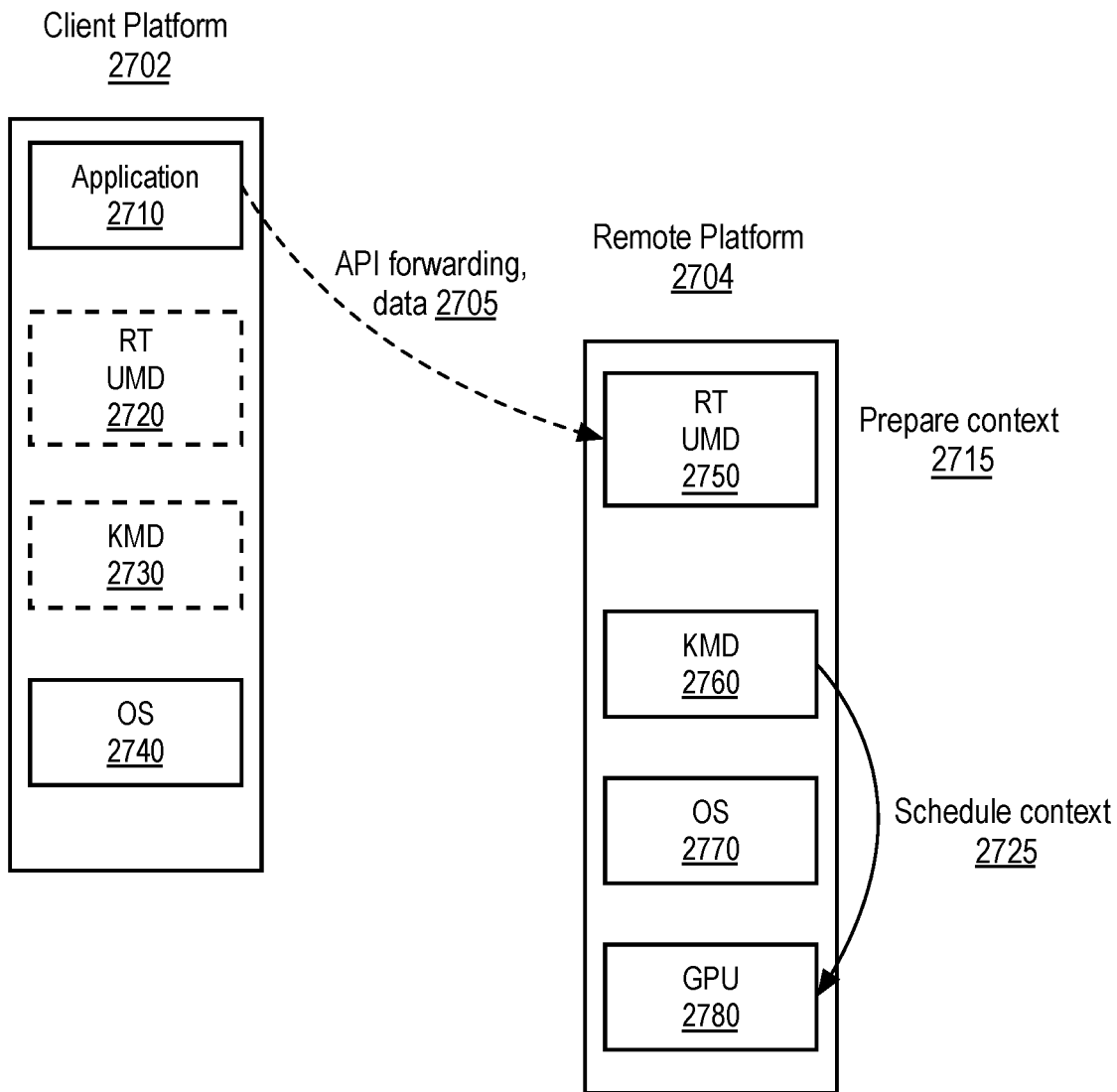
FIG. 27 illustrates a diagram depicting application programming interface (API) forwarding, according to implementations of the disclosure.

The conventional approach to partitioning the GPU stack for remote acceleration has been API forwarding. FIG. 27 illustrates a GPU stack implementing API forwarding in accordance with implementations of the disclosure. GPU stack 2700 is depicted as running the application 2710 on one platform, the client platform 2702, and the rest of the GPU stack 2700 on another platform, the remote platform 2704. Client platform 2702 includes an OS 2740, while remote platform 2704 includes OS 2770. When the application 2710 makes API calls 2705 to the GPU runtime layer 2750, it is intercepted and forwarded to the remote platform 2704, where the runtime 2750 (which previously would have been implemented in client platform 2702 as RT/UMD 2720 in a non-remote implementation) and KMD 2760 (which previously would have been implemented in client platform 2702 as KMD 2730 in a non-remote implementation) service the application 2710 and interface with the GPU 2780 that is connected to the remote platform 2704. The RT and UMD 2750 prepare context 2715, while the KMD 2760 schedules the context 2725 to the GPU 2780.

While approaches such as API forwarding might suffice for some classes of applications that are not latency sensitive, it suffers from a number of drawbacks. Some limitations of this approach include, but are not limited to, high latency incurred due to large volume of runtime API calls made over the network to the remote platform and the requirement of all data and commands having to go through the remote CPU before being forwarded to GPU or client CPU, a requirement to have a Trusted Execution Environment (TEE) on the remote platform to secure the data and computation on the CPU, and having GPU applications run on different stacks and each stack may utilize its own custom implementation of API forwarding, since each of these stacks has a different runtime.

Implementations of the disclosure provide for GPU remoting to driver-managed GPUs where the GPU stack is partitioned between userspace and kernel space components, with the former running on the client application host and the latter on a remote host that is connected to the GPU. In implementations of the disclosure, a GPU remoting middleware layer bridges the two halves of the GPU stack across the network. User data, along with command buffers and other data structures, are prepared on the application host and transported to the server, where the kernel mode driver uses them to prepare the context and schedules the workload on the GPU.

Implementations of the disclosure provide a technical improvement by allowing CSPs to deploy a GPU pooling/remoting solution in cloud datacenters. Furthermore, by natively supporting remoting for various software stacks, GPUs can become candidates for various Cloud deployment solutions that implement scalability, performance, and security.

In implementations of the disclosure, the GPU stack is partitioned between the userspace and kernel space components. The userspace components (application, runtime and UMD) run on one platform. The kernel space component (KMD) run on a remote platform that is physically connected to the GPU. The two halves of the stack are bridged across the fabric by a middleware called, called GPU-over-Fabric (GoF) middleware.

Figure 28:
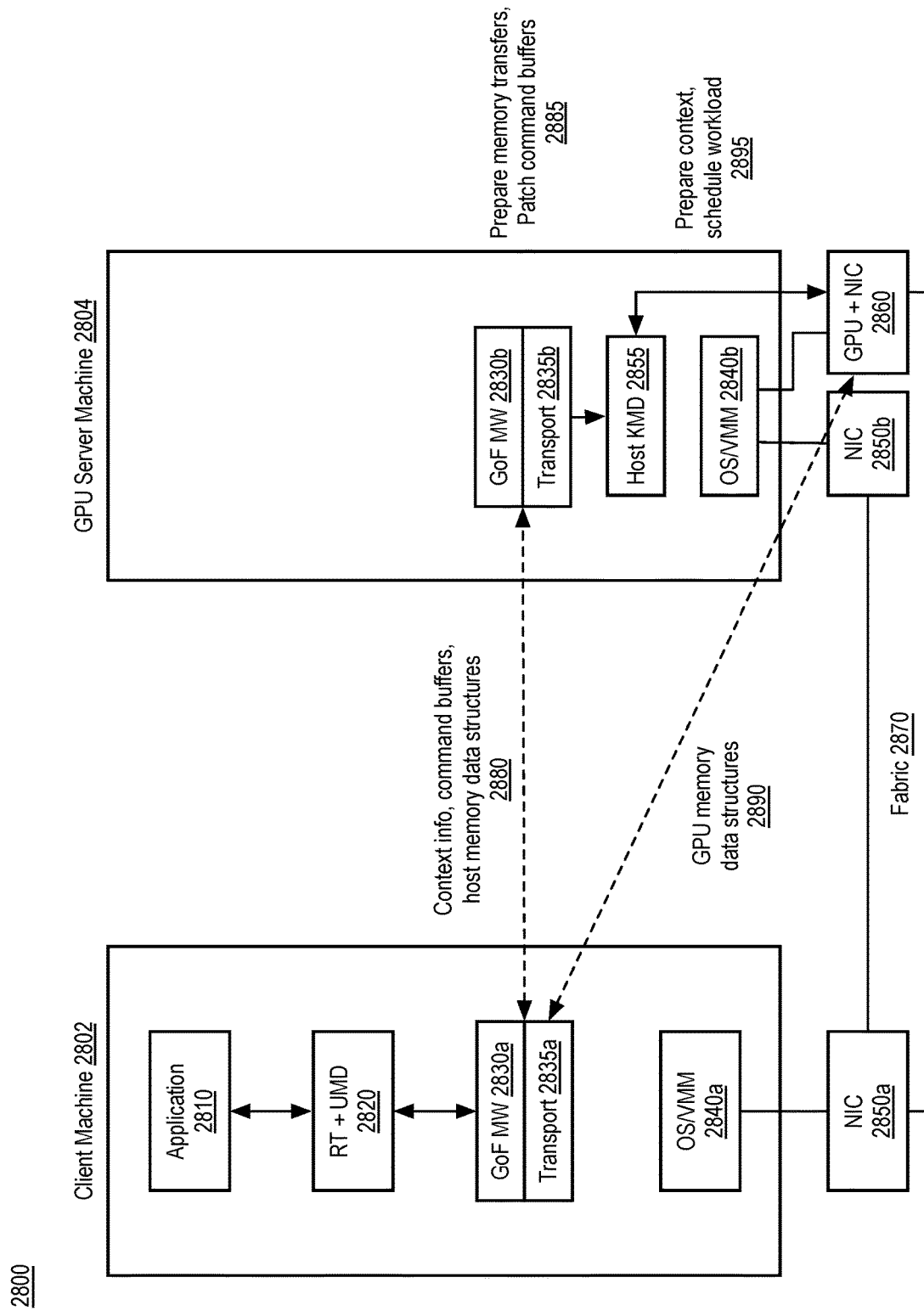
FIG. 28 illustrates the GPU remoting stack implementing GPU remoting to driver-managed GPUs, in accordance with implementations of the disclosure.

FIG. 28 illustrates the GPU remoting stack 2800 implementing GPU remoting to driver-managed GPUs, in accordance with implementations of the disclosure. In one implementation, the GPU stack 2800 is partitioned between userspace and kernel space components. The user space components include the application 2810 and the RT and UMD 2820 running on the client machine 2802. The kernel space components include the KMD 2855 running on a remote host (e.g., GPU server machine 2804) that is connected to the GPU 2860.

In implementations of the disclosure, a GPU remoting middleware layer, such as GoF middleware (MW) 2830a, 2830b bridges the two halves of the GPU stack 2800 across a network. User data along with command buffers and other data structures 2880 are prepared on the client machine 2802 and transported to the GPU server machine 2804, where the KMD 2855 uses them to prepare the context and schedules the workload 2890 on the GPU 2860.

The responsibilities of the various components of the GPU remoting stack 2800 are as follows. The application 2810 selects the GPU 2860 for acceleration and provides kernels and inputs for the acceleration workload. The RT/UMD 2820 services API calls from the application 2810 and constructs command buffers that can be executed by a CS in the GPU 2860. In one implementation, the RT/UMD 2820 compiles GPU kernels (JIT) in source form to instructions in the GPU ISA.

The KMD 2855 manages GPU resources, such as memory, prepares context, and schedules workloads to run on the GPU 2860.

GoF Middleware 2830a, 2830b provides a transport-agnostic interface for the userspace components to discover and use the remote GPU 2860. A transport sublayer 2835a, 2835b in the GoF middleware 2830a, 2830b communicates commands and data between the client platform and the server platform using a specific transport (e.g., TCP/IP, RDMA, InfiniBand, etc.). In one implementation, the GoF middleware 2830a, 2830b uses a protocol that supports operations, such as discovery of the remote GPU, authentication, connection to GPU resources (e.g., memory), and transfer of data to/from the GPU 2860, as well as GPU server machine 2804.

Implementations of the disclosure can utilize an integrated NIC 2850a, 2850b, 2860 for direct transfers between client machine 2802 and GPU local memory of GPU 2860 via fabric 2870 (e.g., Ethernet, etc.). An OS/VMM 2840a, 2840b on each of client machine 2802 and GPU server machine 2804 may manage the utilization of NICs 2850a, 2850b, 2860.

A number of challenges for GPU remoting using driver-managed GPUs can arise due to the distributed nature of the GPU remoting stack. The challenges can be grouped into the following categories: (1) Control Path; (2) Data Path; (3) Security; and (4) Performance. These challenges are discussed below in further detail.

(1) Control Path

Device Discovery and Connection: The client application utilizes a way to discover the remote GPU and its capabilities before it can select it for accelerating its workload. Information about the model of the GPU is also utilized to compile compute kernels that can execute on the GPU.

Workload Submission: Since the KMD, which schedules workloads on the GPU, is on a remote platform, the UMD on the client platform should have some way to submit command buffers and associated data structures across the network to the remote server/GPU.

Event Notification: During execution of the workload by the GPU, asynchronous events (e.g., synchronization operations, interrupts) that would normally result in notifications to the local host platform can now have to be relayed to the userspace software on the remote client platform.

(2) Data Path

Access to GPU Resources: GPU local memory resources that would be mapped into the application's address space can't be directly mapped because the application and the userspace software are on a different physical machine.

Different Address Spaces: Command buffers and associated data structures prepared on the client platform use host memory addresses that can no longer be directly accessed by the remote GPU.

Data Transfer: User data (e.g., compute kernels, input data) should be transported to remote GPU local memory over the network. Similarly, results computed by the GPU should be transferred back to the client host.

(3) Security

Confidentiality: Confidentiality of user data and compute kernels (potential IP) should be ensured.

Integrity: To ensure that the results of the computation in the GPU can be trusted, the user data and kernels, as well as command buffers and other associated data structures that drive the execution of the workload in the GPU, should be protected.

TEE Availability: TEEs on CPUs are not ubiquitous today. In a GPU remoting system, the CPU controlling a pool of GPUs might not have a TEE to protect sensitive code and data.

(4) Performance

Network Latency: A major source of latency is associated with the transfer of data, meta data and control information over the fabric between the client and server platforms.

Server Latency: Another source of latency is associated with going through the remote host to get to the GPU, since the GPU is managed by the KMD running on the remote host.

The above challenges can be addressed using the driver-managed GPU remoting techniques described herein, as described as follows:

(1) Control Path: The control of the remote GPU rests with the KMD running on the remote host. The KMD is responsible for discovering the device, enumerating its features and managing its resources (such as memory) and scheduling jobs on the GPU. In order to connect the client application to the remote GPU, the following may happen.

First, availability of the GPU should be advertised to an Orchestration Service (in Cloud datacenters the job of matching clients with the accelerator resources they utilize is done by an Orchestration Service). The GoF middleware running on the server platform can advertise the availability of the GPU to the Orchestration Service. The service which keeps track of client requests (for GPUs) can then match an available GPU to a client.

The peer GoF middleware layers on the client and server execute a protocol that connects the client with the remote GPU. The protocol would allow the client to discover the features of the GPU, connect to it, authenticate it, and so on.

After acquiring information about the remote GPU, the client GoF middleware can build a device model of the GPU, which it then uses to respond to client requests about GPU features and capabilities. The application can use information about the GPU's features to determine if it wants to offload its workload to the GPU. Having selected a specific remote GPU, information about the specific model of the GPU can enable just-in-time compilation of compute kernels to the target GPU's instruction set.

The runtime and UMD on the client platform prepare the command buffers and other data structures for the GPU Command Streamer and they are transported from the client to server platform via the GoF middleware layer. The GoF layer on the server is a proxy for the application stack on the client platform. It interacts with the KMD and local OS to allocate host memory for data structures received from the client and performs some processing to ensure that the command buffers and other data structures received from the client can be consumed by the GPU Command Streamer (see next section for some more details). It then invokes the KMD when it is ready to submit the workload. The context for the workload is prepared on the remote server by the KMD. The KMD populates the graphics page tables that can translate graphics virtual addresses (used by the compute kernel) to physical addresses; sets up the ring buffer (which points to the command buffers) and other data structures that constitute the GPU context; and schedules the workload when the context is ready.

Asynchronous events, such as interrupts, generated during execution interrupt the driver on the server platform, which notifies the GoF middleware on the server. The GoF middleware layer relays the notifications to its peer on the client, which then propagates it up the userspace stack to the runtime or application.

(2) Data Path: There two data paths in the system. The command buffers and associated data structures such as state and descriptor heaps have to copied to remote host memory because they should be pre-processed before the job is submitted to the GPU. Compute kernels and user data can be directly copied to GPU local memory once the correct destination addresses are known.

Since command buffers and other data structures are constructed by the runtime/UMD on the client platform, they have client host addresses inside them where they reference external memory regions. These structures have to be relocated to the remote host memory and the corresponding addresses "patched" in the data structures before the GPU Command Streamer can process them. The basic idea is to create a manifest listing all the memory regions that have to be copied from client host memory to either the remote host or GPU memory. The manifest is transferred to the GoF middleware on the server, which allocates host memory to receive the data structures, with the help of the local OS. Then, the server GoF middleware copies the memory regions to server host memory 2885. After the copy is completed, the addresses in those data structures can be modified (patched) 2885 to reflect their new host memory locations on the server. Then, the KMD can prepare the context for submission to the GPU 2895.

Compute kernels and user data that should be in GPU local memory are not copied to the remote host memory. GoF middleware on the server can identify such data structures from the manifest and copy them directly to GPU local memory. However, it should know the target addresses in GPU local memory before it can initiate the copy operations. GoF middleware on the server can obtain the target addresses for the compute kernels and user data from the KMD (which manages GPU local memory) and initiate direct transfer of such data from client host memory to GPU local memory.

When the workload is eventually submitted, the GPU Command Streamer can read and execute the command buffers from the server's host memory. All addresses encountered by the Command Streamer in the command buffers and associated data structures can be local host memory addresses (because they were patched). Since the context (GPU page tables) was prepared by the KMD and the kernels and data were copied to GPU memory, when the Command Streamer dispatches the kernel, the GPU's execution units can find the kernel and its input data in memory, with the address translations in the page tables, ready for execution.

In addition to copying data between host and GPU by commands in the command buffer, it is also possible to map GPU local memory to the address space of the client application stack.

The remoting protocol implements primitives that can perform the mapping. The mapping operation returns a handle (to GPU memory) to the application stack. This handle can be used to read/write from/to GPU memory directly.

(3) Security: While security of the GPU remoting solution is not the focus of this IDF, the following points are worth noting. The userspace components that do most of the data and command buffer processing are on the client machine and should run inside a TEE (e.g., Intel® SGX) to protect confidentiality and integrity during execution. When data is transferred to the remote platform, it should be encrypted and integrity-protected.

Certain data structures, such as command buffers, should not be encrypted because they are processed (patched) by GoF middleware on the server. However, since they are integrity-protected, the problem of patching after the integrity tags have been computed on the client side should be solved, as the server platform might not have a TEE. Finally, the GPU itself can isolate its workloads and protect their confidentiality and integrity during execution in its memory.

(4) Performance: The GPU remoting system described in implementations of the disclosure reduces network latency as well as remote server latency. Since all the user space components run the client host, the high frequency interactions between the application, runtime and UMD occur on a single platform and does not have to incur network communication overhead. The data path is also optimized further by routing data targeting GPU memory (such as kernels and user data) directly to the GPU, bypassing the remote host. The responsibility of the stack on the remote host is limited to command buffer preprocessing, context preparation and scheduling. This reduces the latency associated with operations performed on the remote server.

FIG. 29 is a flow diagram illustrating a method 2900 for GPU remoting to driver-managed GPUs, in accordance with implementations of the disclosure. Method 2900 may be performed by processing logic that may comprise hardware (e.g., circuitry, dedicated logic, programmable logic, etc.), software (such as instructions run on a processing device), or a combination thereof. More particularly, the method 2900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 2900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIG. 27-28 may not be repeated or discussed hereafter. In one implementation, a processor providing a middleware layer, such as GoF middleware layer 2830*a*, 2830*b* described with respect to FIG. 28, may perform method 2900.

Method 2900 begins at block 2910 where a processor may provide a remote GPU middleware layer to act as a proxy for an application stack on a client platform separate from a remote device hosting the remote GPU middleware layer. At block 2920, the processor may receive, from the client platform, command buffers and data structures generated by the application stack for consumption by a command streamer of a remote GPU.

Subsequently, at block 2930, the processor may communicate with a kernel mode driver to cause host memory of the remote device to be allocated for the command buffers and the data structures. Lastly, at block 2940, the processor may invoke, by the remote GPU middleware layer, the kernel mode driver to submit a workload generated by the application stack for processing by the remote GPU using the command buffers and the data structures allocated in the host memory of the remote device.

The following examples pertain to further embodiments of GPU remoting to driver-managed GPUs. Example 1 is an apparatus to facilitate GPU remoting to driver-managed GPUs.

The apparatus of Example 1 comprises host memory; a remote graphics processing unit (GPU); and one or more processors communicably coupled to the host memory and the remote GPU, the one or more processors to: provide a remote GPU middleware layer to act as a proxy for an application stack on a client platform separate from the apparatus; communicate, by the remote GPU middleware layer, with a kernel mode driver of the one or more processors to cause the host memory to be allocated for command buffers and data structures received from the client platform for consumption by a command streamer of the remote GPU; and invoke, by the remote GPU middleware layer, the kernel mode driver to submit a workload generated by the application stack, the workload submitted for processing by the remote GPU using the command buffers and the data structures allocated in the host memory as directed by the command streamer.

In Example 2, the subject matter of Example 1 can optionally include wherein the command buffers and data structures are received from a runtime component and user mode driver component of the client platform, and wherein the command buffers and data structures are generated based on instructions from the application stack. In Example 3, the subject matter of any one of Examples 1-2 can optionally include wherein the kernel mode driver utilizes the command buffers and data structures to prepare a context of the workload and schedule the workload on the remote GPU. In Example 4, the subject matter of any one of Examples 1-3 can optionally include wherein the remote GPU middleware layer is to expose an abstraction of the apparatus to the userspace components of the accelerator stack on the remote client machine, and is to mediate transfer of data between the remote client machine and the hardware accelerator.

In Example 5, the subject matter of any one of Examples 1-4 can optionally include wherein the remote GPU middleware layer is a transport-agnostic interface for the application stack on the client platform. In Example 6, the subject matter of any one of Examples 1-5 can optionally include wherein the remote GPU middleware layer comprises a transport sublayer to communicate command and data between the client platform and the apparatus. In Example 7, the subject matter of any one of Examples 1-6 can optionally include wherein the remote GPU comprises a network interface controller (NIC) for direct transfers of data between the client platform and the remote GPU.

In Example 8, the subject matter of any one of Examples 1-7 can optionally include wherein a GPU local memory of the remote GPU is mapped to an address space of the application stack of the client platform to allow the application stack to access the GPU local memory directly. In Example 9, the subject matter of any one of Examples 1-8 can optionally include wherein the one or more processors comprise one or more of a GPU, a central processing unit (CPU), or a hardware accelerator.

Example 10 is a method for facilitating d GPU remoting to driver-managed GPUs. The method of Example 10 can include providing, by one or more processors communicably coupled to a host memory and a remote graphics processing unit (GPU), a remote GPU middleware layer to act as a proxy for an application stack on a client platform separate from the apparatus; communicating, by the remote GPU middleware layer, with a kernel mode driver of the one or more processors to cause the host memory to be allocated for command buffers and data structures received from the client platform for consumption by a command streamer of the remote GPU; and invoking, by the remote GPU middleware layer, the kernel mode driver to submit a workload generated by the application stack, the workload submitted for processing by the remote GPU using the command buffers and the data structures allocated in the host memory as directed by the command streamer.

In Example 11, the subject matter of Example 10 can optionally include wherein the command buffers and data structures are received from a runtime component and user mode driver component of the client platform, and wherein the command buffers and data structures are generated based on instructions from the application stack. In Example 12, the subject matter of any one of Examples 10-11 can optionally include wherein the kernel mode driver utilizes the command buffers and data structures to prepare a context of the workload and schedule the workload on the remote GPU.

In Example 13, the subject matter of any one of Examples 10-12 can optionally include wherein the remote GPU middleware layer is to expose an abstraction of the apparatus to the userspace components of the accelerator stack on the remote client machine, and is to mediate transfer of data between the remote client machine and the hardware accelerator. In Example 14, the subject matter of any one of Examples 10-13 can optionally include wherein the remote GPU middleware layer is a transport-agnostic interface for the application stack on the client platform.

In Example 15, the subject matter of any one of Examples 10-14 can optionally include wherein the remote GPU middleware layer comprises a transport sublayer to communicate command and data between the client platform and the apparatus. In Example 16, the subject matter of any one of Examples 10-15 can optionally include wherein the remote GPU comprises a network interface controller (NIC) for direct transfers of data between the client platform and the remote GPU.

In Example 17, the subject matter of any one of Examples 10-16 can optionally include wherein a GPU local memory of the remote GPU is mapped to an address space of the application stack of the client platform to allow the application stack to access the GPU local memory directly. In Example 18, the subject matter of any one of Examples 10-17 can optionally include wherein the one or more processors comprise one or more of a GPU, a central processing unit (CPU), or a hardware accelerator.

Example 19 is a non-transitory machine readable storage medium for facilitating GPU remoting to driver-managed GPUs. The non-transitory computer-readable storage medium of Example 19 having stored thereon executable computer program instructions that, when executed by one or more processors, cause the one or more processors to perform operations comprising provide, by the at least one processor communicably coupled to a host memory and a remote graphics processing unit (GPU), a remote GPU middleware layer to act as a proxy for an application stack on a client platform separate from the apparatus; communicate, by the remote GPU middleware layer, with a kernel mode driver of the one or more processors to cause the host memory to be allocated for command buffers and data structures received from the client platform for consumption by a command streamer of the remote GPU; and invoke, by the remote GPU middleware layer, the kernel mode driver to submit a workload generated by the application stack, the workload submitted for processing by the remote GPU using the command buffers and the data structures allocated in the host memory as directed by the command streamer.

In Example 20, the subject matter of Example 19 can optionally include wherein the command buffers and data structures are received from a runtime component and user mode driver component of the client platform, and wherein the command buffers and data structures are generated based on instructions from the application stack. In Example 21, the subject matter of Examples 19-20 can optionally include wherein the kernel mode driver utilizes the command buffers and data structures to prepare a context of the workload and schedule the workload on the remote GPU. In Example 22, the subject matter of Examples 19-21 can optionally include wherein the remote GPU middleware layer is to expose an abstraction of the apparatus to the userspace components of the accelerator stack on the remote client machine, and is to mediate transfer of data between the remote client machine and the hardware accelerator.

In Example 23, the subject matter of Examples 19-22 can optionally include wherein the remote GPU middleware layer is a transport-agnostic interface for the application stack on the client platform. In Example 24, the subject matter of Examples 19-23 can optionally include wherein the remote GPU middleware layer comprises a transport sublayer to communicate command and data between the client platform and the apparatus. In Example 25, the subject matter of Examples 19-24 can optionally include wherein the remote GPU comprises a network interface controller (NIC) for direct transfers of data between the client platform and the remote GPU.

In Example 26, the subject matter of Examples 19-25 can optionally include wherein a GPU local memory of the remote GPU is mapped to an address space of the application stack of the client platform to allow the application stack to access the GPU local memory directly. In Example 27, the subject matter of Examples 19-26 can optionally include wherein the at least one processor comprises one or more of a GPU, a central processing unit (CPU), or a hardware accelerator.

Example 28 is an apparatus for facilitating GPU remoting to driver-managed GPUs according to implementations of the disclosure. The apparatus of Example 28 can comprise means for providing, by one or more processors communicably coupled to a host memory and a remote graphics processing unit (GPU), a remote GPU middleware layer to act as a proxy for an application stack on a client platform separate from the apparatus; means for communicating, by the remote GPU middleware layer, with a kernel mode driver of the one or more processors to cause the host memory to be allocated for command buffers and data structures received from the client platform for consumption by a command streamer of the remote GPU; and means for invoking, by the remote GPU middleware layer, the kernel mode driver to submit a workload generated by the application stack, the workload submitted for processing by the remote GPU using the command buffers and the data structures allocated in the host memory as directed by the command streamer. In Example 29, the subject matter of Example 28 can optionally include the apparatus further configured to perform the method of any one of the Examples 11 to 18.

Example 30 is a system for facilitating GPU remoting to driver-managed GPUs, configured to perform the method of any one of Examples 10-18. Example 31 is an apparatus for facilitating GPU remoting to driver-managed GPUs comprising means for performing the method of any one of claims 10 to 18. Specifics in the Examples may be used anywhere in one or more embodiments.

GPU Remoting to Autonomous GPUS

In some embodiments, an apparatus, system, or process is to provide remoting to autonomous GPUs. In one implementation, remoting component 903 described with respect to FIG. 9 provides the remoting to autonomous GPUs.

Implementations of the disclosure provide a solution for remote GPU acceleration that relies on autonomous, self-managing, headless GPUs. The userspace components (e.g., application, runtime, user mode drivers) run on one client platform and connect over the network, directly, to an autonomous GPU, which is not managed by a traditional driver. The solution offers better performance than existing solutions (see next section), while also meeting other requirements for security and support of various GPU stacks within a single framework.

As discussed above, one conventional approach to partitioning the GPU stack for remote acceleration is to run the application on one platform and the rest of the stack on a remote platform. When the application makes API calls to the GPU runtime layer, it is intercepted and forwarded to the remote platform where the runtime and driver stack service the application.

This method, called API forwarding, is discussed above with respect to FIG. 27.

In a driver-managed GPU remoting approach also discussed above with respect to FIG. 28, the GPU stack is partitioned between the userspace components, which run on the client machine and the kernel mode driver, which runs on the server that is physically connected to the GPU. The runtime and UMD prepare the command buffers and associated data structures on the client and transmit them to the server via a GPU remoting middleware layer. The kernel mode driver prepares the context and submits the command buffers to the GPU for execution.

The driver-managed GPU remoting approach improves on the API forwarding approach in several ways. For example, it reduces the latency associated with frequent runtime API calls made over the network and transfers some data (kernels, user data) directly to the GPU.

Implementations of the disclosure provide for another approach to GPU remoting referred to as remoting to autonomous GPUs. In remoting to autonomous GPUs, the GPU userspace stack runs on one platform and is referred to as the client stack. The client stack connects with the autonomous, remote GPU over the network using a messaging passing interface. The GPU virtualizes its own resources (e.g., memory, virtual functions (VFs), etc.) and exposes them to remote clients, without a controlling driver. End-to-end security is achieved by GPU attestation and encrypting/integrity-protecting and verifying all data and control messages at the two endpoints (client and GPU) inside TEEs.

Figure 30:
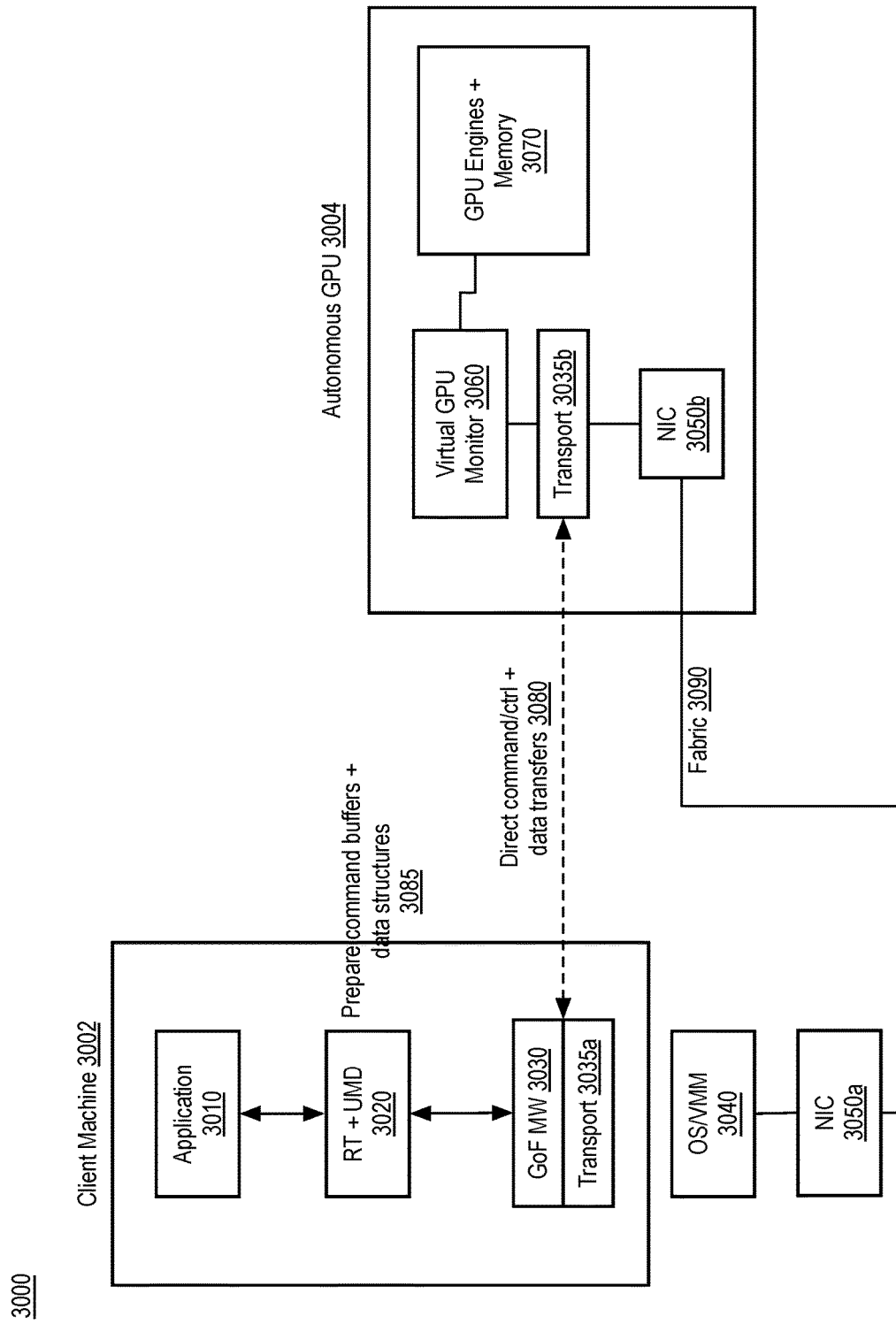
FIG. 30 illustrates an autonomous GPU remoting stack, in accordance with implementations of the disclosure.

FIG. 30 illustrates an autonomous GPU remoting stack 3000 in accordance with implementations of the disclosure. In the remoting to autonomous GPUs approach, the GPU stack 3000 is partitioned at the layer below the userspace components, which include the application 3010 and RT/UMD 2030. The userspace components run on one platform, the client machine 3002, and are connected to the remote autonomous GPU 3004 over a network (not shown). A virtual GPU monitor (VGM) 3060 on the autonomous GPU 3060 provides for the management of the autonomous GPU 3004, including management of the GPU resources such as GPU engine and memory 3070, as described further below.

The two halves of the GPU stack 3000 are bridged across the fabric 3070 (e.g., Ethernet) by a middleware, such as GoF middleware 3030. A transport sublayer 3035*a*, 3035*b* in the GoF middleware 3030 can communicate commands and data between the client machine 3002 and the autonomous GPU 3004 using a specific transport (e.g., TCP/IP, RDMA, InfiniBand, etc.).

Data communications between client machine 3002 and autonomous GPU 2004 may travel over fabric 3090 via NICs 3050a, 3050b. NIC 3050a may interface with an OS/VMM 3040 of the client machine 3002.

The responsibilities of the various components of the GPU stack 3000 may be as follows. Application 3010 can select the GPU 3004 for acceleration, provide kernels and inputs for the acceleration workload. RT/UMD 3020 services API calls from the application 3010 and constructs command buffers that can be executed by a command streamer (CS) (not shown) in the GPU 3004. The RT/UMD 3020 compiles GPU kernels (JIT) in source form to instructions in the GPU 3004 instruction set architecture (ISA).

GoF Middleware: Provides a transport-agnostic interface for the userspace components to discover and use the remote GPU. A transport sublayer 3035a, 3035b in the middleware 3030 communicates commands and data 3085 between the client machine 3002 and the remote GPU 3004 using a specific transport (e.g., TCP/IP, RDMA, InfiniBand, etc.). The middleware 3030 uses a protocol that supports operations such as discovery of the remote GPU 3004, authentication, connection to GPU resources (e.g., memory) and transfer of data 3080 to/from the GPU 3004, as well as remote host.

Remote GPU 3004 is an autonomous, self-virtualizing GPU that manages its own resources, advertises resource availability and executes workloads received from remote clients.

A number of problems/challenges arise due to the distributed nature of the GPU remoting stack. They can be grouped into the following categories: (1) Control path; (2) Data path; (3) Security; and (4) Performance. These challenges are discussed below in further detail.

(1) Control Path

Device Discovery and Connection: The client application utilizes a way to discover the remote GPU and its capabilities before it can select it for accelerating its workload. Information about the model of the GPU is also used to compile compute kernels that can execute on the GPU.

Workload Submission: The UMD on the client platform should have some way to submit command buffers and associated data structures across the network to the remote GPU. There is no kernel mode driver (KMD) running on a remote host to control the GPU, prepare context and schedule the workload.

Event Notification: During execution of the workload by the GPU, asynchronous events (e.g., synchronization operations, interrupts) that would normally result in notifications to the local host platform can now have to be relayed directly to the userspace software on the remote client platform.

(2) Data Path

Access to GPU Resources: GPU local memory resources that would be mapped into the application's address space can't be directly mapped because the GPU and client platform are not connected locally.

Different Address Spaces: Command buffers and associated data structures prepared on the client platform use host memory addresses that cannot be directly accessed by the remote GPU.

Data Transfer: User data (e.g., compute kernels, input data) should be transported to remote GPU local memory over the network. Similarly, results computed by the GPU should be transferred back to the client host.

(3) Security

Confidentiality: Confidentiality of user data and compute kernels (potential IP) should be ensured.

Integrity: To ensure that the results of the computation in the GPU can be trusted, the integrity of user data and kernels, as well as command buffers and other associated data structures that drive the execution of the workload in the GPU, should be protected.

GPU Security: Workloads from various remote clients should be isolated inside the GPU to ensure the confidentiality and integrity of user data and results computed by the GPU. Access to GPU resources by various remote clients over the network should be validated to ensure that a client can access resources assigned to it.

(4) Performance

Network Latency: A major source of latency is associated with the transfer of data, meta data and control information over the fabric between the client and remote GPU.

GPU Latency: Another source of latency is associated with the overhead of managing GPU resources while simultaneously servicing various client workloads. The autonomous GPU resource manager should not become a bottleneck while handling multiple clients at the same time.

The above challenges can be addressed using the autonomous GPU remoting techniques described herein. The autonomous GPU differs from a conventional GPU in at least one aspect: it does not utilize a driver to manage its resources and schedule workloads. It can manage its own resources (memory, VFs, etc.) and subsumes the responsibilities of a GPU kernel mode driver.

Figure 31:
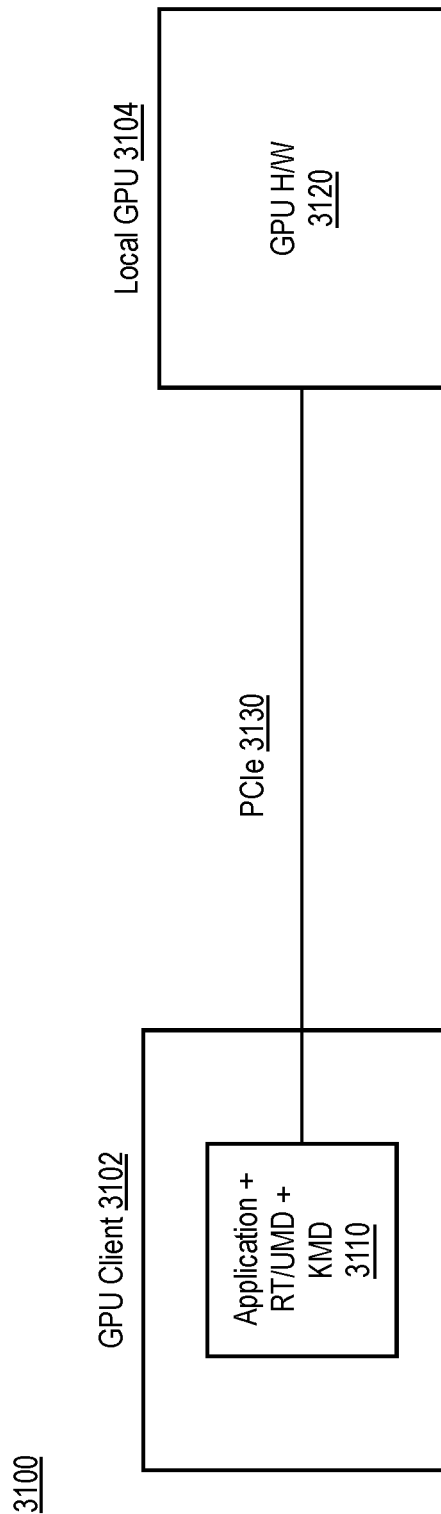
FIG. 31 illustrates a diagram depicting another implementation of API, according to implementations of the disclosure.

FIG. 31 depicts a GPU stack architecture 3100 for GPU remoting to an autonomous GPU in accordance with implementations of the disclosure. The GPU stack 3100 is shown that connects with a GPU client 3102 with a local GPU 3104 over the PCI Express bus 3130. The GPU client 3102 includes a GPU userspace stack including the application, RT/UMD and KMD 3110. The local GPU 3104 includes GPU hardware 3120 used to process requests from the GPU userspace stack including the application, RT/UMD and KMD 3110.

Figure 32:
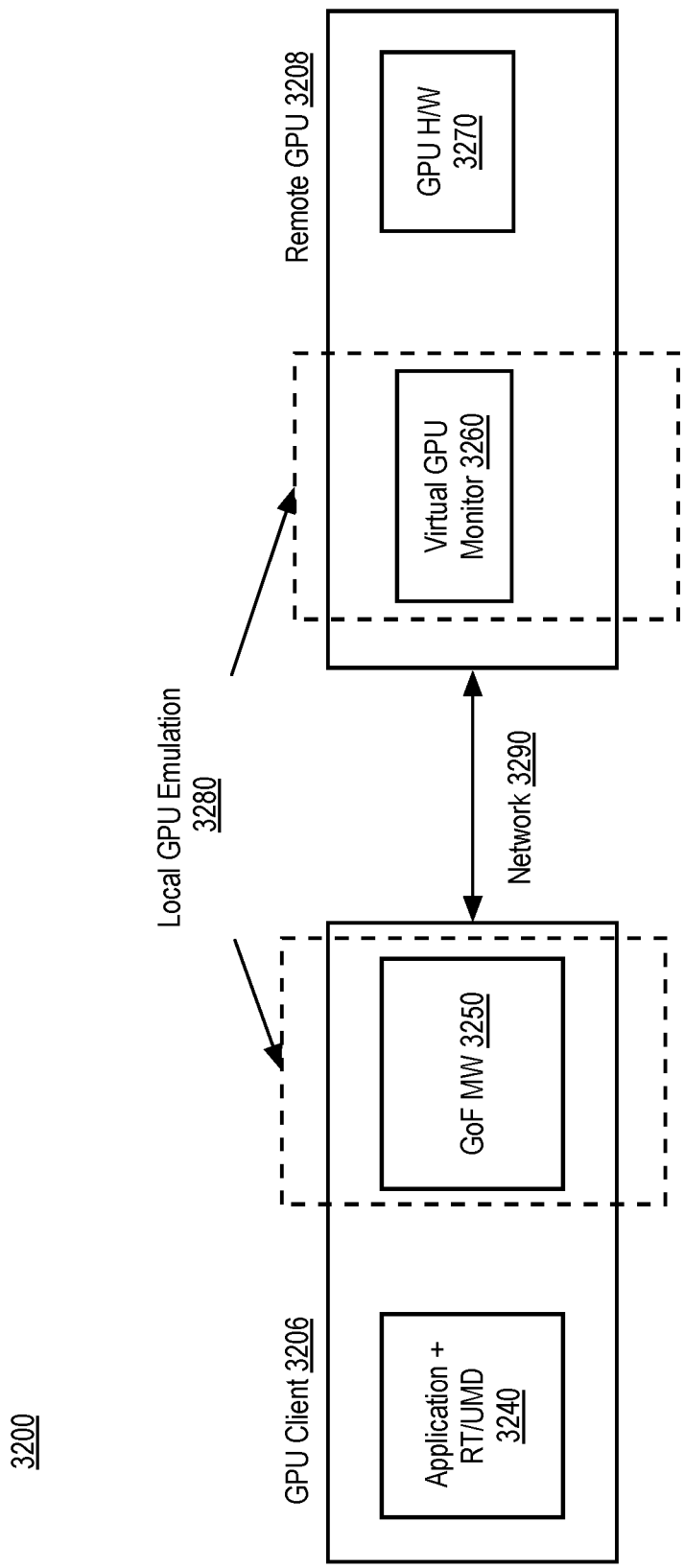
FIG. 32 illustrates a diagram depicting driver-managed GPU remoting, according to implementations of the disclosure.

FIG. 32 depicts another illustration of a GPU stack architecture 3200 for GPU remoting to an autonomous GPU, in accordance with implementations of the disclosure. In GPU stack architecture 3200, the GPU client 3206 having a GPU userspace stack including the application and RT/UMD 3240 connects to a remote, autonomous GPU 3208 over a network 3290. A GoF middleware 3250 on the GPU client 3206 and the Virtual GPU Monitor (VGM) 3260 on the remote GPU 3208 connect the userspace stack 3240 on the GPU client 3206 with the GPU hardware 3270. These components of the GoF middleware 3250 and the VGM 3260 abstract details associated with the network connection. Such abstraction is referred to as local GPU emulation 3280. The local GPU emulation 3280 allows the GPU client 3206 to connect with the remote GPU 3208 using a message passing interface. This design minimizes the changes to the GPU userspace stack, as well as the hardware 3270 of the autonomous GPU 3208. As such, the client application 3240 believes it is connected to a local GPU, while most of the GPU hardware 3270 is unaware that it is running a workload from a remote host (e.g., the GPU client 3206).

The VGM 3260 is the GPU's 3208 resource manager. The VGM 3260 can be implemented as a firmware module that runs on a microcontroller inside the GPU 3208. The VGM 3260 performs the functions such as the following: Exposes a remote device management interface to control the operation of the GPU (e.g., reset GPU, upgrade firmware, etc.); Exposes GPU capabilities and features to its clients over a network interface; Allocates GPU local memory to workloads; Manages GPU page tables to maintain isolation of workloads in local memory; Allocates and configures GPU engines for workloads depending on client requests; Schedules workloads submitted by its remote clients on various GPU engines; and/or Handles asynchronous events (e.g., interrupts) that implement communication with an external platform.

Modern GPUs support virtualization. For example, SR-IOV technology allows a GPU to expose partitions of its resources as virtual functions (VF) to various clients. However, SR-IOV is a PCI Express standard. In moving from local to remote GPUs, exposing VFs to clients over the network should be performed. The VGM 3260 can configure and expose VF capabilities to the GPU's remote clients. Clients can query the device's VF capabilities using the control interface (see next subsection) and access VF resources (e.g., registers, local memory partitions) using the GPU's message passing interface.

Traditional discrete GPUs are connected to their host platforms over a PCI Express link. The host discovers, configures and submits work to such a GPU over a register interface. The device registers are mapped into host system memory and can be accessed through memory read/write operations (MMIO).

With GPU remoting to autonomous GPUs, an autonomous GPU is no longer connected to a controlling host platform. It is available as a resource to its clients over a fabric (e.g., Ethernet), and as a network endpoint it can be accessed using standard networking protocols (TCP/IP, RDMA). In order to communicate with its clients, it exposes a message passing interface. Commands to discover device features, authenticate it, request resources, and submit workloads are encapsulated in messages that are transmitted between the GPU and its clients over the fabric.

The VGM intercepts request messages directed to the GPU and responds to them. It exposes several interfaces to its remote clients. The response of the VGM can depend on the type of interface and type of request. In implementations of the disclosure, there are four types of messages that clients can send to the remote GPU. The messages may be as follows. (Note: In the following, it is assumed that the client and GPU communicate using the RDMA protocol.)

Read: When the client is to read from GPU memory or registers, the VGM first validates the read request and initiates RDMA write operation to client host memory to transfer the data in response.

Write: When the client is to write to GPU memory, the VGM validates the write request and then issues RDMA read operations to remote client host memory to copy data into GPU local memory. Messages of this type can also be used to send commands to the GPU (work submission commands, device management command, etc.).

Queries: These messages are used by the client to discover features of the GPU, get status information, and so on.

Protocol: These messages are exchanged between the client and the GPU while executing certain protocols. For example, attestation and key exchange cryptographic protocols consist of a sequence of messages between the client and the GPU.

Under certain conditions, response messages from the GPU to its client can also indicate errors. There might be several reasons for errors, including cryptographic errors, invalid parameters in a request, unauthorized requests, and so on.

The autonomous GPU exposes the following interfaces to its clients: Management interface; Control interface; and Data interface. These interfaces are described in more detail below.

The management interface is used to manage certain aspects of the GPU's behavior. For example, an authorized operator might want to remotely reset the GPU, upgrade its firmware, and so on. This device management interface can allow authenticated and authorized clients to perform such tasks on the GPU.

The control interface is used by clients to perform tasks such as connecting to the GPU, discovering its features, authenticating it, requesting resources (e.g., memory on the GPU), mapping memory regions into client's address space, and releasing resources. It is also used by the GPU to notify the clients of certain asynchronous events, such as interrupts.

The data interface is used to read/write data between the GPU and its remote clients.

In the following discussion, it is described how remote clients can connect to the autonomous GPU and securely offload their workloads with respect to the control path, the data path, security, and performance.

Control Path:

Device Discovery and Connection: The first step in using a remote, autonomous GPU is to discover it and enumerate its features and available resources. In Cloud datacenters, an Orchestration Service typically matches clients with available accelerator resources on the network. Using the control interface of the autonomous GPU, the Orchestration Service can discover the GPU and enumerate its capabilities and resources (VFs, memory, etc.) by sending query messages. The GPU responds to these messages in much the same way as it does today when it responds requests made to PCI configuration space registers. After initial discovery and enumeration, periodic messages from the GPU to the service to keep it up to date about available GPU resources allows the service to allocate the GPU resources to any remote client that requests it. Assuming that the orchestration service matches a client to the GPU, the GoF middleware layer on the client and the VGM execute a protocol that connects the client with the remote GPU. The protocol would allow the client to discover the features of the GPU, connect to it, authenticate it, and so on.

After acquiring information about the remote GPU, the client GoF middleware can build a device model of the GPU, which it then uses to respond to client requests about GPU features and capabilities. The application can use information about the GPU's features to determine if it wants to offload its workload to the GPU. Having selected a specific remote GPU, information about the specific model of the GPU can enable just-in-time compilation of compute kernels to the target GPU's instruction set.

Workload Submission: The runtime and UMD on the client platform prepare the command buffers and other data structures for the GPU Command Streamer and they have to be transported from the client to the GPU via the GoF middleware layer. The VGM receives the command buffers and other context information that are used to prepare the context before it can be submitted to the GPU Command Streamer (see section on Data Path for details). Once the VGM sets up the context (GPU page tables for the workload), it interrupts the GPU Scheduler, just like a KMD in a traditional GPU interrupts the Scheduler. The scheduler finds an available GPU Command Streamer to dispatch the workload.

Event Notification: Asynchronous events, such as interrupts, generated during execution are relayed as messages back to the client machine, where the GoF middleware layer propagates it up the userspace stack to the runtime or application.

Data Path:

Handling Different Address Spaces: The command buffers and associated data structures such as descriptor heaps have to be copied to GPU local memory because there is no local host directly connected to the GPU from where the GPU can access those data structures. Similarly compute kernels and user data should be copied to GPU local memory once the correct destination addresses are known. Since command buffers and other data structures are constructed by the runtime/UMD on the client platform, they have client host addresses inside them that reference external memory locations. These structures have to be relocated to GPU local memory and the corresponding addresses "patched" in the data structures before the GPU Command Streamer can process them.

As previously discussed, implementations of the disclosure may create a manifest listing all the memory regions that have to be copied from client host memory to GPU memory. The manifest is sent to the GPU in a workload submission message, where the VGM allocates local memory to receive the data structures. Then, using the manifest, the VGM copies the memory regions from client host addresses to GPU memory. After the copy is completed, the addresses in the command buffers and associated data structures can be modified (patched) to reflect their new GPU local memory locations. Finally, the VGM prepares the context (page tables) before the workload is submitted to the GPU Scheduler.

When the workload is eventually submitted, the GPU Command Streamer can read and execute the command buffers from GPU local memory. All addresses encountered by the Command Streamer in the command buffers and associated data structures can be local GPU memory addresses (because they were patched by the VGM). Since the context (GPU page tables) was prepared by the VGM, when the Command Streamer dispatches the kernel, the GPU's execution units can find the kernel and its input data in GPU local memory, with the address translations in the page tables, ready for execution.

Access to GPU Resources: In addition to copying data between client and GPU by commands in the command buffer, it is also possible to map GPU local memory to the address space of the client application stack to transfer data directly between the GPU and the client. The GPU remoting protocol implements primitives that can perform the mapping. The mapping operation returns a handle (to GPU memory) to the application stack. This handle can be used to read/write from/to GPU memory allocated to the application directly.

Security:

Attestation and Secure Session Setup: Before a client can securely offload its workload to the remote GPU it should authenticate the GPU and the verify its attestation report. The root of trust in the GPU manages the security credentials (keys, certificates) utilized to do this. It measures the firmware running on the GPU (including the VGM) during boot and attests to it when a client requests attestation. After successful attestation, the client and the GPU execute an authenticated key exchange protocol to establish a shared symmetric primary key. From the primary key, separate keys can be derived for encrypting and integrity-protecting the messages between the client and the GPU for the duration of their session.

Confidentiality and Integrity Protection: All messages between the client and the GPU are encrypted, integrity-protected and replay-protected. On the client side, the encryption is done inside a TEE (e.g., Intel® SGX). Similarly, on the GPU side, the messages and responses are encrypted securely before transmission to the client. Certain data structures, such as command buffers, can include several data structures that are linked together by pointers. Such data structures may have their integrity verified in accordance with integrity verification techniques.

Access Control and Request Validation: When the GPU receives a message, it is intercepted by the VGM, which decrypts the message and verifies its integrity. Then, it validates the parameters of the request message to ensure that the request in the message can be safely executed. For example, if a client requests a read/write to a local memory location, the GPU should validate that the address and size associated with the memory operation are such that the read or write is constrained to the memory allocated to that client.

GPU Internal Security: The GPU itself should isolate client workloads in its local memory and protect their confidentiality and integrity during execution.

Performance:

The autonomous GPU remoting system described in implementations of the disclosure reduces overall latency since the client can directly communicate with the GPU without going through a remote host that controls the GPU. Since the GPU is autonomous and manages its own resources and is responsible for scheduling, there is additional overhead incurred to perform these tasks (they are traditionally performed by the GPU kernel mode driver on a host machine). In order to handle this additional load without affecting performance, the autonomous GPU might utilize a separate (or more powerful) built-in controller to perform these additional tasks.

FIG. 33 is a flow diagram illustrating a method 3300 for GPU remoting to autonomous GPUs, in accordance with implementations of the disclosure. Method 3300 may be performed by processing logic that may comprise hardware (e.g., circuitry, dedicated logic, programmable logic, etc.), software (such as instructions run on a processing device), or a combination thereof.

More particularly, the method 3300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 3300 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIG. 30-32 may not be repeated or discussed hereafter. In one implementation, a processor, such as an autonomous GPU 3004 described with respect to FIG. 30, may perform method 3300.

Method 3300 begins at block 3310 where a processor may provide a virtual GPU monitor (VGM) to interface over a network with a middleware layer of a client platform, the VGM to interface with the middleware layer using a message passing interface. At block 3320, the processor may configure and expose, by the VGM, virtual functions (VFs) of a GPU to the middleware layer of the client platform.

Subsequently, at block 3330, the processor may intercept, by the VGM, request messages directed to the GPU from the middleware layer, the request messages corresponding to VFs of the GPU to be utilized by the client platform. Lastly, at block 3340, the processor may generate, by the VGM, a response to the request messages for the middleware client.

The following examples pertain to further embodiments of GPU remoting to autonomous GPUs. Example 1 is an apparatus to facilitate GPU remoting to autonomous GPUs. The apparatus of Example 1 comprises a graphics processing unit (GPU) to: provide a virtual GPU monitor (VGM) to interface over a network with a middleware layer of a client platform, the VGM to interface with the middleware layer using a message passing interface; configure and expose, by the VGM, virtual functions (VFs) of the GPU to the middleware layer of the client platform; intercept, by the VGM, request messages directed to the GPU from the middleware layer, the request messages corresponding to VFs of the GPU to be utilized by the client platform; and generate, by the VGM, a response to the request messages for the middleware client.

In Example 2, the subject matter of Example 1 can optionally include wherein the GPU virtualizes resources of the GPU and exposes the resources to the client platform, the resources comprising at least the VFs and memory of the GPU. In Example 3, the subject matter of any one of Examples 1-2 can optionally include wherein the GPU is further to facilitate GPU attestation, GPU encryption, GPU integrity-protection, and verification of data and control messages at the GPU inside of a trusted execution environment (TEE) of the GPU. In Example 4, the subject matter of any one of Examples 1-3 can optionally include wherein the client platform comprises userspace component of a GPU stack, the userspace components comprising an application, a runtime, and user mode driver of the client platform.

In Example 5, the subject matter of any one of Examples 1-4 can optionally include wherein the runtime and user mode driver prepare command buffers and data structures based on instructions from the application. In Example 6, the subject matter of any one of Examples 1-5 can optionally include wherein the command buffers and the data structures to initialize the GPU and to dispatch a workload of the application on the GPU based on instructions from a command streamer of the GPU.

In Example 7, the subject matter of any one of Examples 1-6 can optionally include wherein the client platform comprises a GPU middleware layer to abstract details associated with a network connection between the client platform and the GPU, and wherein the GPU middleware layer to build a device model of the GPU based on the information acquired from the GPU via the VGM. In Example 8, the subject matter of any one of Examples 1-7 can optionally include wherein the VGM exposes a plurality of interfaces to the client platform, the plurality of interfaces comprises at least one of a management interface, a control interface, and a data interface.

Example 9 is a method for facilitating GPU remoting to autonomous GPUs. The method of Example 9 can include providing, by a graphics processing unit (GPU), a virtual GPU monitor (VGM) to interface over a network with a middleware layer of a client platform, the VGM to interface with the middleware layer using a message passing interface; configuring and exposing, by the VGM, virtual functions (VFs) of the GPU to the middleware layer of the client platform; intercepting, by the VGM, request messages directed to the GPU from the middleware layer, the request messages corresponding to VFs of the GPU to be utilized by the client platform; and generating, by the VGM, a response to the request messages for the middleware client.

In Example 10, the subject matter of Example 9 can optionally include wherein the GPU virtualizes resources of the GPU and exposes the resources to the client platform, the resources comprising at least the VFs and memory of the GPU. In Example 11, the subject matter of any one of Examples 9-10 can optionally include wherein the GPU is further to facilitate GPU attestation, encrypting, and integrity-protecting, and verifying data and control messages at the GPU inside of a trusted execution environment (TEE) of the GPU.

In Example 12, the subject matter of any one of Examples 9-11 can optionally include wherein the client platform comprises userspace component of a GPU stack, the userspace components comprising an application, a runtime, and user mode driver of the client platform. In Example 13, the subject matter of any one of Examples 9-12 can optionally include wherein the runtime and user mode driver prepare command buffers and data structures based on instructions from the application.

In Example 14, the subject matter of any one of Examples 9-13 can optionally include wherein the command buffers and the data structures to initialize the GPU and to dispatch a workload of the application on the GPU based on instructions from a command streamer of the GPU. In Example 15, the subject matter of any one of Examples 9-14 can optionally include wherein the client platform comprises a GPU middleware layer to abstract details associated with a network connection between the client platform and the GPU, and wherein the GPU middleware layer to build a device model of the GPU based on the information acquired from the GPU via the VGM. In Example 16, the subject matter of any one of Examples 9-15 can optionally include wherein the VGM exposes a plurality of interfaces to the client platform, the plurality of interfaces comprises at least one of a management interface, a control interface, and a data interface.

Example 17 is a non-transitory machine readable storage medium for facilitating GPU remoting to autonomous GPUs. The non-transitory computer-readable storage medium of Example 17 having stored thereon executable computer program instructions that, when executed by one or more processors, cause the one or more processors to perform operations comprising providing, by a graphics processing unit (GPU) of the at least one processor, a virtual GPU monitor (VGM) to interface over a network with a middleware layer of a client platform, the VGM to interface with the middleware layer using a message passing interface; configuring and exposing, by the VGM, virtual functions (VFs) of the GPU to the middleware layer of the client platform; intercepting, by the VGM, request messages directed to the GPU from the middleware layer, the request messages corresponding to VFs of the GPU to be utilized by the client platform; and generating, by the VGM, a response to the request messages for the middleware client.

In Example 18, the subject matter of Example 17 can optionally include wherein the GPU virtualizes resources of the GPU and exposes the resources to the client platform, the resources comprising at least the VFs and memory of the GPU. In Example 19, the subject matter of any one of Examples 17-18 can optionally include wherein the GPU is further to facilitate GPU attestation, encrypting, and integrity-protecting, and verifying data and control messages at the GPU inside of a trusted execution environment (TEE) of the GPU.

In Example 20, the subject matter of any one of Examples 17-19 can optionally include wherein the client platform comprises userspace component of a GPU stack, the userspace components comprising an application, a runtime, and user mode driver of the client platform. In Example 21, the subject matter of any one of Examples 17-20 can optionally include wherein the runtime and user mode driver prepare command buffers and data structures based on instructions from the application.

In Example 22, the subject matter of any one of Examples 17-21 can optionally include wherein the command buffers and the data structures to initialize the GPU and to dispatch a workload of the application on the GPU based on instructions from a command streamer of the GPU. In Example 23, the subject matter of any one of Examples 17-22 can optionally include wherein the client platform comprises a GPU middleware layer to abstract details associated with a network connection between the client platform and the GPU, and wherein the GPU middleware layer to build a device model of the GPU based on the information acquired from the GPU via the VGM. In Example 24, the subject matter of any one of Examples 17-23 can optionally include wherein the VGM exposes a plurality of interfaces to the client platform, the plurality of interfaces comprises at least one of a management interface, a control interface, and a data interface.

Example 25 is an apparatus for facilitating GPU remoting to autonomous GPUs according to implementations of the disclosure. The apparatus of Example 25 can comprise means for providing, by a graphics processing unit (GPU), a virtual GPU monitor (VGM) to interface over a network with a middleware layer of a client platform, the VGM to interface with the middleware layer using a message passing interface; means for configuring and exposing, by the VGM, virtual functions (VFs) of the GPU to the middleware layer of the client platform; means for intercepting, by the VGM, request messages directed to the GPU from the middleware layer, the request messages corresponding to VFs of the GPU to be utilized by the client platform; and means for generating, by the VGM, a response to the request messages for the middleware client In Example 26, the subject matter of Example 25 can optionally include the apparatus further configured to perform the method of any one of the Examples 10 to 17.

Example 27 is a system for facilitating GPU remoting to autonomous GPUs, configured to perform the method of any one of Examples 9-17. Example 28 is an apparatus for facilitating GPU remoting to autonomous GPUs comprising means for performing the method of any one of claims 9 to 17. Specifics in the Examples may be used anywhere in one or more embodiments.

Protected Management of Network Connected FPGAS

In some embodiments, an apparatus, system, or process is to provide protected management of network-connected FPGAs. In one implementation, protected management component 904 described with respect to FIG. 9 provides the protected management of network-connected FPGAs.

Disaggregated computing is on the rise in data centers. Cloud service providers (CSP) are deploying solutions where processing of a workload is distributed on disaggregated compute resources, such as CPUs and hardware accelerators (including FPGAs), that are connected via network instead of being on the same platform, connected via physical links such as PCIe. This disaggregated computing enables improved resource utilization and lowers costs by enabling making more efficient use of available resources. Disaggregated computing also enables pooling a large number of hardware accelerators for large computation making the computation more efficient and performant.

In particular, CSPs are using network-capable FPGAs in their data centers to allow direct remote communication with the FPGA for efficient data transfers from a remote CPU. In conventional systems, FPGAs are managed by a local host (CPU) to which one or more FPGA may be connected via PCIe.

Modern networks have seen significant improvements in performance bringing their speed and latency in accessing a network connected device closer to that of a local PCIe connected device. This, combined with the growth of disaggregated computing, makes it important to provide a secure and efficient mechanism to allow remote servers to perform full management of network connected devices without utilizing a local CPU. This allows for centralized and efficient management of the devices at lower cost and has other benefits such as improved scalability, ease of upgrade, flexibility in configuration, ease of supporting devices from multiple device vendors etc.

Using PCIe memory mapping in the FPGA and use of PCIe software stack offers flexibility to configure FPGA for use over PCIe or network without custom designs to support different connectivity types.

Figure 34:
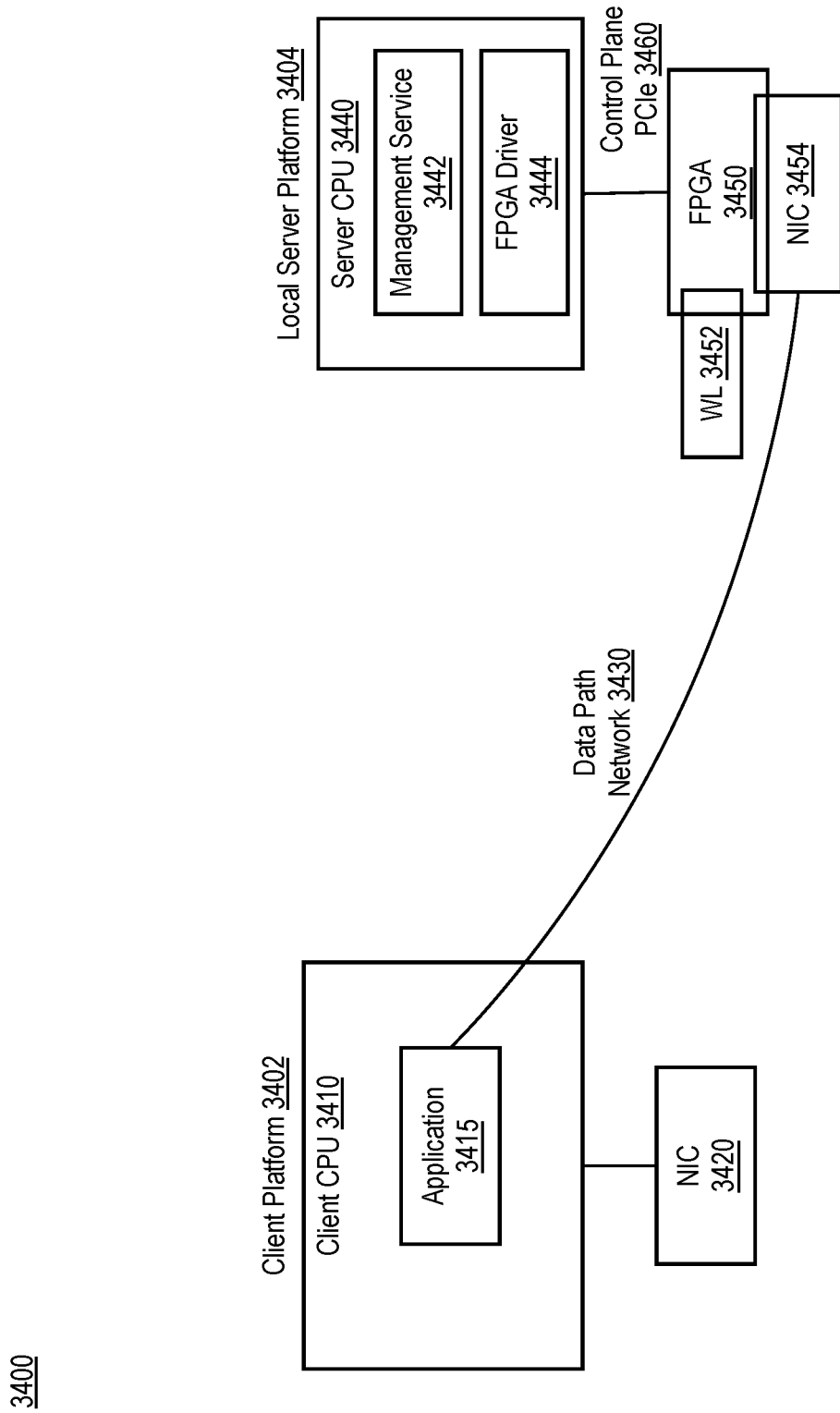
FIG. 34 depicts a network architecture for field programmable gate array (FPGA) management in accordance with implementations of the disclosure.

FIG. 34 depicts a network architecture 3400 for FPGA management in accordance with implementations of the disclosure. As shown in the network architecture 3400, a local host, such as local server platform 3404, configures and manages an FPGA 3450 over PCIe 3460, while a remote client application 3415 hosted by a client CPU 3410 on a client platform 3402 submits workload (data) 3452 directly to the FPGA 3450 over a data path network 3430 using efficient transport protocols, such as RDMA. In one implementations, NICs 3420, 3454 communicate the workload 3452 between the client platform 3402 and the FPGA 3450 using data path network 3430, for example.

Management of the FPGA 3450 includes enumeration of FPGA features, programming the configuration registers, monitoring status, device recovery, etc. Such management may be performed by a management service 3442 in communication with FPGA drivers 3444 by reading and writing into FPGA registers of FPGA 3450 via memory mapped I/O (MMIO). A security sensitive client, running inside a TEE may submit workload securely using secure data transfer protocols such as SSL, TLS or secure RDMA.

Figure 35:
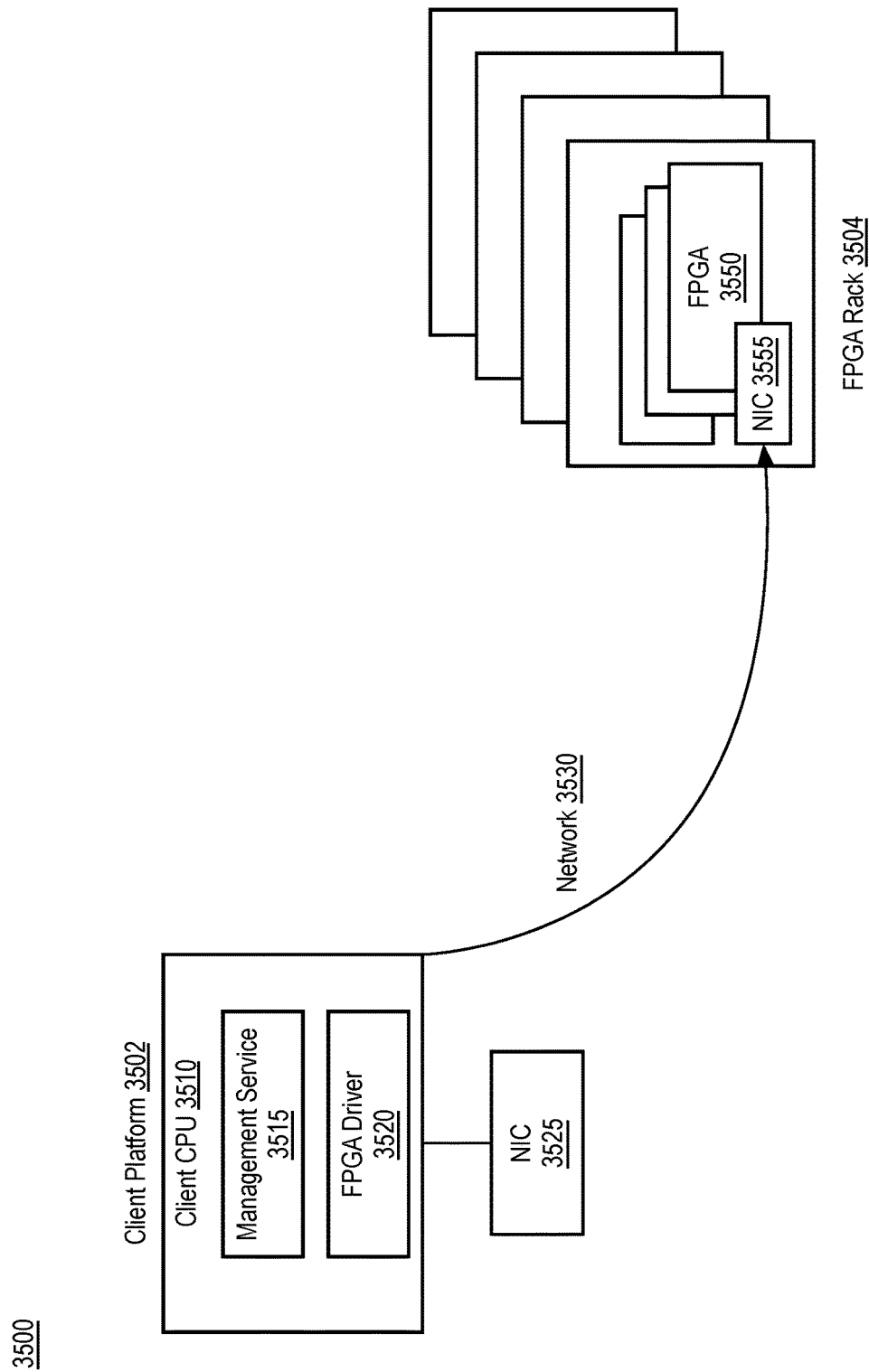
FIG. 35 illustrates a network architecture of central entity management of a rack of FPGAs, in accordance with implementations of the disclosure.

In yet another scenario, the CSP may have a central entity to manage racks of FPGAs in a data center that do not have a local host but have a direct network interface to allow remote management of the FPGA devices. FIG. 35 illustrates a network architecture 3500 of central entity management of a rack of FPGAs, in accordance with implementations of the disclosure.

As shown, an FPGA rack 3504 may include a plurality of FPGAs 3550, each with a corresponding NIC 3555 for communication to and from the associated FPGA 3550. The FPGAs 3550 may have a direct network interface 3530 via the NIC 3555 to a NIC 3525 of the client platform 3502. The client platform 3502 may include a client CPU 3510 hosting a management service 3515 and an FPGA driver 3520 that are both used to perform management of the FPGAs 3550.

In the conventional systems, such as the system depicted in network architecture 3400 of FIG. 34 or network architecture 3500 of FIG. 35, if the host software is compromised, it may misconfigure and/or mis-manage the FPGA that could result in security compromise of client application's workload running on the FPGA. This creates an opportunity for the client application to manage the FPGA directly in a secure and efficient manner and be able to perform the functions as feature enumeration, device configuration, monitoring, recovery etc. via direct network interface into the device.

As such, a technical problem encountered by conventional systems is how to enable secure management of remote PCIe-based FPGAs through a direct network interface into the device, while reusing the existing PCIe driver stack that would run on the client platform and manage the remote FPGA as if it were a local FPGA.

Implementations of the disclosure address this technical problem by providing a technique to issue protected MMIO messages to PCI MMIO configuration space on a remote FPGA for management. Implementations of the disclosure introduce a component in the FPGA called a 'Remote management controller' that parses packetized management commands and issues memory transactions on the internal bus for register read/writes similar to an MMIO request issued by a local host. The 'Remote management controller' also returns response to the remote host such as status of register write command or result of register read command.

Implementations of the disclosure further provide for an entity that runs on the client platform called a 'Remote-MMIO driver', which packetizes the MMIO commands transparently and sends it to the remote FPGA via network transport protocol such as RDMA or TCP-IP. This allows the remote device to appear as a locally connected PCIe device to the upper layers of the drivers, allowing reuse of existing PCIe driver stack for device management.

Implementations of the disclosure can be applied to several different use cases such as: (1) Use by a trusted client application that wants to directly manage the remote device it may be offloading workload to. This would allow the client app to and exclude the locally connected CPU from the trust boundary by issuing device configuration commands directly to the FPGA. (2) Use by a centralized orchestrator that is responsible for configuring and managing standalone FPGAs directly over network.

Implementations of the disclosure address the use case where a centralized orchestrator has a FPGA management service that is responsible for remotely managing racks of network connected FPGAs as shown in the FIG. 35. This is applicable to both virtualized/non-virtualized environments. In either case, the orchestration should run inside a TEE (such as Intel® SGX, Intel® TDX, or AMD® SEV) to ensure the memory is protected during execution that allow MMIO commands to retain integrity when they are prepared for transfer to the FPGA.

Figure 36:
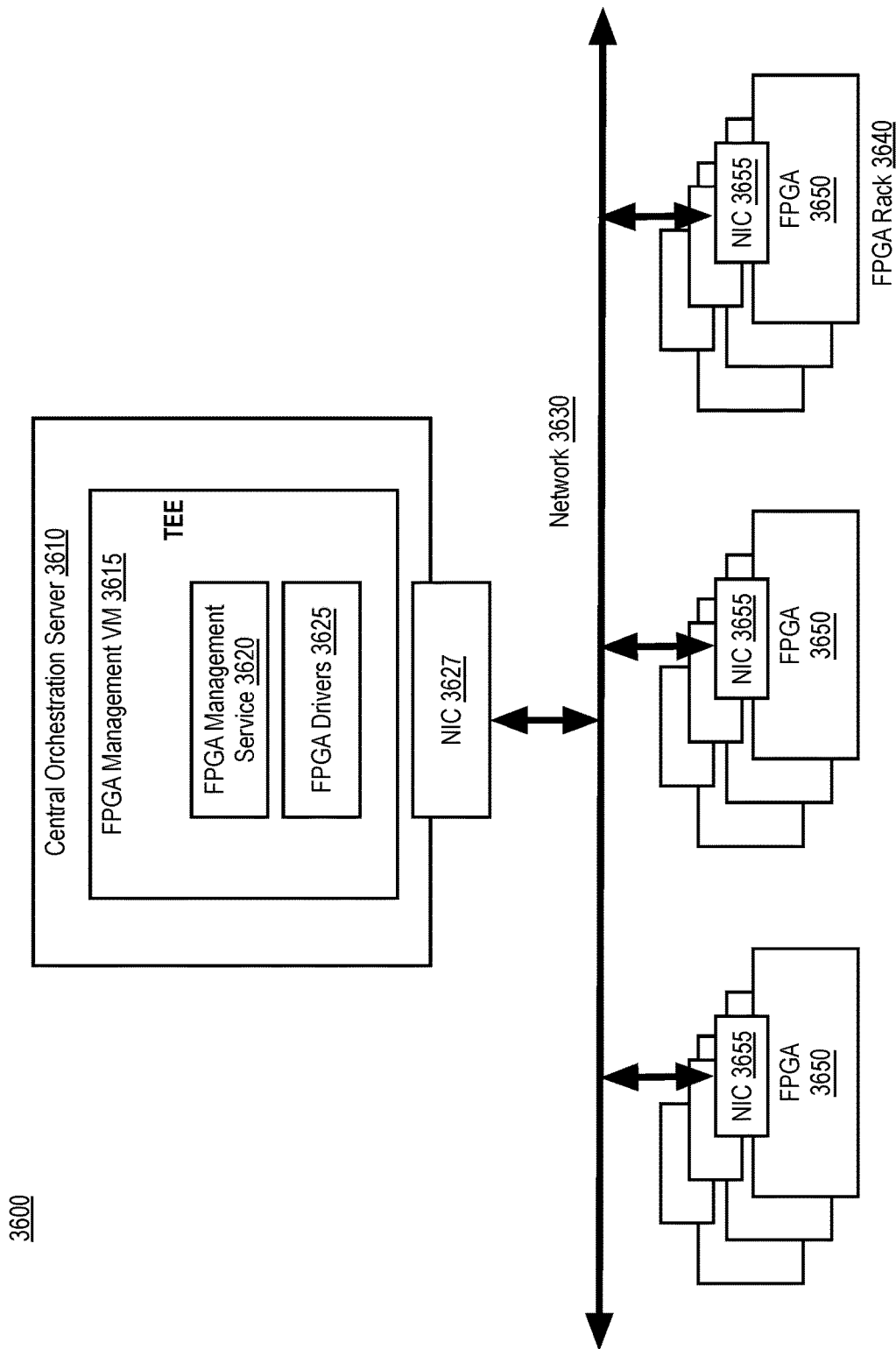
FIG. 36 depicts a network environment for protected management of network-connected FPGAs, in accordance with implementations of the disclosure.

FIG. 36 depicts a network environment 3600 for protected management of network-connected FPGAs, in accordance with implementations of the disclosure. Network environment 3600 includes a central orchestration server 3610 that includes an orchestrator, such as FPGA management VM 3615, that is running in a virtualized environment. The FPGA management VM 3615 is protected from privileged software threats by use of a TEE (such as Intel® TDX or AMD® SEV). The central orchestration server 3610 may be communicably coupled to a plurality of FPGAs 3650 over network 3630. FPGA management VM 3615 may include an FPGA management server 3620 to manage the FPGAs 3650 of an FPGA rack 3640 via FPGA drivers 3625 in communication with FPGAs 3650 over NICs 3627, 3655.

Figure 37:
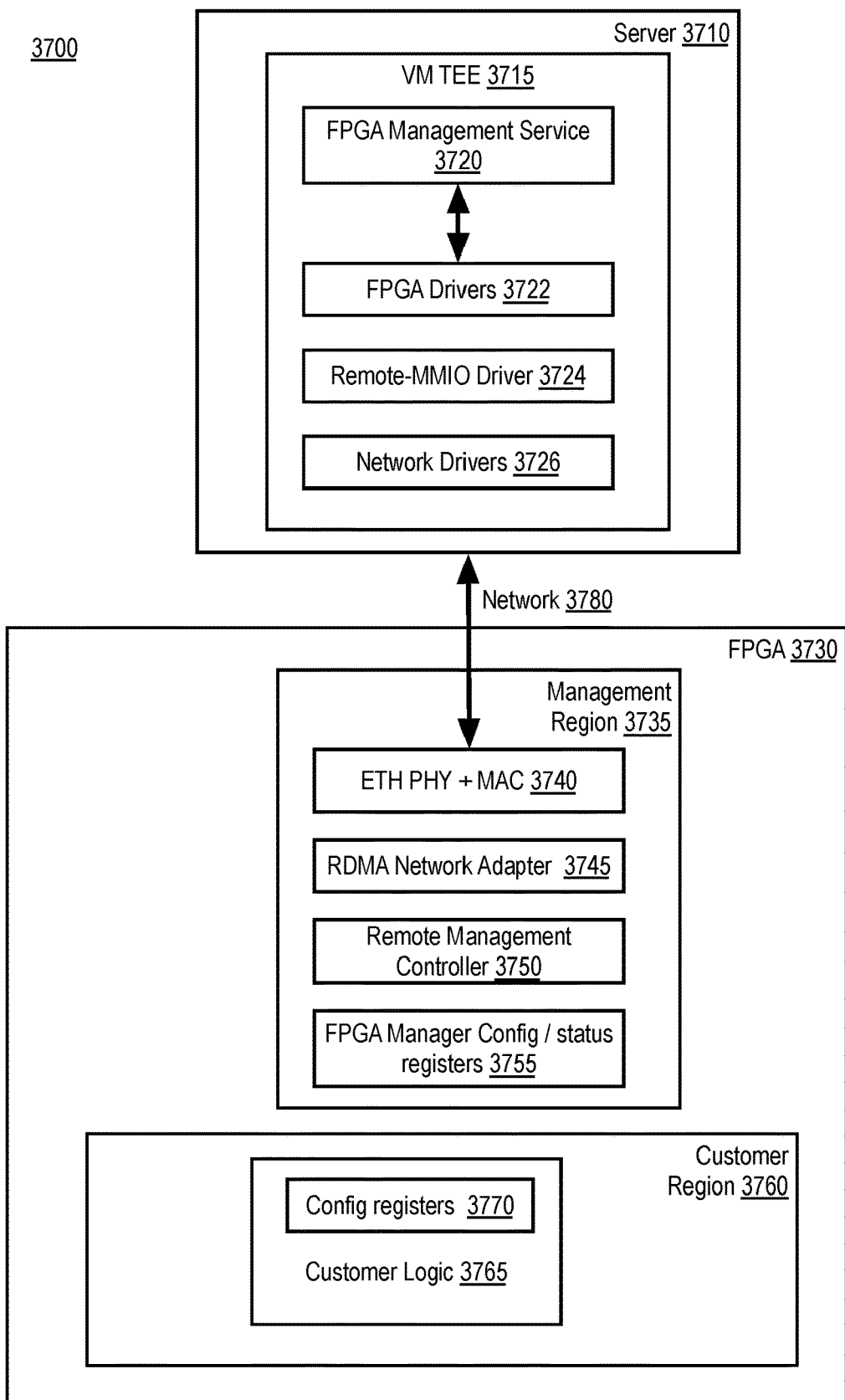
FIG. 37 depicts a network environment for protected management of network-connected FPGAs, in accordance with implementations of the disclosure.

FIG. 37 depicts a network environment 3700 for protected management of network-connected FPGAs, in accordance with implementations of the disclosure. depicts a network environment 3700 for protected management of network-connected FPGAs, in accordance with implementations of the disclosure. Network environment 3700 may be the same as network environment 3600 described with respect to FIG. 36. For example, the server 3710 may be the same as central orchestration server 3610 described with respect to FIG. 36, and VM TEE may be the same as FPGA management VM 3615 described with respect to FIG. 36.

Network environment 3700 further depicts components of an FPGA management VM and an FPGA in order to provide for protected management of network-connected FPGAs in implementations of the disclosure. Server 3710 may be communicably coupled, via network 3780, to a remote FPGA 3720, which may be the same as FPGA 3650 described with respect to FIG. 36.

In one implementation, VM TEE 37'5 may include FPGA management service 3720 (which may be the same as FPGA management service 3620 of FIG. 36) communicably coupled to FPGA drivers 3722 (which may be the same as FPGA drivers 3625 of FIG. 36). VM TEE 3715 may further include remote-MMIO driver 3724 and network drivers 3726.

Remote-MMIO driver 3724 may refer to a driver that runs on an orchestrator platform (e.g., VM TEE 3715) in order to manage the remote FPGA 3730. In one implementation, the remote-MMIO driver 3724 exposes the remote FPGA device 3730 as a legacy device, such as a legacy PCIe device, to the upper level FPGA drivers 3722. The remote-MMIO driver 3724 has two functions: (1) enumeration, and (2) handling remote MMIO reads/writes.

With respect to enumeration, the remote-MMIO driver 3724 is responsible for enumeration of the remote FPGA's 3730 PCIe configuration space and device management features. The remote MMIO driver 3724 performs initial enumeration of the network FPGA 3730, similar to the role played by the PCIe driver, with the help of a remote management controller 3750 IP (e.g., soft or hard logic) inside the FPGA 3730. The remote management controller 3750 provides information about PCIe configuration space and device details including the size of base address register (BAR) regions that are utilized by the FPGA 3730. In some implementations, this information is stored in a FPGA manager configuration/status registers 3755 in a management region (e.g., management code) 3735 of the FPGA 3730. The remote MMIO driver 3724 also walks through FPGA enumeration data to determine what features are supported by the FPGA device 3730. The remote-MMIO driver 3724 then loads the corresponding function drivers and creates corresponding device files representing the enumerated BAR regions. The remote-MMIO driver 3724 also stores a copy of the MMIO register space of the device.

With respect to handling remote MMIO reads and writes, the remote-MMIO driver 3724 receives MMIO read and write requests from an upper driver stack and performs remote MMIO reads and writes. The remote MMIO driver 3724 does this by converting MMIO requests from a host driver on the orchestrator platform (e.g., VM TEE 3715) into remote MMIO request, packetize them and sends them to the FPGA 3730 directly via network transport protocol such as RDMA (e.g., if the NIC on the FPGA is RDMA capable).

MMIOs to remote FPGA cannot be performed using MOV instructions. As such, all MMIO requests targeted for remote FPGA should go through the remote-MMIO driver 3724, which exposes well-defined MMIO read/writes interface to the upper level stack. Remote MMIOs are atomic operations (unlike MOV instruction) and incur network transfer latencies as well as robustness limitations (e.g. dropped packets). This means that the orchestrator manager should check the response to each MMIO requests to confirm it was completed successfully. Any failures can be reported back in the status. The failures may include standard failures such as invalid address, returned by remote management controller or new network related failures. For certain writes, the software may read back the registers to confirm the MMIO Write was completed.

The remote management controller 3750 is an IP within the FPGA 3730 that receives MMIO command packets over the network 3780 and supports requests from the remote-MMIO driver 3724. The supported requests may include requests for enumeration of PCIe configuration space and device management features, and requests for performing MMIO reads/writes coming over the network.

The remote management controller 3750 parses the network MMIO request and performs the corresponding memory read/writes to the FPGA registers 3770, which include configuration registers 3770 maintained as part of customer logic 3765 (e.g., tenant bitstream) maintained in a customer region (e.g., PR region). For an MMIO writes, the remote management controller 3750 returns a status indicating success or failure of write request. In case of MMIO reads, the remote management controller 3750 returns the read response over network to the requesting server.

The design of the remote management controller 3750 can include a message parser that can initiate requested register read/write requests over the internal bus, and a buffer for storing RDMA messages.

Implementations of the disclosure further include a data structure having PCI configuration layout and BAR size information. This data structure is populated at the time of design and synthesis by an FPGA bitstream designer, for example. FIG. 38 depicts one example of a data structure 3800 with PCIe configuration information for protected management of network-connected FPGAs, in accordance with implementations of the disclosure.

In implementations of the disclosure, the mechanism for protected transfer of MMIO request and response between the orchestrator server and the FPGA can be done via TLS, secure-RDMA, and so on. Implementations of the disclosure do not dictate use of a specific transport mechanism and a variety of transport mechanisms may be implemented.

As noted previously, RDMA is an efficient protocol for remote data transfer that moves data from of memory of one compute device to memory of another compute device that are network connected, bypassing kernel stack and with zero copy. This is accomplished by means of a dedicated RDMA IP or a RDMA capable NIC on the device as well as on the host to assist with the transfers. RDMA protocol supports different transfer transactions such as RDMA Send, RDMA Read and RDMA Write.

In implementations of the disclosure, the orchestrator manager and remote FPGA can first establish an RDMA connection by configuring RDMA NICs on the two ends. The configuration should happen securely and all the configuration messages between the CPU and the FPGA should be integrity protected using a shared secret key. The shared secret key may be established using one of the standard attestation and key exchange protocols such a Diffie Hellman or SPDM 1.1. In the discussion herein, it is assumed that two sides have configured RDMA securely and are able to perform protected data transfers that provides confidentially, integrity and replay protection.

Implementations of the disclosure utilize RDMA Sends to transfer the packetized MMIO commands. RDMA Send messages are analogous to transfers over sockets in which data is sent over the network as a message to an untagged buffer on the recipient side. It is up to the recipient to decide where the message gets stored.

Figure 39:
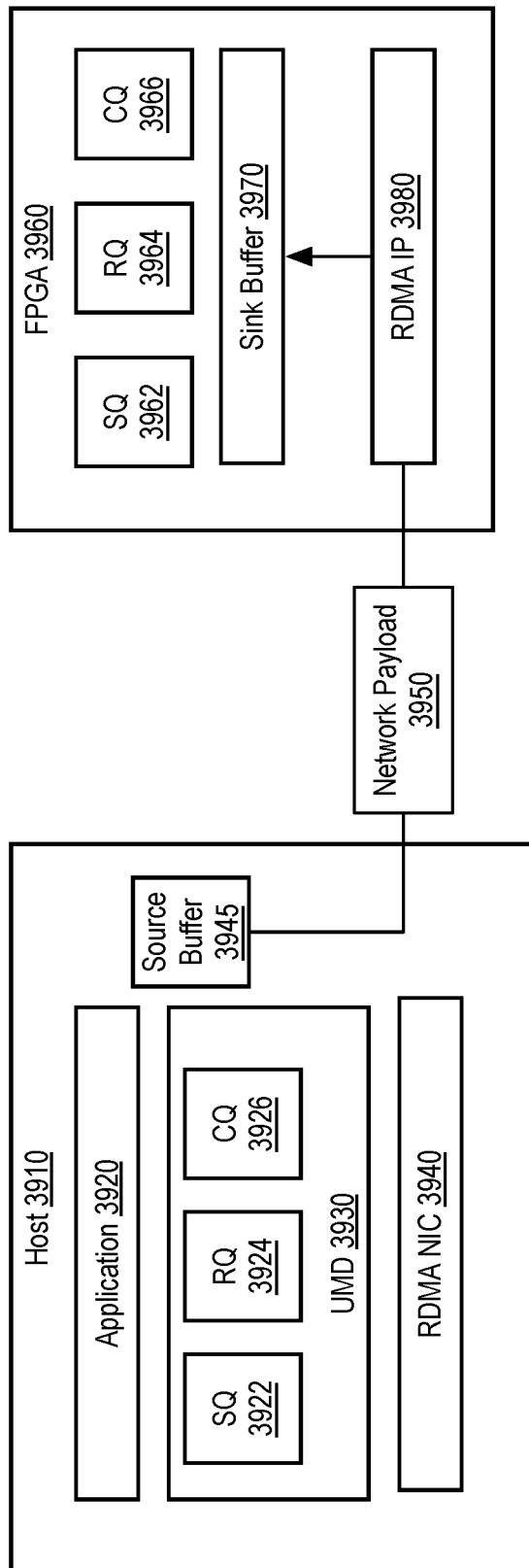
FIG. 39 illustrates a network environment for performing an RDMA Send operation, in accordance with implementations of the disclosure.

FIG. 39 illustrates a network environment 3900 for performing an RDMA Send operation, in accordance with implementations of the disclosure. Network environment 3900 includes a network payload 3950 communicated via an RDMA Send between a host 3910 and an FPGA 3960, in accordance with implementations of the disclosure. Host 3910 includes an application 3920, a UMD 3930, and an RDMA NIC 3940. UMD 3930 maintains queue for RDMA transactions, including a send queue (SQ) 3922, receive queue (RQ) 3924, and a completion queue (CQ) 3926. FPGA 3960 also includes RDMA transaction queues, including SQ 3962, RQ 3964, and CQ 3366. FPGA 3960 also includes an RDMA IP 3980 used for RDMA transactions, e.g., to receive network payload 3950 communicated via an RDMA transaction.

While RDMA Reads and Writes are directed to specific memory addresses, RDMA Send to an untagged buffer 3945, 3970 allows the host 3910 to send a command-header message with details about where the packet is headed to the FPGA 3960 and vice versa. The FPGA 3960 parses the message, obtains the target address, and forwards the message to the correct memory location. This effectively sets up a MMIO Read/Write protocol between the two endpoints.

The above concept is used for remote-MMIOs in which the Remote-MMIO driver on the Orchestrator platform and the Remote Management Controller on the FPGA serve as two endpoints for transferring and receiving messages encapsulated with MMIO payload over RDMA Send.

The following sections describe the enumeration flows followed by the remote-MMIO Write and Read flows.

Enumeration Flow:

PCIe Configuration Space and BAR Regions:

(1) It is assumed that the initial connection/network configuration between the two endpoints has already been established. This can be via standard network handshake mechanisms. The central orchestrator would maintain a database of accelerators and details utilized for establishing connection.

(2) The remote-MMIO driver 3724 is loaded which issues a message using RDMA send to the FPGA 3730. The Command field is set to 'Enum' (Enumeration request).

(3) The remote management controller 3750 receives the message, parses the command field and sends the stored blob representing the PCIe configuration space. (Every PCIe device should have, by default, a PCIe configuration space stored in device as part of the register set).

(4) BAR region sizes and BAR address registers are stored locally by the remote MMIO driver 3724.

(5) The remote MMIO driver 3724 creates device files representing the different BAR regions. This is similar to what the FPGA PCIe driver would do. The remote MMIO driver 3724 can create a virtual PCIe device if the operating system mechanisms allow that. Alternatively, the remote MMIO driver 3724 can create device files, as described here, representing MMIO regions for the FPGA feature drivers 3722 to access.

Device Management Features (1) The remote MMIO driver 3724 issues RDMA sends with command field 'MMIO Rd' to walk the device feature tree.

(2) The remote management controller 3750 parses the command field and issues a memory read request to the respective configuration register and responds back with the data requested.

(3) The remote MMIO driver 3724 then loads the corresponding FPGA feature driver 3722, which then performs any sub-feature enumeration or configuration using MMIO read/write interfaces.

(4) The feature drivers 3722 expose a management API for an orchestrator application to manage the FPGA.

MMIO Write Flow and Read Flow

Figure 40:
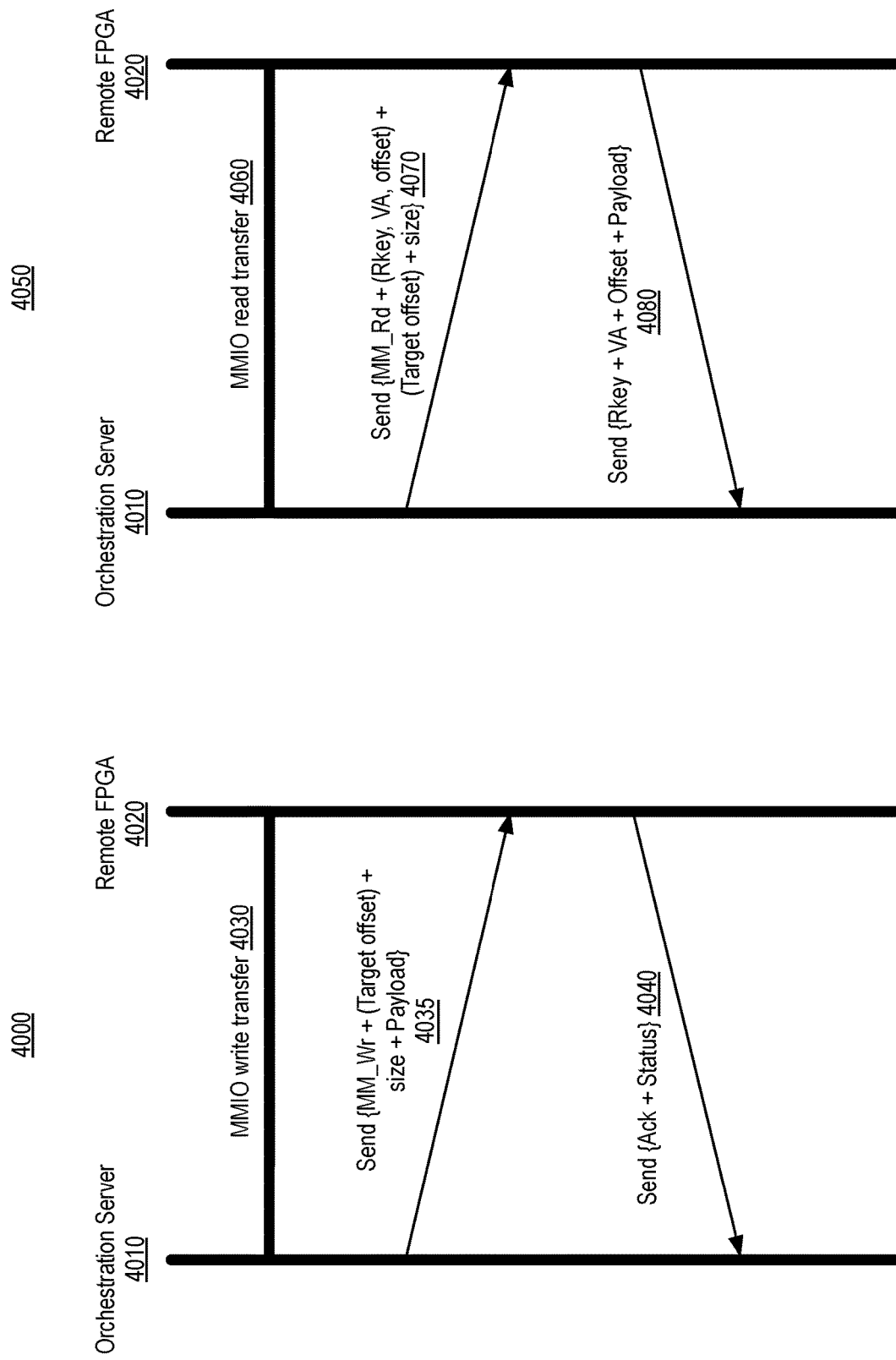
FIG. 40 illustrates MMIO transfers between an orchestration server and a remote FPGA, in accordance with implementations of the disclosure.

FIG. 40 illustrates MMIO transfers 4000 between an orchestration server 4010 and a remote FPGA 4020 in accordance with implementations of the disclosure. MMIO transfers 4000 include MMIO write transfer 4030 depicted on the left side of FIG. 40, and MMIO read transfer 4060 on the right side of FIG. 40.

Referring to FIG. 40, a MMIO write transfer 4030 includes operations 4035, 4040. An example of the packet structure for a MMIO write transfer is as follows:

MM_Wr—Command field referring to a MMIO write transfer

Target_offset—Offset address of the target MMIO configuration register

Bar_region—Details about which bar region to send to

Size—Transfer size at granularity of 32 bits/64 bits transfers as supported by the device. Bigger size transfers are divided into 32/64 bit transfers by the remote-MMIO manager.

Payload—The MMIO write payload to be written to the configuration register.

(1) An orchestrator application issues a management request using a management API provided by the feature drivers.

(2) The feature drivers issue a MMIO Write request corresponding to the orchestrators request targeted to the device file created during enumeration.

(3) Remote MMIO driver notes that this device file corresponds to a network device and packetizes the MMIO request within a RDMA send command using the format mentioned above. The Remote MMIO driver issues RDMA send to the FPGA device (4) Remote management controller receives the message and stores it in internal buffer. It parses the message fields and forwards a memory write request to the configuration register.

(5) On successful write the remote management controller returns an RDMA send with command field for acknowledgement. On a timeout or any other error, the RDMA send response is sent with the error field describing the error.

Referring to FIG. 40, a MMIO read transfer 4060 includes operations 4070, 4080. An example of the packet structure for a MMIO read transfer is as follows:

MM_Rd—Command field referring to a MMIO read transfer

Target_offset—Offset address of the target MMIO configuration register to read from.

Bar_region—Details about which bar region to send to

Size—Transfer size at granularity of 32 bits/64 bits transfers as supported by the device. Bigger size transfers are divided into 32/64 bit transfers by the Remote Management Controller.

Rkey+VA+offset—Address information about the host buffer (1) AN orchestrator application issues a management request using the management API provided by the feature drivers.

(2) The feature drivers issue a MMIO Read request corresponding to the orchestrators request targeted to the device file created during enumeration.

(3) Remote MMIO driver notes that this device file corresponds to a network device and packetizes the MMIO request within a RDMA send command using the format mentioned above. The Remote MMIO driver issues RDMA send to the FPGA device (4) Remote management controller receives the message and stores it in internal buffer. It parses the message fields and forwards a memory read request to the configuration register.

(5) On successful read of the data the remote management controller returns a RDMA send with the data payload. On a timeout or any other error, the RDMA send response is sent with the error field describing the error.

Figure 41:
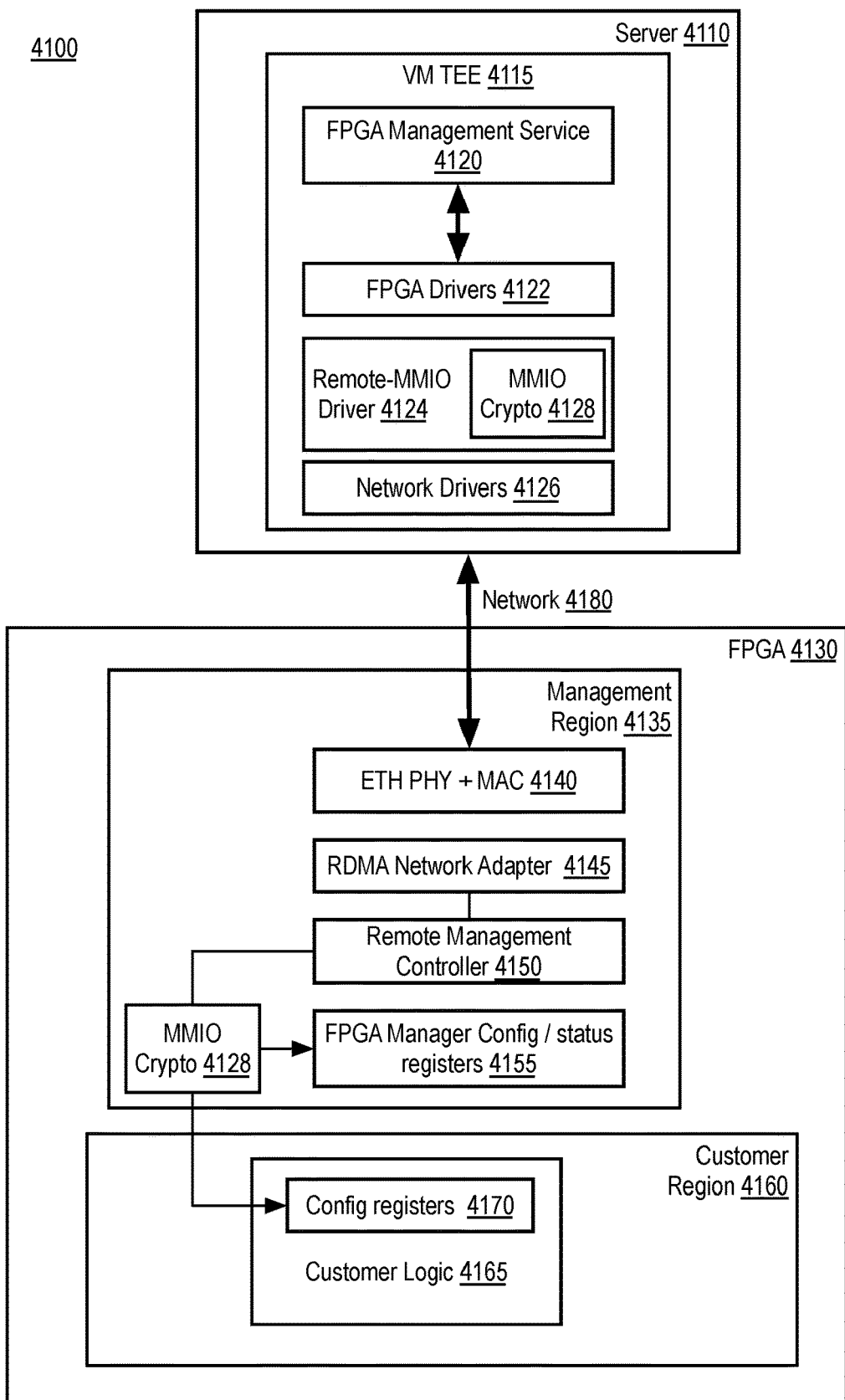
FIG. 41 illustrates a network environment for extending a secure data transfer interface between FPGA and secure enclave for Protected Remote-MMIO, in accordance with implementations of the disclosure.

FIG. 41 details a network environment 4100 for extending a secure data transfer interface between FPGA and secure enclave for protected remote MMIO driver, in accordance with implementations of the disclosure. In one implementations, network environment 4100 is the same as network environment 3700 described with respect to FIG. 37. As such, the description of components of network environment 3700 that are similarly named to components of network environment 4100 are applicable to the description herein of network environment 4100.

In implementations of the disclosure, the feature drivers, such as network drivers 4126, issue MMIO requests to the remote MMIO driver 4124 which forwards them using RDMA Send. Also, as the remote management controller 4150 converts the RDMA Send requests over the network 4180 to memory transactions targeting the configuration registers 4170 within customer logic 4165 (e.g., tenant bitstream) of customer region 4160 (e.g., PR region), these are intercepted by the MMIO crypto IPs 4128 before being forwarded onto the registers 4155, 4170.

Some protocols rely on MMIOs being sent in specific order. In those cases, if the RDMA Sends are sent over an unreliable protocol (e.g., UDP) the ordering of the RDMA Sends may not be maintained or individual packets may be dropped. Also, for reliable transport mechanisms in which order is maintained, a protected MMIO may experience high latency s each 'Protected MMIO' is sent as multiple MMIOs, which results in multiple RDMA sends for this design. A possible optimization in such scenarios is for the RDMA Send message to contain multiple MMIO requests bundled together. For example, for Protected MMIO write, the RDMA send can bundle the MMIO write with Authentication tag data and the MMIO write consisting of the actual payload. The remote management controller can issue multiple memory transactions.

The max size of MMIO requests between the remote MMIO driver and the remote management controller can be decided via an initial handshake between this agent over RDMA send. Such optimizations can be done for other cases as well in which a feature driver is attempting to read an entire feature consisting of multiple MMIO registers.

Figure 42:
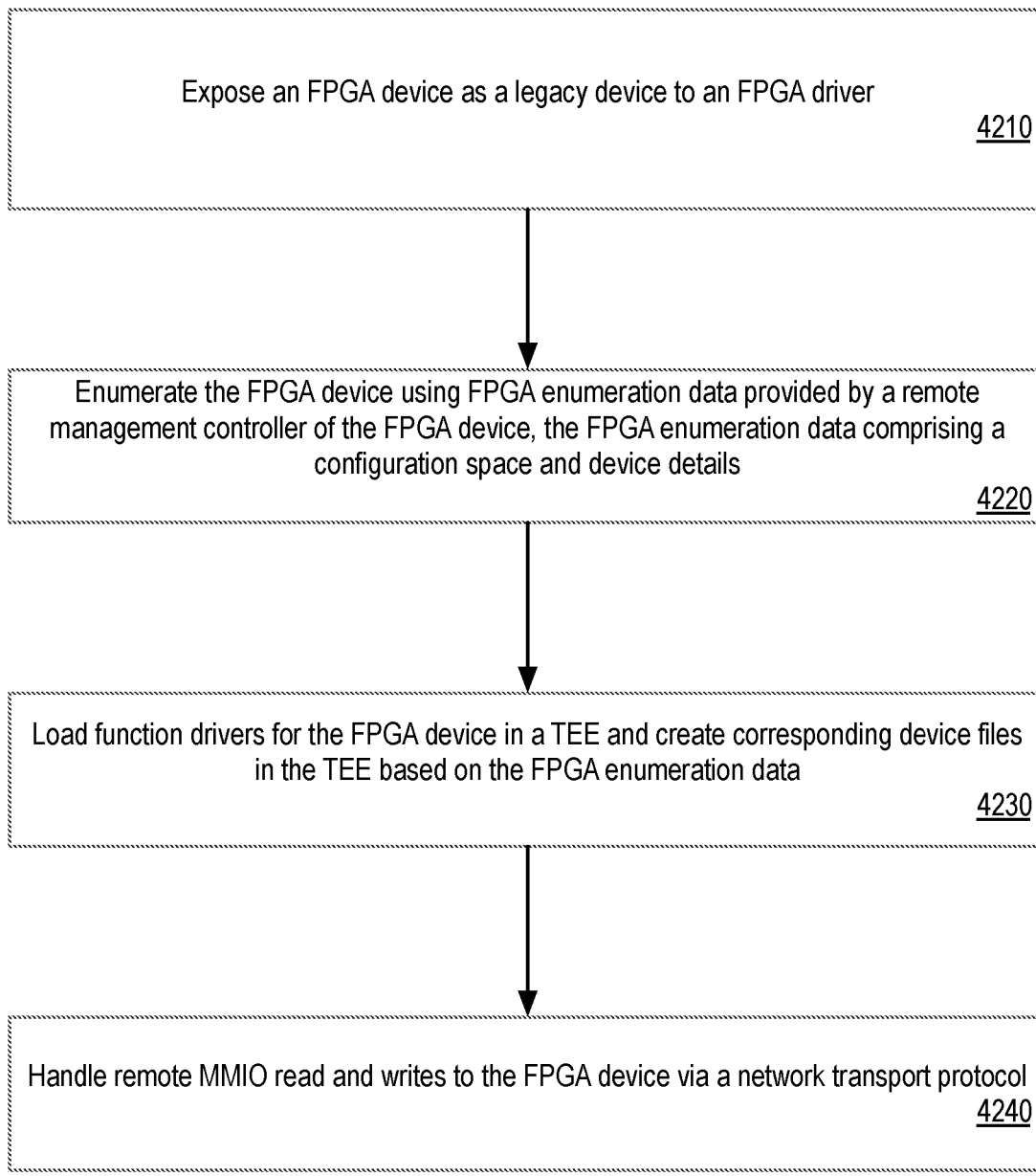
FIG. 42 depicts a flow diagram illustrating a method for protected management of network-connected FPGAs, in accordance with implementations of the disclosure.

FIG. 42 is a flow diagram illustrating a method 4200 for protected management of network-connected FPGAs, in accordance with implementations of the disclosure. Method 4200 may be performed by processing logic that may comprise hardware (e.g., circuitry, dedicated logic, programmable logic, etc.), software (such as instructions run on a processing device), or a combination thereof. More particularly, the method 4200 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 4200 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 34-41 may not be repeated or discussed hereafter. In one implementation, a processor of a server, such as server 3710 implementing a remote-MMIO driver 3724 described with respect to FIG. 37, may perform method 4200.

Method 4200 begins at block 4210 where a processor may expose an FPGA device as a legacy device to an FPGA driver. At block 4220, the processor may enumerate the FPGA device using FPGA enumeration data provided by a remote management controller of the FPGA device, the FPGA enumeration data comprising a configuration space and device details.

Subsequently, at block 4230, the processor may load function drivers for the FPGA device in a TEE and create corresponding device files in the TEE based on the FPGA enumeration data. Lastly, at block 4240, the processor may handle remote MMIO read and writes to the FPGA device via a network transport protocol.

The following examples pertain to further embodiments of protected management of network-connected FPGAs. Example 1 is an apparatus to facilitate protected management of network-connected FPGAs. The apparatus of Example 1 comprises a trusted execution environment (TEE) comprising: a field-programmable gate array (FPGA) driver to interface with an FPGA device that is remote to the apparatus; and a remote memory-mapped input/output (MMIO) driver to expose the FPGA device as a legacy device to the FPGA driver, the remote MMIO driver to: enumerate the FPGA device using FPGA enumeration data provided by a remote management controller of the FPGA device, the FPGA enumeration data comprising a configuration space and device details; load function drivers for the FPGA device in the TEE and create corresponding device files in the TEE based on the FPGA enumeration data; and handle remote MMIO reads and writes to the FPGA device via a network transport protocol.

In Example 2, the subject matter of Example 1 can optionally include wherein the legacy device comprises a peripheral component interconnect express (PCIe) device. In Example 3, the subject matter of any one of Examples 1-2 can optionally include wherein the FPGA enumeration data comprises a size of a base address register (BAR) regions utilized by the FPGA device. In Example 4, the subject matter of any one of Examples 1-3 can optionally include wherein the remote MMIO driver creates the corresponding device files representing the BAR regions of the FPGA device.

In Example 5, the subject matter of any one of Examples 1-4 can optionally include wherein the remote MMIO drive to handle remote MMIO reads and writes further comprises: converting a MMIO request, received from a host driver of the TEE, comprising at least one of the remote MMIO reads and writes into a remote MMIO request; packetizing the remote MMIO request; and sending the packetized remote MMIO request to the FPGA device directly via the network transport protocol. In Example 6, the subject matter of any one of Examples 1-5 can optionally include wherein the network transport protocol comprises remote direct memory access (RDMA).

In Example 7, the subject matter of any one of Examples 1-6 can optionally include wherein the remote management controller of the FPGA is to: receive the packetized remote MMIO request; parse the packetized remote MMIO request; perform a corresponding memory read or write to registers of the FPGA device; and return a status message indicating success or failure of the corresponding memory write or indicating a read response. In Example 8, the subject matter of any one of Examples 1-7 can optionally include wherein the remote management controller comprises a message parser to initiate memory read and write requests to the FPGA device and a buffer for storing messages.

Example 9 is a method for facilitating protected management of network-connected FPGAs. The method of Example 9 can include enumerating, by a remote memory-mapped input/output (MMIO) driver of a trusted execution environment (TEE), a field-programmable gate array (FPGA) device using FPGA enumeration data provided by a remote management controller of the FPGA device, the FPGA enumeration data comprising a configuration space and device details; loading, by the remote MMIO driver, function drivers for the FPGA device in the TEE and create corresponding device files in the TEE based on the FPGA enumeration data; and handling, by the remote MMIO driver, remote MMIO reads and writes to the FPGA device via a network transport protocol, wherein an FPGA driver to interface with an FPGA device.

In Example 10, the subject matter of Example 9 can optionally include wherein the legacy device comprises a peripheral component interconnect express (PCIe) device. In Example 11, the subject matter of any one of Examples 9-10 can optionally include wherein the FPGA enumeration data comprises a size of a base address register (BAR) regions utilized by the FPGA device. In Example 12, the subject matter of any one of Examples 9-11 can optionally include wherein the remote MMIO driver creates the corresponding device files representing the BAR regions of the FPGA device.

In Example 13, the subject matter of any one of Examples 9-12 can optionally include wherein the remote MMIO drive to handle remote MMIO reads and writes further comprises: converting a MMIO request, received from a host driver of the TEE, comprising at least one of the remote MMIO reads and writes into a remote MMIO request; packetizing the remote MMIO request; and sending the packetized remote MMIO request to the FPGA device directly via the network transport protocol. In Example 14, the subject matter of any one of Examples 9-13 can optionally include wherein the network transport protocol comprises remote direct memory access (RDMA).

In Example 15, the subject matter of any one of Examples 9-14 can optionally include wherein the remote management controller of the FPGA is to: receive the packetized remote MMIO request; parse the packetized remote MMIO request; perform a corresponding memory read or write to registers of the FPGA device; and return a status message indicating success or failure of the corresponding memory write or indicating a read response. In Example 16, the subject matter of any one of Examples 9-15 can optionally include wherein the remote management controller comprises a message parser to initiate memory read and write requests to the FPGA device and a buffer for storing messages.

Example 17 is a non-transitory machine readable storage medium for facilitating protected management of network-connected FPGAs. The non-transitory computer-readable storage medium of Example 17 having stored thereon executable computer program instructions that, when executed by one or more processors, cause the one or more processors to perform operations comprising enumerating, by a remote memory-mapped input/output (MMIO) driver of a trusted execution environment (TEE) comprising the at least one processor, a field-programmable gate array (FPGA) device using FPGA enumeration data provided by a remote management controller of the FPGA device, the FPGA enumeration data comprising a configuration space and device details; loading, by the remote MMIO driver, function drivers for the FPGA device in the TEE and create corresponding device files in the TEE based on the FPGA enumeration data; and handling, by the remote MMIO driver, remote MMIO reads and writes to the FPGA device via a network transport protocol, wherein an FPGA driver to interface with an FPGA device.

In Example 18, the subject matter of Example 17 can optionally include wherein the legacy device comprises a peripheral component interconnect express (PCIe) device. In Example 19, the subject matter of any one of Examples 17-18 can optionally include wherein the FPGA enumeration data comprises a size of a base address register (BAR) regions utilized by the FPGA device. In Example 20, the subject matter of any one of Examples 17-19 can optionally include wherein the remote MMIO driver creates the corresponding device files representing the BAR regions of the FPGA device.

In Example 21, the subject matter of any one of Examples 17-20 can optionally include wherein the remote MMIO drive to handle remote MMIO reads and writes further comprises: converting a MMIO request, received from a host driver of the TEE, comprising at least one of the remote MMIO reads and writes into a remote MMIO request; packetizing the remote MMIO request; and sending the packetized remote MMIO request to the FPGA device directly via the network transport protocol. In Example 22, the subject matter of any one of Examples 17-21 can optionally include wherein the network transport protocol comprises remote direct memory access (RDMA).

In Example 23, the subject matter of any one of Examples 17-22 can optionally include wherein the remote management controller of the FPGA is to: receive the packetized remote MMIO request; parse the packetized remote MMIO request; perform a corresponding memory read or write to registers of the FPGA device; and return a status message indicating success or failure of the corresponding memory write or indicating a read response. In Example 24, the subject matter of any one of Examples 17-23 can optionally include wherein the remote management controller comprises a message parser to initiate memory read and write requests to the FPGA device and a buffer for storing messages.

Example 25 is an apparatus for facilitating protected management of network-connected FPGAs according to implementations of the disclosure. The apparatus of Example 25 can comprise means for enumerating, by a remote memory-mapped input/output (MMIO) driver of a trusted execution environment (TEE), a field-programmable gate array (FPGA) device using FPGA enumeration data provided by a remote management controller of the FPGA device, the FPGA enumeration data comprising a configuration space and device details; means for loading, by the remote MMIO driver, function drivers for the FPGA device in the TEE and create corresponding device files in the TEE based on the FPGA enumeration data; and means for handling, by the remote MMIO driver, remote MMIO reads and writes to the FPGA device via a network transport protocol, wherein an FPGA driver to interface with an FPGA device. In Example 26, the subject matter of Example 25 can optionally include the apparatus further configured to perform the method of any one of the Examples 10 to 16.

Example 27 is a system for facilitating protected management of network-connected FPGAs, configured to perform the method of any one of Examples 9-16. Example 28 is an apparatus for facilitating protected management of network-connected FPGAs comprising means for performing the method of any one of claims 9 to 16. Specifics in the Examples may be used anywhere in one or more embodiments.

Enforcement of CSP Policy for FPGA Usage by Tenant Bitstream

In some embodiments, an apparatus, system, or process is to provide for enforcement of CSP policy for FPGA usage by tenant bitstream. In one implementation, FPGA usage policy component 905 described with respect to FIG. 9 provides the enforcement of CSPs policy for FPGA usage by tenant bitstream.

In implementations of the disclosure, an FPGA is specifically discussed. However, any type of programmable logic integrated circuit (IC) (also referred to as a programmable IC) may utilize implementations of the disclosure and implements are not specifically limited to utilization in an FPGA environment. Examples of programmable logic ICs include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. However, for ease of discussion and illustration, the specific example of an FPGA is described herein.

CSPs offer use of their FPGAs to cloud customers for accelerating customer workloads for applications, such as inferencing, training, analytics and others. The use conditions (i.e., use policy) provided by CSPs may dictate policies such as how long the FPGA is available for the customer use, which features the customer is allowed to use (e.g., networking), how much resources the customer may be allowed to use (e.g., memory, number of partially reconfigurable regions), and so on. The use policy may be different for different customers based on business and financial agreement. A CSP can enforce the use policy during execution to ensure that a potentially malicious tenant cannot exploit system vulnerabilities to bypass the use policies. Violation of a use policy has financial implications, such as use of FPGA without paying for additional time, as well as other implications such as adversely impacting resource availability to other tenants, safe operation of FPGA by exceeding temperature or voltage thresholds, etc.

Implementations of the disclosure define techniques for enforcement of an FPGA use policy that is resilient to hardware and software tampering. In conventional systems, the enforcement of use policy is managed by the host OS and driver. For example, if a customer is allowed to use the FPGA for a certain duration, OS service can track the use time and swap out the tenant code from FPGA when the time is up. A limitation of the conventional solutions is that the OS has a large threat surface and any vulnerability in it can be exploited to bypass CSP's use policy. This can be done by modifying the policy itself or by tampering with the policy management code.

Implementations of the disclosure propose a method to bind the use policy to customer's control logic (i.e., bitstream) and deliver that to the FPGA with integrity. Further, implementations of the disclosure define techniques to enforce policies inside the FPGA in a robust manner that cannot be compromised through system level exploits.

Implementations of the disclosure cryptographically bind FPGA use policy for a given customer to that customer's bitstream and have the CSP sign it, thus providing a way to deliver authenticated and integrity-protected policy to the FPGA in a multi-tenant environment. A bitstream may refer to a file that includes the programming information for an FPGA, for example. The term bitstream is frequently used to describe the configuration data to be loaded into a FPGA. Inside the FPGA, a policy management module (also referred to as a policy manager) is defined that collaborates with a secure device manager of the FPGA to enforce the use policy without relying on host software, such as a host OS for such enforcement. In one example, implementations of the disclosure provide techniques to enforce a use-time policy (i.e., how long is the tenant uses the PFGA) with help of a trusted source of time inside the FPGA.

Implementations of the disclosure provide CSPs mechanisms for strong enforcement of use policies for programmable ICs, such as FPGAs, in the presence of potential system level exploits. Implementations provide a technical advantage of providing differentiating feature to CSPs that enables stronger protection of their datacenter resources against unauthorized or improper use.

Implementations of the disclosure provide a two-prong approach including: (1) Binding the use policy to customer code and delivering that to the FPGA securely; and (2) Enforcing use policy inside the FPGA. Each of these prongs is described in further detail below.

(1) Binding Use Policy and Delivering it to the FPGA Securely

In implementations of the disclosure, a use policy for a customer (such as an FPGA customer) may be determined based on business and/or financial agreements between the CSP and the customer. In some cases, such agreements may be determined offline. The CSP may also generate use policies dynamically and motivated by other datacenter goals (such as load balancing) that may determine, for example, how long the customer's bitstream can run on a given FPGA.

Conventional approaches to enable loading a CSP-authorized bitstream may occur as follows: (1) CSP programs their key into the FPGA securely (one time). This may happen during manufacturing. (2) Subsequently, an authorizing entity, owned by the CSP, signs the customer bitstream. The bitstream may also be encrypted if confidentiality of the bitstream is to be protected. (3) When the customer loads the bitstream, a secure device manager inside the FPGA verifies the CSP signature to ensure that the given bitstream has been authorized by the CSP to run on the FPGA.

Implementations of the disclosure modify the conventional approach described above.

Specifically, implementations of the disclosure modify steps 2 and 3 of the above conventional approach as described below and with respect to FIG. 43.

Figure 43:
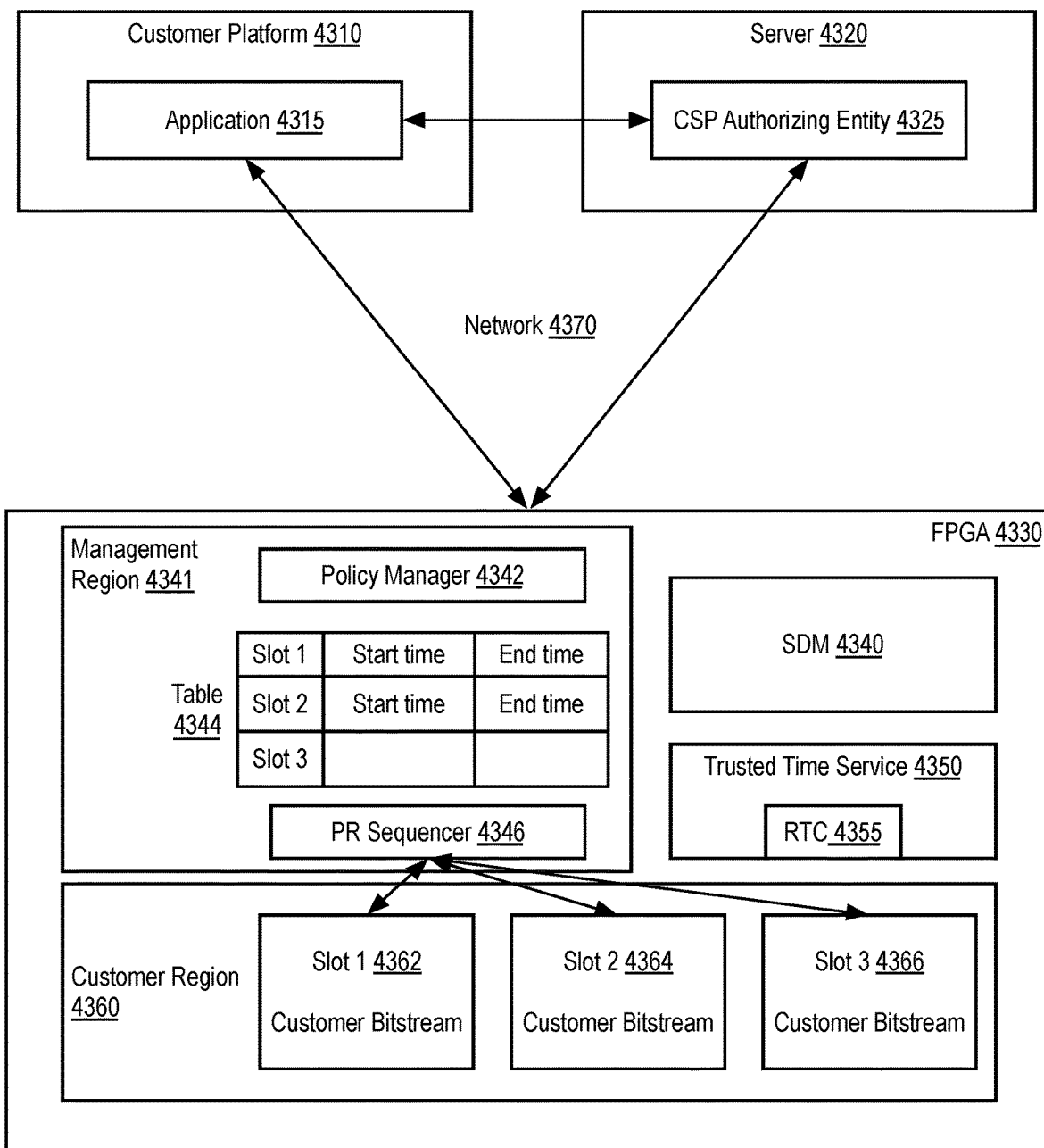
FIG. 43 illustrates a diagram depicting an example flow of a policy manager enforcing a time-based policy, according to implementations of the disclosure.

FIG. 43 illustrates a network architecture 4300 for enforcement of CSP policy for FPGA usage by tenant bitstream, in accordance with implementations of the disclosure. Network architecture 4300 includes a customer platform 4310 (e.g., client device), a server 4320 (e.g., the CSP), and an FPGA 4330 (e.g., CSP-managed entity) communicably coupled to one another via a network 4370. In some implementations, customer platform 4310 hosts an application 4315 that utilizes the resources of the FPGA 4330 to accelerate a workload of the application 4315. The server 4320 of the CSP manages the utilization of the FPGA 4330 for acceleration of the workload of the application 4315.

With respect to step 2 of the conventional approach described above, implementations of the disclosure modify this step as follows. At the time of signing the bitstream, a CSP-owned authorizing entity 4325 of the server 4320 also cryptographically binds a use policy for the customer to the customer's bitstream.

With respect to step 3 of the conventional approach described above, implementations of the disclosure modify this step as follows. The customer loads the bitstream and the policy, along with an authorization certificate that contains an authentication tag (such as a MAC), for both the bitstream and the policy. A secure device manager (SDM) 4340, which is the root of trust of the FPGA 4330, verifies the certificate, extracts the policy and stores it. With the help of a policy manager 4342 of the FPGA 4330, the SDM 4340 determines if the bitstream is allowed to run and configures a partial reconfiguration (PR) region (of the FPGA) (e.g., slot 1 4362, slot 2 4364, slot 3 4366) that is assigned to the bitstream. In one implementation, a PR sequencer 4346 (e.g., agent in charge of partial reconfiguration) handles the assignment of bitstreams to slots 4362, 4364, 4366 of the customer region 4360 of the FPGA 4330. The SDM 4340 associates the PR Slot ID slot with the policy (e.g., via table 4344) to enable monitoring and enforcement of execution policy on that PR tenant.

(2) Policy Enforcement Inside the FPGA

As mentioned above, the SDM 4340 verifies a signature of the bitstream-policy blob and stores the policy-slot ID pair. A slot (e.g., slot 1 4362, slot 2 4364, slot 3 4366) herein refers to a region of the customer region 4360 in the FPGA 4330 where the bitstream is loaded. The ID is a numerical value given to each slot. The SDM 4340 exposes an interface to allow FPGA management code to read the policy and Slot ID.

The policy manager 4342 refers to module, inside the FPGA management region 4341 (e.g., management code), that reads the policy-slot pair from the SDM 4340. The policy manager 4342 parses the policy and configures the internal states accordingly to enable enforcement of use policy for the tenant running on the specified slot 4362, 4364, 4366. One example of enforcement of a time-based use policy is described below. Other use policies may also be enforced by implementations of the disclosure.

In one example, a simple form of time-based use policy specifies the duration of how long customer is allowed to use the FPGA. The time-based use policy includes a start time and a duration. During this period identified by the start time and duration, the customer may load their bitstreams multiple times if they want. But when the duration expires, the PR tenant should be evicted. The policy manager 4342 enforces this with the help of a trusted time service 4350 inside FPGA 4330.

The trusted time service 4350 refers to a service whose source of time is a protected Real Time Clock (RTC) 4355, also inside the FPGA 4330. The RTC 4355 includes the following properties: it is resistant to physical tampering; it persists across FPGA resets; an epoch is associated with it to detect reset or rollover; and enables the trusted time service 4350 to read RTC 4355 time with integrity. The RTC 4355 is set by the CSP securely and is synchronized with CSP's authorizing entity's 4325 time. The trusted time service 4350 can create multiple timers, rooted in RTC 4355 to support monitoring time-based policy for multiple tenants simultaneously.

In the example, the policy manager 4342 compares the start value with the current time from the trusted time service 4350 to determine if the customer is allowed to program the bitstream. In one implementation, the management region 4340 includes a table 4344 that stores the start time and end time of a time-based use policy for each slot. The current time is obtained by reading the RTC 4355 value. If the current time is past the start time, then the bitstream is not allowed to be programmed. The policy manager 4342 returns a time-out error to the SDM 4340, which tells the SDM 4340 to not program the bitstream. A corresponding error is returned to the host software as part of partial reconfiguration (PR) error notification.

If the start time has not expired, then the policy manager 4342 notifies the SDM 4340 to proceed with the programming. Upon completion of PR configuration, the SDM 4340 provides the slot ID of the PR region to the policy manager 4342. The policy manager 4342 then sets a timer using the trusted time service 4350 for the remaining duration to track when the usage time expires. When the use time expires, the policy manager 4342 notifies the host software and then follows up with the SDM 4340 to perform a forced eviction of the tenant at the given slot.

Implementations of the disclosure may provide an initial policy configuration flow. One example of such an initial policy configuration flow (with respect to an example time usage policy) is described as follows:

(1) The customer submits their bitstream to the authorization agent of the CSP. The authorization agent binds the 'Time usage policy' to the bitstream and signs the bitstream and the policy blob. This can be done offline or done during runtime. The signed blob is provided to the customer.

(2) Customer submits the bitstream to the FPGA (this maybe over the network or via the local CPU).

(3) SDM within the FPGA verifies the signature of the blob. SDM then extracts the policy and sends an event to the policy manager to check the policy.

(4) The policy manager reads the policy from the SDM and parses it. For time-based policy, it verifies that time has not expired by comparing the start and duration with the time it obtains from the time service. The time service in turn, obtains the time from RTC in a protected way. If the time has not expired, then it notifies the SDM to proceed with the PR.

(5) The SDM then assigns the bitstream to the empty slot and forwards it to the PR sequencer (agent in charge of partial reconfiguration). It also informs the policy manager of the slot ID where the PR was performed. The policy manager associates the Slot ID with the PR region and stores that internally.

Implementations of the disclosure may subsequently provide a policy enforcement flow.

One example of such a policy enforcement configuration flow is described as follows, continuing from the end of the initial policy configuration flow described above:

(6) Policy manager creates a timer using the timer service. It sets the duration for the timer.

(7) The timer increments the time by reading the RTC value. On reaching the end time, it triggers an event in the policy manager.

(8) The policy monitor issues a slot event to notify the tenant on FPGA of an impending eviction. It also sends an event to the host driver indicating the tenant eviction so the driver can update its resource inventory and notify the customer application allowing the application opportunity to clean up.

(9) The policy manager issues a notification to the SDM to signal tenant eviction.

(10) The SDM evicts the FPGA bitstream, clears tenant specific state and also clears the tenant related keys.

FIG. 44 is a flow diagram illustrating a method 4400 for enforcement of CSP policy for FPGA usage by tenant bitstream, in accordance with implementations of the disclosure. Method 4400 may be performed by processing logic that may comprise hardware (e.g., circuitry, dedicated logic, programmable logic, etc.), software (such as instructions run on a processing device), or a combination thereof. More particularly, the method 4400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 4400 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIG. 43 may not be repeated or discussed hereafter. In one implementation, a programmable IC, such as FPGA 4330 implementing an SMD 4340 described with respect to FIG. 43, may perform method 4400.

Method 4400 begins at block 4410 where a programmable IC may receive, from a tenant, a tenant bitstream and a tenant use policy for utilization of a programmable IC via the tenant bitstream. In one implementation, the tenant use policy is cryptographically bound to the tenant bitstream by a cloud service provider (CSP) authorizing entity and signed with a signature of the CSP authorizing entity.

At block 4420, the programmable IC may extract, in response to successful verification of the signature of the CSP authorizing entity, the tenant use policy to provide to a policy manager of the programmable IC for verification. Subsequently, at block 4430, the programmable IC may configure, in response to the policy manager verifying the tenant bitstream based on the tenant use policy, a partial reconfiguration (PR) region of the programmable IC using the tenant bitstream.

Lastly, at block 4440, the programmable IC may associate a slot identifier (ID) of the PR region with the tenant use policy for enforcement of the tenant use policy on the PR region of the tenant.

The following examples pertain to further embodiments of enforcement of CSP policy for FPGA usage by tenant bitstream. Example 1 is an apparatus to facilitate enforcement of CSP policy for FPGA usage by tenant bitstream. The apparatus of Example 1 comprises a secure device manager (SDM) to: receive, from a computing device of a tenant, a tenant bitstream and a tenant use policy for utilization of the programmable IC via the tenant bitstream, wherein the tenant use policy is cryptographically bound to the tenant bitstream by a cloud service provider (CSP) authorizing entity and signed with a signature of the CSP authorizing entity; in response to successfully verifying the signature of the CSP authorizing entity, extracting the tenant use policy to provide to a policy manager of the programmable IC for verification; in response to the policy manager verifying the tenant bitstream based on the tenant use policy, configuring a partial reconfiguration (PR) region of the programmable IC using the tenant bitstream; and associating a slot identifier (ID) of the PR region with the tenant use policy for enforcement of the tenant use policy on the PR region of the tenant.

In Example 2, the subject matter of Example 1 can optionally include wherein the policy manager is further to enforce the tenant use policy on the PR region of the tenant. In Example 3, the subject matter of any one of Examples 1-2 can optionally include wherein the tenant use policy is cryptographically bound to the tenant bitstream using a message authentication code (MAC) and an authorization certificate comprising the signature. In Example 4, the subject matter of any one of Examples 1-3 can optionally include wherein the CSP authorizing entity provisions a key to the FPGA, the key used as the signature of the CSP authorizing entity, and wherein the key is utilized by the SDM to verify the signature of the CSP authorizing entity.

In Example 5, the subject matter of any one of Examples 1-4 can optionally include wherein the secure device manager comprises a root of trust of the programmable IC. In Example 6, the subject matter of any one of Examples 1-5 can optionally include wherein the policy manager is part of management code of the programmable IC, and wherein the policy manager maintains a data structure in the management code to associate the tenant use policy with the PR region of the tenant. In Example 7, the subject matter of any one of Examples 1-6 can optionally include wherein the policy manager refers to a trusted time service of the programmable IC to enforce the tenant use policy.

In Example 8, the subject matter of any one of Examples 1-7 can optionally include wherein in response to the policy manager determining a violation of the tenant use policy, the policy manager to issues a notification to the SDM to signal eviction of the tenant, and wherein the SDM performs an eviction process on the tenant in response to the notification. In Example 9, the subject matter of any one of Examples 1-8 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 10 is a method for facilitating enforcement of CSP policy for FPGA usage by tenant bitstream. The method of Example 10 can include receiving, by a secure device manager (SDM) of a programmable integrated circuit (IC) from a computing device of a tenant, a tenant bitstream and a tenant use policy for utilization of the programmable IC via the tenant bitstream, wherein the tenant use policy is cryptographically bound to the tenant bitstream by a cloud service provider (CSP) authorizing entity and signed with a signature of the CSP authorizing entity; in response to successfully verifying the signature of the CSP authorizing entity, extracting, by the SDM, the tenant use policy to provide to a policy manager of the programmable IC for verification; in response to the policy manager verifying the tenant bitstream based on the tenant use policy, configuring, by the SDM, a partial reconfiguration (PR) region of the programmable IC using the tenant bitstream; and associating, by the SDM, a slot identifier (ID) of the PR region with the tenant use policy for enforcement of the tenant use policy on the PR region of the tenant.

In Example 11, the subject matter of Example 10 can optionally include wherein the policy manager is further to enforce the tenant use policy on the PR region of the tenant. In Example 12, the subject matter of any one of Examples 10-11 can optionally include wherein the tenant use policy is cryptographically bound to the tenant bitstream using a message authentication code (MAC) and an authorization certificate comprising the signature. In Example 13, the subject matter of any one of Examples 10-12 can optionally include wherein the CSP authorizing entity provisions a key to the FPGA, the key used as the signature of the CSP authorizing entity, and wherein the key is utilized by the SDM to verify the signature of the CSP authorizing entity.

In Example 14, the subject matter of any one of Examples 10-13 can optionally include wherein the secure device manager comprises a root of trust of the programmable IC. In Example 15, the subject matter of any one of Examples 10-14 can optionally include wherein the policy manager is part of management code of the programmable IC, and wherein the policy manager maintains a data structure in the management code to associate the tenant use policy with the PR region of the tenant. In Example 16, the subject matter of any one of Examples 10-15 can optionally include wherein the policy manager refers to a trusted time service of the programmable IC to enforce the tenant use policy.

In Example 17, the subject matter of any one of Examples 10-16 can optionally include wherein in response to the policy manager determining a violation of the tenant use policy, the policy manager to issues a notification to the SDM to signal eviction of the tenant, and wherein the SDM performs an eviction process on the tenant in response to the notification. In Example 18, the subject matter of any one of Examples 10-17 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 19 is a non-transitory machine readable storage medium for facilitating enforcement of CSP policy for FPGA usage by tenant bitstream. The non-transitory computer-readable storage medium of Example 19 having stored thereon executable computer program instructions that, when executed by one or more processors, cause the one or more processors to perform operations comprising receiving, by a secure device manager (SDM) of a programmable integrated circuit (IC) from a computing device of a tenant, a tenant bitstream and a tenant use policy for utilization of the programmable IC via the tenant bitstream, wherein the tenant use policy is cryptographically bound to the tenant bitstream by a cloud service provider (CSP) authorizing entity and signed with a signature of the CSP authorizing entity; in response to successfully verifying the signature of the CSP authorizing entity, extracting, by the SDM, the tenant use policy to provide to a policy manager of the programmable IC for verification; in response to the policy manager verifying the tenant bitstream based on the tenant use policy, configuring, by the SDM, a partial reconfiguration (PR) region of the programmable IC using the tenant bitstream; and associating, by the SDM, a slot identifier (ID) of the PR region with the tenant use policy for enforcement of the tenant use policy on the PR region of the tenant.

In Example 20, the subject matter of Example 19 can optionally include wherein the policy manager is further to enforce the tenant use policy on the PR region of the tenant. In Example 21, the subject matter of any one of Examples 19-20 can optionally include wherein the tenant use policy is cryptographically bound to the tenant bitstream using a message authentication code (MAC) and an authorization certificate comprising the signature. In Example 22, the subject matter of any one of Examples 19-21 can optionally include wherein the CSP authorizing entity provisions a key to the FPGA, the key used as the signature of the CSP authorizing entity, and wherein the key is utilized by the SDM to verify the signature of the CSP authorizing entity.

In Example 23, the subject matter of any one of Examples 19-22 can optionally include wherein the secure device manager comprises a root of trust of the programmable IC. In Example 24, the subject matter of any one of Examples 19-23 can optionally include wherein the policy manager is part of management code of the programmable IC, and wherein the policy manager maintains a data structure in the management code to associate the tenant use policy with the PR region of the tenant. In Example 25, the subject matter of any one of Examples 19-24 can optionally include wherein the policy manager refers to a trusted time service of the programmable IC to enforce the tenant use policy.

In Example 26, the subject matter of any one of Examples 19-25 can optionally include wherein in response to the policy manager determining a violation of the tenant use policy, the policy manager to issues a notification to the SDM to signal eviction of the tenant, and wherein the SDM performs an eviction process on the tenant in response to the notification. In Example 27, the subject matter of any one of Examples 19-26 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 28 is an apparatus for facilitating enforcement of CSP policy for FPGA usage by tenant bitstream according to implementations of the disclosure. The apparatus of Example 28 can comprise means for receiving, by a secure device manager (SDM) of a programmable integrated circuit (IC) from a computing device of a tenant, a tenant bitstream and a tenant use policy for utilization of the programmable IC via the tenant bitstream, wherein the tenant use policy is cryptographically bound to the tenant bitstream by a cloud service provider (CSP) authorizing entity and signed with a signature of the CSP authorizing entity; means for in response to successfully verifying the signature of the CSP authorizing entity, extracting, by the SDM, the tenant use policy to provide to a policy manager of the programmable IC for verification; means for in response to the policy manager verifying the tenant bitstream based on the tenant use policy, configuring, by the SDM, a partial reconfiguration (PR) region of the programmable IC using the tenant bitstream; and means for associating, by the SDM, a slot identifier (ID) of the PR region with the tenant use policy for enforcement of the tenant use policy on the PR region of the tenant. In Example 29, the subject matter of Example 28 can optionally include the apparatus further configured to perform the method of any one of the Examples 11 to 18.

Example 30 is a system for facilitating enforcement of CSP policy for FPGA usage by tenant bitstream, configured to perform the method of any one of Examples 10-18. Example 31 is an apparatus for facilitating enforcement of CSP policy for FPGA usage by tenant bitstream comprising means for performing the method of any one of claims 10 to 18. Specifics in the Examples may be used anywhere in one or more embodiments.

Autonomous (Self-Managed) FPGAS

In some embodiments, an apparatus, system, or process is to provide autonomous (self-managed) FPGAs. In one implementation, autonomous FPGA component 906 described with respect to FIG. 9 provides the autonomous (self-managed) FPGAs.

In implementations of the disclosure, an FPGA is specifically discussed. However, any type of programmable logic integrated circuit (IC) (also referred to as a programmable IC) may utilize implementations of the disclosure and implements are not specifically limited to utilization in an FPGA environment. Examples of programmable logic ICs include PALs, PLAs, FPLAs, EPLDs, EEPLDs, LCAs, CPLDs, FPGAs, just to name a few. However, for ease of discussion and illustration, the specific example of an FPGA is described herein.

Use of FPGAs in datacenters is increasing. FPGAs can be used in datacenters for accelerating applications, such as AI/ML, analytics, browser search, and database, to name a few examples. For efficient use of resources, FPGAs are shared among the applications across the data center and applications send acceleration workloads to FPGAs over a network. As FPGAs become peers to CPUs, there is a shift to move the control and management of the FPGA inside of the FPGA, moving away from the conventional model where the CPU performs the device management, workload scheduling, device resource allocation, etc. for the FPGA.

In conventional systems, FPGAs are attached to a host CPU via PCIe or other physical connection and are managed by an OS and the drivers on the host CPU. The drivers are responsible for tasks such as enumerating the FPGA features, managing device resource allocation for local and remote apps, enforcing FPGA use policy, monitoring device health, and performing recovery, for example.

Figure 45:
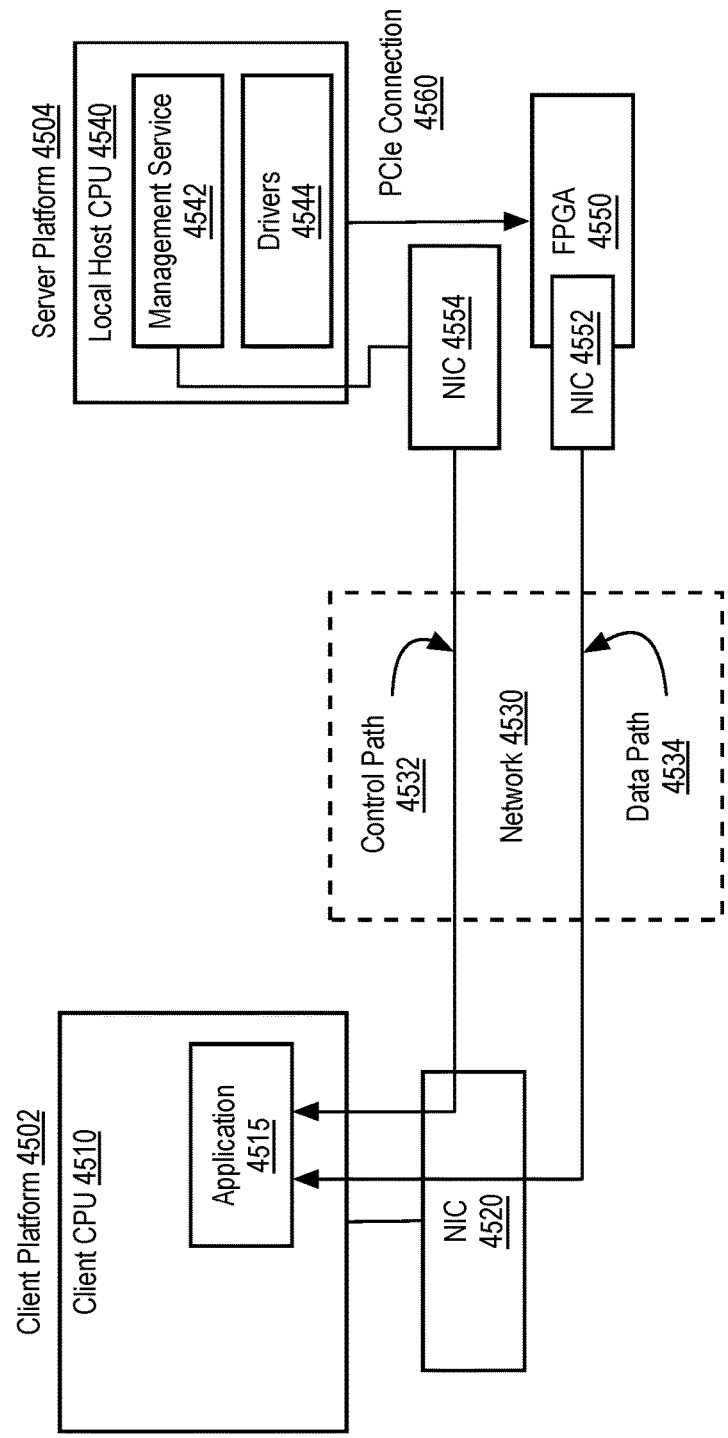
FIG. 45 illustrates a conventional network environment for FPGA management.

FIG. 45 illustrates a conventional network environment 4500 for FPGA management. In network environment 4500, a remote application 4515 running on a host CPU 4510 of a client platform 4502 sends data directly to a network-capable FPGA 4550. However, the FPGA 4550 is connected to a local host CPU 4540 of a server platform 4504 via a direct connection 4560, such as PCIe. As such, the FPGA 4550 is being managed by the local host CPU 4540 of server platform 4504 using management server 4542 and drivers 4544 of the local host CPU 4540. All control and commands from remote application 4515 go through the local host CPU 4540 via a control path 4532 of network 4530 using NICs 4520, 4554. Data from application 4515 may go directly to the FPGA 4550 via data path 4534 of network 4530 using NICs 4520, 4552.

Another conventional system for FPGA management involves offering a platform as a service (PaaS) where the PaaS has a locally attached FPGA. In this case, FPGA does not have a networking capability and the customer deploys the application on the rented platform of the PaaS. Accordingly, both control and data transfer to the FPGA occur via a local PCIe connection. As in the previous conventional solution described with respect to FIG. 45, drivers running on the CPU manage the FPGA in the PaaS-based conventional system.

Conventional approaches to FPGA management have the following disadvantages. First, a device's resource and management are exposed to host system which increases the potential threat surface for offloaded workload. Furthermore, for offload to network-pooled FPGAs, going through the local host for control messages for device configuration, device control, monitoring execution, and so on, creates inefficiencies in the control plane. This adds latencies with large scale out. Another disadvantage of the conventional systems is a higher cost as each rack of FPGA uses a CPU whose role may be to perform device management.

As a background, here are the main management functions performed by the host device drivers in conventional systems:

Enumeration: Read the device registers to enumerate the device capabilities.

Configuration: Configure the registers for stable and correct functioning of FPGA.

Monitoring: Monitor status and indicators such as temperature, power consumption, performance counters as well as other kind of events and interrupts.

Resource assignment: Assigning the FPGA resource to a specific application or virtual machine instance, providing information regarding the current state (busy/available) to requesting software or a central orchestrator service.

Device Recovery and reset: Reset the device and recover it if it is bad state or if it requests to take it back from the tenant for some reason.

Network configuration: Facilitate session setup with the remote application by configuring network registers, such as programming FPGA's RDMA interface.

Partial reconfiguration and debug: Enable application to do partial reconfiguration of the FPGA by loading customer's bitstream. Provide debug interface for application to manage the execution of their bitstream.

Firmware updates: The driver performs firmware updates of the FPGA. This may include for example the management bitstream in the FPGA or firmware associated with any on-board processors.

Implementations of the disclosure provide for an autonomous (i.e., self-managed) FPGA that can be accessed and used by a remote application directly without utilizing a local CPU for a control plane. The autonomous FPGA of implementations of the disclosure is capable of providing the main management functions performed by the host device drivers in conventional systems as detailed above.

Figure 46:
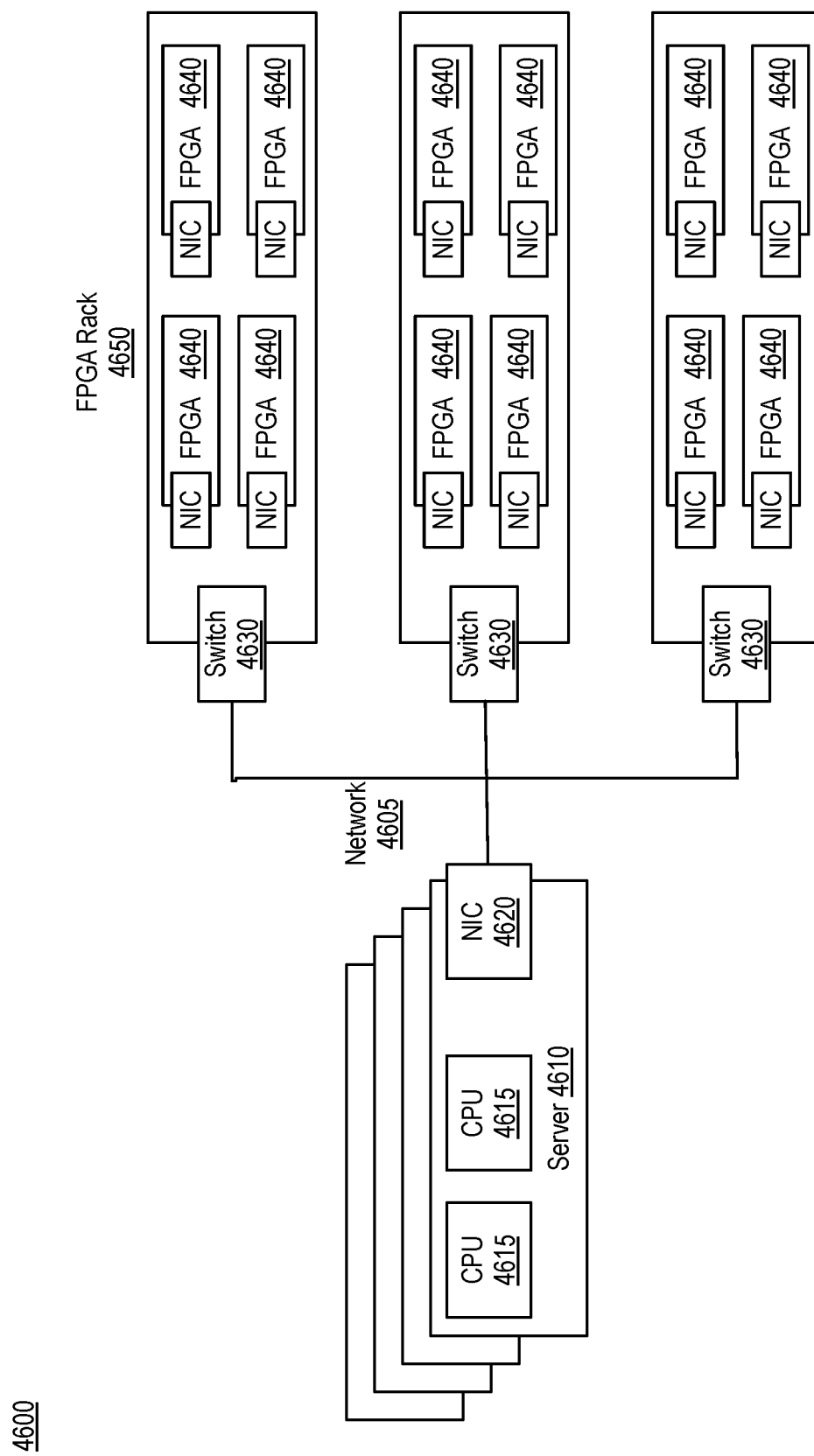
FIG. 46 illustrates a network environment for sharing FPGAs on various servers without a local CPU managing the FPGAs, in accordance with implementations of the disclosure.

FIG. 46 illustrates a network environment 4600 for sharing FPGAs on various servers without a local CPU managing the FPGAs, in accordance with implementations of the disclosure. Network environment 4600 includes rack(s) 4650 of FPGAs 4640 that are shared among the applications on various servers 4610 without a local CPU in the rack(s) 4650 for managing the FPGAs 4640. The FPGAs 4640 may be communicably coupled over a network 4605 to the server(s) 4610 via switches 4630 and NICs 4620. CPUs 4615 at server(s) 4610 may be run the application(s) utilizing the FPGAs 4640.

Implementations of the disclosure define a management component inside the FPGA referred to as the FPGA System Manager (FSM). In some implementations, the FSM is also referred to as a programmable IC System Manager (PICSM) or as simply a system manager. The FSM is designed to perform the management of FPGA, such as feature enumeration, device/resource assignments, resource management, scheduling, monitoring, recovery and device reset (performed by host CPU drivers in today's solutions). The FPGA exposes a message-based network interface to remote software that allow querying for information regarding FPGA capability and its configuration and for deploying workload directly to the FPGA. The interface also provides a mechanism to the remote software for managing and monitoring execution of its bitstream directly, which is facilitated by the FSM module inside the FPGA. Implementations of the disclosure define methods for authorization checks, usage policy enforcement, and secure session for both the control and data plane.

The autonomous FPGA of implementations of the disclosure provides a number of technical advantages. The autonomous FPGA offers improved security as the remote application does not have to rely on an untrusted host driver for FPGA management. The autonomous FPGA provides for lower latencies in management of remote FPGA. Furthermore, CSPs also benefit from lower infrastructure cost as they do not have to dedicate a CPU to manage the network connected FPGA. CSPs can also provide stronger security assurance to their customers as their management code can now reside outside of a customer's trust code base (TCB).

Figure 47:
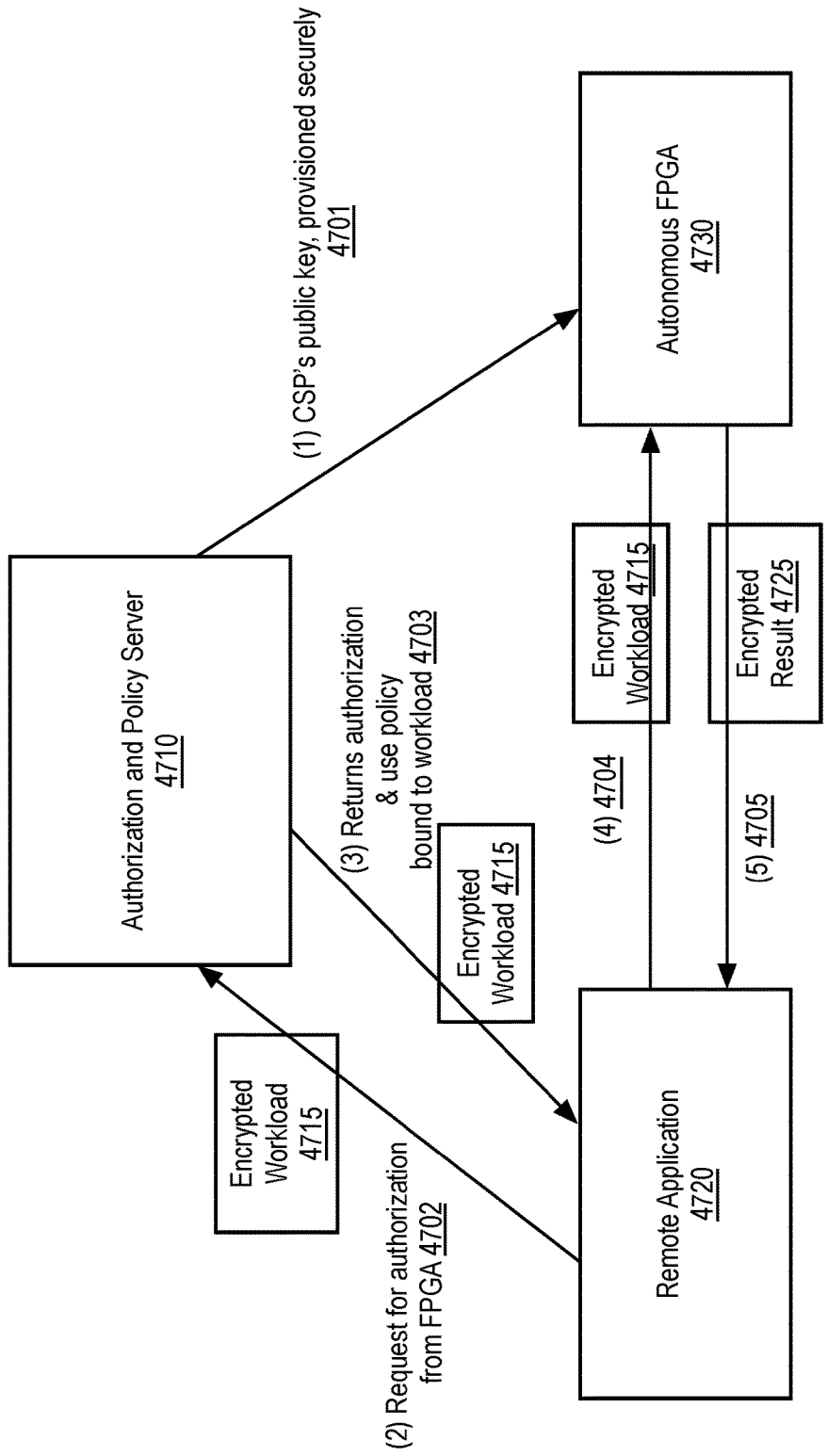
FIG. 47 illustrates a network environment for an autonomous FPGA in accordance with implementations of the disclosure.

FIG. 47 illustrates a network environment 4700 for an autonomous FPGA in accordance with implementations of the disclosure. Network environment 4700 depicts authorization and policy enforcement aspects of running customer code (i.e., a bitstream) on an autonomous FPGA, such as autonomous FPGA 4730. Network environment 4700 include an authorization and policy server 4710, a remote application 4720, and an autonomous FPGA 4730 communicably coupled to one another via one or more networks (not shown).

In one implementation, the authorization and policy server 4710 may be owned by a CSP. The authorization and policy server 4710 is responsible for authorizing a customer's code (i.e., bitstream) to run on the autonomous FPGA 4730. The authorization and policy server 4710 is also responsible for defining a usage policy associated with a customer (e.g., how long the customer can use the FPGA, what resources the customer is allowed to use, etc.) and binding that policy to the workload.

The remote application 4720 is a customer application that seeks to offload its workload to the network-connected, autonomous FPGA 4730. The remote application 4720 can obtain an authorization and policy for its workload from the authorization and policy server 4710 and submit that to the FPGA 4730 over the network. The remote application 4720 may be owned by the CSP or it may belong to a third-party customer.

The autonomous FPGA 4730 is responsible for checking the authorization when the remote application 4720 sends a bitstream for execution on the FPGA 4730.

An example flow of implementations of the disclosure with reference to network environment 4700 of FIG. 47 is as follows:

(1) In a first step 4701, the FPGA owner (e.g., CSP) keys are provisioned into the FPGA 4730 securely. There are existing solution that enable this. An example of such a solution is on Intel® Stratix 10 devices, where the Secure Device Manager is the root of trust and enables secure provisioning of owner keys during manufacturing in presence of an untrusted original device manufacturer (ODM).

(2) In a second step 4702, a customer's remote application 4720 sends a request to the authorization and policy server 4710 (including the application's encrypted workload (bitstream) 4715) for using the CSP's autonomous FPGA 4730.

(3) In a third step 4703, the authorization and policy server 4710 can authorize the use and bind a use policy to the workload 4715. It can return an authorization certificate signed by CSP's keys to the remote application 4720.

(4) In a fourth step 4704, the remote application 4720 discovers the network-connected, autonomous FPGA 4730 using standard network discovery methods. The remote application 4720 asks the autonomous FPGA 4730 if it has available resources. If the autonomous FPGA 4730 does have available resources, then the remote application 4720 uses the message-based network interface to load the bitstream directly into the autonomous FPGA 4730. The remote application 4720 sends both the encrypted bitstream 4715 and the authorization certificate to the autonomous FPGA 4730.

(5) In a fifth step 4705, the autonomous FPGA 4730 verifies the authorization certificate using the CSP's key that was programmed in the FPGA (in the first step 4701). The autonomous FPGA 4730 also enforces the usage policy for use of the autonomous FPGA 4730. If all is good, the autonomous FPGA 4730 runs the workload and returns the encrypted result 4725 to the remote application 4720.

In one implementation, after loading the bitstream, the remote application 4720 may establish a connection with the autonomous FPGA 4730 and perform attestation to establish secure session for subsequent data and control transfer. In some implementations, there can be a central orchestration service that is responsible for performing attestation on behalf of all remote applications 4720, establishing session with the FPGAs 4730, and providing a session keys (also referred to as tokens in the IDF) to the remote application 4720.

Figure 48:
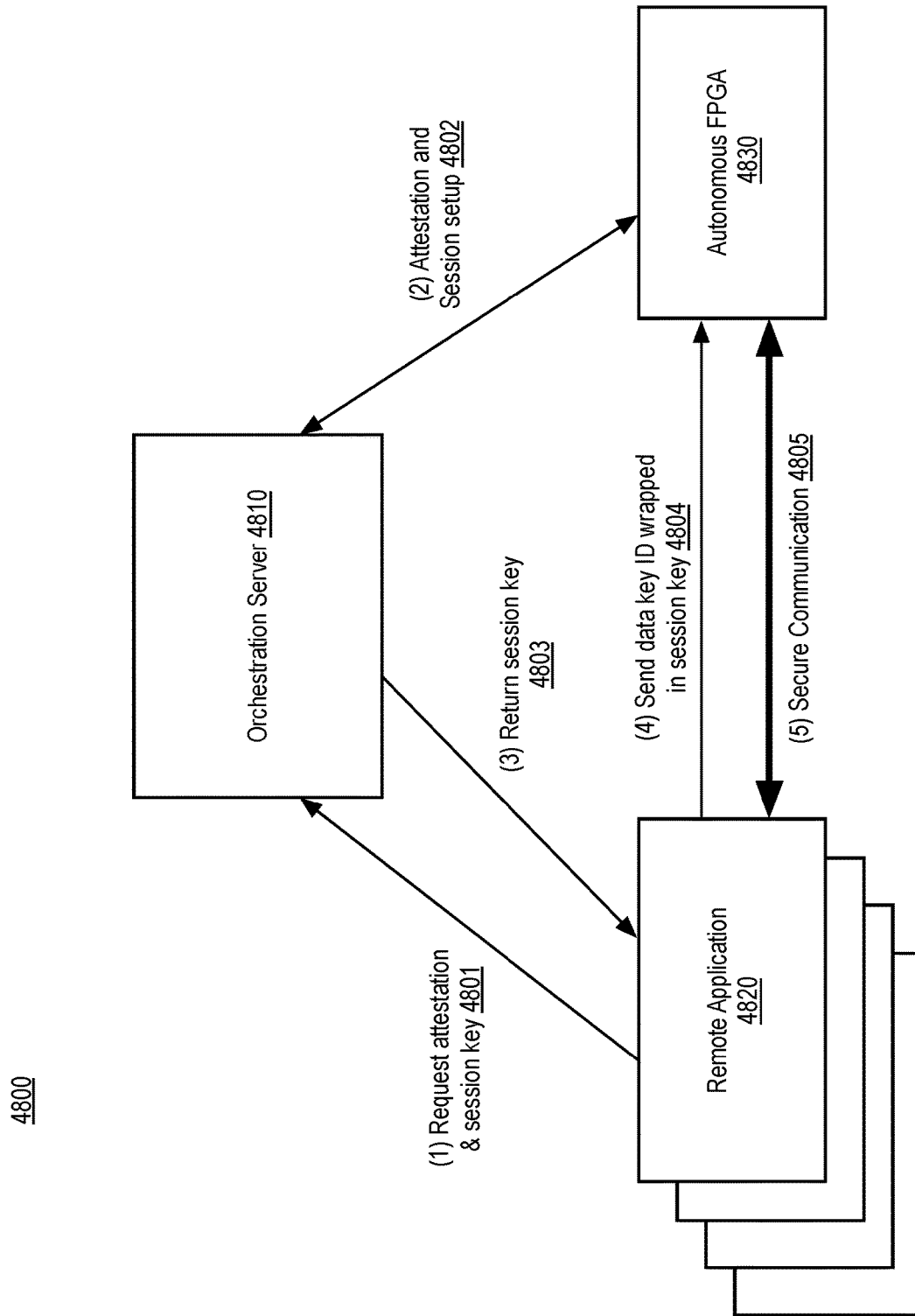
FIG. 48 illustrates a network environment for an autonomous FPGA using an orchestration server to facilitate attestation and session setup, in accordance with implementations of the disclosure.

FIG. 48 illustrates a network environment 4800 for an autonomous FPGA using an orchestration server to facilitate attestation and session setup, in accordance with implementations of the disclosure. Network environment 4800 depicts an autonomous FPGA 4830 using a central orchestration server 4810 to facilitate attestation and session setup and provide a session key to a remote application 4820 over a secure channel. As shown, network environment 4800 include an orchestration server 4710, one or more remote applications 4820, and an autonomous FPGA 4830 communicably coupled to one another via one or more networks (not shown).

An example flow of implementations of the disclosure with reference to network environment 4800 of FIG. 48 is as follows:

(1) In a first step 4801, remote application 4820 requests orchestration server 4810 to attest the FPGA 4830 to which it has offloaded its bitstream to and request a session key.

(2) In a second step 4802, the orchestration server 4810 uses standard attestation and key setup protocol, such as Diffie Hellman or SPDM 1.1, to verify the device, its configuration, and the bitstream loaded on the autonomous FPGA 4830, and establishes a shared secret key with the autonomous FPGA 4830.

(3) In a third step 4803, the orchestration server 4810 sends the session key to the remote application 4820 over a secure channel. This channel may be established using standard protocols such as Diffie Hellman, TLS, SIGMA variation.

(4) In a fourth step 4804, the remote application 4820 derives data keys and wraps the data keys with session keys. The remote application 4820 sends the data keys wrapped in the session keys to the autonomous FPGA 4830.

(5) In a fifth step 4805, the autonomous FPGA 4830 unwraps the data keys using the session keys it had stored at the end of Diffie Hellman protocol (e.g., at the second step 4802). These data keys are then used to protect all messages and data transferred between the remote application 4820 and the autonomous FPGA 4830.

In some implementations, the orchestration server 4810 may optionally also manage autonomous FPGA 4830 assignment to achieve load balancing or other performance goals at the data center. If the orchestration server 4810 manages FPGA assignment, the remote application 4820 can go through the orchestration server 4810 to get an autonomous FPGA 4830 assigned for its use instead of discovering available FPGA itself and programing it with its bitstream. In this model, the orchestration server 4810 determines which autonomous FPGAs 4830 are available and then, based on determined heuristics, determines which autonomous FPGA 4830 to assign to a given remote application 4820. The orchestration server 4810 provides the remote application 4820 with the IP address of the assigned autonomous FPGA 4830 along with the session key (token) for establishing secure communication channel as described in the flow above.

In some implementations, the orchestration server 4810 described with respect to FIG. 48 and the authorization & policy server 4710 described with respect to FIG. 47 may be implemented on the same server. However, the servers may also be implemented on separate servers. Both of these components may be owned by the CSP.

Figure 49:
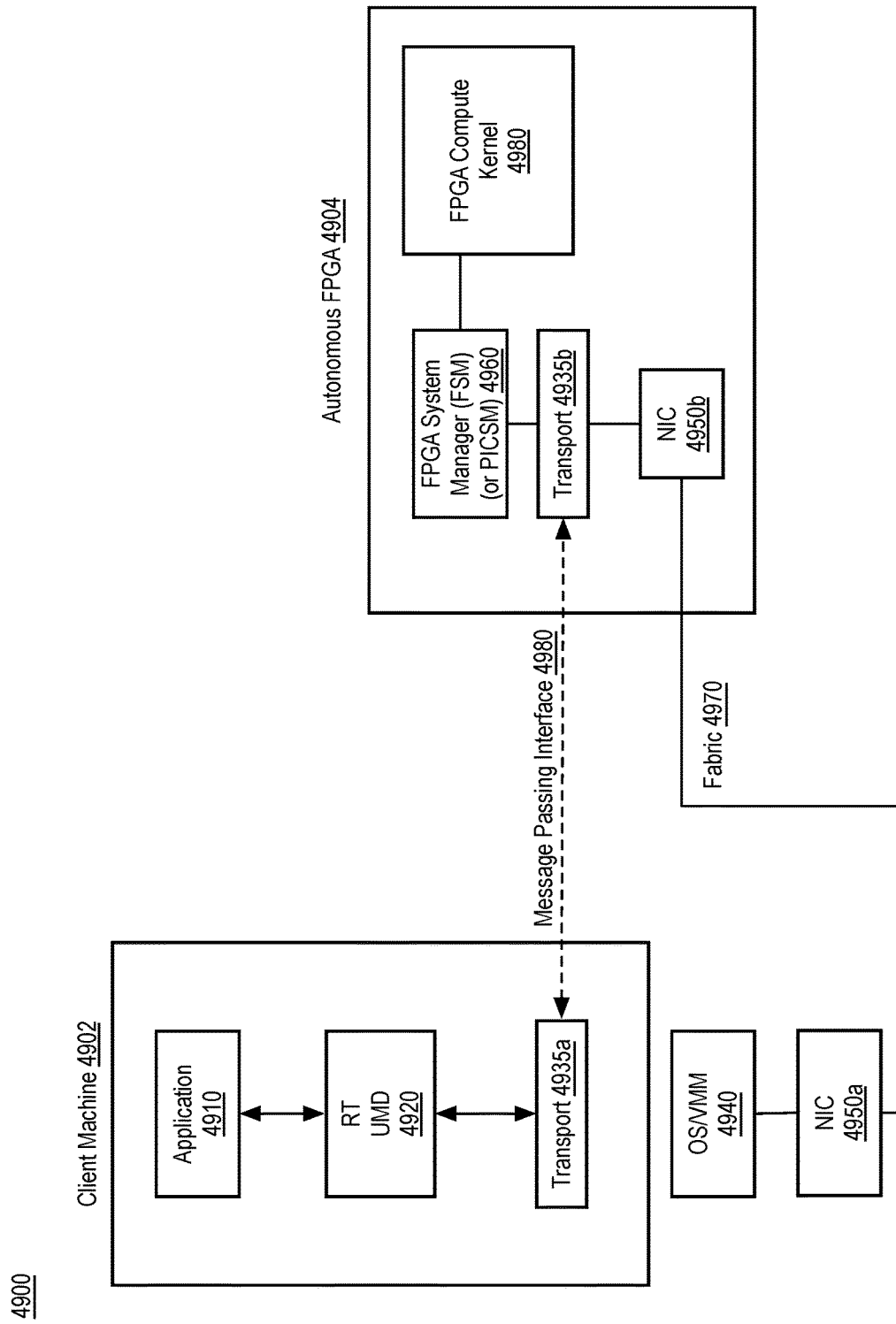
FIG. 49 illustrates a high-level architecture for an autonomous FPGA, in accordance with implementations of the disclosure.

FIG. 49 illustrates a high-level architecture 4900 for an autonomous FPGA, in accordance with implementations of the disclosure. The architecture 4900 may include a client machine 4902 communicably coupled to an autonomous FPGA 4904 over a network fabric 4970.

The client machine 4902 may operate on an OS/VMM 4940 and host components of a user space stack for performing an FPGA transaction. The components of the user space stack for the FPGA transaction may include, but are not limited to, an application 4910, an RT/UMD 4920.

The components of the user space stack may communicate with the autonomous FPGA 4904 via a transport layer 4935a, 4935b. The transport layer 4935a, 4935b can utilize a message passing interface 4980 to pass control and commands corresponding to the FPGA transaction between the client machine 4902 and the autonomous FPGA 4904. Data for the FPGA transaction may be passed between the client machine 4902 and the autonomous FPGA 4904 via NICs 4950a, 4950b via fabric 4970.

In one implementation, an FSM 4960 is instantiated on the autonomous FPGA 4904 to handle the management of the autonomous FPGA 4904 and expose the message-based interface 4980 to a remote software (e.g., application 4910) for configuration, monitoring and debugging, data transfer, and so on. In some implementations, the FSM 4960 is also referred to as a PICSM 4960 or system manager 4960. The FSM 4960 validates all incoming messages for correctness and verifies if the requester is allowed to perform the action requested before updating its internal state as per the request or responding back with requested data.

The following description discusses the main interfaces that the FSM 4960 exposes to the remote software (e.g., application 4910):

Attestation and key setup interfaces: The FSM 4960 should support the following two interfaces:

(1) A mechanism for platform owner to provision its keys into the autonomous FPGA 4904. This key is used later, at runtime, to enforce CSP defined access control and policies. For example, CSP would sign customer code (bitstream) with this key to allow authorized bitstreams to get loaded on the autonomous FPGA 4904. The autonomous FPGA 4904 can verify the authorization before allowing it to be loaded.

(2) Dynamic attestation and session setup: Allow a remote software to verify that it is good FPGA with expected configurations and establish a secure session bound to the PR persona. This may be done via standard attestation and key exchange protocols such as SPDM 1.1 or TLS handshake. Subsequently, the remote application 4910 would generate data encryption keys, wrap it in session key and program them into the autonomous FPGA 4904 to protect all messages to/from the autonomous FPGA 4904.

Enumeration: Reporting an autonomous FPGA 4904 identity. This would provide information such as device vendor, device id, device family etc. Enumeration of capabilities or functions supported by the autonomous FPGA 4904 and available resources such as number of PR regions, availability, etc.

Remote Partial Reconfiguration: A mechanism for the remote application 4910 to directly do partially reconfiguring of the autonomous FPGA 4904 over network. This should support confidentially and integrity by allowing loading encrypted and signed FPGA bitstream.

Control Plane: This enables remote software to manage configuration of customer's logic (e.g., compute kernel), monitor execution and perform debug and instrumentation by remote application. For functionalities such as debug, event monitoring, etc., customers construct their own decoder scheme or addressing mechanism in their FPGA design. Details of how such management works is described in the memory management section below.

Data Plane: The FSM 4960 exposes an interface to the remote application 4910 for configuring the network interface correctly. For efficient data protocols, such as RDMA, the FSM 4960 may not have any further role in this kind of data transfer. For other protocols, the FSM 4960 may have additional role in routing.

Firmware update by an authorized entity.

Device Recovery: An interface to allow an authorized entity to reset or recover the device remotely. The FSM 4960 should clear any state associated with the customer application. This interface may be used for forced recovery of the autonomous FPGA 4904 if it is in unresponsive state. The FSM 4960 can clear any state associated with the remote application's 4910 session or state for the entire autonomous FPGA 4904 if a device level reset is performed.

(Optional) Authorization & resource assignment: An interface for an authorized entity to assign a FPGA tenant to a remote application 4910 by means of establishing a shared session token between these two entities. This is described in further detail below.

The authorized entity herein refers to CSP software or CSP authorized software that is allowed to do remote management of the autonomous FPGA 4904 or authorize who is allowed to use the autonomous FPGA 4904, etc. It can be a combination of orchestrator and authorization server described earlier with respect to FIGS. 47 and 48. The authorized entity should establish an authenticated session with the FPGA which may persist until the next FPGA reset.

The following discussion provides details of functionality of the FSM 4960 in implementations of the disclosure.

With respect to parsing and validation of messages, the FSM 4960 can expose a protected message passing interface for the remote application to interact with the autonomous FPGA 4904. In this case, none of the internal configuration registers are exposed directly to a remote entity. The message includes a message header and payload. The FSM parses and validates the message header parameters before performing any of the actions utilized by the respective messages. The FSM also verifies if the requester is allowed to perform the action requested before updating its internal state as per the request or responding back with requested data. For example, for a message consisting of data transfer to FPGA memory address 0x100, the FSM 4960 may determine if the remote application is allowed to access 0x100.

With respect to resource management, scheduling, and usage policy, the FSM 4960 can provide for such functionality. Resource assignment refers to mapping of the autonomous FPGA 4904 resources for use by a tenant. As part of resource management, the FSM 4960 determines how many available PR regions it has for remote application 4910 use. Allocation to the remote application 4910 may be done directly, in which case the FSM 4960 determines which PR region to assign to the remote application 4910. Optionally, this may be managed by authorized software, such as the orchestrator discussed with respect to FIG. 48. In this case, the FSM 4960 allocates the PR region to the customer as specified by the orchestrator.

The FSM 4960 also manages allocation of other resources such as hard IPs (e.g., decoder), available memory, networking port and such to the tenant logic (e.g., compute kernel 4980) that is being programmed.

The FSM 4960 is responsible for scheduling of tenants which may be done based on things like usage policy (e.g., how long it is allowed to run), or time-slice based on workload demand or based on the priority value specified in the tenant's policy.

Authorization regarding resource assignment is done by an authorization and policy sever such as described with respect to FIG. 47. It is verified and enforced by the FSM 4960. The policy can, for example, state attributes such as, when and how long the autonomous FPGA 4904 is allowed to be accessed by the remote application 4910, the number of tenants that the remote application 4910 is allowed to configure or the size of the autonomous FPGA 4904 memory that can be accessed. It may also assign a priority number to the remote application 4910.

The actual assignment request may come directly from the remote application 4910 or it may be facilitated by an orchestrator (such as described in FIG. 48). If the orchestration server does FPGA allocation and scheduling, then it may also establish a shared session token with the autonomous FPGA 4904 and provide that to the remote application 4910 securely. An authorization & resource assignment interface allows, for example, an orchestrator server to authorize the remote application 4910 to configure and access a FPGA tenant.

With respect to memory management, the FSM 4960 message interface supports various types of data transfers from the remote application 4910 to the autonomous FPGA 4904. The data transfer type can be included in the message header. Based on that information, the FSM 4960 determines the routing.

Figure 50:
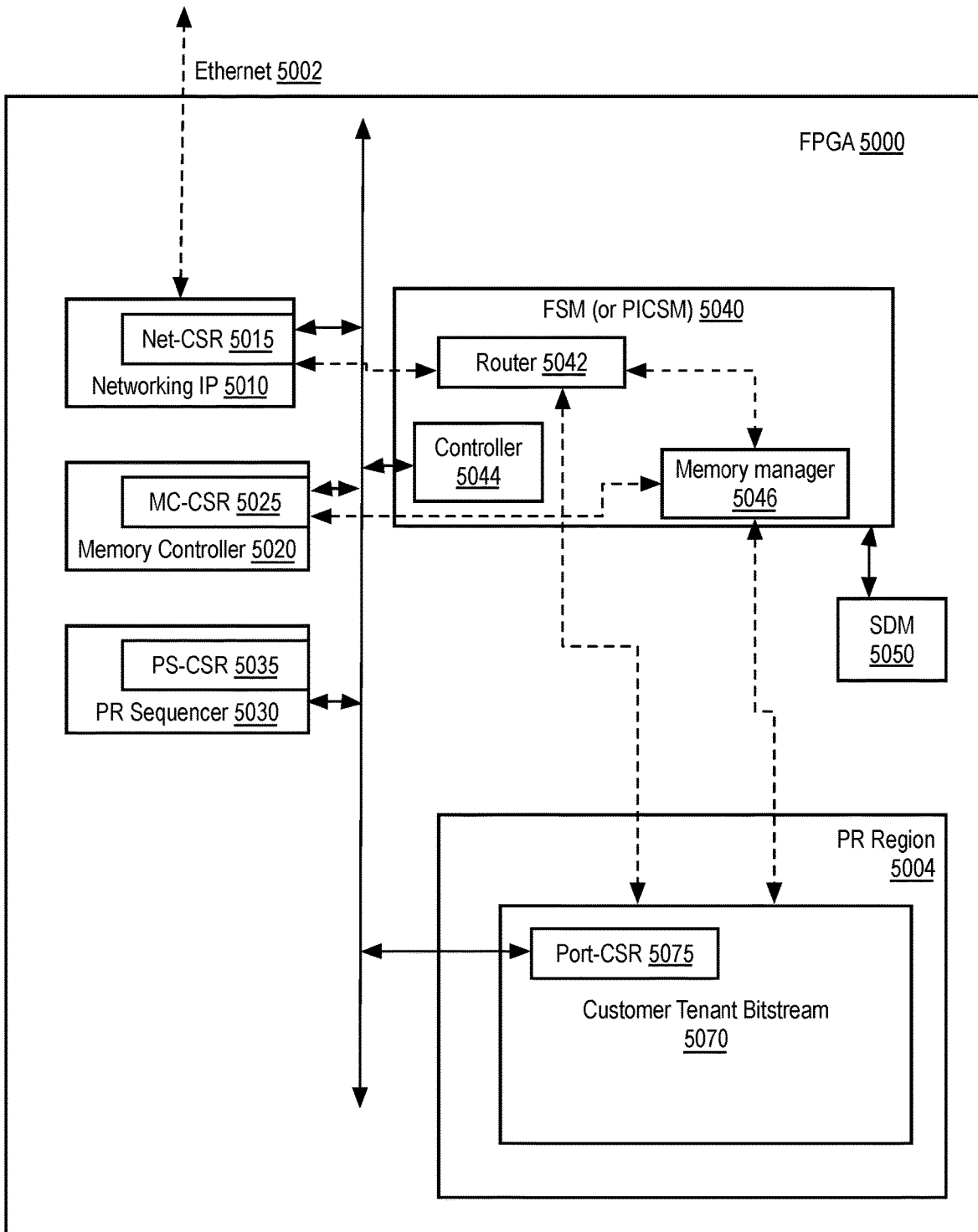
FIG. 50 illustrates an autonomous FPGA with a data and control path internal interface from an FPGA system manager (FSM), in accordance with implementations of the disclosure.

FIG. 50 illustrates an autonomous FPGA 5000 with a data and control path internal interface from an FSM 5040, in accordance with implementations of the disclosure. The FSM 5040 includes a router 5042, a controller 5044, and a memory manager 5046 that work in conjunction to provide the data and control path internal interface for the FSM 5040. In one implementation, the FSM 5040 is the same as FSM 4960 described with respect to FIG. 49. The FSM 5040 may also be referred to herein as a PICSM or a system manager.

In some implementation, two types of data transfers supported by the FSM 5040 (e.g., using the data and control path internal interface of the FSM 5040) are:

(1) Transfer of data from remote application to tenant (customer logic) via a streaming interface, such as AXI4-Stream. The tenant design seeks to implement its own local decoder mechanisms to route this data to appropriate location within the tenant. This data may target internal block RAM memory or custom registers defined by the customer. FSM's packet router ensures that the data is sent to the correct tenant as shown in FIG. 50 (e.g., if there are multiple tenants—multitenancy).

(2) Transfer of data to FPGA DRAM in PR region 5004. This allows a remote application to transfer data directly to the FPGA DRAM. The FSM 5040 also allows a DMA engine instantiated within the tenant to read and write to the allotted memory region in the FPGA DRAM via a standard memory bus interface.

In some implementations, the memory management in the FPGA 5000 may be static. For example, if there are multiple PR slots, each one receives a fixed amount of memory that is pre-configured. In some implementations, memory may be dynamically assigned and managed via standard mechanisms, such as use page tables. For dynamic assignment, the FSM 5040 can be responsible for managing the page tables. In the case of static assignment, there may be a simpler approach, such as use of range registers configured by FSM 5040 to manage isolation of memory available to each tenant.

In one example of how memory access is controlled for a remote application in case of RDMA, the remote application utilizes data plane interfaces to request for a specific buffer in FPGA DRAM to be pinned, as well as to perform the standard RDMA configuration steps. The FSM 5040 checks if the buffer requested falls within the range registers of the tenant. The FSM 5040 proceeds with NIC configuration and RDMA configuration when the access is validated.

With respect to secure connection management, the FSM assists in secure connection setup between a remote application and the FPGA. It performs cryptographic functions utilized to maintain confidentiality and integrity of messages. This connection maybe in the form of a standard network protocol such as TLS or via custom protocols that utilize a combination of symmetric and asymmetric cryptography.

The actual implementation of the FSM can be as firmware running on an embedded CPU or implemented using a state machine. The FSM has to interface with different IPs, such as networking IP 5010, memory controller 5020, and PR sequencer 5030, instantiated on the FPGA responsible for different management actions. This is shown in FIG. 50. Each of the FPGA IPs 5010, 5020, 5030, have their configuration and status register set (CSR) 5015, 5025, 5035, that can be addressed by the FSM controller 5044 via an internal bus such as, for example, AXI. This allows the FSM 5040 to configure and monitor status of different IPs 5010, 5020, 5030.

In an example flow of a PR message by a remote application, the steps taken by an SDM 5050 may include (assuming secure connection establishment has already taken place and client has been authorized to access the FPGA):

(1) Message received from host (e.g., via network connection such as Ethernet 5002), decrypted and verified as part secure connection setup.

(2) Message is then parsed and the FPGA encrypted bitstream from the payload is provided to the SDM 5050 (e.g., a trusted processor on FPGA that handles secure boot-up of device as well as performs other crypto related functions), which decrypts it and verifies the signature.

(3) FSM 5040 then resets the tenant port, which brings the port CSRs 5075 to the initial correct state.

(4) FSM 5040 then triggers PR by setting the corresponding PR CSR 5075.

(5) FSM 5040 provides the PR bitstream 5070 to the PR sequencer 5030 by pushing data using the CSRs 5035, 5075 until complete.

(6) FSM 5040 poll the status from PR CSR's 5075 to see if PR was successful.

FIG. 51 is a flow diagram illustrating a method 5100 for autonomous FPGAs, in accordance with implementations of the disclosure. Method 5100 may be performed by processing logic that may comprise hardware (e.g., circuitry, dedicated logic, programmable logic, etc.), software (such as instructions run on a processing device), or a combination thereof.

More particularly, the method 4400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 5100 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 45-50 may not be repeated or discussed hereafter. In one implementation, a programmable IC implementing a system manager, such as autonomous FPGA 4904 implementing an FSM/PICSM 4960 described with respect to FIG. 49 or autonomous FPGA 5000 implementing an FSM/PICSM 5040 described with respect to FIG. 50, may perform method 5100.

Method 5100 begins at block 5110 where a programmable IC may Interface, by a system manager of a programmable IC over a network, with a remote application of a client platform, the system manager to interface with the remote application using a message-based interface. At block 5120, the programmable IC may perform, by the system manager, resource management of resources of the programmable IC.

Subsequently, at block 5130, the programmable IC may validate, by the system manager, incoming messages to the programmable IC. At block 5140, the programmable IC may verify, by the system manager, whether a requester is allowed to perform requested actions of the incoming messages that are successfully validated. Lastly, at block 5150, the programmable IC may manage, by the system manager, transfer of data between the programmable IC and the remote application based on successfully verifying the requester.

The following examples pertain to further embodiments of autonomous (self-managed) FPGAs. Example 1 is an apparatus to facilitate autonomous (self-managed) FPGAs. The apparatus of Example 1 comprises a system manager to: interface, over a network, with a remote application of a client platform, the system manager to interface with the remote application using a message-based interface; perform resource management of resources of the programmable IC; validate incoming messages to the programmable IC; verify whether a requester is allowed to perform requested actions of the incoming messages that are successfully validated; and manage transfer of data between the programmable IC and the remote application based on successfully verifying the requester.

In Example 2, the subject matter of Example 1 can optionally include wherein the system manager is further to: establish a secure connection between the client platform and the programmable IC; schedule the resources of the programmable IC; and enforce a usage policy directing usage by the remote application of the resources of the programmable IC. In Example 3, the subject matter of any one of Examples 1-2 can optionally include wherein the resource management of the resources comprises at least one of enumeration, configuration, monitoring, resource assignment, device recovery and reset, network configuration, partial reconfiguration and debugging, or firmware updates.

In Example 4, the subject matter of any one of Examples 1-3 can optionally include wherein the system manager to schedule the resources of the programmable IC further comprises the system manager to determine available partial reconfiguration (PR) regions of the programmable IC and allocate a least one of available PR regions to a tenant of the programmable IC. In Example 5, the subject matter of any one of Examples 1-4 can optionally include wherein the system manager is further to expose a plurality of interfaces to the remote application, the plurality of interfaces comprising at least one of an attestation and key setup interface, an enumeration interface, a remote partial reconfiguration (PR) interface, a control plane interface, a data plane interface, a firmware update interface, a device recovery interface, or an authorization and resource assignment interface.

In Example 6, the subject matter of any one of Examples 1-5 can optionally include wherein the attestation and key setup interface to allow an authorized entity associated with the programmable IC to provision one or more keys to the programmable IC, the one or more keys used to validate the incoming messages. In Example 7, the subject matter of any one of Examples 1-6 can optionally include wherein the system manager further comprises a router, a controller, and a memory manager to work in conjunction to provide a data and control path internal interface for the system manager.

In Example 8, the subject matter of any one of Examples 1-7 can optionally include wherein the system manager to perform cryptographic functions to maintain confidentiality and integrity of the incoming messages. In Example 9, the subject matter of any one of Examples 1-8 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 10 is a method for facilitating autonomous (self-managed) FPGAs. The method of Example 10 can include interfacing, by a system manager of a programmable integrated circuit (IC) over a network, with a remote application of a client platform, the system manager to interface with the remote application using a message-based interface; performing, by the system manager, resource management of resources of the programmable IC; validating, by the system manager, incoming messages to the programmable IC; verifying, by the system manager, whether a requester is allowed to perform requested actions of the incoming messages that are successfully validated; and managing, by the system manager, transfer of data between the programmable IC and the remote application based on successfully verifying the requester.

In Example 11, the subject matter of Example 10 can optionally include wherein the system manager is further to: establish a secure connection between the client platform and the programmable IC; schedule the resources of the programmable IC; and enforce a usage policy directing usage by the remote application of the resources of the programmable IC. In Example 12, the subject matter of any one of Examples 10-11 can optionally include wherein the resource management of the resources comprises at least one of enumeration, configuration, monitoring, resource assignment, device recovery and reset, network configuration, partial reconfiguration and debugging, or firmware updates.

In Example 13, the subject matter of any one of Examples 10-12 can optionally include wherein the system manager to schedule the resources of the programmable IC further comprises the system manager to determine available partial reconfiguration (PR) regions of the programmable IC and allocate a least one of available PR regions to a tenant of the programmable IC. In Example 14, the subject matter of any one of Examples 10-13 can optionally include wherein the system manager is further to expose a plurality of interfaces to the remote application, the plurality of interfaces comprising at least one of an attestation and key setup interface, an enumeration interface, a remote partial reconfiguration (PR) interface, a control plane interface, a data plane interface, a firmware update interface, a device recovery interface, or an authorization and resource assignment interface.

In Example 15, the subject matter of any one of Examples 10-14 can optionally include wherein the attestation and key setup interface to allow an authorized entity associated with the programmable IC to provision one or more keys to the programmable IC, the one or more keys used to validate the incoming messages. In Example 16, the subject matter of any one of Examples 10-15 can optionally include wherein the system manager further comprises a router, a controller, and a memory manager to work in conjunction to provide a data and control path internal interface for the system manager.

In Example 17, the subject matter of any one of Examples 10-16 can optionally include wherein the system manager to perform cryptographic functions to maintain confidentiality and integrity of the incoming messages. In Example 18, the subject matter of any one of Examples 10-17 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 19 is a non-transitory machine readable storage medium for facilitating autonomous (self-managed) FPGAs. The non-transitory computer-readable storage medium of Example 19 having stored thereon executable computer program instructions that, when executed by one or more processors, cause the one or more processors to perform operations comprising interfacing, by a system manager of a programmable integrated circuit (IC) over a network, with a remote application of a client platform, the system manager to interface with the remote application using a message-based interface; performing, by the system manager, resource management of resources of the programmable IC; validating, by the system manager, incoming messages to the programmable IC; verifying, by the system manager, whether a requester is allowed to perform requested actions of the incoming messages that are successfully validated; and managing, by the system manager, transfer of data between the programmable IC and the remote application based on successfully verifying the requester.

In Example 20, the subject matter of Example 19 can optionally include wherein the system manager is further to: establish a secure connection between the client platform and the programmable IC; schedule the resources of the programmable IC; and enforce a usage policy directing usage by the remote application of the resources of the programmable IC. In Example 21, the subject matter of any one of Examples 19-20 can optionally include wherein the resource management of the resources comprises at least one of enumeration, configuration, monitoring, resource assignment, device recovery and reset, network configuration, partial reconfiguration and debugging, or firmware updates.

In Example 22, the subject matter of any one of Examples 19-21 can optionally include wherein the system manager to schedule the resources of the programmable IC further comprises the system manager to determine available partial reconfiguration (PR) regions of the programmable IC and allocate a least one of available PR regions to a tenant of the programmable IC. In Example 23, the subject matter of any one of Examples 19-22 can optionally include wherein the system manager is further to expose a plurality of interfaces to the remote application, the plurality of interfaces comprising at least one of an attestation and key setup interface, an enumeration interface, a remote partial reconfiguration (PR) interface, a control plane interface, a data plane interface, a firmware update interface, a device recovery interface, or an authorization and resource assignment interface.

In Example 24, the subject matter of any one of Examples 19-23 can optionally include wherein the attestation and key setup interface to allow an authorized entity associated with the programmable IC to provision one or more keys to the programmable IC, the one or more keys used to validate the incoming messages. In Example 25, the subject matter of any one of Examples 19-24 can optionally include wherein the system manager further comprises a router, a controller, and a memory manager to work in conjunction to provide a data and control path internal interface for the system manager.

In Example 26, the subject matter of any one of Examples 19-25 can optionally include wherein the system manager to perform cryptographic functions to maintain confidentiality and integrity of the incoming messages. In Example 27, the subject matter of any one of Examples 19-26 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 28 is an apparatus for facilitating autonomous (self-managed) FPGAs according to implementations of the disclosure. The apparatus of Example 28 can comprise means for interfacing, by a system manager of a programmable integrated circuit (IC) over a network, with a remote application of a client platform, the system manager to interface with the remote application using a message-based interface; means for performing, by the system manager, resource management of resources of the programmable IC; means for validating, by the system manager, incoming messages to the programmable IC; means for verifying, by the system manager, whether a requester is allowed to perform requested actions of the incoming messages that are successfully validated; and means for managing, by the system manager, transfer of data between the programmable IC and the remote application based on successfully verifying the requester. In Example 29, the subject matter of Example 28 can optionally include the apparatus further configured to perform the method of any one of the Examples 11 to 18.

Example 30 is a system for facilitating autonomous (self-managed) FPGAs, configured to perform the method of any one of Examples 10-18. Example 31 is an apparatus for facilitating autonomous (self-managed) FPGAs comprising means for performing the method of any one of claims 10 to 18. Specifics in the Examples may be used anywhere in one or more embodiments.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined.

Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
   a source remote direct memory access (RDMA) network interface controller (RNIC);
   a queue to store a data entry corresponding to an RDMA request between the source RNIC and a sink RNIC of a remote device;
   a data buffer to store data for an RDMA transfer corresponding to the RDMA request, the RDMA transfer between the source RNIC and the sink RNIC; and
   a trusted execution environment (TEE) to provide protection of the queue and the data buffer used for an RDMA transaction comprising the RDMA transfer, wherein the TEE comprises an authentication tag controller to:
      initialize a first authentication tag calculated using a first key known between a source consumer generating the RDMA request and the source RNIC;
      associate the first authentication tag with the data entry in the queue to provide the protection as integrity verification for the data entry during the RDMA transaction;
      initialize a second authentication tag calculated using a second key known between the source consumer and a sink consumer of the remote device, the sink consumer receiving the RDMA request; and
      associate the second authentication tag with the data buffer to provide the protection as integrity verification for the data buffer during the RDMA transaction.

2. The apparatus of claim 1, wherein the TEE further comprises a cryptographic engine to encrypt contents of the data buffer and the second authentication tag that is added to the data buffer.

3. The apparatus of claim 1, further comprising one or more processors comprising one or more of a GPU, a central processing unit (CPU), or a hardware accelerator.

4. The apparatus of claim 1, wherein the queue comprises at least one of a receive queue, a send queue, a shared receive queue, or a completion queue, and wherein the receive queue and the send queue are part of a queue pair (QP) of the RNIC.

5. The apparatus of claim 1, wherein the TEE comprises an application initiating the RDMA transfer.

6. The apparatus of claim 1, wherein the TEE comprises the source RNIC, and wherein the source RNIC comprises the authentication tag controller.

7. The apparatus of claim 1, wherein the first authentication tag and the second authentication tag are message authentication codes (MACs) to provide integrity protection to the queue and the data buffer for the RDMA request.

8. The apparatus of claim 1, wherein the queue is implemented as a circular buffer, with each data entry in the queue protected by the first authentication tag for the data entry.

9. The apparatus of claim 1, wherein at least one of an identifier of the queue or a sequence number of the data entry is added to a calculation of the first authentication tag.

10. The apparatus of claim 1, wherein at least one of an identifier of a queue pair comprising the queue, an identifier of an end point application of the RDMA request, or a sequence number of the data entry is added to a calculation of the first authentication tag.

11. The apparatus of claim 1, wherein an upper level protocol (ULP) is to utilize the data buffer and the second authentication tag added to the data buffer as part of the RDMA request, and wherein the RDMA request comprises at least one of an RDMA send command, an RDMA read command, or an RDMA write command.

12. A method comprising:
  executing, by a processor, a trusted execution environment (TEE) to provide protection of a queue and a data buffer used for a remote direct memory access (RDMA) transaction comprising an RDMA request, wherein the TEE comprises an authentication tag controller;
  initializing, by the authentication tag controller, a first authentication tag calculated using a first key known between a source consumer generating the RDMA request and a source RDMA network interface controller (RNIC);
  associating, by the authentication tag controller, the first authentication tag with a data entry in the queue to provide the protection as integrity verification for the data entry during the RDMA transaction;
  initializing, by the authentication tag controller, a second authentication tag calculated using a second key known between the source consumer and a sink consumer of a remote device, the sink consumer receiving the RDMA request; and
  associating, by the authentication tag controller, the second authentication tag with the data buffer to provide the protection as integrity verification for the data buffer during the RDMA transaction.

13. The method of claim 12, wherein the TEE further comprises a cryptographic engine to encrypt contents of the data buffer and the second authentication tag that is added to the data buffer.

14. The method of claim 12, wherein the queue comprises at least one of a receive queue, a send queue, a shared receive queue, or a completion queue, and wherein the receive queue and the send queue are part of a queue pair (QP) of the RNIC.

15. The method of claim 12, wherein the TEE comprises the RNIC, and wherein the RNIC comprises the authentication tag controller.

16. The method of claim 12, wherein the first authentication tag and the second authentication tag are message authentication codes (MACs) to provide integrity protection to the queue and the data buffer for the RDMA request.

17. A non-transitory machine readable storage medium having stored thereon executable computer program instructions that, when executed by one or more processors, cause the one or more processors to perform operations comprising:
  executing, by the one or more processors, a trusted execution environment (TEE) to provide protection of a queue and a data buffer used for a remote direct memory access (RDMA) transaction comprising an RDMA request, wherein the TEE comprises an authentication tag controller;
  initializing, by the authentication tag controller, a first authentication tag calculated using a first key known between a source consumer generating the RDMA request and a source RDMA network interface controller (RNIC);
  associating, by the authentication tag controller, the first authentication tag with a data entry in the queue to provide the protection as integrity verification for the data entry during the RDMA transaction;
  initializing, by the authentication tag controller, a second authentication tag calculated using a second key known between the source consumer and a sink consumer of a remote device, the sink consumer receiving the RDMA request; and
  associating, by the authentication tag controller, the second authentication tag with the data buffer to provide the protection as integrity verification for the data buffer during the RDMA transaction.

18. The non-transitory machine readable storage medium of claim 17, wherein the TEE further comprises a cryptographic engine to encrypt contents of the data buffer and the second authentication tag that is added to the data buffer.

19. The non-transitory machine readable storage medium of claim 17, wherein the queue comprises at least one of a receive queue, a send queue, a shared receive queue, or a completion queue, and wherein the receive queue and the send queue are part of a queue pair (QP) of the RNIC.

20. The non-transitory machine readable storage medium of claim 17, wherein the first authentication tag and the second authentication tag are message authentication codes (MACs) to provide integrity protection to the queue and the data buffer for the RDMA request.

* * * * *